(12) United States Patent
Raleigh et al.

(10) Patent No.: US 10,869,199 B2
(45) Date of Patent: *Dec. 15, 2020

(54) NETWORK SERVICE PLAN DESIGN

(71) Applicant: Headwater Research LLC, Tyler, TX (US)

(72) Inventors: Gregory G. Raleigh, Woodside, CA (US); Jeffrey Green, Sunnyvale, CA (US); James Lavine, Corte Madera, CA (US); Justin James, Poway, CA (US)

(73) Assignee: Headwater Research LLC, Tyler, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,902

(22) Filed: Dec. 10, 2018

(65) Prior Publication Data

US 2019/0124513 A1 Apr. 25, 2019

Related U.S. Application Data

(63) Continuation of application No. 14/948,082, filed on Nov. 20, 2015, now Pat. No. 10,165,447, which is a
(Continued)

(51) Int. Cl.
*H04W 12/08* (2009.01)
*G06Q 10/06* (2012.01)
(Continued)

(52) U.S. Cl.
CPC .......... *H04W 12/08* (2013.01); *G06F 15/177* (2013.01); *G06Q 10/06315* (2013.01); *G06Q 10/06375* (2013.01); *G06Q 20/102* (2013.01); *G06Q 20/20* (2013.01); *G06Q 20/40* (2013.01); *G06Q 30/0207* (2013.01); *G06Q 30/0241* (2013.01);
(Continued)

(58) Field of Classification Search
USPC .......................................................... 705/34
See application file for complete search history.

(56) References Cited

U.S. PATENT DOCUMENTS 5,131,020 A 7/1992 Liebesny et al.
5,283,904 A 2/1994 Carson et al.
(Continued)

FOREIGN PATENT DOCUMENTS

CA 2688553 A1 12/2008
CN 1310401 A 8/2001
(Continued)

OTHER PUBLICATIONS

"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.
(Continued)

*Primary Examiner* — Garcia Ade
(74) *Attorney, Agent, or Firm* — James E. Harris

(57) ABSTRACT

A technique involves modular storage of network service plan components and provisioning of same. A subset of the capabilities of a service design system can be granted to a sandbox system to enable customization of service plan offerings or other controls.

16 Claims, 135 Drawing Sheets

Related U.S. Application Data continuation of application No. 13/842,172, filed on Mar. 15, 2013, now Pat. No. 9,858,559, which is a continuation-in-part of application No. 13/248,025, filed on Sep. 28, 2011, now Pat. No. 8,924,543, and a continuation-in-part of application No. 13/253,013, filed on Oct. 4, 2011, now Pat. No. 8,745,191, said application No. 13/248,025 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/239,321, filed on Sep. 21, 2011, now Pat. No. 8,898,293, and a continuation-in-part of application No. 13/248,028, filed on Sep. 28, 2011, now Pat. No. 8,924,469, and a continuation-in-part of application No. 13/247,998, filed on Sep. 28, 2011, now Pat. No. 8,725,123, and a continuation-in-part of application No. 13/134,005, filed on May 25, 2011, now Pat. No. 8,635,335, said application No. 13/253,013 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/239,321, filed on Sep. 21, 2011, now Pat. No. 8,898,293, and a continuation-in-part of application No. 13/248,028, filed on Sep. 28, 2011, now Pat. No. 8,924,469, and a continuation-in-part of application No. 13/247,998, filed on Sep. 28, 2011, now Pat. No. 8,725,123, and a continuation-in-part of application No. 13/134,005, filed on May 25, 2011, now Pat. No. 8,635,335, and a continuation-in-part of application No. 13/248,025, filed on Sep. 28, 2011, now Pat. No. 8,924,543, said application No. 12/695,019 is a continuation-in-part of application No. 12/380,778, filed on Mar. 2, 2009, now Pat. No. 8,321,526, and a continuation-in-part of application No. 12/380,771, filed on Mar. 2, 2009, now Pat. No. 8,023,425, said application No. 12/695,020 is a continuation-in-part of application No. 12/380,780, filed on Mar. 2, 2009, now Pat. No. 8,839,388, said application No. 12/694,445 is a continuation-in-part of application No. 12/380,780, filed on Mar. 2, 2009, now Pat. No. 8,839,388, said application No. 12/694,451 is a continuation-in-part of application No. 12/380,780, filed on Mar. 2, 2009, now Pat. No. 8,839,388, said application No. 12/694,455 is a continuation-in-part of application No. 12/380,780, filed on Mar. 2, 2009, now Pat. No. 8,839,388, said application No. 12/695,021 is a continuation-in-part of application No. 12/380,780, filed on Mar. 2, 2009, now Pat. No. 8,839,388, said application No. 12/695,980 is a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,021, filed on Jan. 27, 2010, now Pat. No. 8,346,225, said application No. 13/134,028 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,005, filed on May 25, 2011, now Pat. No. 8,635,335, said application No. 13/134,005 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No.

8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, said application No. 13/229,580 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,005, filed on May 25, 2011, now Pat. No. 8,635,335, and a continuation-in-part of application No. 13/134,028, filed on May 25, 2011, now Pat. No. 8,589,541, said application No. 13/237,827 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/134,005, filed on May 25, 2011, now Pat. No. 8,635,335, said application No. 13/239,321 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/695,021, filed on Jan. 27, 2010, now Pat. No. 8,346,225, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/134,005, filed on May 25, 2011, now Pat. No. 8,635,335, said application No. 13/248,028 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/239,321, filed on Sep. 21, 2011, now Pat. No. 8,898,293, and a continuation-in-part of application No. 13/247,998, filed on Sep. 28, 2011, now Pat. No. 8,725,123, and a continuation-in-part of application No. 13/248,025, filed on Sep. 28, 2011, now Pat. No. 8,924,543, and a continuation-in-part of application No. 13/134,005, filed on May 25, 2011, now Pat. No. 8,635,335, said application No. 13/247,998 is a continuation-in-part of application No. 12/380,778, filed on Mar. 2, 2009, now Pat. No. 8,321,526, and a continuation-in-part of application No. 12/380,780, filed on Mar. 2, 2009, now Pat. No. 8,839,388, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/239,321, filed on Sep. 21, 2011, now Pat. No. 8,898,293, and a continuation-in-part of application No. 13/248,028, filed on Sep. 28, 2011, now Pat. No. 8,725,123, and a continuation-in-part of application No. 13/248,025, filed on Sep. 28, 2011, now Pat. No. 8,924,543, and a continuation-in-part of application No. 13/134,005, filed on May 25, 2011, now Pat. No. 8,635,335.

(60) Provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/270,353, filed on Jul. 6, 2009, provisional application No. 61/264,126, filed on Nov. 24, 2009, provisional application No. 61/275,208, filed on Aug. 25, 2009, provisional application No. 61/237,753, filed on Aug. 28, 2009, provisional application No. 61/252,151, filed on Oct. 15, 2009, provisional application No. 61/252,153, filed on Oct. 15, 2009, provisional application No. 61/264,120, filed on Nov. 24, 2009, provisional application No. 61/348,022, filed on May 25, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/385,020, filed on Sep. 21, 2010, provisional application No. 61/387,243, filed on Sep. 28, 2010, provisional application No. 61/387,247, filed on Sep. 28, 2010.

(51) Int. Cl.
| | |
|---|---|
| *G06Q 20/10* | (2012.01) |
| *G06Q 20/20* | (2012.01) |
| *G06Q 20/40* | (2012.01) |
| *G06Q 30/02* | (2012.01) |
| *G06Q 30/04* | (2012.01) |
| *G06Q 30/06* | (2012.01) |
| *G06Q 40/00* | (2012.01) |
| *H04L 12/14* | (2006.01) |
| *H04L 12/24* | (2006.01) |
| *H04M 15/00* | (2006.01) |
| *H04L 29/08* | (2006.01) |
| *H04W 88/08* | (2009.01) |
| *H04L 29/06* | (2006.01) |
| *H04W 4/50* | (2018.01) |
| *H04W 12/00* | (2009.01) |
| *H04W 4/24* | (2018.01) |
| *G06F 15/177* | (2006.01) |
| *H04L 9/32* | (2006.01) |
| *H04W 28/02* | (2009.01) |
| *H04L 12/851* | (2013.01) |
| *H04W 8/20* | (2009.01) |
| *H04W 28/12* | (2009.01) |
| *H04W 48/14* | (2009.01) |
| *H04W 4/20* | (2018.01) |
| *H04W 24/08* | (2009.01) |
| *H04W 12/02* | (2009.01) |
| *H04L 12/58* | (2006.01) |
| *H04W 4/12* | (2009.01) |
| *H04W 4/18* | (2009.01) |
| *H04W 8/18* | (2009.01) |
| *H04W 72/04* | (2009.01) |
| *H04L 12/813* | (2013.01) |
| *H04W 4/02* | (2018.01) |
| *H04W 12/06* | (2009.01) |
| *H04W 48/16* | (2009.01) |
| *H04W 4/16* | (2009.01) |
| *H04W 8/02* | (2009.01) |
| *H04W 84/04* | (2009.01) |
| *H04W 84/12* | (2009.01) |
| *H04W 88/06* | (2009.01) |

(52) U.S. Cl.
CPC ...... *G06Q 30/0283* (2013.01); *G06Q 30/0284* (2013.01); *G06Q 30/04* (2013.01); *G06Q 30/0601* (2013.01); *G06Q 40/00* (2013.01); *G06Q 40/12* (2013.12); *H04L 9/32* (2013.01); *H04L 9/3247* (2013.01); *H04L 12/14* (2013.01); *H04L 41/0806* (2013.01); *H04L 41/0893* (2013.01); *H04L 41/5003* (2013.01); *H04L 41/5054* (2013.01); *H04L 47/20* (2013.01); *H04L 47/2408* (2013.01); *H04L 51/046* (2013.01); *H04L 63/0236* (2013.01); *H04L 63/04* (2013.01); *H04L 63/0428* (2013.01); *H04L 63/08* (2013.01); *H04L 63/0853* (2013.01); *H04L 63/0892* (2013.01); *H04L 63/10* (2013.01); *H04L 63/20* (2013.01); *H04L 67/145* (2013.01); *H04L 67/26* (2013.01); *H04L 67/306* (2013.01); *H04L 67/327* (2013.01); *H04M 15/00* (2013.01); *H04M 15/58* (2013.01); *H04M 15/61* (2013.01); *H04M 15/80* (2013.01); *H04M 15/88* (2013.01); *H04W 4/02* (2013.01); *H04W 4/12* (2013.01); *H04W 4/18* (2013.01); *H04W 4/20* (2013.01); *H04W 4/24* (2013.01); *H04W 4/50* (2018.02); *H04W 8/18* (2013.01); *H04W 8/20* (2013.01); *H04W 12/00* (2013.01); *H04W 12/0017* (2019.01); *H04W 12/02* (2013.01); *H04W 12/06* (2013.01); *H04W 24/08* (2013.01); *H04W 28/02* (2013.01); *H04W 28/0215* (2013.01); *H04W 28/0268* (2013.01); *H04W 28/12* (2013.01); *H04W 48/14* (2013.01); *H04W 48/16* (2013.01); *H04W 72/0453* (2013.01); *H04W 88/08* (2013.01); *H04L 41/0876* (2013.01); *H04L 41/5025* (2013.01); *H04L 67/2819* (2013.01); *H04L 67/34* (2013.01); *H04M*

2215/0188 (2013.01); *H04W 8/02* (2013.01); *H04W 84/04* (2013.01); *H04W 84/042* (2013.01); *H04W 84/12* (2013.01); *H04W 88/06* (2013.01); *Y02P 90/80* (2015.11)

(56) References Cited

U.S. PATENT DOCUMENTS

| | | | |
|---|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |

(56) References Cited

U.S. PATENT DOCUMENTS

| | | |
|---|---|---|
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,020,781 B1 | 3/2006 | Saw et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,320,781 B2 | 1/2008 | Lambert et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,794 B2 | 3/2009 | Feather et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |

(56) References Cited

U.S. PATENT DOCUMENTS

| | | |
|---|---|---|
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 | 9/2009 | Lutnick et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,788,700 B1 | 8/2010 | Feezel et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,255 B2 | 12/2010 | Karaoguz et al. |
| 7,853,656 B2 | 12/2010 | Yach |
| 7,856,226 B2 | 12/2010 | Wong et al. |
| 7,860,088 B2 | 12/2010 | Lioy |

(56) References Cited

U.S. PATENT DOCUMENTS

| | | |
|---|---|---|
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,873,985 B2 | 1/2011 | Baum |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,175 B2 | 1/2012 | Todd et al. |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |

(56) References Cited

U.S. PATENT DOCUMENTS

| | | |
|---|---|---|
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |

(56) References Cited

U.S. PATENT DOCUMENTS

| | | |
|---|---|---|
| 8,346,210 B2 | 1/2013 | Balsan et al. |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,429,409 B1 | 4/2013 | Wall et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,057 B2 | 7/2013 | Cuervo |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 | 9/2013 | Guba et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,402 B2 | 9/2013 | Vidal et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,850 B2 | 12/2013 | Zabawskyj et al. |
| 8,600,895 B2 | 12/2013 | Felsher |
| 8,601,125 B2 | 12/2013 | Huang et al. |
| 8,605,691 B2 | 12/2013 | Soomro et al. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |

(56) References Cited

U.S. PATENT DOCUMENTS

| | | |
|---|---|---|
| 8,621,056 B2 | 12/2013 | Coussemaeker et al. |
| 8,626,115 B2 | 1/2014 | Raleigh et al. |
| 8,630,314 B2 | 1/2014 | York |
| 8,630,925 B2 | 1/2014 | Bystrom et al. |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,712,631 B2 | 4/2014 | Tietjen et al. |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,792,857 B2 | 7/2014 | Cai et al. |
| 8,793,304 B2 | 7/2014 | Lu et al. |
| 8,798,610 B2 | 8/2014 | Prakash et al. |
| 8,799,227 B2 | 8/2014 | Ferguson et al. |
| 8,799,440 B2 | 8/2014 | Zhou et al. |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tönsing et al. |
| 8,930,238 B2 | 1/2015 | Coffman et al. |
| 8,930,551 B2 | 1/2015 | Pandya et al. |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,972,537 B2 | 3/2015 | Bastian et al. |
| 8,977,284 B2 | 3/2015 | Reed |
| 8,977,856 B2 | 3/2015 | Malek et al. |
| 8,983,860 B1 | 3/2015 | Beda, III et al. |
| 8,995,952 B1 | 3/2015 | Baker et al. |
| 9,002,322 B2 | 4/2015 | Cotterill |
| 9,002,342 B2 | 4/2015 | Tenhunen et al. |
| 9,014,973 B2 | 4/2015 | Ruckart |
| 9,015,331 B2 | 4/2015 | Lai et al. |
| 9,021,069 B2 | 4/2015 | Ducrou et al. |
| 9,026,100 B2 | 5/2015 | Castro et al. |
| 9,030,934 B2 | 5/2015 | Shah et al. |
| 9,032,427 B2 | 5/2015 | Gallant et al. |
| 9,042,923 B1 | 5/2015 | Mirho |
| 9,043,462 B2 | 5/2015 | Badiee et al. |
| 9,047,651 B2 | 6/2015 | Roumeliotis et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,137,389 B2 | 9/2015 | Neal et al. |
| 9,172,553 B2 | 10/2015 | Dawes et al. |
| 9,173,090 B2 | 10/2015 | Tuchman et al. |
| 9,176,913 B2 | 11/2015 | Millet et al. |
| 9,177,455 B2 | 11/2015 | Remer |
| 9,191,394 B2 | 11/2015 | Novak et al. |
| 9,277,433 B2 | 3/2016 | Raleigh et al. |
| 9,282,460 B2 | 3/2016 | Souissi |
| 9,286,469 B2 | 3/2016 | Kraemer et al. |
| 9,286,604 B2 | 3/2016 | Aabye et al. |
| 9,298,723 B1 | 3/2016 | Vincent |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,361,451 B2 | 6/2016 | Oberheide et al. |
| 9,363,285 B2 | 6/2016 | Kitamura |
| 9,367,680 B2 | 6/2016 | Mahaffey et al. |
| 9,369,959 B2 | 6/2016 | Ruutu et al. |
| 9,386,045 B2 | 7/2016 | Kgil et al. |
| 9,402,254 B2 | 7/2016 | Kneckt et al. |
| 9,413,546 B2 | 8/2016 | Meier et al. |
| 9,418,381 B2 | 8/2016 | Ahuja et al. |
| 9,454,598 B2 | 9/2016 | Hwang et al. |
| 9,459,767 B2 | 10/2016 | Cockcroft et al. |
| 9,479,917 B1 | 10/2016 | Gota et al. |
| 9,501,803 B2 | 11/2016 | Bilac et al. |
| 9,589,117 B2 | 3/2017 | Ali et al. |
| 9,609,459 B2 | 3/2017 | Raleigh |
| 9,634,850 B2 | 4/2017 | Taft et al. |
| 9,648,022 B2 | 5/2017 | Peterka et al. |
| 9,681,003 B1 | 6/2017 | Kim et al. |
| 9,712,476 B2 | 7/2017 | Boynton et al. |
| 10,002,332 B2 | 6/2018 | Spong |
| 10,057,775 B2 | 8/2018 | Raleigh et al. |
| 10,171,988 B2 | 1/2019 | Raleigh et al. |
| 10,171,990 B2 | 1/2019 | Raleigh et al. |
| 10,248,996 B2 | 4/2019 | Raleigh |
| 10,264,138 B2 | 4/2019 | Raleigh et al. |
| 10,285,025 B1 | 5/2019 | Baker et al. |
| 10,462,627 B2 | 10/2019 | Raleigh et al. |
| 10,492,102 B2 | 11/2019 | Raleigh et al. |
| 10,582,375 B2 | 3/2020 | Raleigh |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |

(56) References Cited

U.S. PATENT DOCUMENTS

| | | |
|---|---|---|
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0114553 A1 | 6/2004 | Jiang et al. |
| 2004/0116140 A1 | 6/2004 | Babbar et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0226178 A1 | 10/2005 | Forand et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |

(56) References Cited

U.S. PATENT DOCUMENTS

| | | |
|---|---|---|
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0111740 A1 | 5/2007 | Wandel |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0265003 A1 | 11/2007 | Kezys et al. |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0101291 A1 | 5/2008 | Jiang et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |

(56) References Cited

U.S. PATENT DOCUMENTS

| | | |
|---|---|---|
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0170554 A1 | 7/2009 | Want et al. |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217065 A1 | 8/2009 | Araujo, Jr. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027525 A1 | 2/2010 | Zhu |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0182220 A1 | 7/2011 | Black et al. |
| 2011/0185202 A1 | 7/2011 | Black et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0244837 A1 | 10/2011 | Murata et al. |
| 2011/0249668 A1 | 10/2011 | Milligan et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0101952 A1 | 4/2012 | Raleigh et al. |
| 2012/0108225 A1 | 5/2012 | Luna et al. |
| 2012/0144025 A1 | 6/2012 | Melander et al. |

(56) References Cited

U.S. PATENT DOCUMENTS

| | | |
|---|---|---|
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0103376 A1 | 4/2013 | Gaddam et al. |
| 2013/0111572 A1 | 5/2013 | Gaddam et al. |
| 2013/0117140 A1 | 5/2013 | Kashanian |
| 2013/0117382 A1 | 5/2013 | Gaddam et al. |
| 2013/0144789 A1 | 6/2013 | Aaltonen et al. |
| 2013/0149994 A1 | 6/2013 | Gaddam et al. |
| 2013/0183937 A1 | 7/2013 | Neal et al. |
| 2013/0225151 A1 | 8/2013 | King et al. |
| 2013/0275583 A1 | 10/2013 | Roach et al. |
| 2013/0326356 A9 | 12/2013 | Zheng et al. |
| 2014/0066101 A1 | 3/2014 | Lyman et al. |
| 2014/0073291 A1 | 3/2014 | Hildner et al. |
| 2014/0080458 A1* | 3/2014 | Bonner .................. H04W 4/16 455/414.1 |
| 2014/0241342 A1 | 8/2014 | Constantinof |
| 2015/0181628 A1 | 6/2015 | Haverinen et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2010128391 A3 | 1/2011 |
| WO | 2011002450 A1 | 1/2011 |
| WO | 2011149532 A1 | 12/2011 |
| WO | 2012047275 A | 4/2012 |

OTHER PUBLICATIONS

"Ads and movies on the run," the Gold Coast Bulletin, Southport, Qld, Jan. 29, 2008.
"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. Of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.

(56) References Cited

OTHER PUBLICATIONS

"Prevent iCloud Documents & Data from using your data plan," Oct. 26, 2011; CNET webarchive, by Jason Ciprian.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offiload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Ehnert, "Small application to monitor IP trafic on a Blackberry—1.01.03", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Steglich, Stephan, "I-Centric User Interaction," Nov. 21, 2003.

(56) References Cited

OTHER PUBLICATIONS

Sun et al., "Towards Connectivity Management Adaptability: Context Awareness in Policy Representation and End-to-end Evaluation Algorithm," Dept. of Electrical and Information Engineering, Univ. of Oulu, Finland, 2004.

Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.

Van Eijk, et al., "GigaMobile, Agent Technology for Designing Personalized Mobile Service Brokerage," Jul. 1, 2002.

VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.

Wi-Fi Alliance Hotspot 2.0 Technical Task Group, "Wi-Fi Certified Passpoint™ (Release 1) Deployment Guidelines—Version 1.0—Oct. 2012".

Wi-Fi Alliance Technical Committee Hotspot 2.0 Technical Task Group, "Hotspot 2.0 (Release 1) Technical Specification—Version 1.0.0"; 2012.

Windows7 Power Management, published Apr. 2009.

Wireless Broadband Alliance, "WISPr 2.0, Apr. 8, 2010"; Doc. Ref. No. WBA/RM/WISPr, Version 01.00.

Zhu et al., "A Survey of Quality of Service in IEEE 802.11 Networks," IEEE Wireless Communications, Aug. 2004.

Byrd, "Open Secure Wireless," May 5, 2010.

Droid Wall 1.3.7 description Apr. 28, 2010; obtained from https://www.freewarelovers.com/android/apps/droid-wall.

Sharkey, "Coding for Life—Battery Life That Is," May 27, 2009.

\* cited by examiner

Hierarchical Design Environment

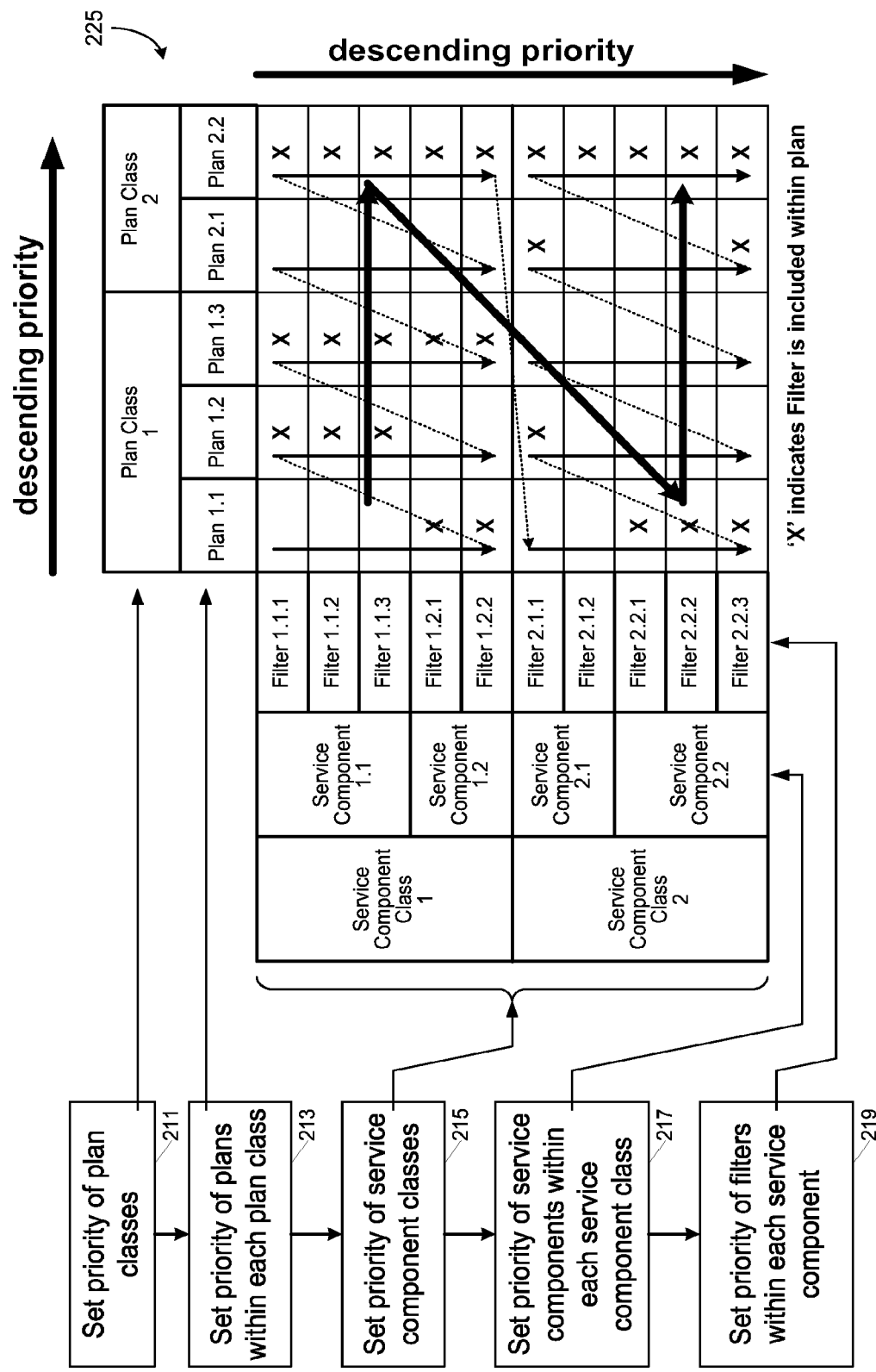
FIG. 6 Policy Priority Management

FIG. 7 Policy Priority Management

| Service Component Class | Service Component | Filter | Plan Classes/Plans | | | | |
|---|---|---|---|---|---|---|---|
| | | | Sponsored Plans | | User-Paid Plans | | |
| | | | One-Day Sponsored Twitter Plan | Three-Day Sponsored Social Networking Plan | 30-Day, 10 MB General Access Plan With Bonus | Non-Expiring 50 MB General Access Plan | |
| Sponsored Service Components | Facebook | Facebook App Filter | | | X | | |
| | | Facebook Messenger Filter | | X | X | | |
| | | Facebook Web Access Filter | | X | X | | |
| | Twitter | Twitter App Filter | X | X | X | | |
| | | Twitter Web Access Filter | X | X | X | | |
| Open-Access Service Components | Open Access | All-pass Filter | | | X | X | | descending priority → descending priority ↑

FIG. 8 Policy Priority Management

| Service Component Class | Service Component | Filter | Plan Classes/Plans | | | | |
|---|---|---|---|---|---|---|---|
| | | | Sponsored Plans | | User-Paid Plans | | |
| | | | One-Day Sponsored Twitter Plan | Three-Day Sponsored Social Networking Plan | One-Week 50 MB General Access Plan | 30-Day, 10 MB General Access Plan With Bonus | |
| Sponsored Service Components | Facebook | Facebook App Filter | | X | | X | |
| | | Facebook Messenger Filter | | X | | X | |
| | | Facebook Web Access Filter | | X | | X | |
| | Twitter | Twitter App Filter | X | X | | X | |
| | | Twitter Web Access Filter | X | X | X | X | |
| Open-Access Service Components | Open Access | All-pass Filter | | | X | X | | descending priority (rows, top to bottom)
descending priority (columns, left to right)

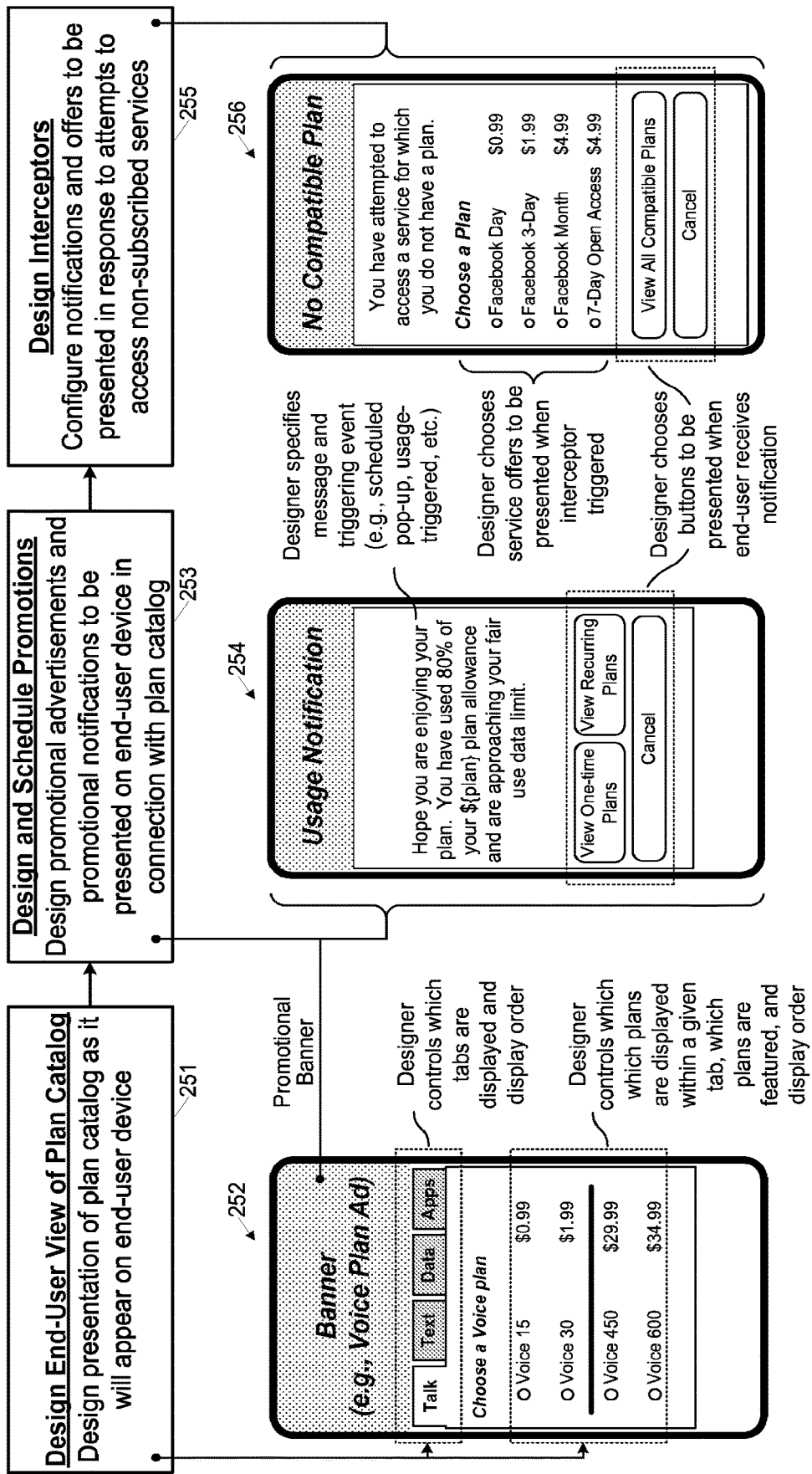
FIG. 9 Service Discovery Management

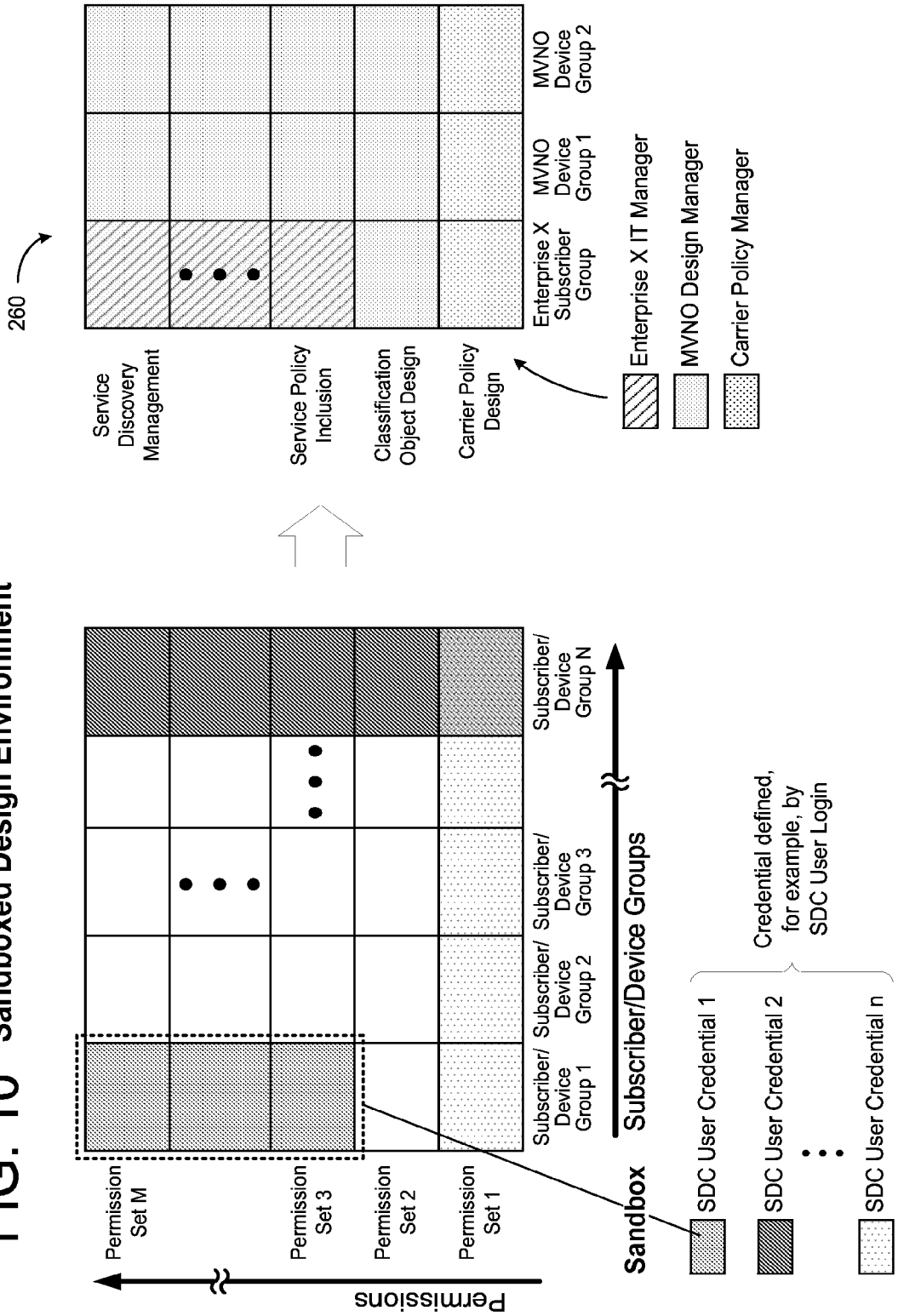
FIG. 10 Sandboxed Design Environment

Single-Match/Multi-Match Design Capability

Single-Match/Multi-Match Design Capability

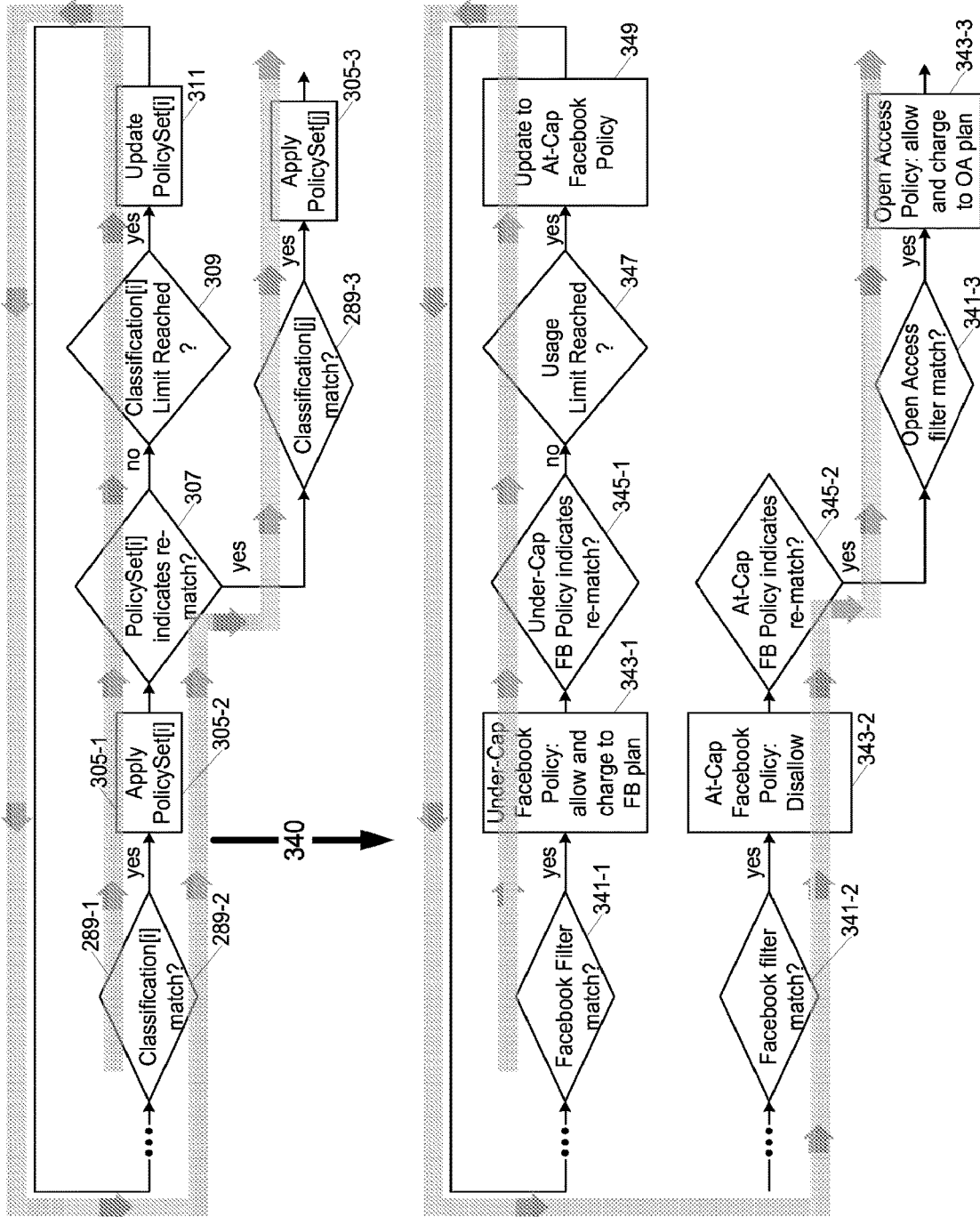
FIG. 12 Multi-Match Example: Cap and Re-Match

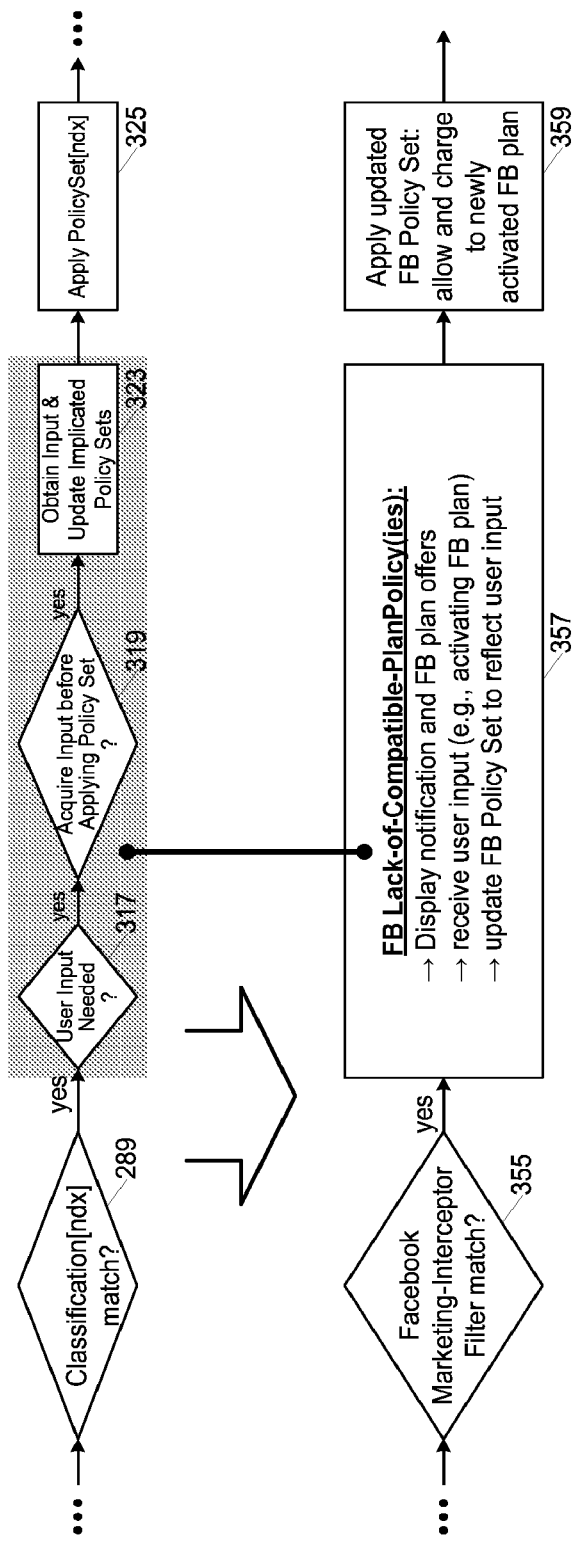
FIG. 13 Input-Modified Policy Set Example: Marketing Interceptor

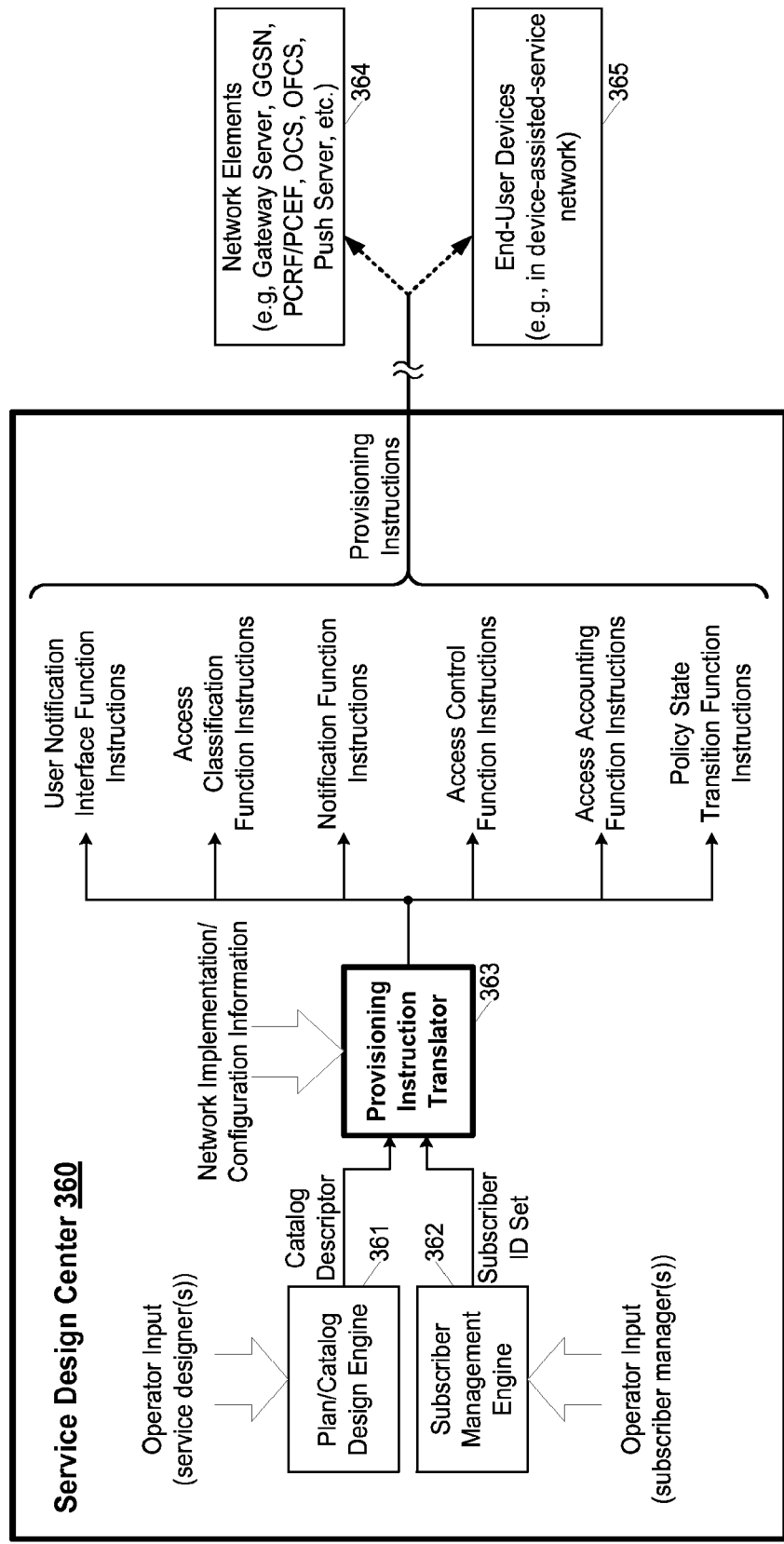
FIG. 14A Provisioning Instruction Translator

Policy System Architecture

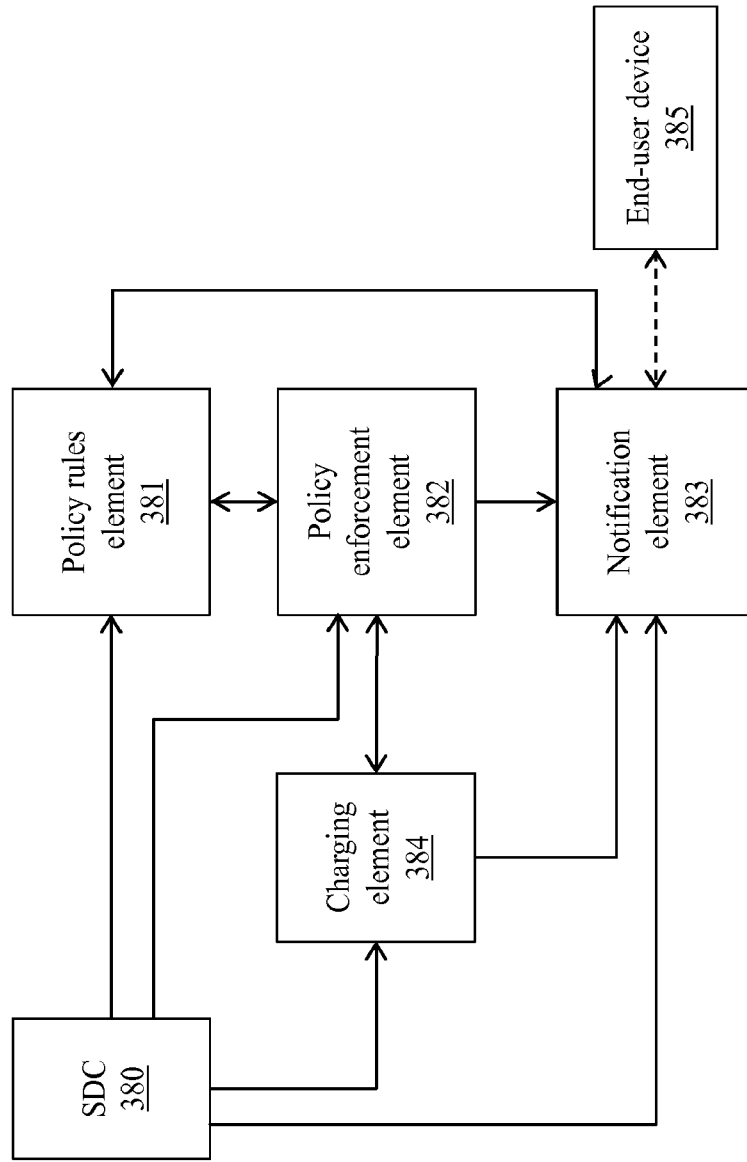
FIG. 14C  Policy Provisioning and Enforcement

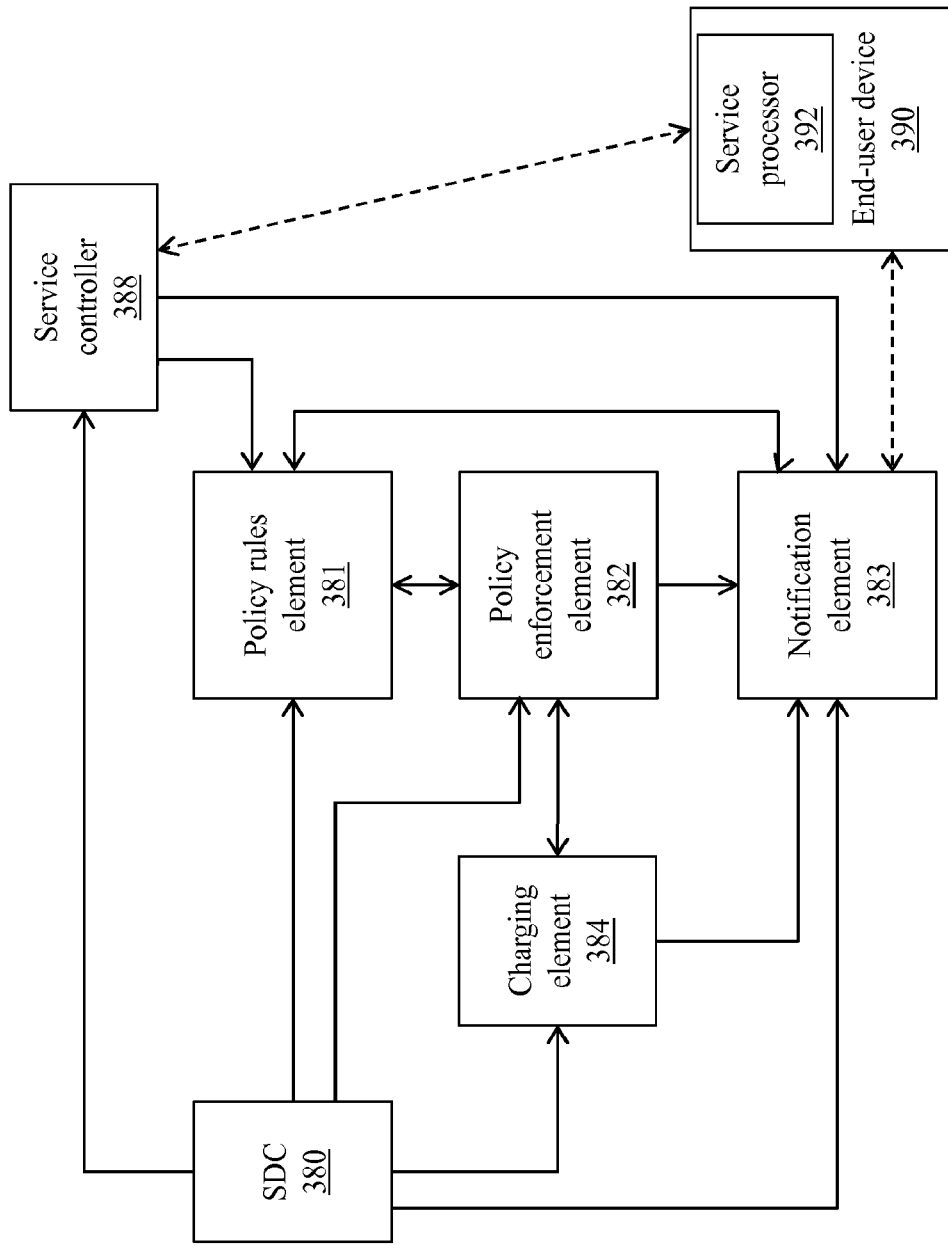
FIG. 14D  Policy Provisioning and Enforcement

Service Design Center

Home > Catalogs

Catalogs

| Name ▲ | Description |
|---|---|
| B&N | B&N Catalog for demos with Add-Ons data plans and Sponsored services |
| CTS | |
| Dave P Test | |
| G Catalog | G Catalog |
| ItsOn Demo | for demo purposes |
| ItsOn MVNO | For demo purposes with Sponsored plans, Base Plans and Add-ons. |
| JOE Demo | Joint Venture Demo |
| Mobile Internet | Catalog focusing on Mobile Internet. With MB, App bases plans and No streaming data |
| z- Testing | VB - Testing |

— 401

[New]

Service Design Center

Home > Catalogs

ItsOn Demo for demo purposes

1. Configure Plans & Bundles
2. Configure Base Plan Sets
3. Configure device tabs
4. Add plans/bundles to the "Featured" list
5. Configure Interceptors
6. Create Promo Banners
7. Schedule Promo Popups
8. Configure Upsells
9. Adjust Plan Priorities
10. Review and Publish!

Subscriber Groups

— 405

FIG. 15    Plan Catalogs

Plan Catalogs > Incorporated Service Plans & Bundles

Service Design Center

Home > Catalogs > *ItsOn Demo*

Plans and Bundles

New Plan
New Bundle

Data Plans

| Internal Name | Display Name | Class | Price | |
|---|---|---|---|---|
| Amex | Amex Pass | PAID | $1.99 | ✎ ✗ |
| Apptastic | Apptastic | PAID | $6.99 | ✎ ✗ |
| Data Open Access 125MB | 125MB Data | PAID | $4.99 | ✎ ✗ |
| Data Open Access 300MB | 250MB Data | PAID | $7.99 | ✎ ✗ |
| Data Open Access B100 | Data 100 | PAID | $5.00 | ✎ ✗ |
| Data Open Access B1000 | Data 1000 | PAID | $30.00 | ✎ ✗ |
| Data Open Access B300 | Data 300 | PAID | $10.00 | ✎ ✗ |
| Data Open Access B600 | Data 600 | PAID | $15.00 | ✎ ✗ |
| Facebook monthly pass | Facebook Pass | PAID | $4.99 | ✎ ✗ |
| Gmail Application | Gmail Pass | PAID | $2.99 | ✎ ✗ |
| Instagram Monthly Pass | Instagram Pass | PAID | $5.99 | ✎ ✗ |
| iStoryBooks Pass | iStoryBooks Pass | PAID | $2.99 | ✎ ✗ |
| Maps & Nav monthly pass | Map & Nav Pass | PAID | $3.99 | ✎ ✗ |
| Nook | Free Nook Access | SPONSORED | $0.00 | ✎ ✗ |
| Twitter monthly pass | Twitter Pass | PAID | $2.99 | ✎ ✗ |
| Weatherbug Monthly Pass | Weatherbug Pass | PAID | $1.99 | ✎ ✗ |
| YouTube monthly pass | YouTube Pass | PAID | $5.99 | ✎ ✗ |

Voice Plans

| Internal Name | Display Name | Class | Price | |
|---|---|---|---|---|
| Voice Open 15mins | Voice 15 | PAID | $1.00 | ✎ ✗ |
| Voice Open 1min | Voice 1 | PAID | $0.15 | ✎ ✗ |
| Voice Open 30mins | Voice 30 | PAID | $2.00 | ✎ ✗ |
| Voice Open 450mins | Voice 450 | PAID | $30.00 | ✎ ✗ |
| Voice Open 600mins | Voice 600 | PAID | $35.00 | ✎ ✗ |

Service Design Center

Plan Catalogs > Plan Priorities

Home > Catalogs > *ItsOn Demo*

Plan Priorities

Sponsored Plans

| | Plan Name | Description |
|---|---|---|
| 1 | Nook | Nook for a month |

Paid Plans

| | Plan Name | Description |
|---|---|---|
| 1 | Twitter monthly pass | Twitter access for 1 month |
| 2 | Test | Test |
| 3 | Open small roam | Small Roam |
| 4 | Apptastic | 4 apps for a month inc Facebook, Twitter |
| 5 | Test | Test |
| 6 | SMS Messaging Open B1000 | Text 1000 |
| 7 | Maps & Nav monthly pass | Maps & Nav for a month |
| 8 | YouTube monthly pass | YouTube for a month |
| 9 | Weatherbug Monthly Pass | Weatherbug for a month |
| 10 | iStoryBooks Pass | iStoryBooks for a month |
| 11 | Amex | Amex online banking |
| 12 | Facebook monthly pass | Facebook for a month |
| 13 | Instagram Monthly Pass | Instagram uploads |
| 14 | Gmail Application | Gmail for a month |
| 15 | Data Open Access 125MB | 125MB Data - open access |
| 16 | Data Open Access 300MB | 250MB Data - open access |
| 17 | Voice Open 15mins | Voice 15mins |

Service Plans > Plan Properties

Service Design Center

Home > Catalogs > *ItsOn Demo* > Plans & Bundles

[Properties]

Plan Properties

Service Policy: (Choose a Service Policy...)

Name (internal): [          ]

SKU: KrG9Pb4mLKN7mClbTHrdpPqX3tY1BeNG

Carrier Plan ID: [          ]

Activation Date: 2012-11-14 🗓 (YYYY-MM-DD)

Deactivation Date: [     ] 🗓 (optional, YYYY-MM-DD)

Plan Class:
- ● Paid
- ○ Activation (free for subscriber, never sent to the device, and assigned during first time on air)
- ○ Sponsored (free for subscriber)
  - ☐ Default (the subscriber gets this plan automatically, cannot be shared or repurchased)
  - ☐ Repurchasable Is Shareable: ☐ (Subscriber may choose to share with other subscribers of the same Account)

Limit by:
- ● Data used
- ○ Time used

Limits: Data included per cycle: [1] [GB ▼]

Is Base Plan: ☐ (recurs monthly, shareable, upgradeable and downgradeable)

Device will report usage: Every [1 ▼] megabyte(s)

Hidden: ☐ (If a plan is hidden, devices cannot see it or buy it. Only Activation or Sponsored Default plans can be hidden.)

[Cancel] [Next ▶]

Service Plans > Incorporated Service Policy

Choose a Service Policy — 423

| Name | Type | Filters |
|---|---|---|
| Amazon App | Data | Amazon App US<br>Amazon App UK |
| Amex | Data | Amex web<br>Amex app |
| Apptastic | Data | Google Maps & Navigation Apps<br>Facebook Application<br>Twitter Application<br>Instagram Application |
| BarclayCard | Data | Barclaycard |
| Bing Access | Data | Bing App |
| Cartoon Network | Data | CN |
| CBS TV.com | Data | TV.com |
| CNet | Data | CNet |
| Customer Google Account Login | Data | Gmail App no label<br>Google Services Framework<br>Contact Sync Adapters |
| Data Open Access | Data | Open Data Access |
| dave policy | Data | Open Data Access |
| Dropbox | Data | Dropbox App |
| eBay App | Data | eBay App |
| Facebook Application | Data | Facebook Application |
| Gmail - no label | Data | Gmail Application |
| Gmail Application | Data | Gmail Application |
| Google Applications Bundle | Data | Google Maps & Navigation Apps<br>Google Play Books<br>Google Maps Street View Application<br>Gmail Application<br>Google Plus Application<br>Google Play Store Application<br>Google Play Movies<br>Google Voice Application<br>Google Calendar Application |

FIG. 25

Bundled Service Plans > Bundle Properties

Service Design Center

439

Home > Catalogs > *ItsOn Demo* > Plans & Bundles

[Properties]

Bundle Properties

Name (internal): [                    ]

SKU: [ BHgcKOhQWHdlxZGU8WkMgLHWLJHZpUES ]

Carrier Plan ID: [                    ]

Activation Date: [ 2012-11-14 ] 📅 (YYYY-MM-DD)

Deactivation Date: [          ] 📅 (optional, YYYY-MM-DD)

Plan Class: ● Paid
○ Activation (free for subscriber, never sent to the device, and assigned during first time on air)
○ Sponsored (free for subscriber)
☐ Default (the subscriber gets this plan automatically, cannot be shared or repurchased)
☐ Repurchasable

[ Cancel ] [ Next ▶ ]

FIG. 29

Service Policies

Service Design Center

Home > Service Policies

Service Policies

| Name | Type |
|---|---|
| Amazon App | Data |
| Amex | Data |
| Apptastic | Data |
| BarclayCard | Data |
| Bing Access | Data |
| Cartoon Network | Data |
| CBS TV.com | Data |
| CNet | Data |
| Customer Google Account Login | Data |
| Data Open Access | Data |
| dave policy | Data |
| Dropbox | Data |
| eBay App | Data |
| Facebook Application | Data |
| Gmail - no label | Data |
| Gmail Application | Data |
| Google Applications Bundle | Data |
| Google Calendar Application | Data |
| Google Maps Street View | Data |
| Google Play Books | Data |
| Google Play Movie | Data |
| Google Play Music | Data |
| Google Play Store Access (Carrier) | Data |

[New]

Service Policies > Incorporated Service Policy Components

Service Design Center

Home > Service Policies > Amazon App

| Properties | Components | Policy Events | Review |

Service Policy Components

Add at least one Component to this Service Policy.

A component is a collection of "filters", which indicate which applications and websites a device should have access to.

Create a new Component from scratch
Clone an existing Component

Set Components' priorities.

Below are this service policy's components. For any class of components that has more than one component, drag components to set their relative priorities. (Components can only be dragged within their own tables.)

Sponsored Components

| Priority | Component Name | Description | | |
|---|---|---|---|---|
| 1 | Test | Test | Edit | Delete |

Specialized Application Components

| Priority | Component Name | Description | | |
|---|---|---|---|---|
| 2 | Amazon App | Amazon App | Edit | Delete |

[ ◀ Back ] [ Cancel ] [ Next ▶ ]

463

FIG. 41 Service Policies > Policy Events > Policy Event Properties

FIG. 47A

Data Filter Design

Service Design Center

Home > Service Policies > Amazon App > Components > Test > Filters > Allow Play Store Browsing

Filter Properties

Filter Name: Allow Play Store Browsing ☐ Associative Only Filter
Description: Allow Play Store Browsing – UID ☑ Once matched, perform no further classification ☐ Filter by Remote Destination
  ☐ Domain: [____]
    ☐ Allow referrers to be loaded
    ☐ Use Associative Filtering:
      ☐ By seconds [____]
      ☐ By bytes of data [____]
  ☐ IP Address: [____]

☑ Filter by Application
  Package: [com.android.vending]
  Provide a package ID such as com.facebook.katana. Need help? Click here to search by name.
  ☐ Validate this Application ☐ Display in Launcher Widget
  Display Name: [____] (Limit 9 characters.)
  ☐ Display usage bar chart next to icon
  ☐ Use Custom Icon For This Domain:
    (Icon will display here) [Choose File] No file chosen
    PNG 48x48 pixels ☑ Filter by Target Operating System
  [Android ▼]

☐ Filter by Content
  Direction of filter: [Both Directions ▼]
  ○ Generic Content
    [video-flv ▼]
  ○ User-Defined Content
    [Google Login TOS ▼]

☐ Filter by Protocol
  ○ TCP
  ○ UDP
  ○ TCP/UDP

☐ Filter by Port
  Port #: [____]

[Cancel] [Done]

527

FIG. 47B    Messaging Filter Design

FIG. 47C Voice Filter Design

FIG. 48

Service Design Center

Plan Catalogs > Base Plans

Home > Catalogs > *ItsOn Demo*

Base Plan Sets

New Base Plan Set

| Label | Voice | Messaging | Data | Total Price | | |
|---|---|---|---|---|---|---|
| ☆ Premium plan | Voice Open B600 | SMS Messaging Open B600 | Data Open Access B600 | $40.00 | / | ✗ |
| ☆ Economy plan | Voice Open B300 | SMS Messaging Open B300 | Data Open Access B300 | $25.00 | / | ✗ |
| ☆ Premium Plus plan | Voice Open B600 | SMS Messaging Open B600 | Data Open Access B1000 | $55.00 | / | ✗ |
| ☆ Voice & Text | Voice Open B300 | SMS Messaging Open B300 | | $15.00 | / | ✗ |
| ☆ Ultimate plan | Voice Open B1000 | SMS Messaging Open B1000 | Data Open Access B1000 | $75.00 | / | ✗ |
| ☆ Advanced plan | Voice Open B600 | SMS Messaging Open B1000 | Data Open Access B1000 | $70.00 | / | ✗ |
| ☆ Starter plan | Voice Open B100 | SMS Messaging Open B100 | Data Open Access B100 | $12.50 | / | ✗ |
| ⊙ Apptastic | Voice Open B100 | SMS Messaging Open B100 | Apptastic | $14.49 | / | ✗ |

◀ Back

Service Design Center

Home > Catalogs > *ItsOn Demo*

[Tabs] [Plans] [Order]

Plans In Each Tab

Indicate where each Plan should be visible within a Catalog.

Additionally, all plans are offerable via Upsells, Promotional Banners, and the Featured Plans list.

| Plan Internal Name | Plan Display Name | Text | Data Passes | Talk | App Passes |
|---|---|---|---|---|---|
| SMS Messaging Open 2 | Text 2 | ☑ | ☐ | ☐ | ☐ |
| Amex | Amex Pass | ☐ | ☐ | ☐ | ☐ |
| Data Open Access 125MB | 125MB Data | ☐ | ☑ | ☐ | ☐ |
| Data Open Access 250MB | 250MB Data | ☐ | ☑ | ☐ | ☑ |
| Facebook monthly pass | Facebook Pass | ☐ | ☐ | ☐ | ☑ |
| Gmail Application | Gmail Pass for a month | ☐ | ☐ | ☐ | ☑ |
| Instagram Monthly Pass | Instagram Pass | ☐ | ☑ | ☐ | ☐ |
| iStoryBooks Pass | iStoryBooks Pass | ☐ | ☐ | ☐ | ☑ |
| Maps & Nav monthly pass | Map & Nav Pass | ☐ | ☐ | ☐ | ☐ |
| Open small roam | Small Roam | ☑ | ☐ | ☐ | ☐ |
| SMS Messaging Open | Text 1000 | ☑ | ☐ | ☐ | ☐ |
| SMS Messaging Open | Text 450 | ☐ | ☐ | ☐ | ☐ |
| Apptastic | Apptastic | ☐ | ☐ | ☐ | ☐ |
| SMS Messaging Open 50 | Text 50 | ☐ | ☐ | ☐ | ☐ |
| Test | Test | ☐ | ☐ | ☑ | ☑ |
| Test | Test | ☐ | ☐ | ☑ | ☐ |
| Twitter monthly pass | Twitter Pass | ☐ | ☐ | ☐ | ☐ |
| Voice Open 15mins | Voice 15 | ☐ | ☐ | ☑ | ☐ |
| Voice Open 1min | Voice 1 | ☐ | ☐ | ☐ | ☐ |
| Voice Open 30mins | Voice 30 | ☐ | ☐ | ☐ | ☐ |
| Voice Open 450mins | Voice 450 | ☐ | ☐ | ☐ | ☐ |

543

Plan Presentation

FIG. 52

Plan Catalogs > Service Discovery > Plan Presentation

Service Design Center

Home > Catalogs > *ItsOn Demo*

| Tabs | Plans | Order |

Plan and Divider Order

For each "tab" of plans, drag plans and dividers to set their display order.

| Text | Data Passes | Talk | App Passes |

| Order | Plan Name | Description |
|---|---|---|
| 1 ↕ | Text 2 | Text 2 texts |
| 2 ↕ | Text 50 | Text 50 texts |
| 3 ↕ | Text 450 | Text 450 texts |
| 4 ↕ | Test divider | |

[Add Divider] [____]

[◀ Back] [Cancel] [Next ▶]

Service Design Center

Home > Catalogs > ItsOn Demo

Plan Catalogs > Service Discovery > Plan Presentation

| Tabs | Plans | Order |

Plan and Divider Order

For each "tab" of plans, drag plans and dividers to set their display order.

| Text | Data Passes | Talk | App Passes |

| Order | Plan Name | Description |
|-------|-----------|-------------|
| 1 ⬍ | Monthly unlimited passes | |
| 2 ⬍ | Facebook Pass | Facebook for a month |
| 3 ⬍ | Twitter Pass | Twitter access for 1 month |
| 4 ⬍ | Gmail Pass | Gmail for a month |
| 5 ⬍ | YouTube Pass | YouTube for a month |
| 6 ⬍ | Map & Nav Pass | Maps & Nav for a month |
| 7 ⬍ | Instagram Pass | Instagram uploads |

[Add Divider] [        ]

[◀ Back] [Cancel] [Next ▶]

Service Design Center

Home > Catalogs > *ItsOn Demo*

Plan Catalogs > Service Discovery > Featured Plans

Featured Plans and Bundles

Select Plans and Bundles that should appear in the "Featured" list for the Catalog.

| | Name | Description | Type | Price |
|---|---|---|---|---|
| ☐ | Amex | Amex online banking | DATA | $1.99 |
| ☐ | Apptastic | 4 apps for a month inc Facebook, Twitter | DATA | $6.99 |
| ☐ | Data Open Access 125MB | 125MB Data - open access | DATA | $4.99 |
| ☐ | Data Open Access 250MB | 250MB Data - open access | DATA | $7.99 |
| ☑ | Facebook monthly pass | Facebook for a month | DATA | $4.99 |
| ☐ | Gmail Application | Gmail for a month | DATA | $2.99 |
| ☐ | Instagram Monthly Pass | Instagram uploads | DATA | $5.99 |
| ☐ | iStoryBooks Pass | iStoryBooks for a month | DATA | $2.99 |
| ☑ | Maps & Nav monthly pass | Maps & Nav for a month | DATA | $3.99 |
| ☐ | Open small roam | Small Roam | BUNDLE | $5.00 |
| ☐ | SMS Messaging Open | Text 450 texts | MESSAGING | $4.50 |
| ☐ | SMS Messaging Open | Text 1000 texts | MESSAGING | $10.00 |
| ☐ | SMS Messaging Open 2 | Text 2 texts | MESSAGING | $0.15 |
| ☐ | SMS Messaging Open 50 | Text 50 texts | MESSAGING | $0.75 |
| ☐ | Test | Test | BUNDLE | $1.00 |
| ☐ | Test | Test | DATA | $5.00 |
| ☐ | Twitter monthly pass | Twitter access for 1 month | DATA | $2.99 |
| ☐ | Voice Open 15mins | Voice 15 mins | VOICE | $1.00 |
| ☐ | Voice Open 1min | Voice 1 minute | VOICE | $0.15 |
| ☑ | Voice Open 30mins | Voice 30 mins | VOICE | $2.00 |

563

FIG. 57     Plan Catalogs > Service Discovery > Interceptors

Service Design Center

Home > Catalogs > *ItsOn Demo*

Interceptors

Interceptors are notifications that pop up on the device if it ever attempts to access something that it has not been granted access to. There are 2 types of interceptor: "Generic" and "Marketing".

Generic Interceptors

Required. These are a backstop. They only pop up if a device doesn't have a single Plan or Marketing Interceptor that can classify the usage of the device.

Usually, Generic Interceptors will simply explain something like "Sorry, you haven't yet purchased a plan that provides access for this action. Please click here to view the Catalog of available Data plans."

Data: Data LCP2 [Edit]

Voice: Voice LCP [Edit]

Messaging: Text LCP [Edit]

Marketing Interceptors

Optional. Marketing Interceptors (unlike Generic Interceptors) are filter-specific.

A subscriber's experience of a Marketing Interceptor is like this (as an example): on her device, she browses to Facebook.com. A pop-up notification tells her "You have not yet purchased access to Facebook. Want to buy a plan? [Free Facebook ~ basic], [Facebook for 24 hrs ~ $3], [Facebook for 1 month ~ $5]"

[New]

[◀ Back]

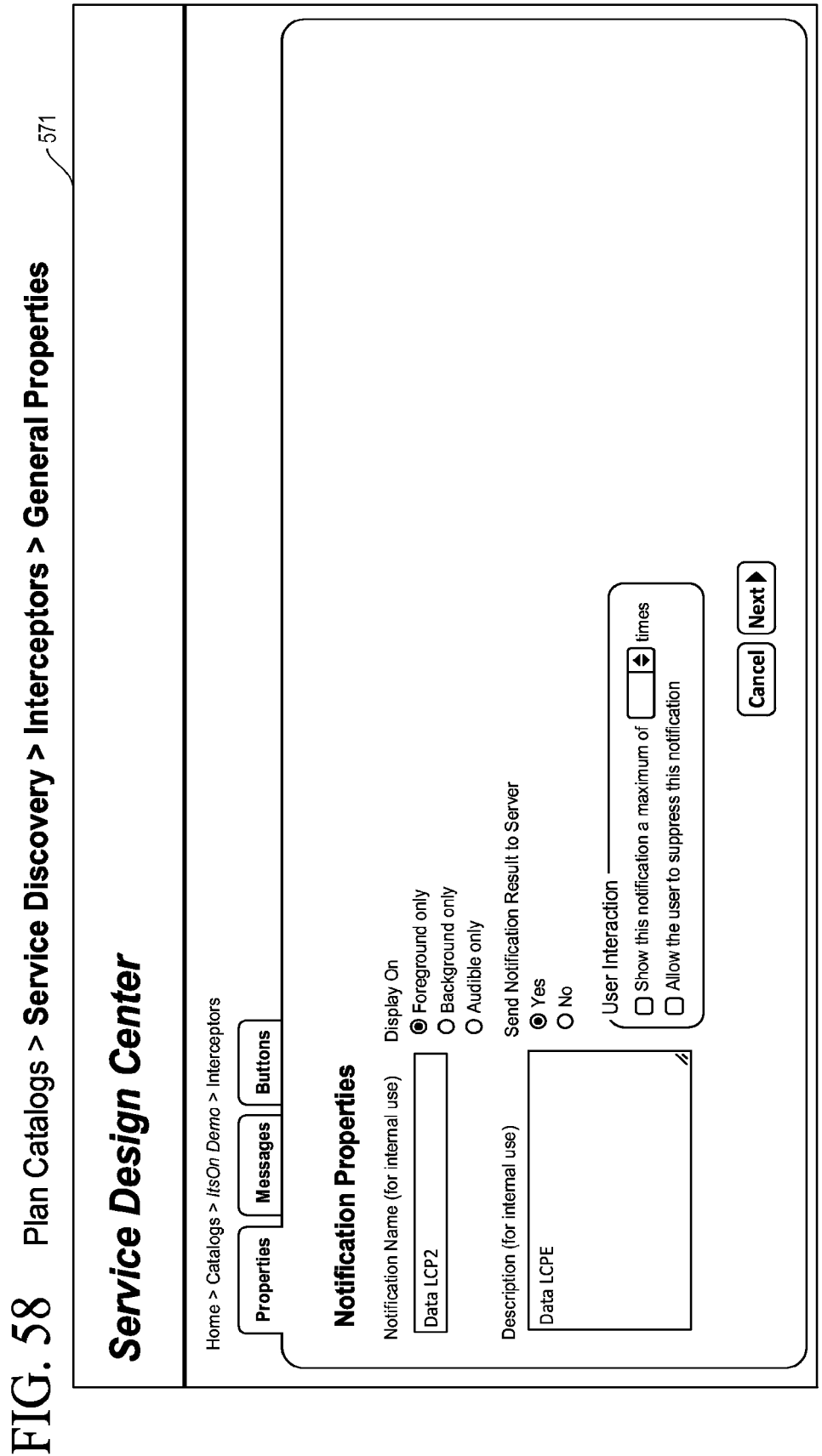
FIG. 58  Plan Catalogs > Service Discovery > Interceptors > General Properties

FIG. 59

Plan Catalogs >
Service Discovery >
Interceptors >
Messages

FIG. 60

Plan Catalogs >
Service Discovery >
Interceptors >
Button Configuration

*Service Design Center*

Home > Catalogs > *VB - Test* > Interceptors
| Properties | Messages | Buttons |

Notification Buttons

Choose which buttons the Subscriber will be able to press when she receives this Notification.

Upsells
Within this notification, you may advertise specific Plans for purchase. (This is called an Upsell.)
☐ Display Upsell Plans Button Actions
As you add buttons, they appear in the preview, and their configuration panels appear below.

| Select | Button Actions |
|--------|---------------|
| ☑ | View One-time Plans |
| ☐ | View Recurring Plans |
| ☐ | Change Base Plans |
| ☐ | More Info |
| ☐ | Launch URL |
| ☑ | Dismiss (Cancel) |

580

The button currently set as the default for the phone user appears depressed.

Button Labels

"View One-time Plans" button
English (US): [Go to Store]
English (UK): [              ]
Italian:       [              ]
Spanish:       [              ]

"Cancel" button
English (US): [View Recurring Plans]
English (UK): [              ]
Italian:       [              ]
Spanish:       [              ]

579

Preview [English (US) ▼]

[Go to Store]  [Cancel]

Note: Actual phone/buttons will differ in appearance from this mockup.

Default Button
● View One-time Plans
○ Cancel

Not all phones have a joystick, but for those that do, specify which button should have the initial "focus."

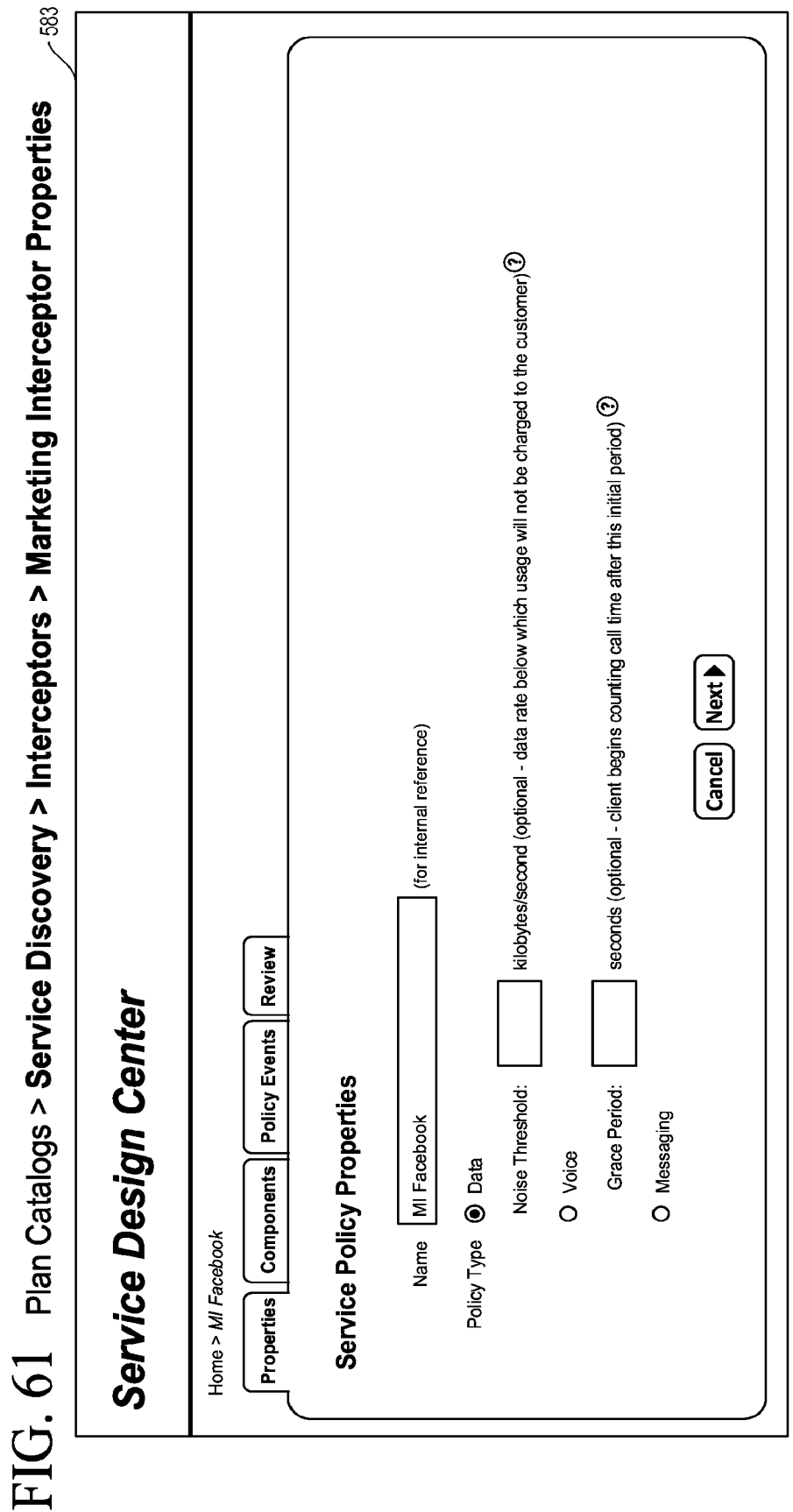
FIG. 61 Plan Catalogs > Service Discovery > Interceptors > Marketing Interceptor Properties

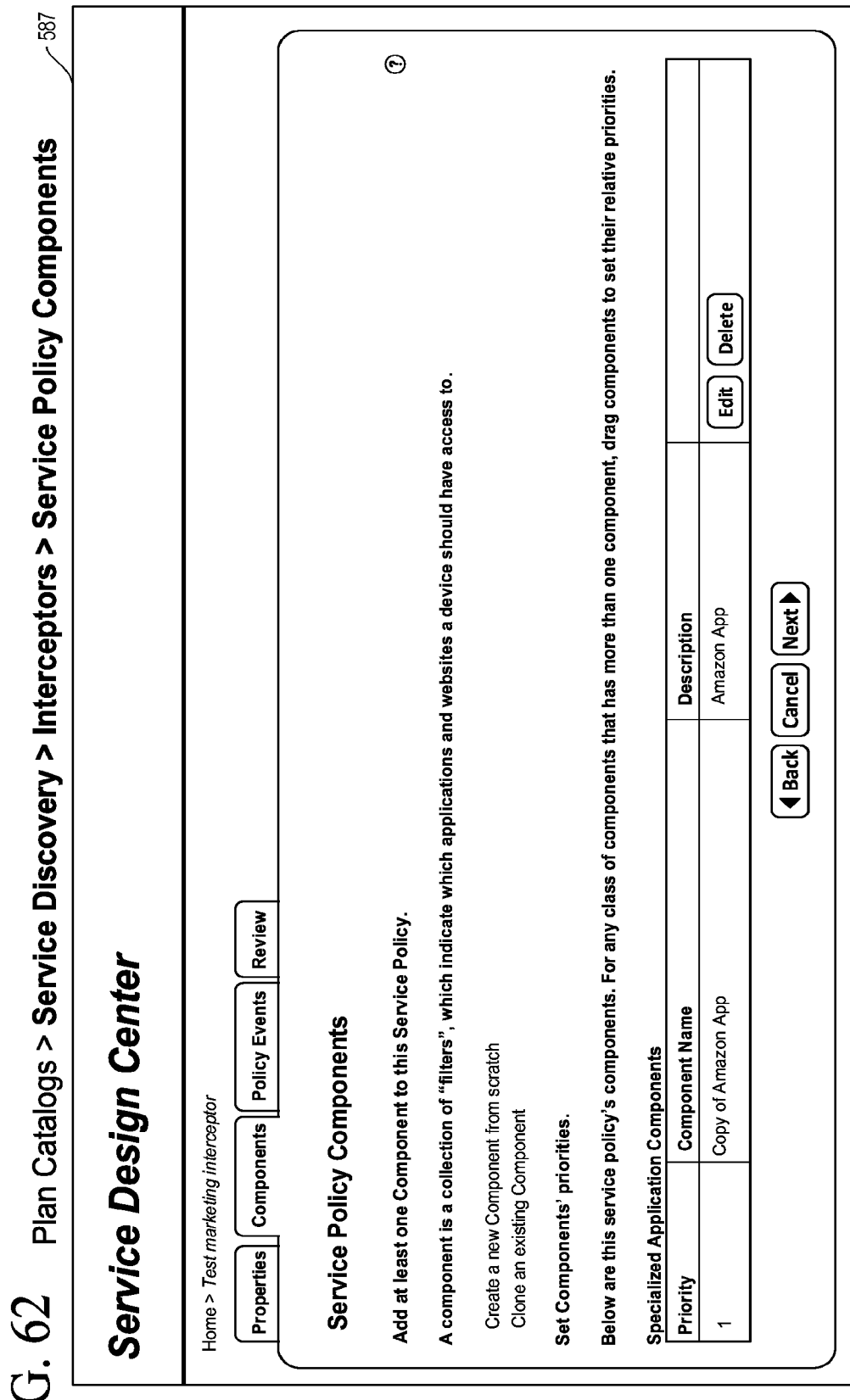
FIG. 62 Plan Catalogs > Service Discovery > Interceptors > Service Policy Components

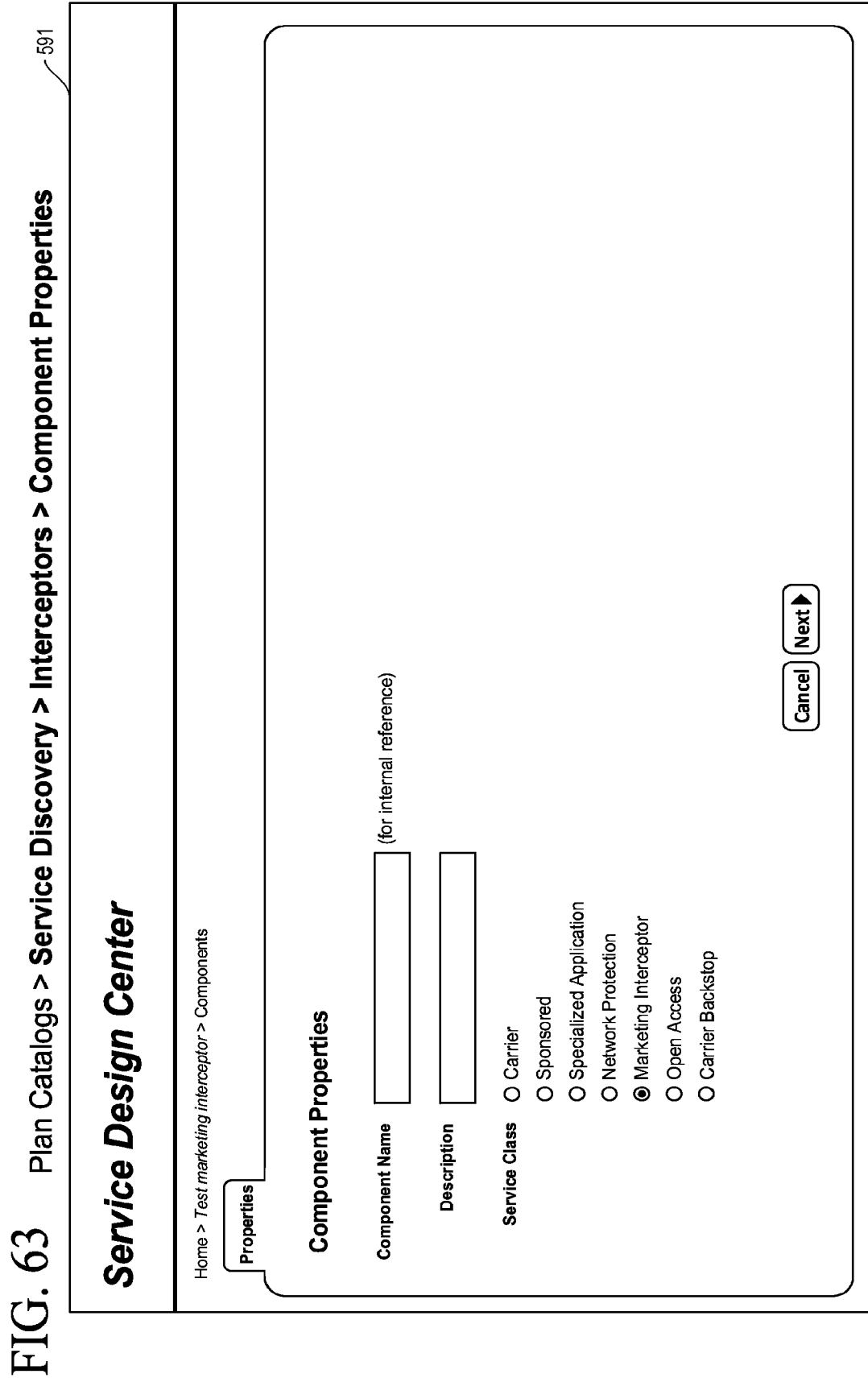
FIG. 63  Plan Catalogs > Service Discovery > Interceptors > Component Properties

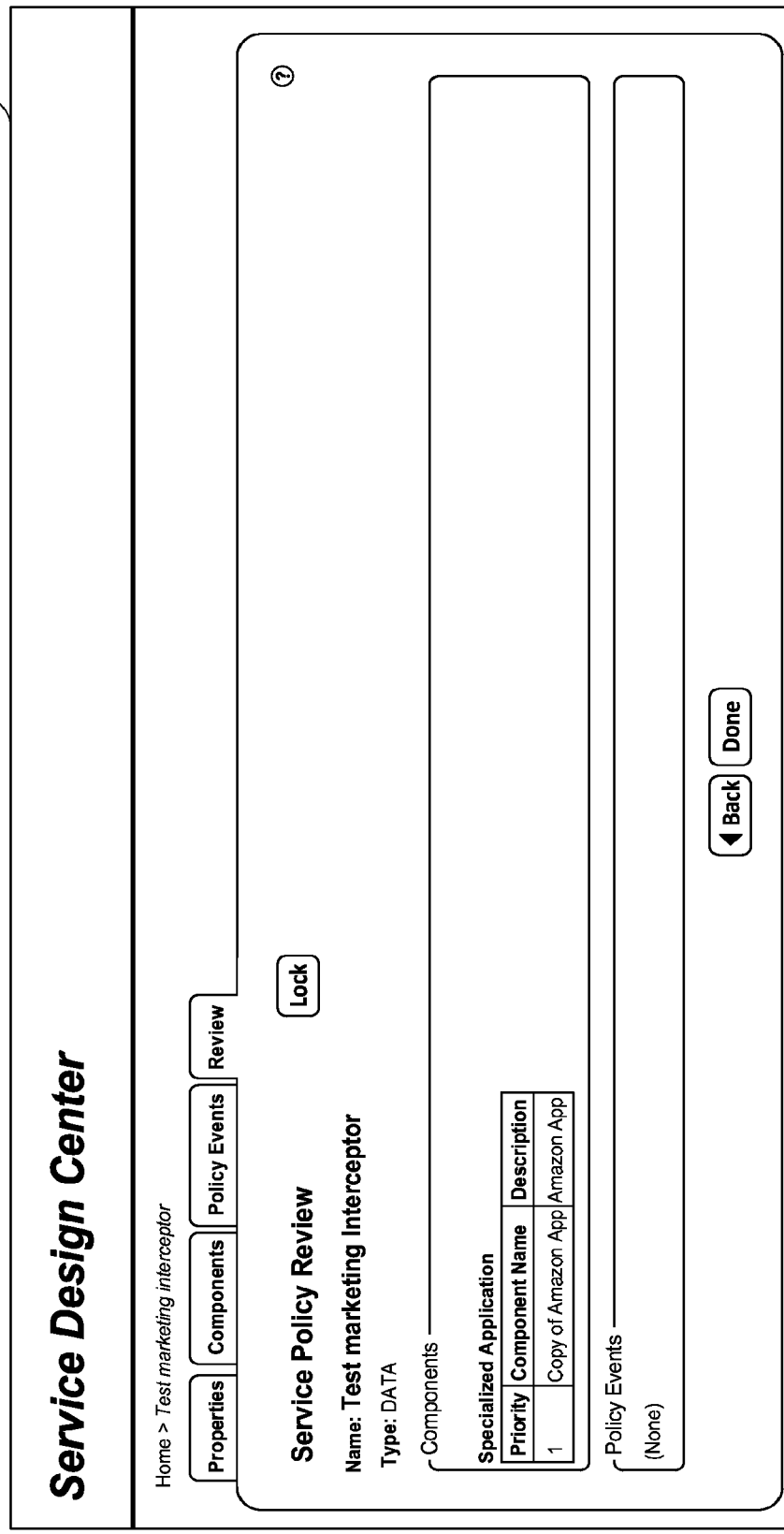
FIG. 65  Plan Catalogs > Service Discovery > Interceptors > Review

Plan Catalogs > Service Discovery > Promotions > Promo Banners

Service Design Center

Home > Catalogs > *ItsOn Demo*

Promo Banners

Configure promotional banners that should appear on the Catalog intro page on the device. (A banner is an image that is linked to a plan's or bundle's "Buy" page.)

New promotional banner

English (US)

| Order | Plan/Bundle Name | Promo Banner Name | Activation Date | Deactivation Date | | |
|---|---|---|---|---|---|---|
| 1 | Facebook monthly pass | facebook | 2012-09-03 | (none) | ✎ | ✗ |
| 2 | SMS Messaging Open B100 | text | 2012-09-03 | (none) | ✎ | ✗ |
| 3 | Instagram Monthly Pass | Instagram | 2012-09-03 | (none) | ✎ | ✗ |

English (UK)
(None)

Italian
(None)

Spanish
(None)

◀ Back

— 603

Service Design Center

Home > Catalogs > *ItsOn Demo* > Plans & Bundles

Promo Banner
Choose banner images (linked to plans for purchase) that should appear on the Catalog intro page on the device.

Locale: English (US)

Image: [😊 Share the good news! $0.49]  Choose another image

Plan/Bundle: Amex (Amex online banking)
Activation Date: 2012-11-14 📅 (YYYY-MM-DD)
Deactivation Date: ____ 📅 (YYYY-MM-DD)

Cancel  [Save]

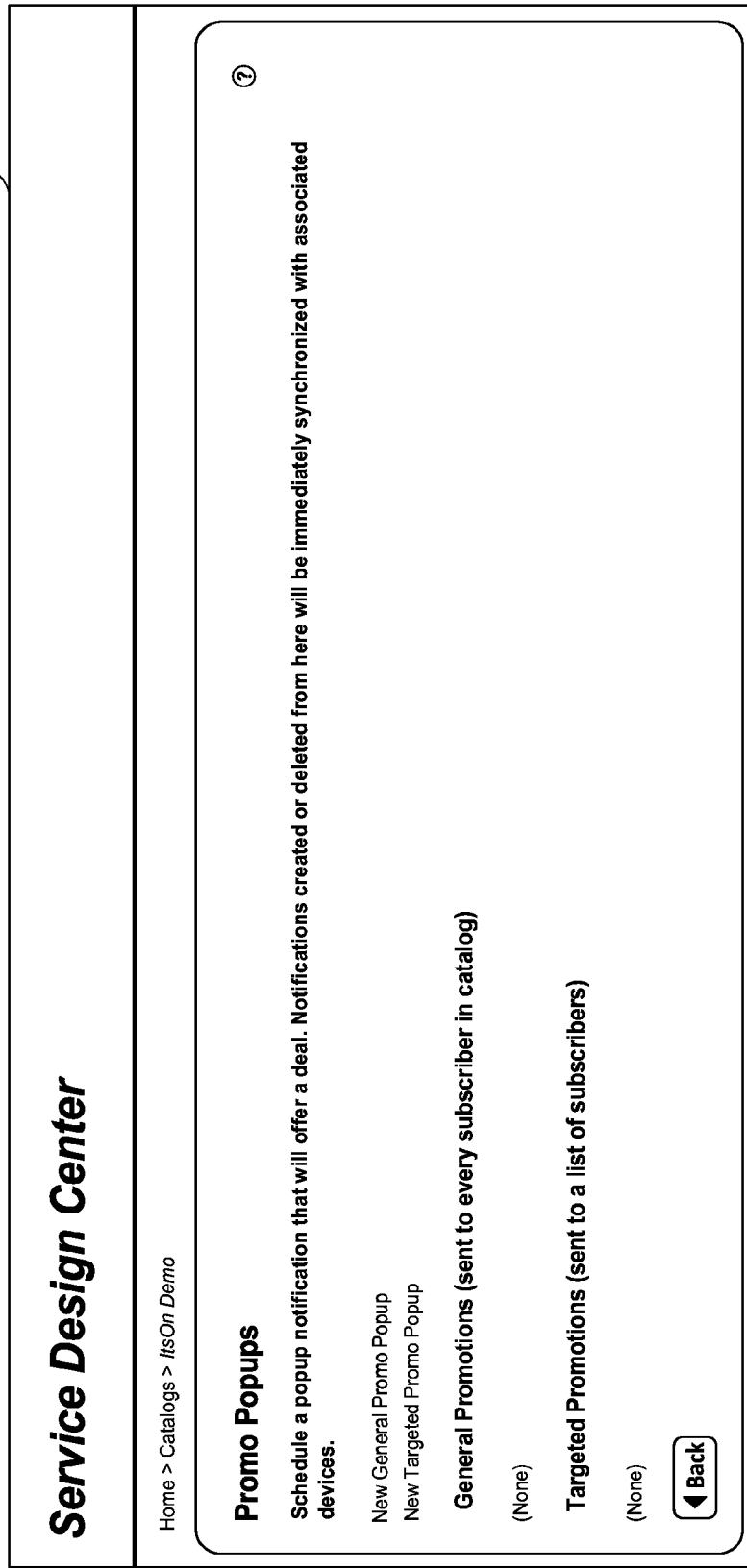
FIG. 67  Plan Catalogs > Service Discovery > Promotions > Promo Popups

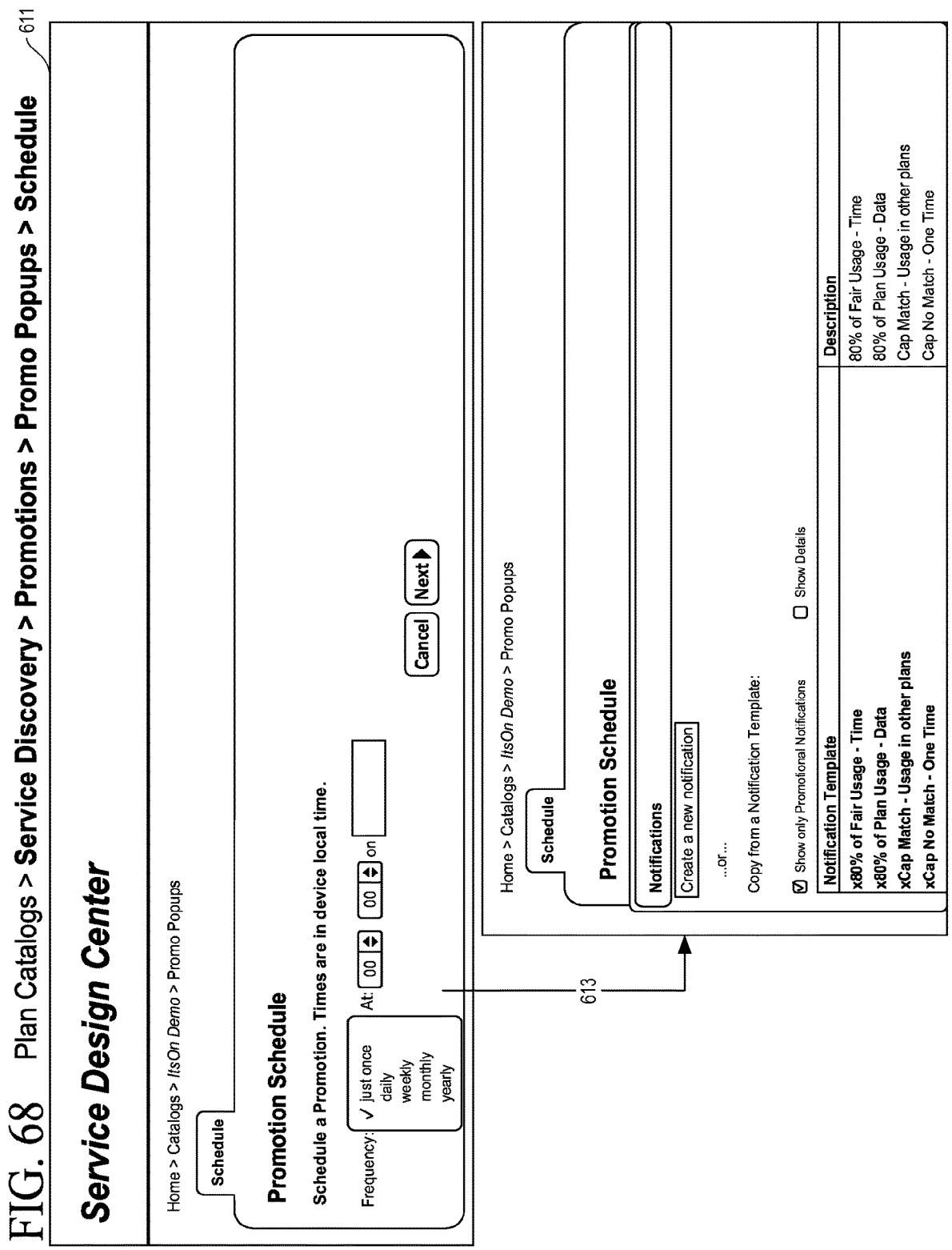
FIG. 68 Plan Catalogs > Service Design Center > Service Discovery > Promotions > Promo Popups > Schedule

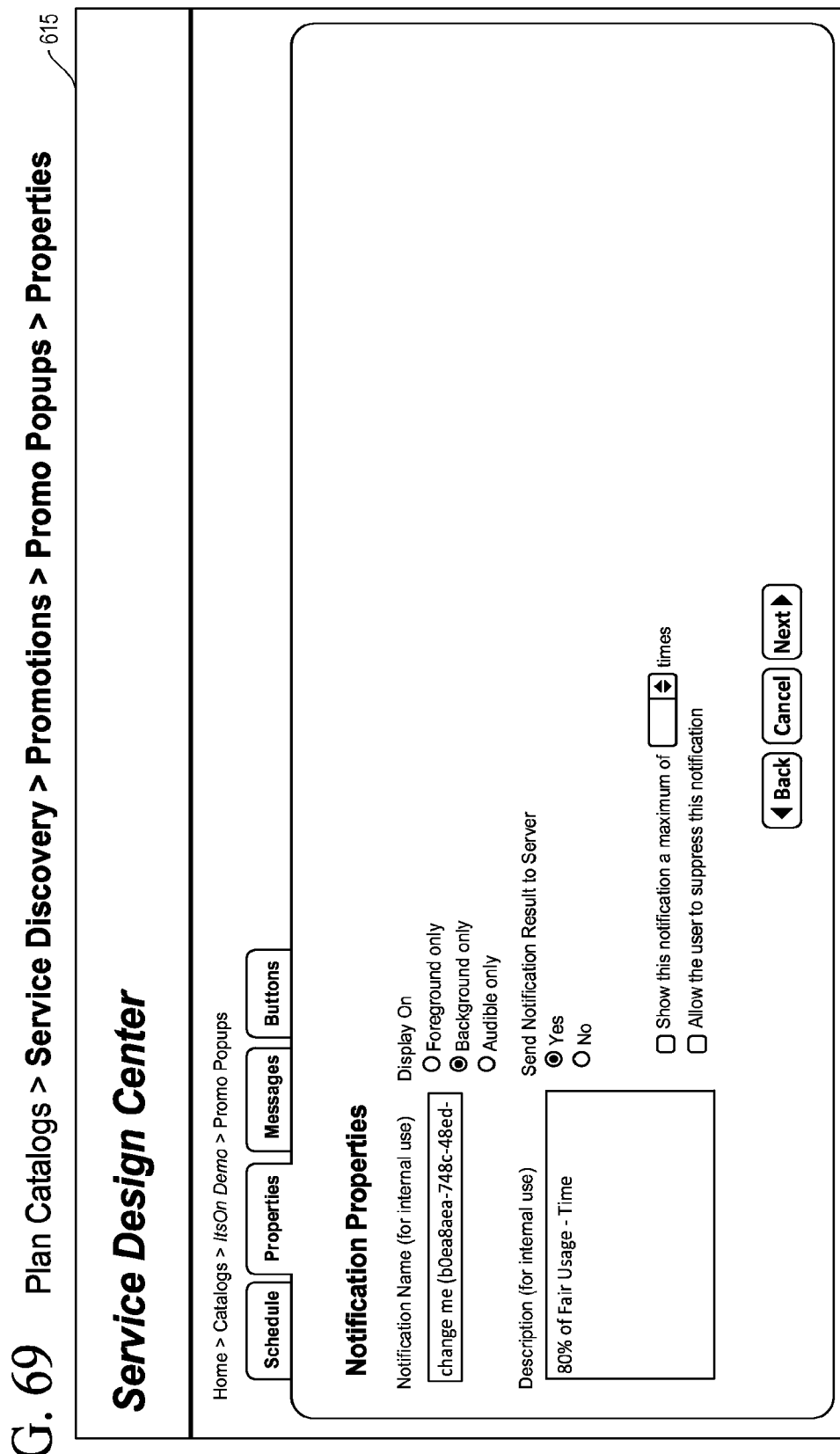
FIG. 69  Plan Catalogs > Service Discovery > Promotions > Promo Popups > Properties

Plan Catalogs
➢ Service Discovery
 ➢ Promotions
  ➢ Promo Popup
   ➢ Buttons

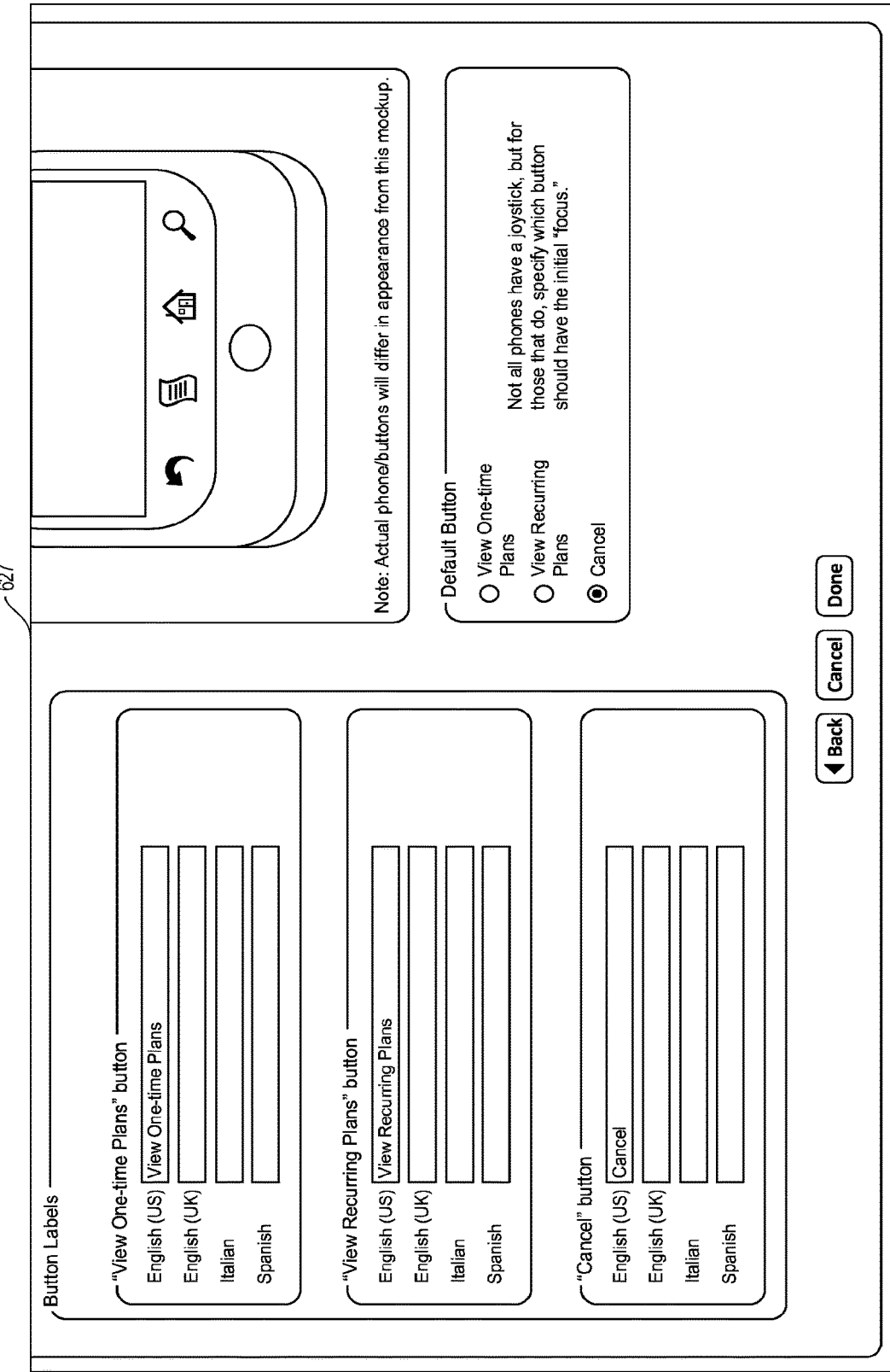
FIG. 72  Plan Catalogs > Service Discovery > Promotions > Promo Popup > Buttons

FIG. 73

Plan Catalogs > Service Discovery > Upsells

Service Design Center

Home > Catalogs > ItsOn Demo

Upsells

Please ensure that each Upsell offers at least one plan/bundle.

Promo Popups (0 upsell opportunities)

Generic Interceptors (3 upsell opportunities)

| Type | # of Offers | |
|---|---|---|
| Data | 3 | Edit |
| Voice | 3 | Edit |
| Messaging | 3 | Edit |

Marketing Interceptor notifications (0 upsell opportunities)

Policy Event notifications (8 upsell opportunities)

| Policy Event | Context | # of Offers | |
|---|---|---|---|
| 100% Facebook Usage | Service Policy | 0 | Edit |
| 100% Gmail Usage | Service Policy | 0 | Edit |
| 100% Maps Usage | Service Policy | 0 | Edit |
| 100% Messaging Usage | Service Policy | 0 | Edit |
| 100% Twitter Usage | Service Policy | 0 | Edit |
| 80% Facebook Usage | Service Policy | 0 | Edit |
| 80% Gmail Usage | Service Policy | 0 | Edit |
| 80% Maps Usage | Service Policy | 0 | Edit |

◀ Back

Plan Catalogs
> Service Discovery
> Upsells
> Configure Upsell

Service Design Center

Home > Catalogs > *ItsOn Demo* > Upsells

Configure Upsell

Choose which Plans/Bundles to offer in the "Data LCP2" Upsell.

| | Plan/Bundle Name | Description | Price |
|---|---|---|---|
| ☑ | 125MB Data | 125MB Data - open access | $4.99 |
| ☑ | 250MB Data | 250MB Data - open access | $7.99 |
| ☑ | Apptastic | 4 apps for a month inc Facebook, Twitter | $6.99 |
| ☐ | Voice 600 | Voice 600 mins | $35.00 |
| ☐ | Voice 1 | Voice 1 minute | $0.15 |
| ☐ | Map & Nav Pass | Maps & Nav for a month | $3.99 |
| ☐ | Twitter Pass | Twitter access for 1 month | $2.99 |
| ☐ | Small Roam | Small Roam | $5.00 |
| ☐ | Text 2 | Text 2 texts | $0.15 |
| ☐ | Voice 15 | Voice 15 mins | $1.00 |
| ☐ | Facebook Pass | Facebook for a month | $4.99 |
| ☐ | Text 450 | Text 450 texts | $4.50 |
| ☐ | iStoryBooks Pass | iStoryBooks for a month | $2.99 |
| ☐ | Voice 30 | Voice 30 mins | $2.00 |
| ☐ | Amex Pass | Amex online banking | $1.99 |

Display Order

Drag plans/bundles to change their display order:

| Display Order | Plan/Bundle Name | Description | Price |
|---|---|---|---|
| 1 ⇕ | Apptastic | 4 apps for a month in Facebook, Twitter | $6.99 |
| 2 ⇕ | 125MB Data | 125MB Data - open access | $4.99 |
| 3 ⇕ | 250MB Data | 250MB Data - open access | $7.99 |

Cancel  (Save)

Plan Catalogs > Service Discovery > Promo Popup > Offered Plans ⟋639

Service Design Center

Home > Catalogs > *ItsOn Demo* > Upsells

Configure Upsell

Choose which Plans/Bundles to offer in the "100% Facebook Usage" Upsell.

| | Plan/Bundle Name | Description | Price |
|---|---|---|---|
| ☐ | 250MB Data | 250MB Data – open access | $7.99 |
| ☐ | Voice 450 | Voice 450 mins | $30.00 |
| ☐ | Voice 600 | Voice 600 mins | $35.00 |
| ☐ | Text 1000 | Text 1000 texts | $10.00 |
| ☐ | Voice 15 | Voice 15 mins | $1.00 |
| ☐ | Amex Pass | Amex online banking | $1.99 |
| ☐ | Gmail Pass | Gmail for a month | $2.99 |
| ☐ | Text 450 | Text 450 texts | $4.50 |
| ☐ | YouTube Pass | YouTube for a month | $5.99 |
| ☐ | Voice 30 | Voice 30 mins | $2.00 |
| ☐ | Twitter Pass | Twitter access for 1 month | $2.99 |
| ☐ | Test | Test | $1.00 |
| ☐ | Facebook Pass | Facebook for a month | $4.99 |
| ☐ | Map & Nav Pass | Maps & Nav for a month | $3.99 |
| ☐ | Text 50 | Text 50 texts | $0.75 |
| ☐ | 125MB Data | 125MB Data – open access | $4.99 |

Cancel [Save]

FIG. 77

Templates
> Policy Event
Notifications

Service Design Center

Home > Templates

Filter | Policy Event Notification | Promotional Notification | LCPE Notification

Policy Event Templates

| Name | Description | Title | Subtitle | Short Text | Long Text | Buttons |
|---|---|---|---|---|---|---|
| x80% of Fair Usage - Data | 80% of Fair Usage - Data | Usage Notification – English (US) | For $(plan) – English (US) | Usage Notification – English (US) | Hope you are enjoying your plan. You have used 80% of your $(plan) plan allowance. – English (US) | *English (US)*<br>• "Cancel" → NO_ACTION, Default<br>*English (UK)*<br>*Italian*<br>*Spanish* |
| x80% of Fair Usage - Time Based | 80% of Fair Usage - Time Based | Usage Notification – English (US) | For $(plan) – English (US) | Usage Notification – English (US) | Hope you are enjoying your plan. You have used 80% of your $(plan) plan allowance and are approaching your fair usage data limit. – English (US) | *English (US)*<br>• "Cancel" → NO_ACTION, Default<br>*English (UK)*<br>*Italian*<br>*Spanish* |
| Plan Expiration - One Time | Plan Expiration - One Time | Your plan has expired – English (US) | Buy again? – English (US) | Your plan has expired – English (US) | Your $(plan) plan has expired. Would you like to purchase again? Tap a button to view more plans. – English (US) | *English (US)*<br>• "Cancel" → NO_ACTION<br>• "Change Base Plans" → CHANGE_BASE_PLANS<br>• "View Recurring Plans" → VIEW_RECURRING_PLANS<br>• "View One-time Plans" → VIEW_ONE_TIME_PLANS, Default<br>*English (UK)*<br>*Italian*<br>*Spanish* |
| Plan Expiration - Recurring | Plan Expiration - Recurring | Your plan has expired – English (US) | Buy again? – English (US) | Your plan has expired – English (US) | Your $(plan) plan has expired. Please tap on a button to view more options. – English (US) | *English (US)*<br>• "Cancel" → NO_ACTION<br>• "Change Base Plans" → CHANGE_BASE_PLANS<br>• "View Recurring Plans" → VIEW_RECURRING_PLANS |

Templates
> Promotional Notifications

Service Design Center

Home > Templates

| Filter | Policy Event Notification | Promotional Notification | LCPE Notification |

Promotion Templates

| Name | Description | Title | Subtitle | Short Text | Long Text | Buttons |
|---|---|---|---|---|---|---|
| x80% of Fair Usage - Time | 80% of Fair Usage - Time | Usage Notification – English (US) | For $(plan) – English (US) | Usage Notification – English (US) | Hope you are enjoying your plan. You have used 80% of your $(plan) plan allowance and are approaching your fair use data limit. – English (US) | English (US)<br>• "Cancel" → NO_ACTION, Default<br>English (UK)<br>Italian<br>Spanish |
| x80% of Plan Usage - Data | 80% of Plan Usage - Data | Usage Notification – English (US) | For $(plan) – English (US) | Usage Notification – English (US) | Hope you are enjoying your plan. You have used 80% of your $(plan) plan allowance. – English (US) | English (US)<br>• "Cancel" → NO_ACTION, Default<br>English (UK)<br>Italian<br>Spanish |
| xCap Match - Usage in other plans | Cap Match - Usage in other plans | Usage Notification – English (US) | Your plan has run out – English (US) | Usage Notification – English (US) | You have used up all of your allowance for $(capPlan) plan. Further usage will count against your $(plan) plan. – English (US) | English (US)<br>• "Cancel" → NO_ACTION, Default<br>English (UK)<br>Italian<br>Spanish |
| xCap No Match - One Time | Cap No Match - One Time | Your plan has run out – English (US) | Buy more now – English (US) | Your plan has run out – English (US) | You have used up all of your $(plan) plan, please buy another plan from the list below or tap on Store. – English (US) | English (US)<br>• "Cancel" → NO_ACTION<br>• "Go to Store" → VIEW_ONE_TIME_PLANS, Default<br>English (UK)<br>Italian<br>Spanish |
| xCap No Match - Recurring | Cap No Match - Recurring | Your plan has run out – English (US) | Buy more now – English (US) | Your plan has run out – English (US) | You have used up all of your $(plan) plan, please buy another plan from the list below or tap on Store. – English (US) | English (US)<br>• "Cancel" → NO_ACTION<br>• "Go to Store" → VIEW_RECURRING_PLANS, Default |

Templates
> Lack of Plan
Notifications

Service Design Center

Home > Templates

| Filter | Policy Event Notification | Promotional Notification | LCPE Notification |

LCPE Templates

| Name | Description | Title | Subtitle | Short Text | Long Text | Buttons |
|---|---|---|---|---|---|---|
| Data LCPE | Data LCPE | Your plan has run out – *English (US)* | Purchase access for ${app} – *English (US)* | Purchase a compatible plan – *English (US)* | You currently do not have a plan that allows access to the application or website you are trying to use. – *English (US)* | *English (US)*<br>• "Change Base Plans" → CHANGE_BASE_PLANS<br>• "View Recurring Plans" → VIEW_RECURRING_PLANS<br>• "View One-time Plans" → VIEW_ONE_TIME_PLANS<br>• "Cancel" → NO_ACTION, Default<br>*English (UK)*<br>*Italian*<br>*Spanish* |
| Marketing Interceptor | Marketing Interceptor (Disallow and No Match) | Trying to access ${app}? – *English (US)* | Purchase this special ${app} plan – *English (US)* | Purchase this special ${app} plan – *English (US)* | This is a specific plan for accessing ${app} – enjoy your experience. – *English (US)* | *English (US)*<br>• "Cancel" → NO_ACTION<br>• "Go to Store" → VIEW_ONE_TIME_PLANS, Default<br>*English (UK)*<br>*Italian*<br>*Spanish* |
| Text LCPE | Text LCPE | Your Messaging Plan has run out – *English (US)* | Purchase from list below or go to Store – *English (US)* | Purchase from list below or go to Store – *English (US)* | You need to purchase a plan to send/receive a text message for contact ${directoryNumber} – *English (US)* | *English (US)*<br>• "Cancel" → NO_ACTION<br>• "Go to Store" → VIEW_ONE_TIME_PLANS, Default<br>*English (UK)*<br>*Italian*<br>*Spanish* |
| Voice (Audible MP3) LCPE | Voice (Audible MP3) LCPE | | | | | *English (US)*<br>*English (UK)* |

655

New

FIG. 81  Subscriber Management

Service Design Center

Home > Subscribers

Subscribers

| ID | Phone Number | Nickname |
|---|---|---|
| 234106556078494 | 07598270447 | Vincent 3 |
| 234159098003344 | 07795693183 | Main |
| 234159106251118 | 07827455424 | Child |
| 310120001045032 | 6502815876 | Google Galaxy Nexus ICS Demo |
| 310120001045842 | 6502815934 | CAB Galaxy Nexus ICS Demo |
| 310260487755746 | 6504402771 | Jeff |
| 310260587852855 | 6504403025 | Jeff Master TMO |
| 310120650218645B | 6502819703 | Jeff Spr |
| 310120650274599B | 6502815807 | Jeff Master SPR |
| 310120650274600B | 6502815848 | Beau Nexus S 4G |
| 310120650274601B | 6502815947 | Share |
| 310120650274602B | 6502816009 | Beau Main 2 Nexus S 4g |

663

[New]

FIG. 82    Subscriber Management > Subscriber Properties

Service Design Center

Home > Subscribers > (new)

Properties

Identity:

Phone Number:

Status:
✓ Active
  Fraud
  Inactive
  Suspended
  Potential Fraud

Nickname:

Locale: English (US)

Save & New ▲

Cancel   Done

667

FIG. 83    Subscriber Management > Subscriber Groups

Service Design Center

Home > Subscriber Groups

Subscriber Groups

| Name | Description |
|---|---|
| CTS | |
| Google Demo Device Group | Google Demo Device Group |
| ItsOn MVNO Group | ItsOn MVNO Group |
| Jeffs Demo Group | |
| Laurent subs | |
| Nook | Nook Subscriber Group |
| unassigned | |
| User Testing | User Testing |
| Vincent | |
| Vincent Mobile Internet | |

671

New

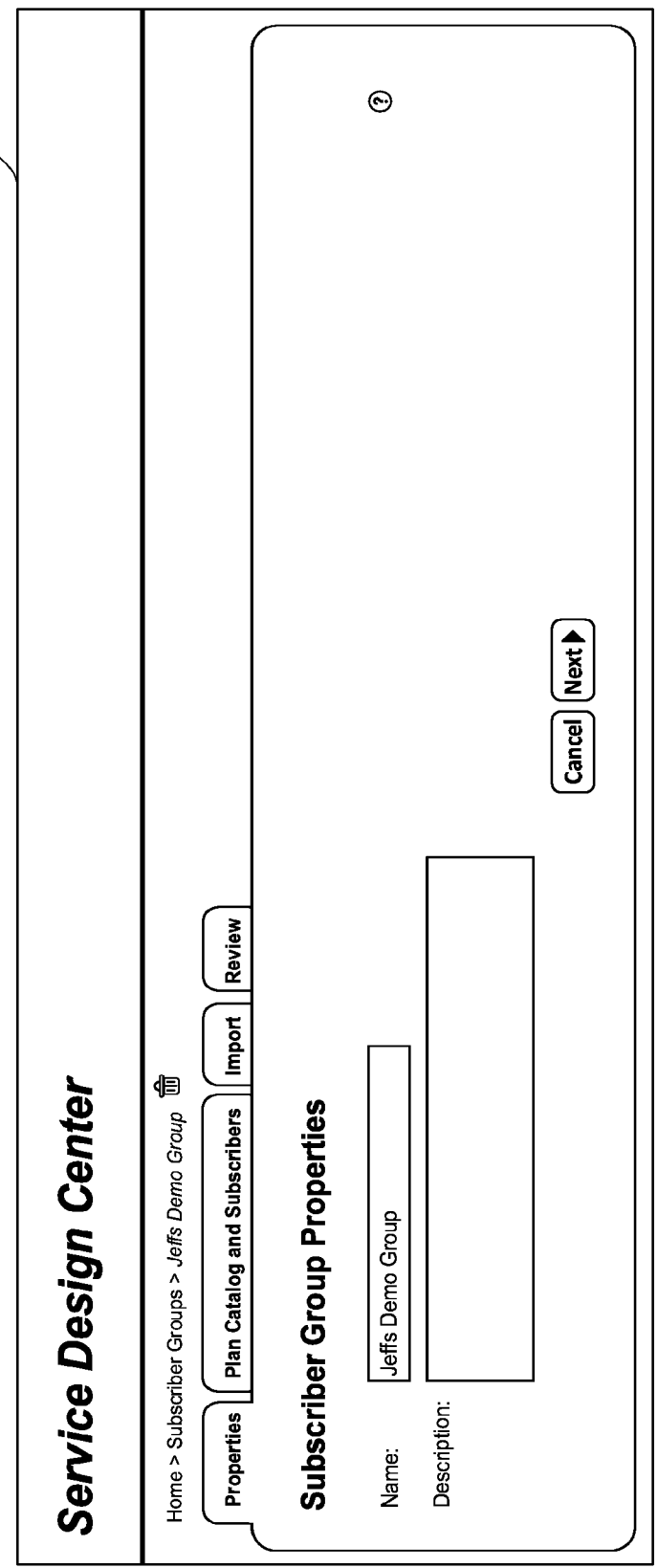
FIG. 84 Subscriber Management > Subscriber Groups > Group Properties

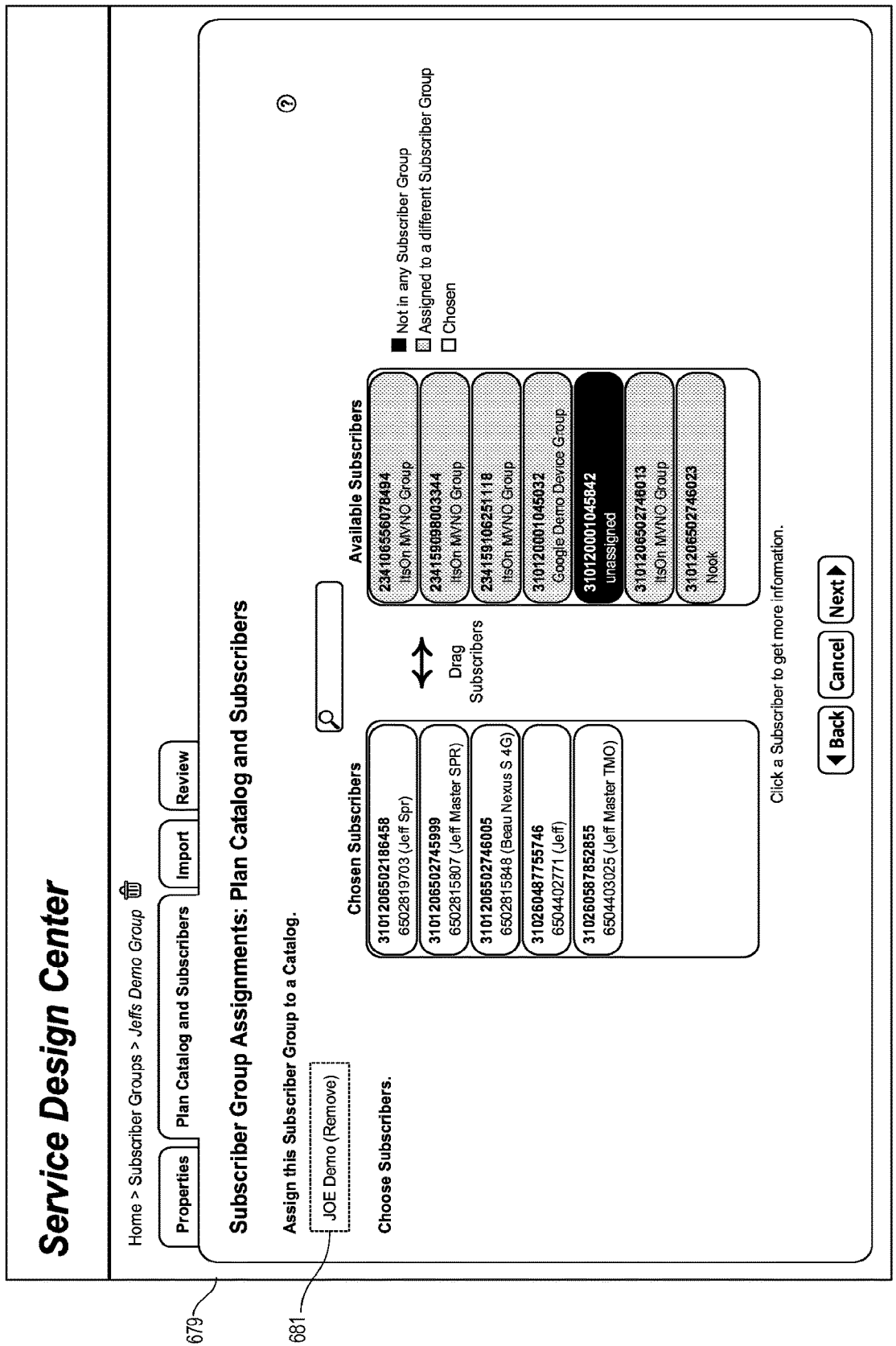
FIG. 85  Subscriber Management > Subscriber Groups > Catalog/Subscriber Association

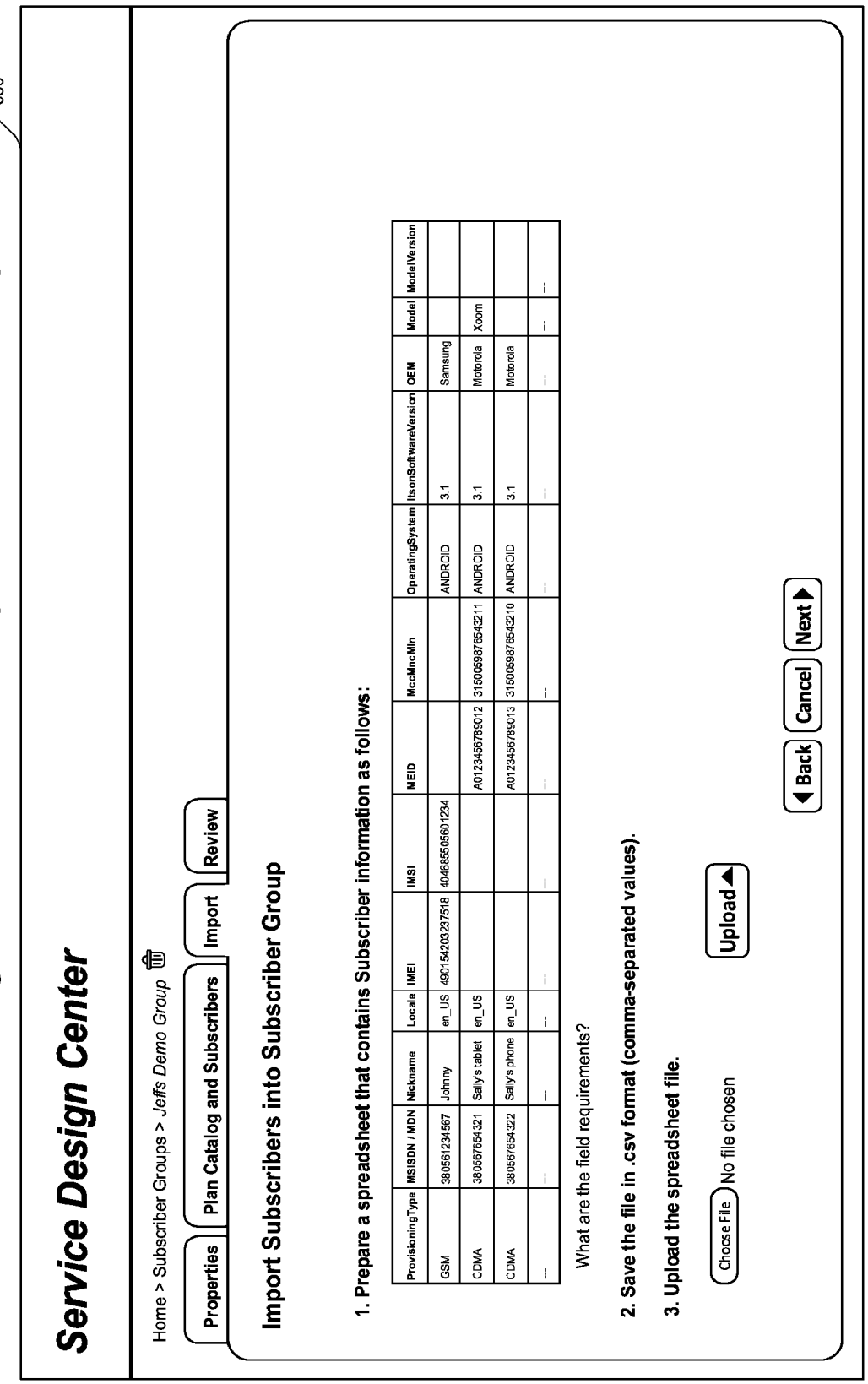
FIG. 86 Subscriber Management > Subscriber Groups > Subscriber Data Import

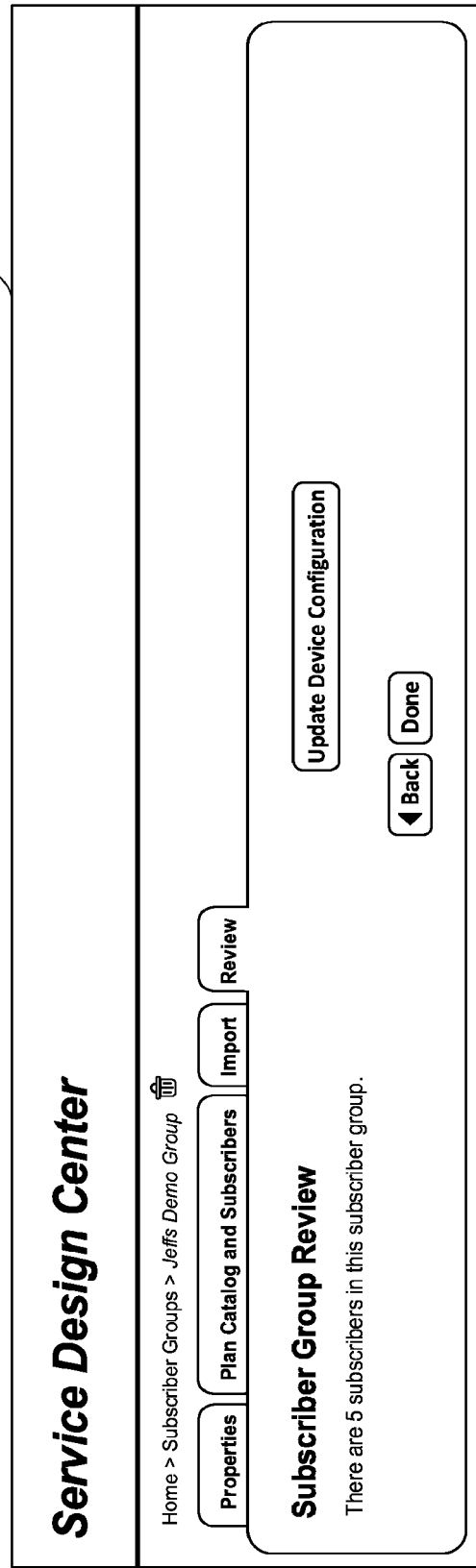
FIG. 87  Subscriber Management > Subscriber Groups > Review

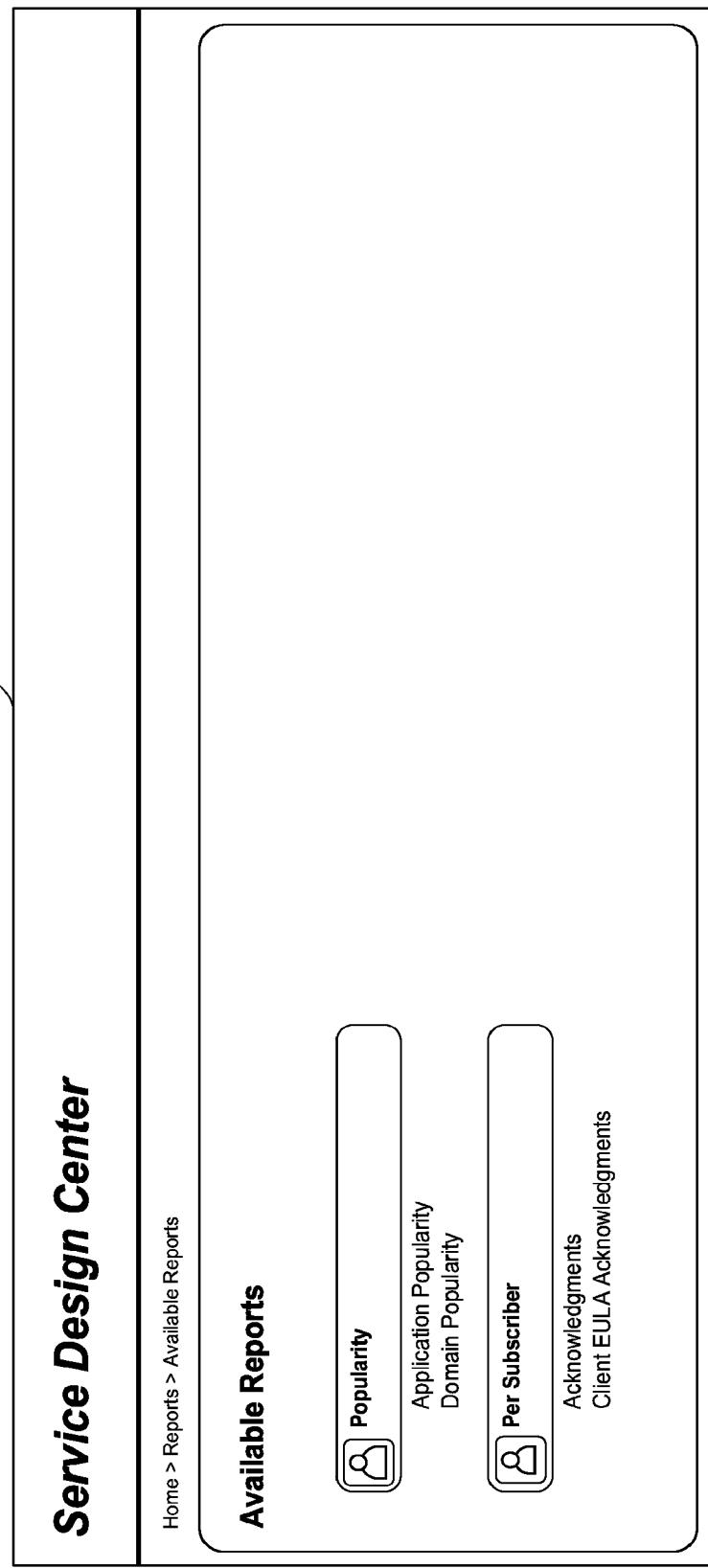
FIG. 88  Reports/Analytics

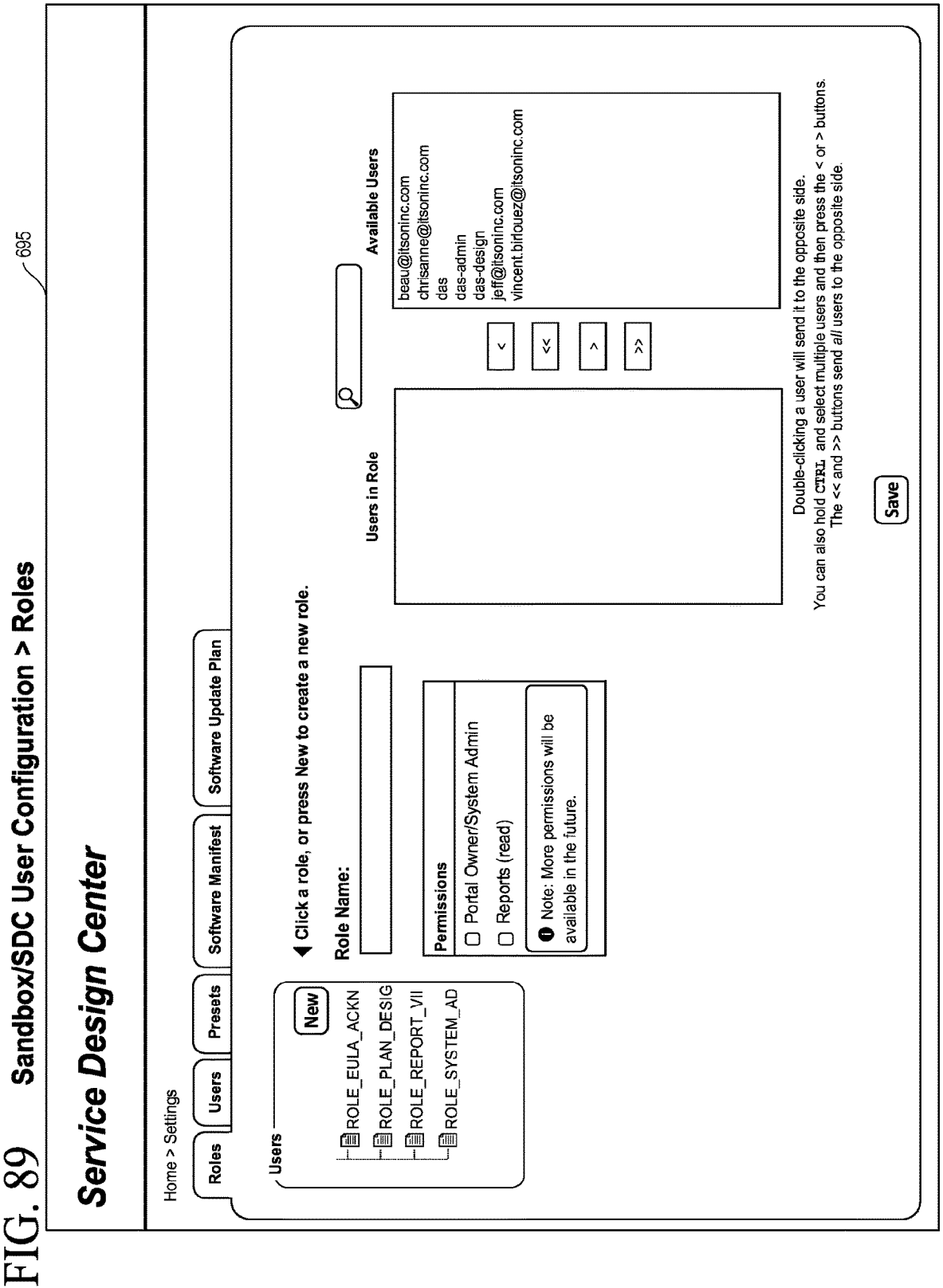
FIG. 89 Sandbox/SDC User Configuration > Roles

FIG. 91

Sandbox/SDC User Configuration > User Profile — 703

Service Design Center

Home > My Profile

My Profile

Username (Email Address): das-admin

First Name:

Last Name:

Password: Change my password

My Roles: ROLE_EULA_ACKNOWLEDGED ROLE_SYSTEM_ADMIN

[Save]

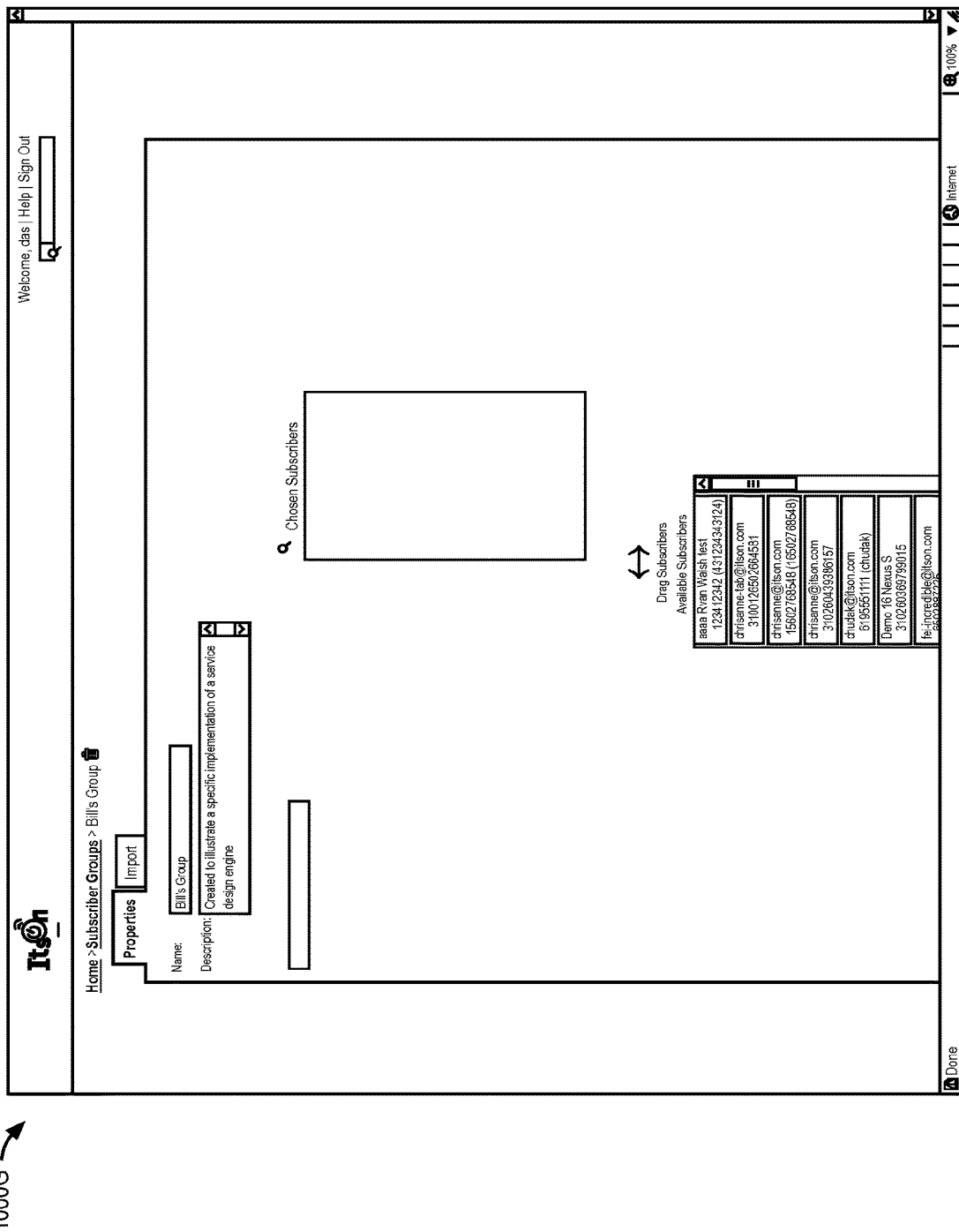

NETWORK SERVICE PLAN DESIGN

BACKGROUND

Network service plans have conventionally been developed by teams of technical specialists, each expert in the operation and programming of a respective subset of network appliances deployed to implement a given aspect of service policy. After the broad outline of a new plan offering is agreed upon, for example, separate teams of control policy and accounting policy specialists are typically tasked with developing control policies and accounting policies, respectively, required to implement the new plan, and programming individual network appliances to execute the control and accounting functions required by those policies.

Unfortunately, the divergent appliance-level destinations for control and accounting policy instructions tend to disjoin the development and implementation of those policies, yielding silos of development and implementation effort, which significantly slows the deployment of new service plans and often leads to less cogent plan design and implementation. New plans typically take many months and hundreds of development/implementation hours in the path from drawing board to implementation.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 6 illustrates an exemplary approach to managing policy priority within the integrated service design center of FIG. 2 that leverages the design hierarchy of FIG. 5;

FIG. 7 illustrates an example of a Z-ordered classification sequence with respect to the filters associated with sponsored and user-paid plan classes, and sponsored and open-access component classes;

FIG. 8 illustrates another example of Z-ordered classification within a plan catalog having plan classes and component classes, service policy components and plans similar to those shown in FIG. 7, but with replacement of a non-expiring general access plan with a one-week general access plan;

FIG. 9 illustrates exemplary design capabilities within the service design center of FIG. 2 for informing a subscriber of available service plans and plan features within a plan catalog;

FIG. 10 illustrates an exemplary sandbox design environment that may be configured within the service design center of FIG. 2;

FIG. 12 illustrates an exemplary application of multi-match classification to enable re-matching after detecting a policy limit;

FIG. 13 illustrates a more specific example of the dynamic policy-set modification described in reference to FIG. 11B;

FIG. 14A illustrates an exemplary set of provisioning instruction outputs generated by a provisioning instruction translator within a service design center;

FIG. 14C illustrates various functions that may be involved in enforcing policies for an end-user device in embodiments in which the end-user device lacks a service processor;

FIG. 14D illustrates various functions that may be involved in enforcing policies for an end-user device in embodiments in which the end-user device includes service processor;

FIG. 15 depicts a plan catalog display presenting the names and descriptions of previously designed catalogs in a list, prompting a service design center user (the "SDC user") to select any of the catalogs for modification and/or further design input;

FIG. 16 depicts an exemplary "Plans & Bundles" display presented in response to user selection of the "Configure plans & Bundles" option in the design-action list shown in FIG. 15;

FIG. 17 depicts an exemplary "Plan Priorities" display corresponding to the plan priority aspect of the catalog design shown in FIG. 5 and presented in response to navigation input within the Plans & Bundles display;

FIG. 19 illustrates an exemplary "Plan Properties" display presented in response to SDC user selection of the "New Plan" option in the Plans & Bundles display shown in FIG. 16;

FIG. 20 illustrates a Service Policy selection display presented in response to SDC user input specifying the "Choose a Service Policy" option in the Plan Properties display of FIG. 19;

FIGS. 25 and 26 illustrate exemplary "Bundle Properties" and "Bundled Plan Properties" displays that present a collective set of information and prompts corresponding to the Plan Properties display shown in FIG. 19, but with the service policy definition being split out from the general properties to enable specification of multiple service policies;

FIG. 29 illustrates an exemplary "Service Policies" display corresponding to the "Service Policies" aspect of the plan design hierarchy shown in FIG. 5;

FIG. 31 illustrates a tabbed "Service Policy Components" display presented in response to navigation input within the Service Policy Properties display;

FIG. 51 illustrates an exemplary "Plans in Each Tab" display reached by navigation input from the Catalog Tabs display or other catalog-presentation design display;

FIG. 52 illustrates an exemplary "Plan and Divider Order" display reached by navigation input from the Plans in Each Tab display or other catalog-presentation design display;

FIGS. 53-55 illustrates exemplary views of the Plan and Divider Order display with respect to each of the other plan-category tabs shown in FIG. 52;

FIG. 56 illustrates an exemplary "Featured Plans and Bundles" display reached by navigation input within, for example, the Plans In Each Tab display of FIG. 51;

FIG. 57 illustrates an exemplary "Interceptors" display presented in response to navigation input within the catalog presentation displays of FIGS. 50-55;

FIG. 58 illustrates a tabbed "Notification Properties" display presented in connection with generic interceptor design and thus in response to navigation input within the Interceptors display;

FIG. 59 illustrates an exemplary "Message Properties" display presented in response to navigation input within the Notification Properties display and thus as a further aspect of generic interceptor design;

FIG. 60 illustrates an exemplary "Button Properties" display presented in response to navigation input within the Message Properties display (or tab selection from the Notification Properties display) as another aspect of generic interceptor design;

FIGS. 61-65 illustrate a tabbed set of service policy definition displays presented in connection with marketing interceptor design and thus in response to navigation input within the Interceptors display of FIG. 57;

FIG. 66 illustrates a pair of exemplary promotional banner displays and that enable the SDC user to configure promotional banners to be displayed within the end-user device in connection with constituent plans and bundles of a plan catalog;

FIG. 67 illustrates an exemplary "Promo Popups" display that prompts the SDC user to define general and targeted promotional popups;

FIGS. 68-72 illustrate a tabbed set of promotional popup design displays presented in response to navigation input within the Promo Popups display of FIG. 67;

FIG. 73 illustrates an exemplary "Upsells" display that enables the SDC user to view various discovered-service definitions and ensure that each offers at least one service plan or bundle in connection with an end-user notification;

FIG. 74 illustrates an exemplary "Configure Upsell" display presented in response to navigation input within the "Upsells" display of FIG. 73;

FIG. 75 illustrates another exemplary "Configure Upsell" display presented when the SDC user clicks the "Edit" text prompt associated with a particular policy event shown in FIG. 73;

FIGS. 76-79 illustrate design-object templates that may be selected within other service design displays, enabling a design object, once created and saved as a template, to be reapplied or cloned in numerous subsequent designs;

FIGS. 81-87 depict exemplary displays generated by a subscriber management engine within a service design center embodiment and that enable the SDC user to configure and maintain groups of subscribers and associate individual subscriber groups with respective plan catalogs;

FIG. 88 illustrates an exemplary "Available Reports" display presented in response to navigation input from an SDC home screen;

FIGS. 89-91 illustrate exemplary SDC user configuration displays that enable an SDC administrator to allocate design/management responsibilities within the service design center to service designers and/or subscriber managers;

FIGS. 96A and 96B depict screenshots of a specific implementation of a service design system;

DETAILED DESCRIPTION

Figure 1:
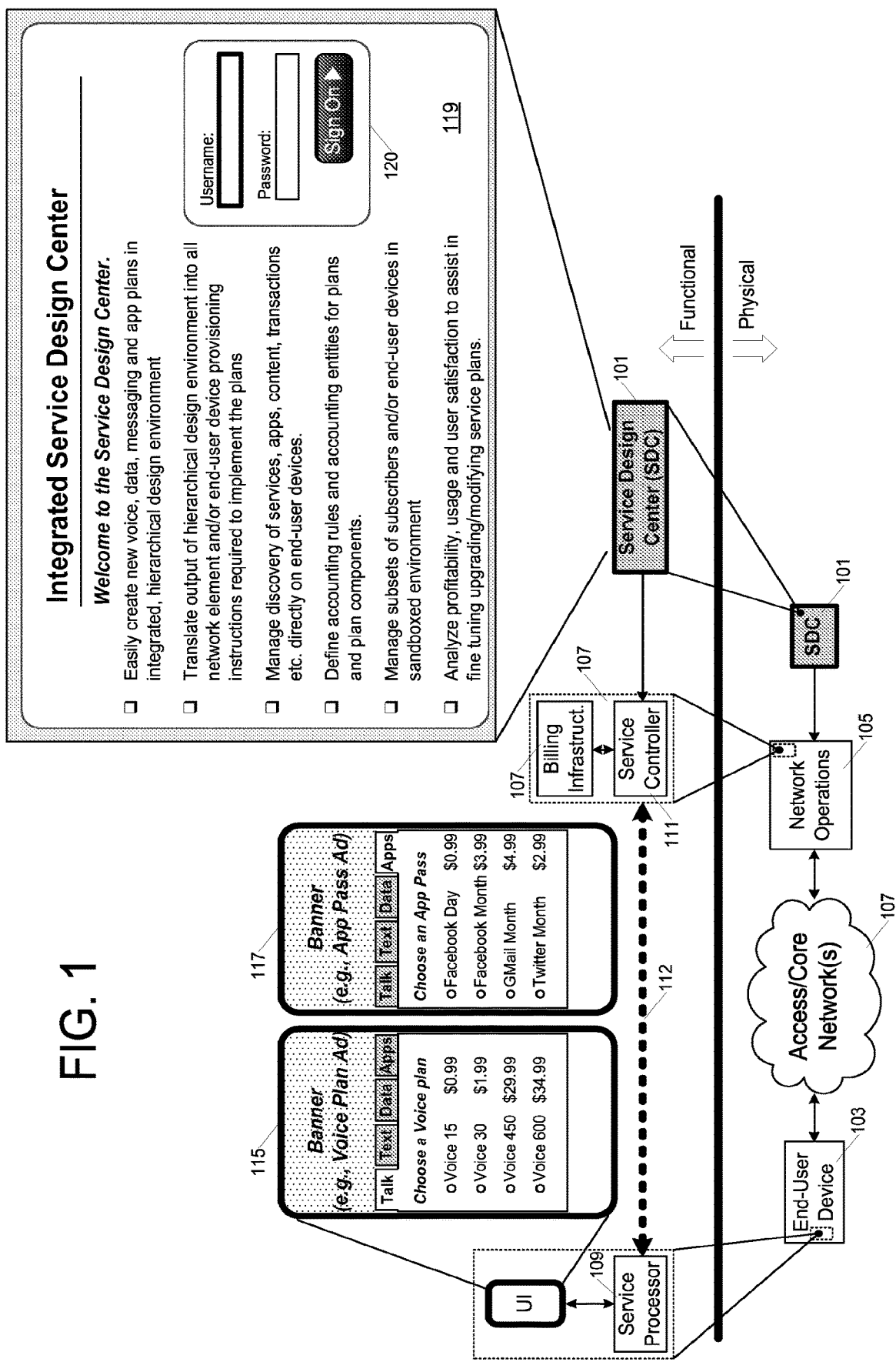
FIG. 1 illustrates an exemplary device-assisted network for which service plans are provisioned by an integrated service design center.

An integrated network-service design environment that enables centralized, unified, coordinated development of access-control, service-accounting and service-notification policies, and automated translation of developed service policies into provisioning instructions for a diverse variety of network elements and/or end-user devices is disclosed in various embodiments. In a number of embodiments, for example, classification objects and policy events are defined and/or organized in multiple hierarchical levels ranging from base-level classification objects to complete catalogs of service plans. This hierarchical organization allows for the ascendent inheritance of object properties through the hierarchy (i.e., elements at higher levels of the hierarchy can inherit or take on one or more properties of elements at lower levels of the hierarchy) and normalizes the collection of design elements at each hierarchical level, enabling, for example, a single design element to be included in multiple design elements at higher hierarchical levels, thus streamlining service plan development and simplifying revision and testing. In further embodiments, the integrated design environment contemplates concurrent activation and implementation of "overlapping" service plans for a single end-user device. For example, an end-user device may be associated with or subscribed to more than one active service plan at a time, and, in such cases, more than one active service plan may allow for a particular device activity (e.g., access to a particular web site could be allowed by a service plan providing for unrestricted Internet access, and it could also be allowed by a second service plan that provides for access to the particular web site). The integrated design environment enables plan designers to define control and/or accounting priorities of those plans relative to each other or even to delegate prioritization choices to subscribers or end-users (i.e., service consumers or parties associated with a service account, such as parents, device group managers (e.g., virtual service providers, mobile network operators (MNOs), mobile virtual network operators (MVNOs), etc.), enterprise information technology (IT) managers, administrators, etc.). The integrated design environment may also permit definition of "multi-match" classification and the triggering of multiple policy events per match to effect a richer set of end-user device features and performance than is possible with more conventional classification schemes. In yet further embodiments, the integrated design environment enables designers to define and control end-user discovery of available services, for example, through organization and featuring of plans and promotions on end-user devices, and definition of offers to be presented in response to detecting an attempted access for which a compatible plan is lacking. The integrated design environment may also facilitate definition and management of a broad variety of subscriber groups (and/or sets of end-user devices), and also permit "sandboxed" delegation of precisely defined subsets of service design and/or management responsibilities with respect to specified groups of subscribers or end-user devices. These and other features and advantages of the above-mentioned embodiments and others are disclosed in greater detail below.

FIG. 1 illustrates an exemplary device-assisted network in which service plans applicable to an end-user device may be designed using, and provisioned using instructions generated by, an integrated service design center 101 according to embodiments disclosed herein. The view presented is split conceptually between physical and functional interconnections of an end-user device and network operation elements. In the physical view, the end-user device 103 and network operation elements 105 are interconnected via one or more networks (e.g., an access network and one or more core networks, shown collectively at 107, and which may include the Internet) to enable delivery of and accounting for usage of various network services according to one or more service plans designed using, and provisioned using instructions generated by, service design center 101. Functionally, a service processor 109, implemented in hardware, software, or a combination of hardware and software, within the end-user device and a service controller 111, implemented in hardware, software, or a combination of hardware and software, within one or more of the network operation elements communicate over a device service link 112 to enable and account for service usage (e.g., voice, data, messaging, etc.), and to enable on-demand purchasing of various service plan offerings via a user-interface (UI) of the end-user device itself. In the user-interface examples shown at 115 and 117, for instance, the end-user device presents various voice, messaging, data and specialized application plans on user-selectable tabs, in each tab prompting the device user to choose from a list of available plans. Service processor 109 communicates the selection of a service plan and, in some embodiments, information about ongoing service usage within a selected plan to service controller 111, which coordinates with other network operation elements and/or elements within the access/core networks to configure the selected service plan and provide the requested service. In some embodiments, the service controller obtains service usage information from the service processor and/or one or more network elements (e.g., base station, radio access network (RAN) gateway, transport gateway, mobile wireless center, home location register, AAA server, data store, etc.) and communicates service usage information to billing infrastructure elements as necessary to account for service usage.

In the embodiment of FIG. 1, service design center 101 provides an integrated, hierarchical environment that enables a service designer (e.g., a human operator) to perform a wide variety of tasks, including, for example:

design in detail some or all of the voice, data, messaging and specialized service plans offered on or available to a specified collection of end-user devices, where the specialized service plans can be used to define a wide variety of service plans, possibly time-limited, using any conceivable classification, such as a plan that offers voice and/or messaging service up to a specified usage limit (e.g., specified minutes of voice and/or number of texts), or a plan that offers access through a particular end user device application ("app") (e.g., a plan that allows unlimited use of the Facebook app for a day), or a plan that offers access to a particular network destination (e.g., access to a particular web site for a specified period of time, etc.), or a plan that offers access to a particular type of content (e.g., streaming content, video content, audio content, etc.), or a plan that offers access to a particular category of services (e.g., access to social networking services through specified apps and web sites);

translate an output of the hierarchical design environment into network element and/or end-user device provisioning instructions necessary to provide and account for plan services under the available service plans;

manage end-user discovery of available services, applications, content, transactions and so forth, including managing the organization, display and promotion of available plans on end-user devices and managing presentation and acceptance of plan offers in response to detecting an attempted access for which no compatible plan has been purchased, or for which a less expensive or otherwise more user-appealing plan is available;

design accounting rules and configure information associated with accounting entities (e.g., AAA servers, online charging systems, offline charging systems, mediation platforms, home location registers, messaging gateways, etc.) (including third-party service sponsors) for end-user service plans and plan components;

design access rules and configure information associated with access control entities (including network elements (e.g., DPI systems, access gateways, AAA servers, online charging servers, messaging gateways, etc.))

manage subsets of subscribers and/or end-user devices (e.g., associated with an enterprise, device group, mobile virtual network operator, virtual service provider, carrier, etc.) with a pre-defined set of permissions according to designer credential established at login (i.e., as shown at 120 within the exemplary service design center introduction display 119); and/or analyze profitability, usage, user-satisfaction metrics, etc. to assist in fine-tuning and/or upgrading or modifying offered service plans.

These and various other features and advantages of embodiments of integrated network-service design are described in further detail below.

Figure 2:
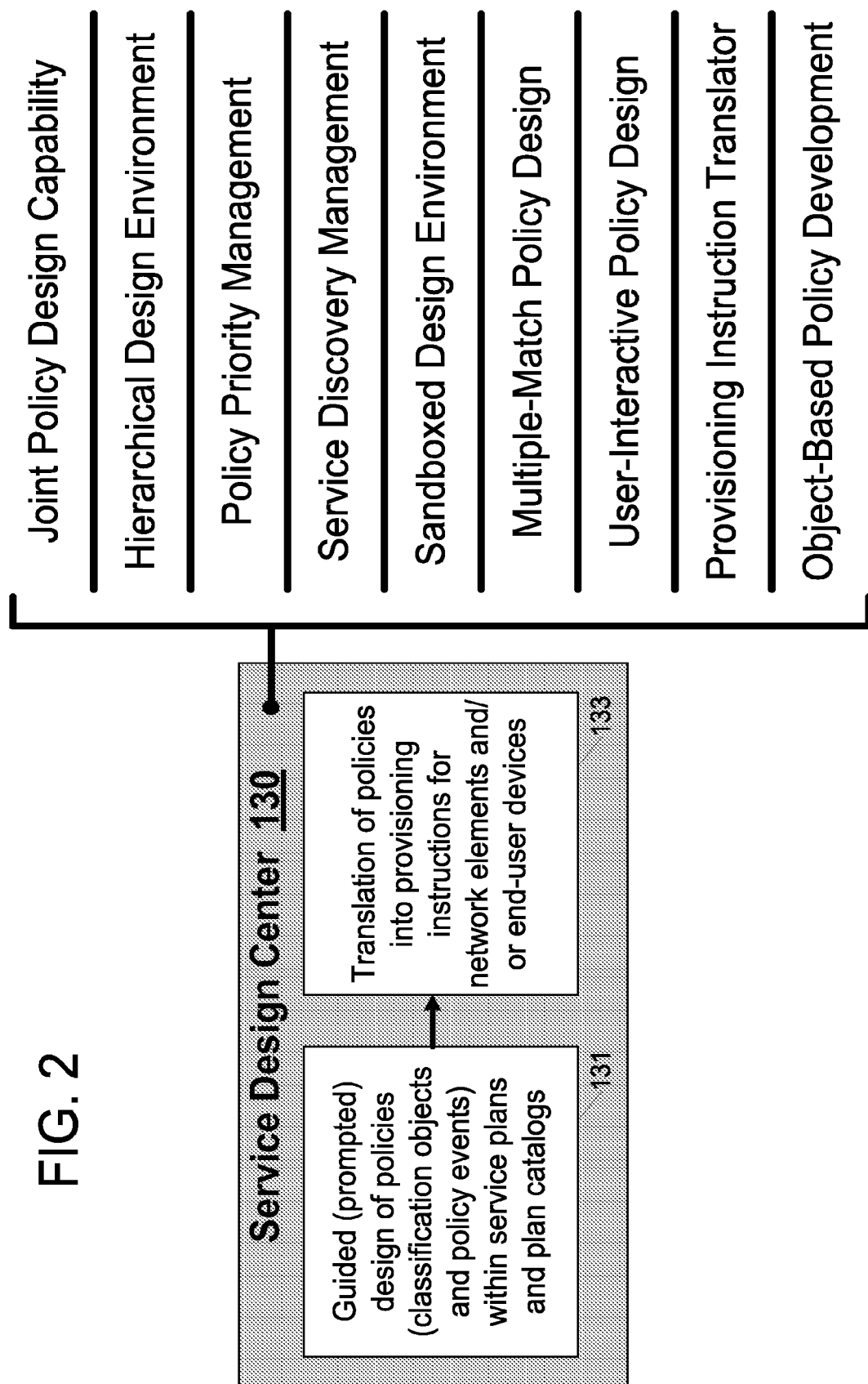
FIG. 2 illustrates a conceptual embodiment of an integrated service design center, depicting high-level service design and provisioning operations together with a non-exhaustive list of design center capabilities and features.

FIG. 2 illustrates a conceptual embodiment of an integrated service design center 130, depicting high-level service design and provisioning operations together with a non-exhaustive list of design center capabilities and features. As shown, service design center 130 guides (or prompts) a service designer through the design of service polices within service plans and/or catalogs of service plans (131) and then translates the service policies defined for the designed service plans into provisioning instructions for network elements and/or end-user devices (133). In contrast to conventional approaches in which at least access-control and accounting policies are disaggregated and separately designed, integrated service design center 130 enables those policies and complementary notification policies to be jointly designed in a centralized, hierarchical design environment. Further, integrated service design center 130 provides a rich set of design tools that permit plan designers to set priorities for when service plans and/or plan components overlap (i.e., when a particular device activity is within or is covered by more than one service plan or plan component), manage and promote end-user discovery of available services or service plans, and define multiple-match classification sequences (e.g., what to do when a particular device activity fits within more than one classification) and user-interactive policy application (e.g., dynamically determining and/or modifying the policy to be applied in response to a filter-matching event based on user-input), all together with a provisioning instruction translator that generates, according to the service design output, the various provisioning instructions required to provide and account for planned services, and for various network elements (e.g., network equipment, the end-user device, etc.) to implement the policies applicable to such services. Moreover, as described in greater detail below and illustrated with respect to exemplary user-interface displays shown in FIGS. 15-92, the service design center supports object-based service policy development, enabling a service designer to carry out service plan design through creation, organization, testing, revision and deployment of reusable policy objects at every hierarchical level of the plan design.

Joint Policy Design

Figure 3:
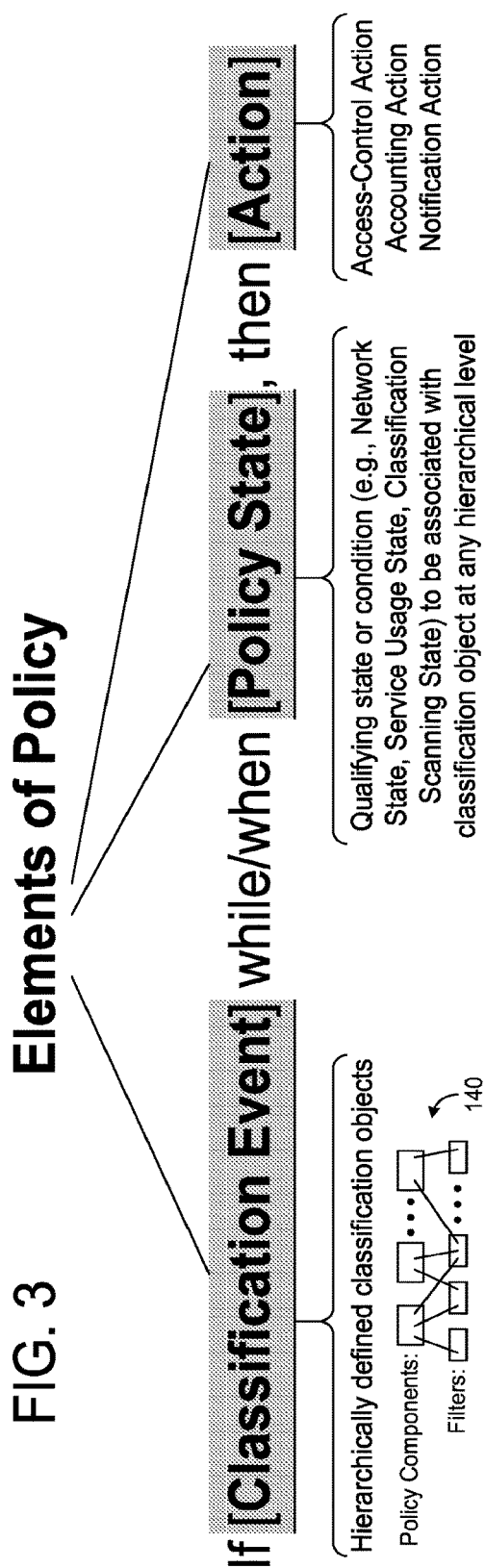
FIG. 3 illustrates exemplary policy elements that may be defined and provisioned by the integrated service design center of FIG. 2.

FIG. 3 illustrates exemplary policy elements that may be defined using and provisioned by the integrated service design center of FIG. 2. As shown, a policy may be defined as one or more actions carried out in response to (i.e., triggered by) detecting a classification event while or when in a policy state, with the action, classification event, and policy state may each be specified by a plan designer through interaction with the integrated service design center. In general, classification events are matches between designer specified classification objects and attempted or actual service access events. In a number of embodiments described below, service activity filters (or "filters") constitute base-level classification objects, with one or more filters forming constituents of a higher-level object referred to herein as a service policy component (or "component"). This hierarchical definition of classification objects, illustrated graphically at 140 in FIG. 3, provides a number of benefits, including object normalization (i.e., a single filter definition may be incorporated within multiple components, rather than requiring redundant filter definitions within respective components), property inheritance (properties defined with respect to filters are imputed to incorporating components) and hierarchical development (i.e., respective service designers or groups of designers may be tasked with lower-level filter design and higher-level component design) to name a few. The integrated service design center thus allows personnel with differing skills and knowledge to participate in service plan design/configuration. For example, an engineer could use the integrated service design center to design filters and/or components for use in service plans without having any knowledge of the service plans that subscribers are likely to want. For instance, the engineer could design a filter to identify network access attempts associated with the Facebook app on an end-user device without knowing how that filter might be incorporated into a service plan or how that filter might be used to define a new service. Conversely, a marketing individual with knowledge of network services subscribers are likely to want, but lacking know-how to implement underlying filters and or other more technical design objects, may nonetheless design marketable services or service plans by leveraging the filters and/or components designed by the engineer. For example, the marketing individual could design a "Facebook app for a day" service using the Facebook app filter designed by the engineer. The integrated service design center thus facilitates collaborative definition and deployment of service plans and services by allowing service design activities to be partitioned at different levels of the design hierarchy and engaged by individuals most knowledgeable or otherwise best suited for the design activity at hand.

Still referring to FIG. 3, policy state refers to a temporal condition such as a network state, classification-scanning state, service usage state and/or transition with respect to network, classification-scanning or service-usage states that, if in effect at the time of the classification event, will trigger the policy action, which, as shown, may be either an access-control action, an accounting action, or a notification action. Thus, the policy state may be viewed, from a Boolean perspective, as a qualifier to be logically ANDed with the classification event (i.e., match detection with respect to classification object) to trigger the policy action. As explained below, the policy state associated with a given classification object may be set to an "always true" state (e.g., "any network state" and "any service usage state") so that any match with respect to the classification object will trigger execution of the corresponding policy action. For example, if a sponsored text messaging service is available (e.g., a service sponsor has decided to offer some number of free text messages to a particular group of end-user devices), it might be desirable to provide a notification to every end-user device in the group of the availability of the sponsored text messaging service, regardless of whether those end-user devices are already able to send or receive text messages. Conversely, the classification event defined by a classification object may be set to an "always TRUE" condition (i.e., no access event or attempted-access event required) so that any match with respect to the policy state definition will trigger execution of the corresponding policy action. Examples include actions triggered in response to entering or leaving a roaming network, detecting availability of a known WiFi network for offloading, etc. In a number of embodiments described below, policy states and corresponding policy actions are defined conjunctively by a service designer as "policy events"—actions to be performed if an associated classification object is matched while/when one or more policy states are true.

Figure 4:
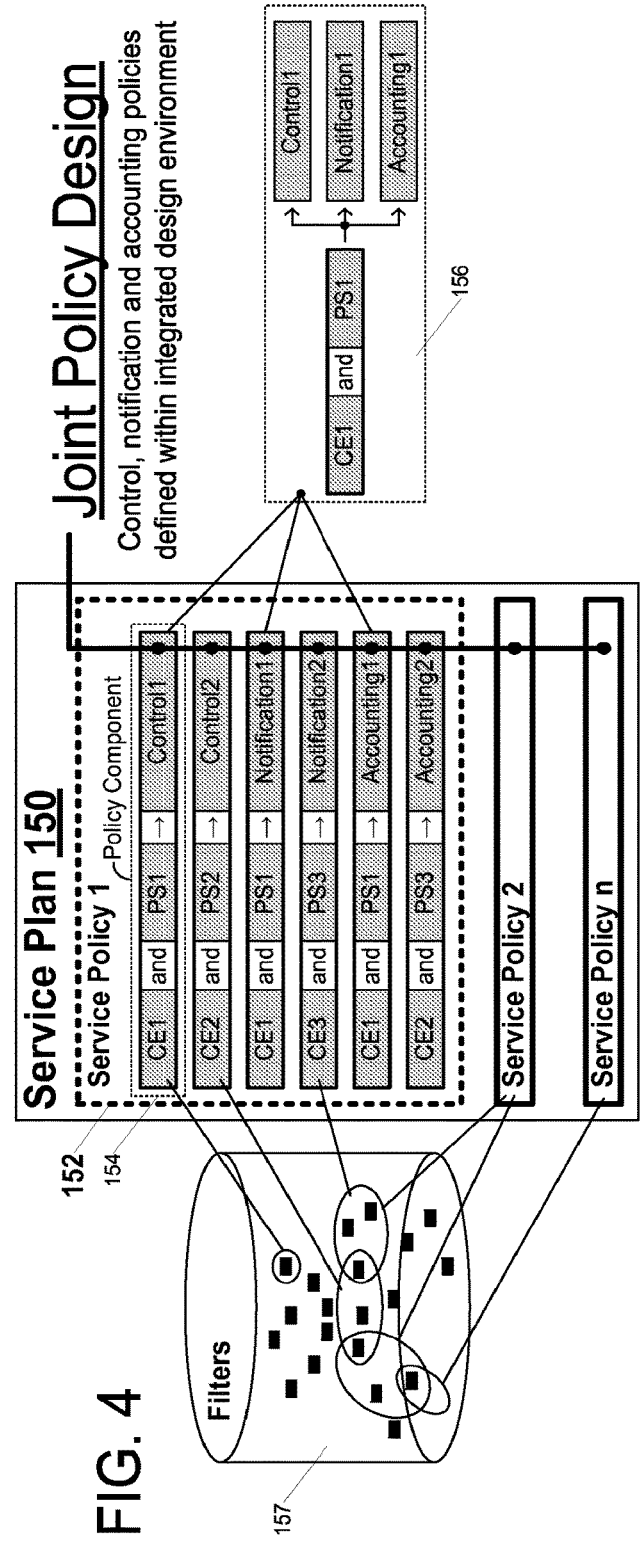
FIG. 4 illustrates an exemplary joint policy design—a combination of access-control, notification and accounting policies—that may be defined and provisioned using the integrated service design center of FIG. 2.

FIG. 4 illustrates an exemplary joint policy design—a combination of access-control, notification, and accounting policies or any two of those three policy types—that may be defined and provisioned using the integrated service design center of FIG. 2. To be clear, while FIG. 4 illustrates all three of access-control, notification, and accounting policies, it should be understood that joint policy design may involve only two types of policies, such as access-control and notification, or access-control and accounting, or notification and accounting. Proceeding hierarchically from top to bottom (and graphically from outside in), a service plan 150 is defined to include one or more service policies 152, with each service policy including one or more service policy components 154 and each service policy component constituted by the policy elements described in reference to FIG. 3 (i.e., a classification event (CE), policy state (PS), and triggered action). For example, the top row specifies classification event "CE1," policy state "PS1," and triggered action "Control1"; the second row specifies classification event "CE2," policy state "PS2," and triggered action "Control2"; and so forth. The classification event within each service policy component results from a match with a component-level classification object constituted by one or more filters within, for example, a database of filter definitions 157. In the example shown, and in a number of embodiments discussed below, policy events (i.e., combined policy state and policy action definitions) are defined at the policy component level, but such definitions may generally be applied at any hierarchical level within the plan design.

As a matter of terminology, individual policy components are distinguished herein as access-control policies (or "control policies" for short), accounting policies, and notification policies according to the nature of their triggered actions. For example, the six exemplary policy components 154 within the first service policy instance (i.e., "Service Policy 1") include two control policy components (indicated by policy actions "Control1" and "Control2"), two notification policy components, and two accounting policy components (of course, the inclusion of the six exemplary policy components 154 within the first service policy instance is merely illustrative—more or fewer components may be included within a given service policy). Likewise, it is not necessary that the components include all three of control, notification, and accounting, or that the number of each type be equal. As described above and in further detail below, the hierarchical definition of filters and component-level classification objects enables filters within database 157 to be re-used within a given service policy 152, as in the definition of classification events CE2 and CE3, and also within different service policies. Also, the same classification event may be associated with two or more policy events within respective policy components as in the policy components that yield control, notification, and accounting actions (Control1, Notification1, Accounting1) in response to classification event CE1 during policy state PS1. Further, while each policy component is shown as triggering a single control action, a single policy component may be defined to include multiple actions in an alternative implementation or configuration. Thus, instead of requiring three separate policy component instantiations to effect the Control1, Notification1, and Accounting1 actions, a single policy component may be defined to trigger those three actions (or any combination of actions, including two or more actions of the same type) as shown at 156. In addition to enabling efficient, joint policy definition within an integrated design environment, this design flexibility permits the design of arbitrarily complex policy implementations, including policies that support multiple-match classification sequences and "interceptor" policies that detect attempted access to an unsubscribed service and interact with a user to offer and activate one or more access-compatible service plans.

The consistent joint (integrated) policy definition and enforcement framework enabled by the various SDC embodiments presented herein is tremendously advantageous in the design and provisioning of enhanced policy enforcement capability, lower complexity and reduced network cost, reduced latency in user service notifications, and real time interaction between service plan policy options and user preferences to enhance the user experience and increase the opportunities to effectively market and sell new types of services and service plans or bundles. As described above, joint policy definition and enforcement framework refers to the capability to define and deploy filters (or collections of filters) conditioned on policy state and associate the conditioned filters with any of three policy types: control, accounting and notification. For example, a service activity (e.g., access or attempted access) that yields a match with respect to a filter (or collection of filters) defined as a "data communication type" and conditioned on "service limit reached" (a policy state) can be associated with a joint policy actions comprising "cap" (a control action triggered by the policy-state-conditioned filter match and thus a control policy) and "send plan modification required notification" (a notification action triggered by the filter match and thus a notification policy). This "cap and notify" joint policy construct allows for simultaneous execution of real-time capping (when the service limit is reached) and real-time user notification that the limit has been reached. Because the notification action is triggered at the same instant as the cap was enforced (i.e., both actions are triggered by the same policy-state-conditioned filter matching event), and the notification trigger can cause the notification system to deliver a user interface message to be displayed on the device UI in fractions of a second to a few seconds, the device user experiences a notification explaining why the service has been stopped precisely when the user has requested service and thus while the user's attention is directed to execution of the requested service (i.e., coincident in time with the service being stopped). Further, the UI message may include or be accompanied by information of various options for resolving the service stoppage, including on-the-spot offers to activate one or more service plans that will enable the requested service. Thus, in contrast to a disaggregated policy design/implementation in which notice of plan-expiration may arrive minutes or hours after the relevant service request with no option for resolution beyond calling a "customer care" call center (i.e., an untimely notification of a problem with no clear or immediate avenue for correction—in essence, a nuisance), a joint or integrated policy defined using embodiments of the integrated service design center enables instantaneous notification of the plan exhaustion event together one or more options for immediate resolution and allowance of the requested service access, apprising the network-service consumer of a problem and offering one or more solutions (including offers to purchase/activate additional service plans) precisely when the consumer is most likely to make a purchase decision. From a system design perspective, by providing the capability to associate a filter match definition with multiple policy types (i.e., as in the above example of joint (or integrated) policy design) there is no longer a need to have separate communication service control and communication service notification systems because both functions are accomplished with the same system.

As another joint or integrated policy example, a filter match comprising "data communication type" (a filter or component) conditioned on "service limit reached" (a policy state) can be associated with a joint policy comprising "stop accounting to base service plan bucket" (a first accounting policy), "begin accounting to service overage bucket" (a second accounting policy), and "send service overage now in effect notification" (a notification trigger policy). As in the preceding cap and notify example, this exemplary "cap and match" joint policy provides real-time notification to make the end-user immediately aware of service plan status (i.e., capped in this example), thus allowing the end-user to potentially modify his/her service plan or usage behavior. As the cap and match example also demonstrates, the single, simplified joint policy enforcement system obviates the separate accounting and notification systems that plague conventional approaches.

As another joint policy example, three-way joint policy enforcement may be achieved through definition of a filter comprising "data communication type" (a "data" filter or collection of data filters) whose match is conditioned on a "service limit reached" policy state and triggers, as control, accounting and notification actions, a "restrict access to service activation destinations" (a control action, and thus a control policy), a "stop accounting to base service plan bucket" (an accounting action and accounting policy), and a "send new service plan or service plan upgrade required" notification (a notification action and therefore a notification policy). In this example the complexity of having separate accounting, control and notification systems that are difficult to program and provide poor notification response times is avoided and replaced with an elegant, simple, less expensive and easier to program joint policy system that provides real time user notification.

As mentioned briefly above, embodiments of the integrated service design center also enable design and deployment of interactive (or dynamic) service policies. Continuing with the data filter example presented above, a match with respect to a data filter conditioned (or qualified) by a "service limit reached" policy state can be associated with a joint user-interactive policy comprising "cap until user response received" (a user-interactive control policy), "stop accounting to base service plan bucket" (an accounting policy), and "send the service plan offer corresponding to the data limit reached condition" (a user-interactive notification trigger policy). Thus, the SDC embodiments described herein provide not only for enhanced policy enforcement capability, lower complexity and reduced latency for a better user experience, but also real-time interaction between service plan policy options and user preferences, further enhancing the user experience and increase the opportunities to effectively market and sell new types of services and service plans or bundles.

As another example illustrating a joint policy design, a first data filter match conditioned by a "95% of service limit reached" policy state can trigger (or otherwise be associated with) a "send service limit about to be reached" notification (i.e., a notification policy), and a second data filter match conditioned by a "100% of service limit reached" can trigger a "cap" control action (i.e., a control policy). Thus, in this joint policy design example, the integrated service design center enables definition of a common (or shared) data-communication-type filter that is conditioned on two different policy states and, when matched in conjunction with the respective policy states, triggers distinct notification and control actions.

As another example illustrating a joint policy design, a first filter match comprising "Amazon" (a filter or a component) conditioned on "sponsored Amazon limit not reached" (a policy state) can be associated with "allow" (control policy) and "account to sponsored Amazon bucket" (an accounting policy), and a second filter match comprising "Amazon" (a filter or a component) conditioned on "sponsored Amazon limit reached" (a policy state) can be associated with "stop accounting to sponsored Amazon bucket" (an accounting policy), "send acknowledgement for 'Free Amazon service limit reached for this month, would you like to continue with Amazon charged to your data plan?' notification" (a user-interactive notification policy) and "cap until user response received" (a user-interactive control policy), "if user agrees, cap-match" [e.g. continue searching for a match] (a user-interactive policy to proceed down the Z-order to find another match), and "if user does not agree, cap-no match" (a user-interactive control policy). This is an example of a multi-match policy set where Amazon is first tested for the sponsored service filter until the sponsored service use bucket limit is reached, then a cap-match command is executed and, if there is another Amazon filter match before the "no capable plan" end filter is reached (e.g. a user data plan bucket that is not over its limit), then a second match will be found in the prioritization order.

As another example illustrating a joint policy design, at a first time a first filter match comprising "application update" (a filter or a component) conditioned on "application background status" (a first policy state) and "roaming network condition in effect" (a second policy state) can be associated with "block" (a control policy), and at a second time a second filter match comprising "application update" (a filter or a component) conditioned on "application foreground status" (a first policy state) and "roaming network condition in effect" (a second policy state) can be associated with "allow" (a control policy), and at a third time a filter match comprising "application update" (a filter or a component) conditioned on "application background status" (a first policy state) and "home network condition in effect" (a second policy state) can be associated with "allow". Thus, in this example a filter is conditioned on two policy state conditions (home/roaming network state and foreground/background application state), wherein in a background application update is allowed unless it is occurring on a roaming network, and a foreground application update is always allowed. This example simultaneously demonstrates two advantageous capabilities that may be achieved through joint policy design: the ability to modify control policy (or accounting or notification policies) as a function of network type and also the ability to modify control policy as a function of foreground versus background application status.

As another example illustrating joint policy design, a filter match comprising "no capable plan" (the final filter in the Z-order search) conditioned on "Vodafone Spain roaming network condition in effect" (a policy state) can be associated with "send the service plan offer corresponding to roaming on Vodafone Spain" (a notification policy), and "cap and wait for response" (a user-interactive control policy). Further, as a pure notification example, a filter match comprising "voice communication type" (a filter or component) conditioned on "80% of service limit reached" (a policy state) can be associated with "send 'you have 20% left on your talk plan' voice notification message" (a notification policy).

As a marketing interceptor example, a filter match comprising "no capable data plan" (the final filter in the Z-order search) with no condition can be associated with "send the free try before buy service offer" (a notification policy), and "cap and wait for response" (a user-interactive control policy).

As another marketing interceptor example embodiment, a filter match comprising "Facebook" (a filter or component) can be associated with "notify and continue" (a notification trigger policy) and "send Google+ sponsored cellular service offer" (a notification policy). In this example the special command "notify and continue" is provided as an example of the expanded policy enforcement instruction set that can lead to additional policy capabilities—in this case simplified and powerful notification based on user activity with their device. The notify and continue command example provides for a notification trigger that results in a notification being sent to the device UI (in this case an offer for free Google+ access on cellular networks) with no impact on service plan control or accounting and without interfering with the service activity to match with a filter in the Z-order search. The "continue" in "notify and continue" refers to the process of allowing the Z-order search process to proceed to find a match under the service plan policies in effect.

As another example of joint policy design and implementation, a notification policy may specify that when an end-user device that is not associated with (subscribed to) a service plan that provides for text messaging attempts to send a text message, a notification is provided through a user interface of the end-user device. In this example, the policy state is that the end-user device is not associated with a service plan that provides for text messaging, the classification event is that the end-user device attempted to send a text message, and the action is to provide a notification through the user interface of the end-user device. As another example, a control policy may specify that when an end-user device that is not associated with (subscribed to) a service plan that provides for text messaging attempts to send a text message, the text message is blocked. In this example, the policy state is that the end-user device is not associated with a service plan that provides for text messaging, the classification event is that the end-user device attempted to send a text message, and the action is to block the attempted text message. The policy may specify more than one action. For example, continuing with the examples above, a policy may specify that when an end-user device that is not associated with (subscribed to) a service plan that provides for text messaging attempts to send a text message, the attempted text message is blocked, and a notification is provided through a user interface of the end-user device. In general, classification events are matches between designer-specified classification objects and attempted or actual service access events. For example, in the text message example provided above, the designer-specified classification object is an attempt to send a text message, and the attempted or actual service access event is that the end-user device attempted to send a text message.

Hierarchical Design Environment

Figure 5:
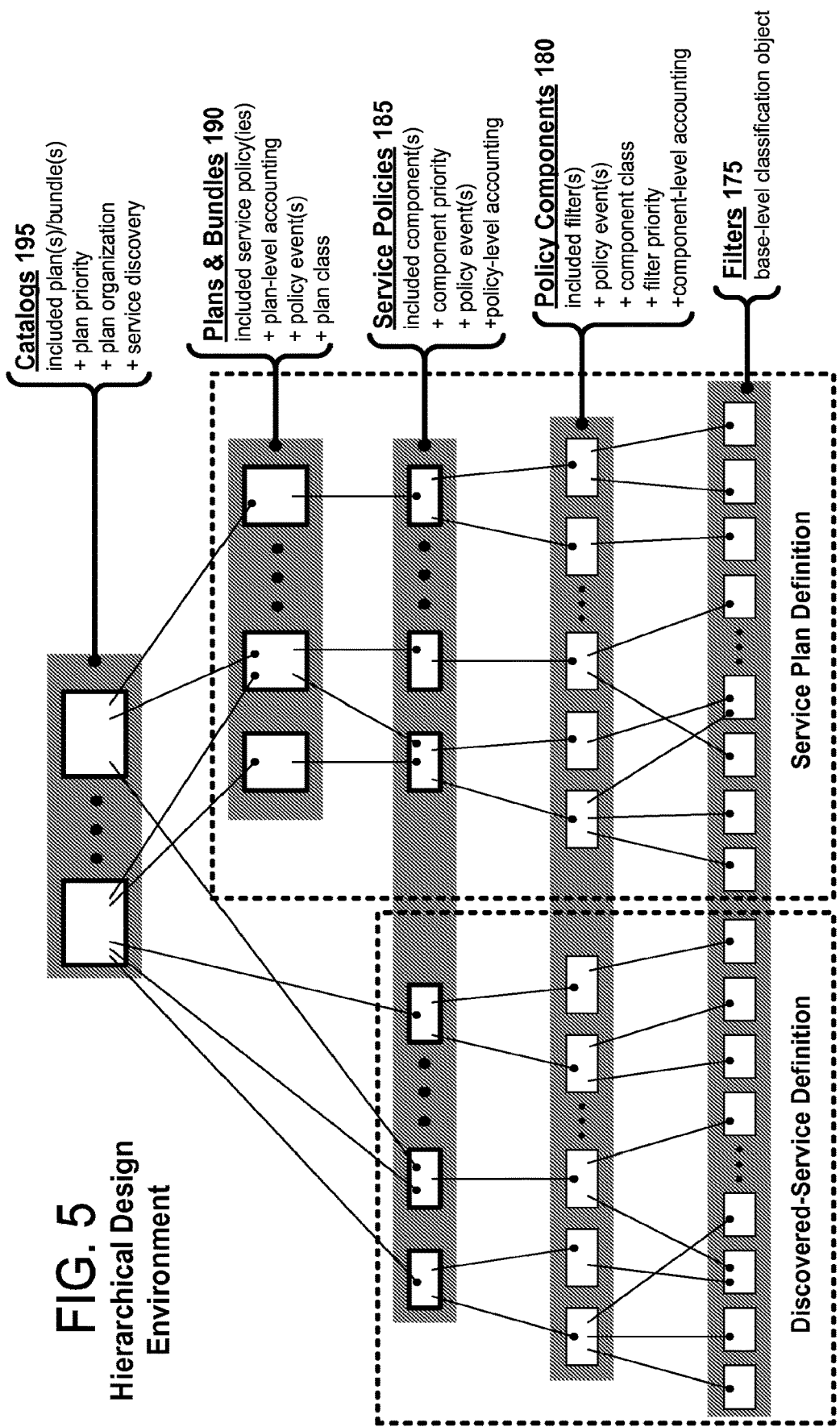
FIG. 5 illustrates a hierarchical design environment implemented in a specific integrated service design center embodiment.

FIG. 5 illustrates a hierarchical design environment implemented in a specific integrated service design center embodiment. Proceeding from bottom up through the hierarchy, filters 175 form base-level classification objects to be incorporated into service policy components 180 at the next hierarchical level. As shown, each service policy component includes, in addition to the incorporated filter(s), one or more policy event definitions together with a component service class definition, filter priority specification and optional component-level accounting specification. As discussed in reference to FIG. 3 and in further detail below, each policy event definition specifies an policy state and triggered action (i.e., an access-control, notification or accounting action), thus establishing, in conjunction with the incorporated filter set, the policy elements presented semantically in FIG. 3. As shown in FIG. 5 (and described above), each service policy component 180 may include filters that are incorporated within other service policy components, enabling a single filter definition to serve as a classification object within multiple service policy components. The component service class definition is applied, in at least one embodiment, to prioritize between potentially conflicting applications of different service policies to a given service activity (e.g., when one service policy specifies to block the service activity, and another service policy specifies to allow the service activity), and the filter priority definition likewise prioritizes the classification sequence between individual filters of a service policy component (e.g., if a service activity fits two classifications, which classification wins). Policy priority management is discussed in greater detail below in reference to FIG. 6.

Proceeding to the next hierarchical design level shown in FIG. 5, service policies 185 are defined by inclusion of one or more service policy components, together with a component priority specification, an optional number of multi-component (or "service-policy-level") policy event definitions and policy-level accounting specifications. As an example, a service policy underlying a social networking plan may include separate service policy components for different types of social networking services—a Facebook service policy component that enables access to a Facebook app, for instance, and a Twitter service policy component that enables access to a Twitter app. Each of those service policy components may themselves include any number of filters and policy event definitions as explained below. The component priority specification enables prioritization between same-class service policy components, and the multi-component policy event specification permits association of a single policy event with the classification objects within all incorporated service policy components—in effect, defining multiple service policies through a single, shared policy event specification. The examples described below in reference to FIGS. 7 and 8 demonstrate the value and power of intra-class prioritization with regard to plans, for instance, by enabling the service designer to prioritize an earlier-to-expire plan ahead of a later-expiring one. The ability to prioritize between same-class service policy components similarly empowers the service designer (or user, based on a preference setting) to reliably predict/control which service policy component will be applied first to enable a given service activity. For instance, the service designer may prioritize a more generic component beneath a more specific one (e.g., "Social Networking component" prioritized beneath a Facebook component) or prioritize between open access/no-streaming and open access/with-streaming plans.

The hierarchical design levels described thus far (i.e., filters, policy components and service policies) may be applied in either a service plan definition or in discovered-service constructs, such as the marketing interceptors (or "interceptor" policies) mentioned above, which can detect attempted accesses to an unsubscribed service and interact with a user to offer and activate one or more services. FIG. 5 reflects this division between plan definition and discovered-service definition as a separation of constituent design objects at and below the service policy level in the design hierarchy. Note that, though depicted (for convenience) as mutually exclusive within the service plan and discovered-service definitions, the various design objects at each hierarchical level (i.e., filters, policy components and/or service policies) may be shared between service plan and discovered-service definitions. More generally, some types of discovered-service constructs may be viewed as special configurations of service plans. For example, a marketing interceptor may be viewed as a plan with a disallow access-control policy and a notification policy, triggered by a particular policy state (e.g., classification scanning state=Disallow and NO Match is seen, as discussed below), that yields a message prompting the user of an end-user device to activate one or more optional service plans.

Continuing upward to the next hierarchical level within a service plan definition, service plans and service-plan bundles (the latter being referred to in shorthand herein as "bundles") are defined by incorporation of one or more service polices together with a specification of optional plan-level accounting policies, plan-level policy events and plan class. In one embodiment, plans and bundles are distinguished by quantity of incorporated service policies with service plans each incorporating a single service policy, and service-plan bundles each incorporating multiple service policies (i.e., establishing, in effect, a bundle of service policies). As discussed below, the multiple service policies within a bundle are generally billed as a collective service, but may be accounted for separately, for example, to enable costs of constituent service policies to be broken out for taxation, analytic or other purposes.

In a number of embodiments, plan-level accounting enables billing on recurring or non-recurring cycles of designer-specified duration, and thus complements any policy-based accounting actions (e.g., component-level, policy-level or plan-level accounting according to service usage in addition to or instead of accounting per temporal cycle). In one embodiment, for example, the service design center permits the specification of a minimum number of billing cycles to transpire (and/or a calendar date or other criteria) before plan cancellation is permitted, and also whether plan usage metrics are to be reset or usage limits varied (e.g., usage rollover) at the conclusion of a given accounting cycle. Other examples include proration rules, sharing rules, etc.

Plan-level policy event definition, like policy event definition at the service policy level, permits a single policy-event definition to be associated with the classification objects incorporated from lower hierarchical levels, thus enabling a conceptually and logistically efficient definition of numerous policies having a shared plan-level policy state and triggered action, but different classification events. Plan class specification enables prioritization between service plans according to, for example, the paying entity, nature of the service, and so forth. In one embodiment, for example, plans may be differentiated as either sponsored (i.e., a third party pays for or otherwise defrays the cost of service in part or whole) or subscriber-paid, with sponsored plans being prioritized ahead of subscriber-paid plans. By this arrangement, sponsored and subscriber-paid plans for otherwise identical services may coexist, with the plan prioritization ensuring usage of a sponsored plan before its subscriber-paid counterpart (or vice-versa). As another example, plans that enable service activation may be differentiated, as a class, from service-usage plans, with activation-class plans being prioritized ahead of their service-usage counterparts. Such prioritization can be used to ensure that a user service plan is not charged for data access required to activate a service plan (or for service plan management).

In the embodiment of FIG. 5, the top hierarchical design level is occupied by plan catalogs (or "catalogs"), each of which constitutes a complete collection of service plans and bundles to be published to a given end-user device group (i.e., one or more end-user devices) or subscriber group (i.e., one or more subscribers). Accordingly, each plan catalog is defined to include one more service plans and/or service-plan bundles instantiated in the hierarchical level below, together with an indication of relative priority between same-class plans and, optionally, a one or more plan organization specifications (e.g., add-on plans, base plans, default plans such as carrier plans and/or sponsored plans, etc.). As shown, each plan catalog also may also include one or more discovered-service objects (e.g., marketing interceptors expressed by service policy definitions within the discovered-service branch of the design hierarchy) and may define various service-discovery functions such as promotions or "upsells" of available plans or bundles (e.g., presented in banner ads, scheduled pop-ups, usage-driven notifications, etc.), organization and featuring of cataloged plans within the user-interface of an end-user device, and so forth. Thus, altogether, the plan catalog design, together with properties and features inherited from lower-level design objects, defines an overall experience intended for the user of an end-user device, from service offering to service execution, with complete expression of all applicable access-control, notification and accounting policies, merged with point-of-need promotion of available services, all according to design within the integrated service design center.

Still referring to the design hierarchy of FIG. 5, the following examples illustrate the manner in which plan-level accounting, policy-level accounting and component-level accounting may be applied in different service designs:

1—Component level accounting for Amazon access is sponsored by Amazon or carrier. Accordingly, a service designer may define all the filters that comprise Amazon access and create a component with these filters, defining an accounting policy to account to an Amazon charging code for access or attempted access during specified network states (i.e., specified in policy state definitions, which may include policy states in addition to or other than network states) such as, for example, access via home cellular network and WiFi network. The service designer may further assign accounting policy to not account to Amazon charging code and instead charge a user-paid plan for other network states (e.g., access via roaming network) and assign a high classification priority to the sponsored components to ensure that Amazon is charged for network states Amazon is supposed to be charged for before user plan usage is charged. Accordingly, by including such a service policy component within a user service plan, Amazon will be charged for access via home or WiFi networks before user is charged.

2—Component level accounting for Amazon access is sponsored by Amazon or carrier. A service designer may define all the filters that comprise Amazon access and create a component that includes these filters, assign control policy to allow and accounting policy to account to an Amazon charging code for some network states such as, for example, home cellular network and WiFi network. The service designer may then assign a control policy to disallow Amazon access for other network states (e.g., roaming network) and assign a high classification priority to make sure Amazon is charged for network states Amazon is supposed to be charged for before user plan usage is charged, place this component within a user service plan so that Amazon is charged before user bucket is charged for home or WiFi network states, by not allowing the component when roaming the multi-match Z-order filter match process will not show a match when roaming and the Z-order process will then search for another match such as a user paid roaming plan.

3—Component level accounting for Amazon access is sponsored by Amazon or carrier, define all the filters that comprise Amazon access and create a component with these filters, assign control policy to allow and accounting policy to account to Amazon charging code for some network states such as for example home cellular network and WiFi network, assign control policy to "not allow" Amazon and to "notify and require acknowledgement" of roaming charges for Amazon for other network states such as roaming network, if user does not acknowledge charge then block Amazon and don't seek another filter match, if user does acknowledge charge then allow Amazon access to seek another match in the Z-order process, assign a high Z-order priority to make sure Amazon is charged for network states Amazon is supposed to be charged for before user plan usage is charged, place this component within a user service plan so that Amazon is charged before user bucket is charged for home or WiFi network states, by not allowing the component when roaming the multi-match Z-order filter match process will not show a match when roaming and the Z-order process will then search for another match such as a user paid roaming plan.

4—Roaming component is provided in service plan, define roaming filters into a component for all networks that are allowed in roaming plan, assign roaming accounting policy and control policy, place high in Z-order so that roaming is charged at a special rate before home user bucket is charged.

The foregoing instances of plan-level, policy-level and component-level accounting are provided for purposes of example only and to make clear that accounting actions may be specified at any level of the service design hierarchy where beneficial to do so, including at multiple hierarchical levels. Prioritization (and/or conflict resolution) between accounting actions defined at two or more hierarchical levels may be controlled by explicit or implied input from the SDC user (i.e., with such input forming part of the overall service design specification) and/or established by design or programmed configuration (e.g., as in a user preference setting) of the SDC itself.

Policy Priority Management

FIG. 6 illustrates an exemplary approach to managing policy priority within the integrated service design center of FIG. 2 that leverages the design hierarchy of FIG. 5. It should be clear in light of the teachings herein that it is possible, using the service design center, to design and make available to end-user devices a wide variety of services and service plans. As a simple example, a designer could use the service design center to create not only "open-access" plans that allow unrestricted access, but also specialized service plans that enable access to social networking services. Assume that the designer creates three service plans: (1) an open-access plan that allows 50 MB of unrestricted Internet access, (2) a service plan that allows access only to Twitter, and (3) a social networking plan that allows access to both Facebook and Twitter. If an end-user device is subscribed to all three of these plans, and the device accesses Facebook, the service usage could be accounted either to the open-access plan or to the social networking plan. If the end-user device accesses Twitter, the service usage could be accounted to any one of the three plans. There is thus a need for rules or a methodology to establish the order in which the applicable service policies (e.g., one or more of accounting, control, and notification) are applied.

If a user or subscriber has paid for all service plans enabling the end-user device to access services, and none of the plans expires, then the order in which the plans are used up (i.e., the order in which service usage is accounted to the service plans) does not matter. But if a service plan is, for example, provided at no charge to a user or subscriber, and a particular service usage fits within that no-charge plan, then it may be desirable to account for the particular service usage within the no-charge plan instead of accounting for the service usage to a user-paid plan. Likewise, if a first service plan (whether user-paid or provided at no charge to the user) is nearing expiration (e.g., will cease to be available in three hours), and a second service plan under which a particular service usage could be accounted does not expire, it may be desirable to account for the particular service usage within the first service plan, if possible. By knowing variables such as whether a service plan is partially or entirely user-paid (or, conversely, whether a service plan is partially or entirely sponsored), whether a service plan expires, etc., a service designer can use the service design center to control whether, and in what order, service policies (e.g., accounting, control, and notification) are applied when an end-user device engages in various service activities (i.e., use of apps, access to Internet destinations, transactions, etc.). A policy enforcement engine (e.g., implemented by one or more agents within a network element and/or end-user device) may also apply the priority information to dynamically alter the priority order, for example, in view of fluctuating priority relationships that may result from the timing of plan purchases and/or automatically cycling (i.e., auto-renewing) plans. Also, while not specifically shown in FIG. 6, otherwise equivalent (or similar) plans may be prioritized based, for example, on service expiration (e.g., based on time remaining in a time-limited plan and/or usage remaining in a usage-capped plan). Thus, while FIG. 6 illustrates a relatively static priority organization, the relative priority between objects within the design hierarchy (e.g., plans, plan classes, service components, service component classes, and/or filters) may be changed dynamically in accordance with information provided within the service design center.

In the embodiment shown in FIG. 6, the relative priorities between different classes of plans are established at 211, with the priorities between plans within each class being set at 213. Examples of plan classes are carrier plans (e.g., plans that provide for carrier services, such as over-the-air updates), sponsored plans (e.g., plans that are subsidized, paid-for, or sponsored in some other manner by a third-party sponsor), and user plans (e.g., plans that are paid-for by the user or a subscriber). Similarly, the relative priorities between different classes of service policy components (also referred to herein as "service components," "policy components" and "components") is established at 215, and the priorities between service policy components within each component class is set at 217. The relative priorities between filters within a given service policy component may be established at 219. Note that the use of plan classes is optional and that specific plan class and component class names shown in FIG. 6 and further examples below are provided to assist the human service designer in managing priorities of the plans and components. Additional or alternative plan classes, component classes and names of such constructs may be used in alternative embodiments.

Although a top-down sequence of priority definition is shown in FIG. 6 (i.e., according to design hierarchy), the prioritization at different hierarchical levels may be set in any order, including a bottom up sequence in which filter priority is defined first, followed by service component priority and so forth. Moreover, the priority definition (i.e., assignment or setting of the relative priorities of two or more objects) at a given hierarchical level may be implied or predetermined within the service design center rather than explicitly set by the service designer. In one embodiment, for example, the priority between service component classes is predetermined within the service design center so that a designer's specification of component class for a given service component effects an implicit priority definition with respect to service components assigned to other component classes (e.g., a class having sponsored components may, by default, have a higher priority than a class having user-paid components). Similarly, the relative priorities of service plan classes may be predetermined within the service design center so that specification of plan class for a given plan or bundle effects an implicit priority definition with respect to service plans and bundles assigned to other plan classes. In another example, the priority of filters within a given service component may be implicitly defined by the order in which the designer incorporates the filters within the service component.

FIG. 6 also illustrates an implied priority between objects at different levels of the design hierarchy. More specifically, in the embodiment shown, all filters associated with the highest-priority component class are evaluated across the full range of plan class priorities before evaluating filters associated with the next-highest-priority component class. This hierarchical-level prioritization is demonstrated in FIG. 6 by a two dimensional "priority" grid 225 having service policy components and component classes arranged in order of descending priority along the vertical axis and service plans and plan classes arranged in order of descending priority along the horizontal axis. Individual cells within the priority grid are marked with an 'X' if the corresponding filter (and therefore the incorporating service policy component) is included within the corresponding service plan and left blank otherwise. As shown by the directional path overlaid on the grid, the filter evaluation order (or classification sequence) proceeds through all the filters associated with a given component class, service plan by service plan, before proceeding to the filters of the lower priority component class. With respect to a given component class, the filters associated with each service plan are evaluated according to component priority order and then according to the relative priorities of filters within a given component. In the case of service plan 1.3, for example, the filters associated with service component 1.1 (a service policy component within service component class 1) are evaluated before the filters associated with lower-priority service component 1.2, and individual filters incorporated by each service component are evaluated one after another according to their priority assignments (e.g., with respect to service component 1.2, filters are prioritized as Filter 1.1.1>Filter 1.1.2>Filter 1.1.3 and evaluated in that order). With regard to service plans, priority is resolved first at the plan class level and then by the relative priorities of plans within a given plan class. Thus, in the example shown, the filters associated with plans of class 1 are evaluated before the filters associated with plans of class 2, with the plans of each class being evaluated one after another according to their priority assignments (e.g., with respect to plan class 1, plans are prioritized as Plan 1.1>Plan 1.2>Plan 1.3 and evaluated in that order). Overall, in the priority grid layout of FIG. 6, the classification sequence follows a Z-shaped progression ("Z-order"), proceeding from left to right through the plans containing service policy components associated with the highest priority component class before retracing to the leftmost (highest-priority) plan and repeating the left-to-right progression with respect to the next-highest-priority component class.

FIG. 7 illustrates an example of a Z-ordered classification sequence with respect to the filters associated with two plan classes: sponsored and user-paid; and also two component classes: sponsored and open access. Of the four service plans shown in the priority grid, two are sponsored and two are user-paid. From an end-user's perspective, if a particular service activity of an end-user device (e.g., use of an app, access to a web site, etc.) fits both within a sponsored plan and a user-paid plan, it is desirable that the service activity be accounted to (e.g., charged to) the sponsored plan. In other words, if a particular service activity could be accounted to a sponsored plan instead of a user-paid plan, that particular service activity should be accounted to the sponsored plan. Thus, the sponsored plans should be prioritized ahead of user-paid plans. In some embodiments, sponsored plans are prioritized ahead of user-paid plans by default operation of the service design center. In some embodiments, the relative priorities of plans classes are explicitly set by a service designer. In the exemplary embodiment shown in FIG. 7, the two sponsored plans are prioritized ahead of the user-paid plans.

Although sponsored plans may be prioritized ahead of user-paid plans in a number of contexts, the converse may also be true. For example, under the concept of a "carrier backstop," a carrier or other service provider may wish to charge certain service activities required for service plans to work (e.g., domain name server functions) first to the end-user if the end-user has a supporting plan, and then to the service provider as a backstop. Accordingly, all the prioritizing arrangements described herein should be understood to be examples, with various alternative prioritizations being permitted by design or default.

Continuing with the prioritization examples, a particular service plan could have, for instance, sponsored and user-paid components. For example, the 30-day, 10 MB general access plan of FIG. 7 has both sponsored service components and open-access service components. If a particular service activity fits within a sponsored service component, it is desirable from a user's perspective that the service activity be accounted to the sponsored service component. Only when there is no sponsored service component available should the service activity be accounted to the open-access component. Similarly, sponsored service components are prioritized ahead of open-access service components, so that sponsored Facebook and Twitter components are prioritized ahead of an open access component. Like the plan priorities, the class priorities and the component priorities may be specified by the service designer or predetermined by default operation of the service design center.

The priorities of plans within a given plan class may be explicitly assigned by the service designer, or potentially by a user through a web site or through a user interface of the end-user device. In the example of FIG. 7, the designer has designated a "one-day sponsored Twitter plan" as being higher priority than a "three-day sponsored social networking plan" (although the opposite priority arrangement may have been specified). The one-day sponsored Twitter plan provides access to Twitter for a day at no cost to the user. As shown by FIG. 7, the one-day sponsored Twitter plan includes two Twitter-related filters: a Twitter app filter and a Twitter web access filter. As also shown by FIG. 7, the two Twitter filters are within the sponsored service component class. Because the one-day sponsored Twitter plan is a sponsored plan that provides only for limited access (i.e., to Twitter), the one-day sponsored Twitter plan does not include any other app/service-specific filters (e.g., none of the illustrated Facebook filters are included), nor does it include the all-pass filter that is an open-access service component and allows unrestricted service access.

On the other hand, the three-day sponsored social networking plan includes both of the Twitter-related filters (because access to Twitter is included in the three-day sponsored social networking plan), and it also includes three Facebook filters: a Facebook app filter, a Facebook messenger filter, and a Facebook web access filter. Because the three-day sponsored social networking plan provides only for social networking access, the plan does not include the all-pass filter. Note, however, that the end-user may wish to modify the default priorities based on purchase timing and/or re-prioritize based on service usage. Such end-user prioritization controls may be selectively granted as part of the overall user experience defined within the service design center.

In the example of FIG. 7, in which the sponsored Twitter plan expires after one day, it makes sense that the priority of the one-day Twitter plan would be higher than the priority of the three-day sponsored social networking plan (e.g., service usage fitting within the one-day Twitter plan would be accounted to the one-day Twitter plan before checking whether the service usage fits within the three-day sponsored social networking plan). If, in contrast, the sponsored Twitter plan expired after seven days, the designer, a user/subscriber, or the service design center by default might instead prioritize the three-day sponsored social networking plan over the seven-day sponsored Twitter plan, because the three-day sponsored social networking plan expires first.

Similarly, FIG. 7 shows a user-paid 30-day, 10 MB general access plan with bonus, which provides for general (i.e., unrestricted) access as well as a bonus that provides for sponsored (i.e., included as a bonus in the user-paid plan) access to particular social networking services/sites (i.e., Twitter and Facebook). Therefore, the 30-day, 10 MB general access plan with bonus includes the previously-described social networking filters (i.e., the three Facebook-related filters and the two Twitter-related filters) and the all-pass filter that allows general access. Meanwhile, the non-expiring 50 MB general access plan is entirely user-paid, with no sponsored components, and therefore it includes only the all-pass filter, which allows unrestricted access. In FIG. 7, the designer (or user/subscriber, or the service design center using default rules) has prioritized the (eventually expiring) 30-day, 10 megabyte (MB) general access plan with a bonus data allocation (e.g., a carrier or network-operator provided volume of network data service provided to incentivize the user's purchase) ahead of a non-expiring 50 MB general access plan. Like the priorities of same-class plans, the priorities of same-class components may be specified by the service designer or by default by the service design center. In the example of FIG. 7, the Facebook policy component is prioritized ahead of the Twitter component, though the designer or the service design center could have reversed this order. The priorities of filters incorporated within each policy component may likewise be specified by the service designer or by a default prioritization rule in the service design center. In the example of FIG. 7, a Facebook App filter has a higher priority (i.e., will be checked for a match before) a Facebook Messenger filter, which in turn has a higher priority (i.e., will be checked for a match before) a Facebook Web Access filter. Within the Twitter component, a Twitter App filter is prioritized over a Twitter Web Access filter.

Still referring to FIG. 7, the classification sequence proceeds with regard to sponsored service components, starting with the filters of the one-day sponsored Twitter plan (the sponsored Facebook component is not included in the one-day sponsored Twitter plan as indicated by the blank priority-grid cells with respect to the three Facebook filters) and then proceeding to the filters of the three-day sponsored social networking plan and then the 30-day 10 MB general access plan with bonus. Note that both of the sponsored components include filters within the three-day sponsored social networking plan (i.e., both the sponsored Facebook component and the sponsored Twitter component are constituents of that plan) and within the 3-day 10 MB General Access plan with bonus (i.e., the bonus in this example includes the sponsored Facebook and sponsored Twitter components). By contrast, the non-expiring 50 MB General Access plan contains no sponsored components and thus no filters from sponsored service components and therefore occupies no grid cells with respect to sponsored service components. Proceeding to the open-access component class, neither of the sponsored plans contains an open access component (hence the blank cells), while both the user-paid plans include an open access component (incorporating an all-pass filter) and thus yield the final two filter evaluations in the classification sequence.

Note a use of the Twitter app by an end-user device could potentially be accounted to any one of the four plans shown in FIG. 7: (1) the one-day sponsored Twitter plan, (2) the three-day sponsored social networking plan, (3) the 30-day, 10 MB access plan with bonus, or (4) the non-expiring 50 MB general access plan (because Twitter is within general access). Applying the filter priority sequence shown in FIG. 7, a Twitter access attempt in connection with a Twitter app will match the Twitter app filter. Because the first match is under the one-day sponsored Twitter plan, if the one-day sponsored Twitter plan is still active (i.e., the one day has not expired), the access attempt will consequently be allowed and accounted to the One-Day Sponsored Twitter plan without further filter evaluation (multiple-match classification represents another possibility and is discussed below). In addition, any defined notification policy associated with a match of the Twitter app filter under the one-day sponsored Twitter plan will be triggered. After the one-day Twitter sponsorship expires, a new priority management table can be used (i.e., a table like the one of FIG. 7, but without the first column under "Sponsored Plans"), or the control action associated with a match of the Twitter app filter in the one-day sponsored Twitter plan can be associated with a control action of "block but keep looking," which indicates that the access is not allowed under the one-day sponsored Twitter plan, but there may be another plan under which the access is allowed. It should also be noted that a match of the Twitter app filter within the one-day sponsored Twitter plan after expiration of the one-day sponsored Twitter plan, although blocked and therefore not accounted to the one-day sponsored Twitter plan, could trigger a notification policy action. For example, the fact that access was blocked could be reported to the user/subscriber or to a network element. A user/subscriber notification might inform the user that the one-day sponsored Twitter plan has expired and/or offer the user/subscriber another plan that would allow future accesses (e.g., a user-paid Twitter plan, a social networking plan, or a general access plan, to name just a few). The notification action could be based on other service plans already active for the device, such as those shown in FIG. 7. For example, because the device associated with the priority management table of FIG. 7 still has a sponsored social networking plan available, the notification might simply inform a user/subscriber that the sponsored Twitter plan has expired. But if the device did not have a plan that would provide for access to Twitter, the notification might provide service offers to the user/subscriber to enable Twitter access.

Continuing with the example of FIG. 7, the same Twitter access that would have been allowed under the one-day sponsored Twitter plan will, after expiration of the one-day sponsored Twitter plan, not be allowed in the classification sequence (i.e., will match the Twitter app filter of the one-day sponsored Twitter plan but will be blocked because the plan has expired, and will not match any of the other filters in the sequence) until reaching the Twitter App filter within the three-day sponsored social networking plan, where "allow," "charge plan," and notification policy actions may be triggered. Upon expiration of the Three-Day Sponsored Networking plan, the same attempted Twitter access will not be allowed (but might trigger one or more notification actions) until it reaches the Twitter App Filter incorporated within the 30-day 10 MB General Access Plan with Bonus, being allowed and accounted according to the policy definitions of that plan, starting, for example, with usage of the bonus data service allocation. After the bonus within the 30-Day, 10 MB General Access Plan is consumed, a Twitter access attempt will not be allowed within any of the sponsored service components (but may trigger one or more notification actions), but will be allowed after matching the all-pass filter of the 30-Day 10 MB General Access Plan with Bonus. Finally, after the 30-Day 10 MB General Access Plan has expired (along with all the sponsored service plans), the same Twitter access attempt will not be allowed (but may trigger one or more notification actions) until it matches the all-pass filter within the non-expiring 50 MB general access plan.

Although often it will be a service designer, through the service design center, who establishes the relative priorities of service plans, a subscriber or user can also be provided with the tools to set service plan priorities. For example, the subscriber/user may be given a "sandbox" (described) herein that allows the subscriber/user to modify the priorities of service plans. The subscriber/user may also, or alternatively, be able to establish service plan priorities through a user interface of the end-user device itself. For example, when a user selects (e.g., pays for, accepts, selects, etc.) a service plan from the end-user device, the user can be presented with an option to establish the priority of the service plan relative to other service plans associated with the device.

FIG. 8 illustrates another example of Z-ordered classification within a plan catalog having plan classes and component classes, service policy components and plans similar to those shown in FIG. 7, except that the non-expiring 50 MB General Access Plan has been replaced by a one-week 50 MB General Access Plan. Further, in the example shown, the service designer has prioritized the one-week 50 MB General Access Plan ahead of the 30-Day 10 MB General Access plan with Bonus. Because the one-week general access plan contains no sponsored policy components, any service access attempt falling within the scope of a sponsored service plan (including the sponsored components associated with the bonus data allocation within the 30-day general access plan) will match sponsored-component filters in the same sequence as in FIG. 7. By contrast, an attempted service access falling outside the scope of the sponsored components will now first match the open access filter within the one-week general access plan instead of the 30-day general access plan, thus ensuring that the shorter-lived one-week plan will be consumed ahead of the longer 30-day plan.

As the examples in FIGS. 7 and 8 demonstrate, the implied and explicit control over plan, component and filter priorities enables service usage requests within an environment of multiple applicable service plans to be accommodated and accounted for in a logical, systematic (e.g., deterministic or predictable) order, prescribed by the service designer. Moreover, it allows a rich and diverse set of notification actions to be triggered when, for example, an attempted service usage is not allowed within a particular service plan. From the reverse perspective, priority management within the service design center enables service consumers to activate a rich and diverse set of service plans with confidence that an intelligent, well designed usage and accounting priority will be applied to a service access falling within the scope of multiple active plans (i.e., no double usage-metering or accounting).

Service Discovery Management

FIG. 9 illustrates exemplary design capabilities within the service design center of FIG. 2 for informing a subscriber of available service plans and plan features within a plan catalog. First, as shown at 251, the service designer is prompted to design the presentation of a plan catalog (i.e., collection of plans and/or bundles that constitute a service offering with respect to a given subscriber group or end-user device group) as it will appear on the user interface of an end-user device. In the exemplary end-user device view shown at 252, for instance, the service designer is prompted to create "tabs" in which individual plans may be organized and displayed, with full control over the number of tabs and their names and order of display. Folders, slide deck arrangements, rolodex configurations (e.g., carousels, wheels, etc.) or any other type of organizational structures may be used in alternative embodiments.

The service design center may also enable the designer to control the subset of plans to be presented within a tab or other organizational structure, feature a particular plan or plans within a "featured" plan tab or page, control the order in which the plans are presented and/or separate the subset of plans into further subgroups within the plan presentation. In the tabbed service plan display shown at 252, for example, the service designer has (i) specified four voice plans to be listed within a "Talk" tab of a smartphone interface, (ii) ordered those plans according to their usage allowance (ranging from 15 minutes to 600 minutes), (iii) inserted a divider to separate the plans into those of briefer and longer usage allowance (e.g., under an hour versus over an hour), (iv) specified plan pricing, (v) provided selection buttons (circles to the left of each plan description) to enable an end-user to select an individual plan for purchase and activation, and (vi) provided a prompt to the end-user to "Choose a Voice Plan," all within the integrated service design environment. The service designer may additionally specify one or more plans to be specially featured within a given organization structure (e.g., highlighted with respect to other plans on the same tab or presented in a separate list of featured plans) and provide explanatory or promotional information to be displayed in response to end-user selection of a particular plan or bundle. Thus, the service design center enables the overall plan marketing environment to be precisely defined, either exactly or generally as it will appear on the display of an end-user device. In the particular example shown, the end-user device is assumed to be a smartphone having a touch-screen interface, though plan catalog presentations may similarly be specified for various other mobile and/or fixed-location devices having any practicable user interface, including tablet/laptop/desktop computers, specialized devices such as e-book readers or network-interactive navigation systems, network-connected media players, intermediate networking devices, and so forth. In end-user devices that lack visual displays (or display-bearing devices operated in auditory/voice-operated modes), plan catalogs may be presented audibly (through voice prompts) with user voice commands or button-press used to select specific options. For example, voice keywords may be spoken to select specific plans, receive additional information, etc.

Still referring to FIG. 9, the service design center may also enable design and scheduling of various promotions to be presented in connection with a plan catalog as shown at 253. These promotions may range from banner advertisements (e.g., displayed in connection with respective subsets of plans such as in connection with a selected tab as shown at 252) to pre-scheduled pop-up notifications (e.g., notifications of "plan of the month," etc.) to more targeted event-driven notifications (e.g., offering a service plan option to a subscriber/user after detecting a service usage condition, such that the device has consumed a certain percentage of a service plan), and in most or all cases may be accompanied by sale offers for one or more service plans and/or service-plan bundles, referred to herein as "upsells." In the example shown at 254, for instance, the designer has specified a notification message regarding plan usage status (e.g., to be displayed in response to detection of service usage in connection with a given policy state) to be presented on the user interface of an end-user device together with a set of buttons that constitute an offer to view/purchase additional service plans. Thus, the service designer is enabled to craft a targeted promotional message and service plan offer to be presented precisely when the user is informed that an extant service plan is nearing termination (or that a service plan has been fully used, or even velocity-based notifications that predict premature capping (reaching a usage limit before end of plan) or unduly low usage (reaching an end of cycle/duration well before reaching a usage limit) based on a rate of use). Though buttons prompting the end-user to view one-time and recurring plans are depicted in the exemplary promotion, buttons for directly purchasing one or more plans may alternatively or additionally be displayed. More generally, sponsored plan offers, purchase coupons, service-enhancing coupons or virtually any other plan activation inducement may be presented in connection with scheduled or event-triggered promotions.

As another aspect of discovered-service management, shown at 255, a service designer may define generic and targeted "interceptors" that detect service-usage-related events (e.g., requests for non-subscribed services, etc.) and present promotional offers (upsells) in response. In one embodiment, generic interceptors are backstop control and notification actions triggered in response to an access attempt for which no classification match results. For example, a service designer may specify a default "You do not have a text plan" message to be presented in response to detecting an attempt to send or receive an SMS (Short Messaging Service) message from an end-user device having no texting plan. As in the promotional offers discussed above, the lack of compatible plan (LCP) message may be presented together with an offer to view/purchase one or more service plans that permit the requested access.

Targeted interceptors, referred to herein as "marketing interceptors," are similar to generic interceptors, but include one or more service policy components (and thus one or more filters) that serve to detect the unsubscribed access attempt, thereby enabling a more precise identification of the service request and a correspondingly more targeted service offer in response. In the example shown at 256, for instance, one or more service policy components are deployed to detect Facebook service requests (e.g., attempt to execute a Facebook app, engage Facebook Messenger, or access a Facebook web page) and, in response, to provide a lack-of-compatible-plan message together with an offer to allow the user/subscriber to purchase one or more compatible plan offers (four different Facebook plans in this example, as well as an option to view all compatible plans (i.e., all plans allowing the attempted service usage)). Further, the collection of offers (an "offer set" constituting one or more offers) may be conditioned or tailored according to various factors relating to end-user device and/or network state. For example a different offer set may be presented in response to foreground-only activities (e.g., activities that prompt for user-input or otherwise actively present information via the user interface of the end-user device) than in response to background-only activities, and a yet a different offer set may be presented in response to a particular combination of foreground and background activities. For example, a particular offer may be displayed only if the corresponding application is in the foreground (e.g., Facebook app driving user-interface display) and a different notification may be presented if the application is in the background (e.g., Facebook app attempting a background sync). Thus, marketing interceptors enable a tailored set of service plans to be offered on an end-user device precisely when the device user has requested a service falling within the purview of the offered plans and in accordance with the state of the end-user device and/or network—a service otherwise unavailable without new plan activation.

Sandboxed Design Environment/Subscriber Management

FIG. 10 illustrates an exemplary "sandbox" design environment that may configured within the service design center of FIG. 2. The sandbox design environment provides a subset of an available set of service/service plan design and/or service plan management capabilities to a service design center (SDC) user, who could be a service administrator, a carrier/MNO/MVNO employee, an IT manager of an enterprise, a parent responsible for managing a family plan, etc., or any combination of such individuals where multiple parties (e.g., different MVNOs and/or MNO's or combinations of these in a multi-tenant environment) share a common service design center In the following, two types of credentials are contemplated. The first is a service design center user credential, which identifies the user of the service design center. The service design center credential may be a username/password combination, a biometric parameter (e.g., a fingerprint, an iris scan, etc.), or any other information that distinguishes a particular service design center user from all other service design center users. The second type of credential is a credential that identifies an end-user device. As would be appreciated by a person having ordinary skill in the art, a device credential allows a user to access network services using an end-user device. A credential uniquely identifies an entity, such as a particular end-user device, a particular subscriber or account-holder associated with the end-user device, a particular service account associated with the end-user device, etc. Examples of credentials include, but are not limited to, a phone number, an international mobile subscriber identifier (IMSI), a mobile station identifier (MSID), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, any other identifying information that uniquely identifies an end-user device, and combinations of these. Some credentials (e.g., a SIM, a phone number, etc.) may be moved from one end-user device to another end-user device, whereas other credentials are permanently associated with a device (e.g., an ESN, a device identifier, etc.). This document often refers to a device credential as uniquely identifying a device because even a credential that can be moved from one device to another uniquely identifies a particular device when the credential is installed in the particular device (e.g., while a SIM card is in Device A, the SIM card uniquely identifies Device A because the SIM card can only be installed in one device at a time).

In the embodiment shown in FIG. 10, service design center user credentials are associated with respective sets of design permissions and/or groups of subscribers or devices, each of which is also associated with a device credential. The association of a service design center user credential with a set of one or more device credentials, each of which is uniquely associated with an end-user device, and a set of design capabilities defines a "sandbox" in which the service design center user can design and/or deploy service plan offerings to a specified set of subscribers or on a specified set of end-user devices. In the specific example presented in FIG. 10, for instance, an SDC user identified by "Credential 1" is provided with permission sets 3 through M (but not permission sets 1 or 2) and design responsibility for subscriber/device group 1 (but not groups 2 through N), and is thus permitted to revise/create some but not all aspects of a service design with respect to a limited group of subscribers or end-user devices (each of which is identified by some sort of device credential). The user associated with Credential 1 might be, for example, an engineer who designs filters and service components, but not service plans or marketing interceptors. By contrast, a "Credential 2" SDC user is afforded a full range of permissions with respect to subscriber/device group N. The Credential 2 user might be, for example, a mobile virtual network operator (MVNO) responsible for the design and management of service plans for all devices associated with the MVNO. A "Credential n" user is provided only with permission set 1, but with regard to all groups of subscribers and/or end-user devices. The Credential n user might be, for example, an employee of a carrier who is responsible for designing marketing interceptors. In one embodiment, the credential for a given service design center user is created by a system administrator and associated with the user's login (e.g., as shown at 120 in FIG. 1). For example, a username and password successfully entered during login to the service design center may be applied to select a corresponding credential (e.g., by indexing a database of credentials) that directly or indirectly defines the permission sets and subscriber/device groups included within the SDC user's design sandbox. As another example, the username/password combination might be the SDC user credential that is then associated with a group of end-user devices, each defined by a device credential.

Still referring to FIG. 10, an example of a specific set of design sandboxes allocated to three different user credentials is shown at 260. As can be seen, a carrier policy manager is provided with a single permission set (carrier policy design) that spans all subscriber and device groups. Reversing that, a design manager for a mobile virtual network operator (MVNO) is provided with all permission sets except the carrier policy design permissions, again with responsibility for all subscriber and device groups. By contrast, an IT manager for Enterprise X is provided with service design responsibility for only those end-user devices within the Enterprise X subscriber group and then only for a limited number of permission sets. In the example shown, for instance, the Enterprise X IT Manager is enabled to create/modify service policy inclusion definitions and service discovery management, but not classification object design or carrier policy design (e.g., defining plans and marketing interceptors by incorporating pre-existing service policy components, but not creating/revising service policy components or individual filters themselves).

Note that the user credentialing mechanism may be implemented within the service design center itself, or, in whole or part, as a separate entity that provides verified (or trusted) credentials to one or more instances of the service design center. The latter arrangement enables intra-organizational responsibilities to be further sandboxed (e.g., further subdividing the various permission sets and/or subscriber/device group responsibilities shown with respect to a particular credential in FIG. 10) without requiring action by the service design center administrator.

Multiple-Match Design Capability

As demonstrated in a number of examples above, the joint or integrated policy design constructs enabled by embodiments of the integrated service design center permit definition and provisioning of much more complex, user-responsive and interactive service policies than possible through conventional disaggregated design approaches. These include, for example without limitation:
  service policies that yield multiple triggered actions in response to detection of a classification event (i.e., filter match or component match) as in simultaneous cap and notification (control and notification actions);
  service policies that trigger user-interactive communication before proceeding with policy application as in the case of a marketing interceptor that yields cap and notification actions together with further presentation of a service plan offer on the user-interface of an end-user device (a further notification action or part of the original notification action) that prompts the end-user to activate a new sponsored or user-paid service plan before finalizing the response to the filter matching event;
  service policies that enable continued classification following a filter-matching event, thereby permitting triggered action(s) otherwise specified by the filter-matching event to be deferred, modified or overridden in view of one or more subsequent matching events, as in the cap and match examples provided above (i.e., cap reached, but continue classification scan before resolving to disallow service request) or as in the case of associative matching, where a sequence of (or other set of two or more) filter-matching events is required to determine/infer a status or characteristic with respect to a requested service (e.g., instance of a regular expression, or other activity necessarily or most-easily detectable through match with multiple filters); and/or
  service policies that enable triggered action, policy state or filter definitions (of the subject service policy itself and/or other interrelated service policies) to be modified dynamically, for example, in response to a filter-matching event and/or policy state.

The consistent joint (integrated) policy definition and enforcement framework provided by the present disclosure is very important for providing enhanced policy enforcement capability, lower complexity and reduced network cost, reduced latency in user service notifications, and real time interaction between service plan policy options and user preferences to enhance the user experience and increase the opportunities to effectively market and sell new types of services and service plans or bundles. Here, joint policy definition and enforcement framework refers to the capability to define or design filters (or components) conditioned on policy state and associate the filters with any of three policy types: control, accounting and notification. For example, a filter match comprising a filter match comprising "data communication type" (a filter or component) conditioned on "service limit reached" (a policy state) can be associated a joint policy comprising "cap" (a control policy) and "send plan modification required notification" (a notification trigger policy). This allows for simultaneous real time capping when the service limit is reached and real time user notification that the limit has been reached. Because the notification trigger occurred at the same instant as the cap was enforced, and the notification trigger can cause the notification system to deliver a user interface message to be displayed on the device UI in fractions of a second to a few seconds, the user experiences a notification explaining why the service has been stopped that is coincident in time with the service being stopped. With this type of joint (or integrated) policy capability to associated a filter match definition with multiple policy types there is no longer a need to have separate communication service control and communication service notification systems because both functions are accomplished with the same system. As another example, a filter match comprising "data communication type" (a filter or component) conditioned on "service limit reached" (a policy state) can be associated a joint policy comprising "stop accounting to base service plan bucket" (a first accounting policy), "begin accounting to service overage bucket" (a second accounting policy), and "send service overage now in effect notification" (a notification trigger policy). Similar to the above example, this example embodiment provides real time user notification so that the user is immediately aware of the status of their service allowing the user to potentially modify their service plan or their usage behavior. In this example the disclosure also provides the benefit that this single, simplified joint policy enforcement system removes the need for separate accounting and notification systems. An example embodiment for a three-way joint policy enforcement is a filter match comprising "data communication type" (a filter or component) conditioned on "service limit reached" (a policy state) that is associated with "restrict access to service activation destinations" (a control policy), "stop accounting to base service plan bucket" (an accounting policy), and "send new service plan or service plan upgrade required notification" (a notification policy). In this example the complexity of having separate accounting, control and notification systems that are difficult to program and provide poor notification response times is replaced with an elegant, simple, less expensive and easier to program joint policy system that provides real time user notification.

With the present disclosure, in some embodiments policy can also be interactive. Continuing with the same basic filter match example for illustration purposes, a filter match comprising "data communication type" (a filter or component) conditioned on "service limit reached" (a policy state) can be associated with a joint user-interactive policy comprising "cap until user response received" (a user-interactive control policy), "stop accounting to base service plan bucket" (an accounting policy), and "send the service plan offer corresponding to the data limit reached condition" (a user-interactive notification trigger policy). This example illustrates that not only does the present disclosure provide for enhanced policy enforcement capability, lower complexity and reduced latency for a better user experience, the disclosure also provides for a real time interaction between service plan policy options and user preferences, further enhancing the user experience and increase the opportunities to effectively market and sell new types of services and service plans or bundles.

As another example illustrating a joint policy design, a first filter match comprising "data communication type" (a filter or component) conditioned on "95% of service limit reached" (a policy state) can be associated with "send service limit about to be reached notification" (a notification trigger policy), and a second filter match comprising "data communication type" (a filter or component) conditioned on "100% of service limit reached" can be associated with "cap" (a control policy). In this example, a common filter is shared that defines a data communication type, and the common filter is conditioned on two different policy states.

As another example illustrating a joint policy design, a first filter match comprising "Amazon" (a filter or a component) conditioned on "sponsored Amazon limit not reached" (a policy state) can be associated with "allow" (control policy) and "account to sponsored Amazon bucket" (an accounting policy), and a second filter match comprising "Amazon" (a filter or a component) conditioned on "sponsored Amazon limit reached" (a policy state) can be associated with "stop accounting to sponsored Amazon bucket" (an accounting policy), "send acknowledgement for 'Free Amazon service limit reached for this month, would you like to continue with Amazon charged to your data plan?' notification" (a user-interactive notification policy) and "cap until user response received" (a user-interactive control policy), "if user agrees, cap-match" [e.g. continue searching for a match] (a user-interactive policy to proceed down the Z-order to find another match), and "if user does not agree, cap-no match" (a user-interactive control policy). This is a clear example of a multi-match policy set where Amazon is first tested for the sponsored service filter until the sponsored service use bucket limit is reached, then a cap-match command is executed and if there is another Amazon filter match before the "no-match" end filter is reached (e.g. a user data plan bucket that is not over its limit) then a second match will be found in the Z-order.

As another example illustrating a joint policy design, at a first time a first filter match comprising "application update" (a filter or a component) conditioned on "application background status" (a first policy state) and "roaming network condition in effect" (a second policy state) can be associated with "block" (a control policy), and at a second time a second filter match comprising "application update" (a filter or a component) conditioned on "application foreground status" (a first policy state) and "roaming network condition in effect" (a second policy state) can be associated with "allow" (a control policy), and at a third time a filter match comprising "application update" (a filter or a component) conditioned on "application background status" (a first policy state) and "home network condition in effect" (a second policy state) can be associated with "allow". This is a clear example of a filter conditioned on two policy state conditions (home/roaming network state and foreground/background application state), wherein in a background application update is allowed unless it is occurring on a roaming network, and a foreground application update is always allowed. This is an interesting example embodiment showing two advantageous capabilities at the same time, the first capability being the ability to modify control policy (or accounting or notification policies) as a function of network type and the second capability being the ability to modify control policy as a function of foreground vs. background application status.

As another example illustrating joint policy design, a filter match comprising "no-match" (the final filter in the Z-order search) conditioned on "Vodafone Spain roaming network condition in effect" (a policy state) can be associated with "send the service plan offer corresponding to roaming on Vodafone Spain" (a notification policy), and "cap and wait for response" (a user-interactive control policy).

As a pure notification example, a filter match comprising "voice communication type" (a filter or component) conditioned on "80% of service limit reached" (a policy state) can be associated with "send 'you have 20% left on your talk plan' voice notification message" (a notification policy).

As a marketing interceptor example, a filter match comprising "no-match" (the final filter in the Z-order search) with no condition can be associated with "send the free try before buy service offer" (a notification policy), and "cap and wait for response" (a user-interactive control policy).

As another marketing interceptor example embodiment, a filter match comprising "Facebook" (a filter or component) can be associated with "notify and continue" (a notification trigger policy) and "send Google+ sponsored cellular service offer" (a notification policy). In this example the special command "notify and continue" is provided as an example of the expanded policy enforcement instruction set that can lead to additional policy capabilities—in this case simplified and powerful notification based on user activity with their device. The notify and continue command example provides for a notification trigger that results in a notification being sent to the device UI (in this case an offer for free Google+ access on cellular networks) with no impact on service plan control or accounting and without interfering with the service activity to match with a filter in the Z-order search. The "continue" in "notify and continue" refers to the process of allowing the Z-order search process to proceed to find a match under the service plan policies in effect.

As another marketing interceptor example embodiment for advertising a product or service, a filter match comprising "SiriusXM app" (a filter or component) can be associated with "notify and continue" (a notification trigger policy) and "send Pandora app and sponsored cellular service offer" (a notification policy). In this example the notification policy is based on detecting application activity that triggers a marketing interceptor offer.

Figure 11A:
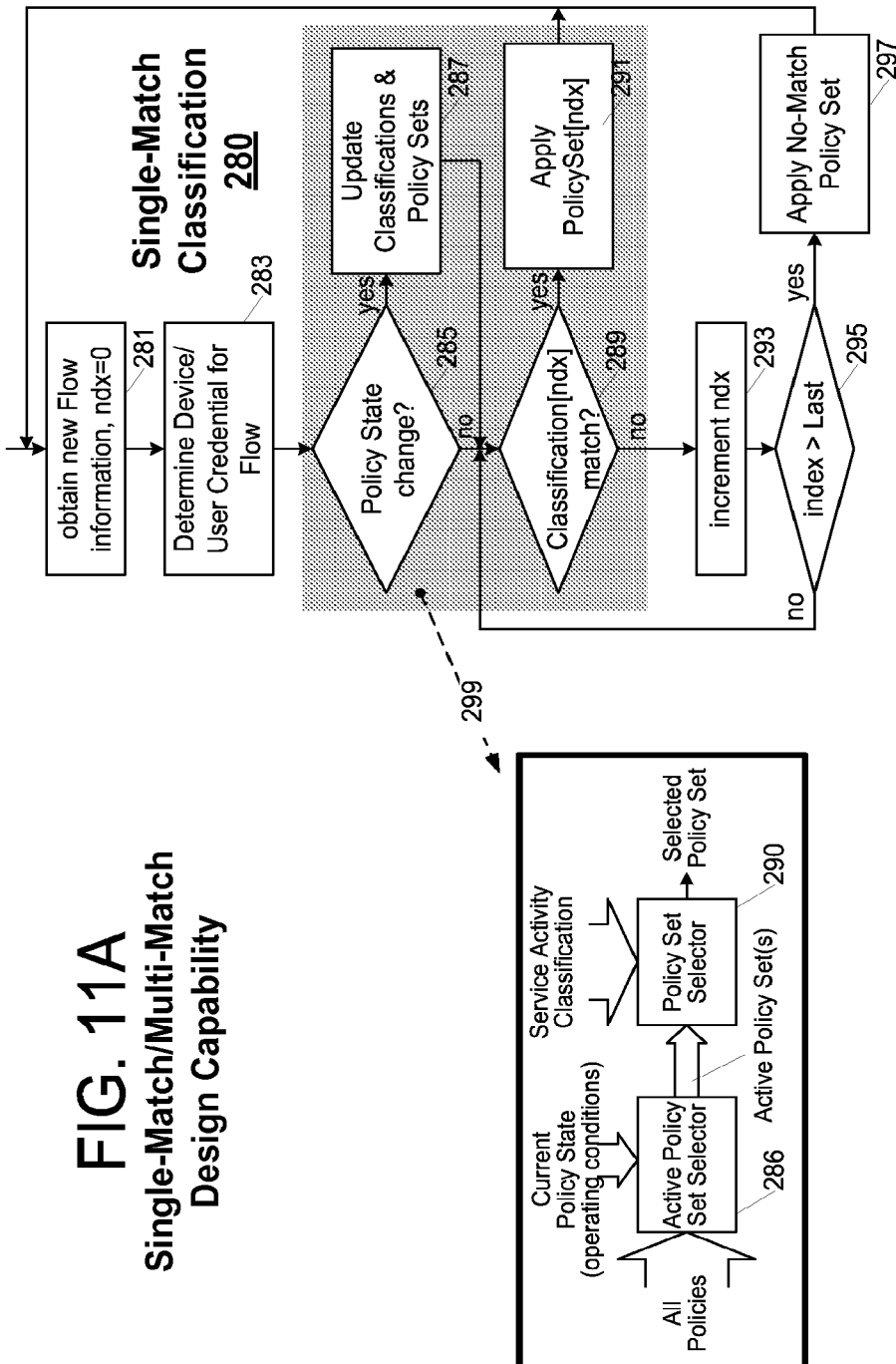
FIGS. 11A and 11B contrast exemplary single-match and multi-match classification sequences that may be designed within the service design center of FIG. 2.
Figure 11B:
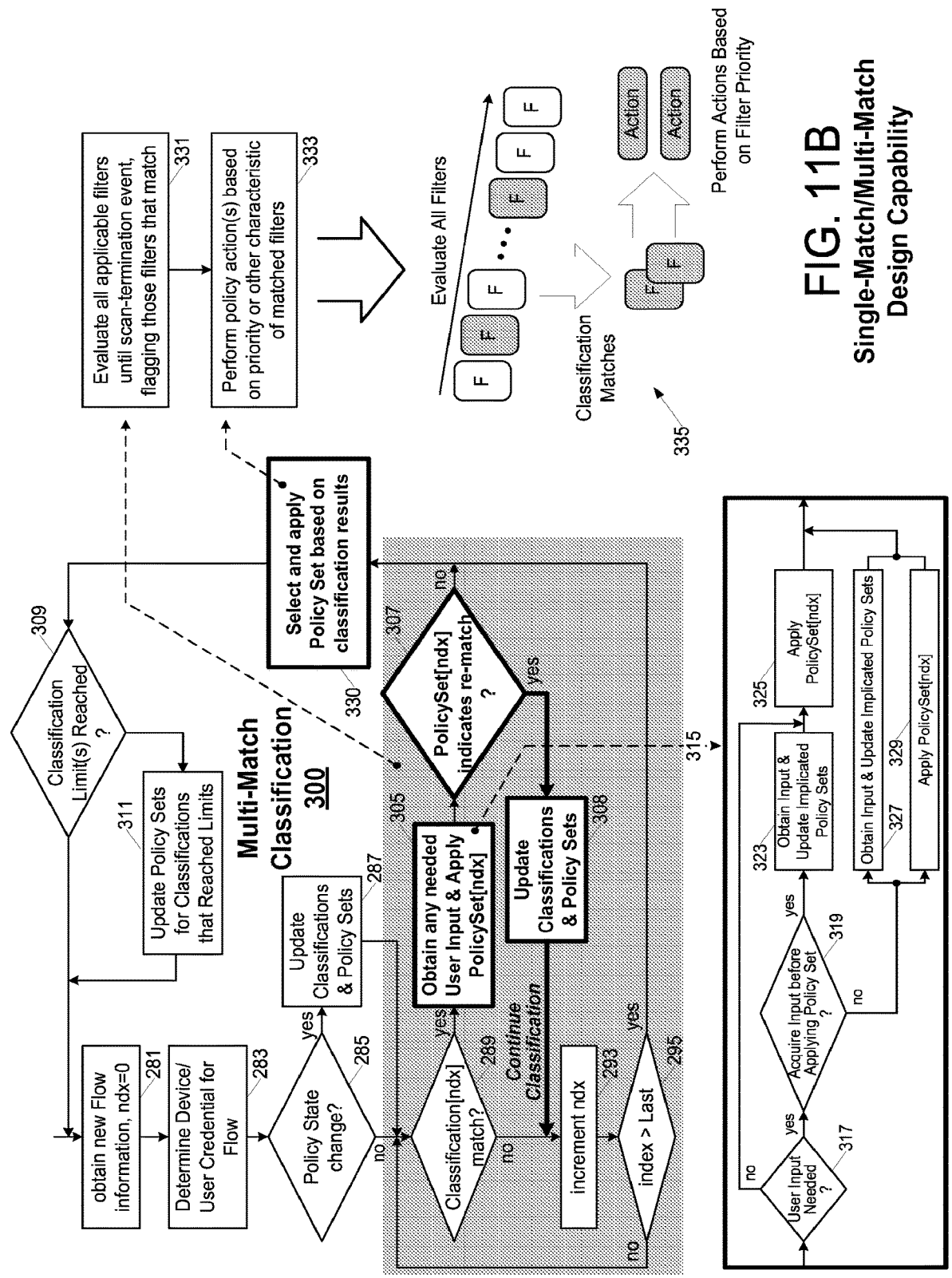

FIGS. 11A and 11B contrast exemplary single-match and multi-match classification sequences that may be designed within the service design center of FIG. 2 to help demonstrate design flexibility and user-interactivity that may be achieved using multi-match constructs. In the single-match classification sequence (280) shown in FIG. 11A, new flow information is obtained at 281, and a loop index ("ndx") is initialized to zero. The new flow information may include, for example and without limitation, information from packet headers within a transmission control protocol (TCP) or user datagram protocol (UDP) flow (though information from headers, data, and/or footers of packets in other layers of an IP protocol stack or other protocol stack may also be used), information resulting from app execution (i.e., "app-based" classification), voice/text messaging information (e.g., filtering for dialed or typed strings or components thereof, sent/received user ID's such as phone numbers or other identifiers, teleservice ID, occurrence of predetermined message patterns (e.g., as in the case of regular expression searching) or other information in the text payload). At 283, an identifier or credential of the end-user device (or, as explained above, of its user) associated with the new flow is determined, thus enabling classification with respect to the specific service policies associated with that identifier or credential. At decision 285, policy states (e.g., network state, service usage state, classification scanning state, or other temporal condition) are evaluated to determine whether a policy state has changed since the last policy state evaluation and, if so, the applicable set of classification objects and policy sets is updated at 287 before beginning a filter evaluation loop at 289. As an example, if an end-user device transitions to a different network state (e.g., from not-roaming to roaming, from a 4G network to a WiFi network, to a particular network access point name (APN), etc.) or to a different service usage state (e.g., to a particular time of day or upon crossing a usage threshold in which a specified number of megabytes, minutes, seconds or percentage of plan usage is remaining or has been consumed, etc.), then the detection of that transition at 285 will trigger determination of an updated policy set 287. In one embodiment, shown for example at 299, an active policy set selector 286 applies the current policy state to identify, as an "active policy" subset of the full complement of defined policies, one or more policies that match the current policy state. As shown, the active policy set(s) are output to a policy set selector 290 which identifies "selected policy set(s)" in accordance with service activity classification and thus in connection with filter evaluation as discussed below. Note that active policy set selector 286 and policy set selector 290 (which may be logically combined or applied in reverse order in an alternative implementation) may be implemented by one or more programmed processors, hardware elements, or any combination thereof.

Continuing with the embodiment of FIG. 11A, a filter evaluation loop is begun at 289 to evaluate filters or other classification objects one after another with respect to the new flow. More specifically, in each iteration of the filter evaluation loop, a filter corresponding to the loop index ("Classification[ndx]") is evaluated (289) with each filter "miss" (i.e., no match and thus a negative determination at 289) yielding a loop index increment at 293 and test against the final filter index at 295 before repeating the next loop iteration. If no filter match is detected in the last iteration of the filter evaluation loop (i.e., resulting in an affirmative determination at 295), a default "no-match" policy set is applied at 297 (note that the default no-match policy set may be implicitly or explicitly defined). By contrast, if a classification match is detected at 289, the policy set associated with the matched filter (i.e., PolicySet[ndx]) is applied at 291 to conclude the classification sequence for the current flow. Thus, as the "single-match" moniker implies, the classification sequence with respect to a given flow is terminated in response to the first filter match detected.

Referring now to FIG. 11B, an exemplary multi-match classification sequence 300 begins with the same initialization (flow information obtention and index reset), device credential identification and policy state evaluation/conditional-update operations shown in the single-match classification sequence (i.e., 281, 283, 285 and 287). The filter evaluation loop is also similar as filters are iteratively evaluated for a match in decision 289, with the loop index being incremented and tested at 293 and 294. In contrast to the single-match approach, however, a classification match (affirmative determination at 289) results in the more user-interactive operation shown at 305, including obtaining any needed user input before or concurrently with applying some or all of the indexed policy set, thus enabling the indexed policy set to be modified in response to user input before being applied in connection with the service request. For example, in the embodiment shown in detail view 315, a classification match triggers a determination of whether user input is needed (decision 317), and, if needed, a determination of whether the user input is to be acquired before applying at least a portion of the match-indicated policy set (decision 319). If user input is to be acquired before policy-set application, the user input is obtained and applied to update policy sets implicated by the input (e.g., entire policy sets or portions of policy sets directly or indirectly selected in connection with criteria that includes at least the user input) at 323 before applying the match-indicated policy set at 325. By contrast, if the user input need not be acquired before policy-set application (negative determination at 319), the user input obtention/policy-set update at 327 may be carried out concurrently (i.e., at least partially overlapping in time) with the policy set application at 329. As a more specific example of the operations shown at 315, detection of streaming traffic (or an attempt to send/receive streaming traffic) while roaming may trigger a determination that end-user input is to be acquired before allowing the traffic. Accordingly, a notification regarding the potential expense of the streaming traffic may be presented on the UI of the end-user device and the end user, thus informed, may be prompted to click "OK" or "NO" with regard to the streaming operation. If the end user clicks "OK," the stream is allowed; if the end user clicks "NO," the stream is blocked. The "NO" input may be applied exclusively to the streaming flow at hand, or may be applied to any streaming flow detected thereafter while roaming.

Still referring to detail view 315, the sequential obtention of user input, policy-set update and policy-set application at 323 and 325 permits the applied policy set to be updated in whole or part in response to the user-input. Further, one or more policy states may be updated to reflect the matching event and thus establish a new classification scanning state to be considered as the classification sequence continues. As discussed in examples below, the ability to update policy sets based on user input enables service characteristics and selections to be changed on the fly (i.e., dynamically or on-demand), particularly in the context of a device-assisted service environment where the user-input may include a service activation directive (e.g., a service purchase or selection of a sponsored service) in response to a lack-of-compatible-plan notification. Similarly, the ability to establish a new classification scanning state provides a feedback mechanism within the classification sequence as a classification match may dynamically trigger a change in the policy state to be applied in conjunction with subsequent classification events. Also, in one embodiment, each classification event in a multi-match classification sequence may be flagged (or logged or otherwise recorded) so that, upon concluding the classification sequence, the overall set of matched filters may be considered in determining the actions to be performed. Thus, instead of (or in addition to) triggering actions in immediate response to a classification match (i.e., in the midst of a classification sequence), a determination of actions to be performed may be deferred until the classification sequence terminates to enable decision making in view of the complete set of classification events. This deferred-action construct is discussed in further detail below.

Continuing with multi-match classification sequence 300, attributes of the indexed policy set are evaluated at 307 to determine whether further classification ("re-match") is permitted. If so, then despite the classification event detection at 289 and policy set application at 305, the filter evaluation loop is continued by updating the classification and policy sets at 308 (i.e., to reflect any change in classification scanning state or other policy states effected by the policy set application at 305) and then incrementing the loop index at 293. If the loop index does not exceed the final index (negative determination at 295), the filter evaluation loop repeats starting at 289. Upon reaching the final loop index (affirmative determination at 295) or applying a policy set that denies further re-matching (negative determination at 307), the multi-match classification is concluded at 330 by selecting and applying a policy set based on the classification results. Before proceeding with a subsequent multi-match classification, classification limits may be evaluated at 309 to determine whether limits (e.g., usage limits) have been reached with respect to any policy sets and, if so, updating those policy sets accordingly at 311.

Reflecting on the filter evaluation loop and end-of-scan policy-set application effected within multi-match classification sequence 300, the ability to defer action (in whole or part) otherwise triggered by a classification event enables decision making in view of the classification sequence as a whole and thus a more informed and tailored set of triggered actions. The net effects of the filter evaluation loop and end-of-scan policy-set application are shown at 331 and 333, respectively. That is, the filter evaluation loop enables an evaluation of all applicable filters (i.e., those included within the scan by virtue of the credential evaluation at 283 and/or update operations at 287 and 308) until a scan-termination event is reached (i.e., all filters evaluated or matching a filter that does not permit re-matching), and the end-of-scan policy set application at 330 enables execution of policy actions in view of the full set of matched filters, if any. These operations are shown graphically at 335, with filters being evaluated in order (though parallel evaluation may also be possible) to yield a set of match filters (i.e., resulting from flagging/logging/recording the matching event and/or information corresponding to the matched filters), with some set of actions being performed based on priority or other characteristics of the matched filters. Note that if no classification events are detected in the filter evaluation loop, a backstop, no-match policy set may be applied at 330.

FIG. 12 illustrates an exemplary application of multi-match classification to enable re-matching after detecting a policy limit—a classification sequence referred to herein as "cap and re-match." Proceeding according to the multi-match classification sequence shown in FIG. 11B, an under-limit classification match detected at 289-1 yields application of a policy set at 305-1 without re-match at 307. The evaluation at 309 determines that a classification limit has been reached, resulting in an update to the policy set (at 311) that yielded the classification match, and more specifically an update that reverses the re-match setting of the policy state to enable re-matching in subsequent policy-set application. In other words, re-match is not attempted while the service usage is under the classification limit, but when the service usage reaches the classification limit, re-match is attempted to determine whether the service usage can be allowed in connection with another extant filter. Thus, tracking the shaded sequence of operations shown in FIG. 12, after a second classification match at 289-2 (i.e., '-1', '-2', '-3' enumerating different executions of the same operation within the classification sequence) the updated policy set is applied at 305-2, and the newly established re-matching state of the policy set permits continuation of the filter evaluation sequence and, in the example shown, a secondary classification match at 289-3 and policy set application at 305-3.

FIG. 12 also illustrates a more specific example of the "cap and re-match" classification sequence at 340 with respect to a Facebook filter and initially under-cap (or below usage-limit) Facebook Policy Set. As shown, when a Facebook filter match is detected at 341-1, the under-cap Facebook policy set is applied at 343-1 to allow the service request and account for the service usage under a Facebook plan (e.g., a sponsored Facebook plan or user-paid Facebook plan). Because service usage has been allowed, the Facebook policy set permits no further re-matching (negative determination at 345-1). Assuming that a plan usage limit is reached after permitting the service usage at 343-1 (i.e., affirmative determination at 347) and that the Facebook policy set is updated to an At-Cap Facebook policy at 349, then a subsequent Facebook filter match at 341-2 (e.g., in connection with a new flow) will trigger application of the At-Cap Facebook policy at 343-2, disallowing the usage under that service plan in view of the policy cap. Because the At-Cap Facebook policy permits re-match at 345-2, however, the classification sequence continues with respect to the current Facebook service request and, in the example shown, yields another match with respect to an open-access filter at 343-3 and a permitted service usage and charge against open-access plan under the corresponding Open Access policy set at 343-3. This operation may be better understood in the context of FIG. 7. In the example shown there, a service request matched and allowed under the sponsored Facebook service policy within the 30-Day, 10 MB General Access Plan with Bonus (i.e., assuming the Three-Day Sponsored Social Networking Plan has already expired) may terminate the classification sequence. After allowance of a service request that consumes the last of the Bonus portion of that plan, the sponsored Facebook service policy may be updated to disallow further Facebook service requests, but to permit re-matching. Accordingly, a subsequent Facebook service request that matches a filter under the sponsored Facebook service policy will be disallowed but with re-matching (i.e., allowing continued classification), thus resulting in a match and allowance under the Open Access service policy of the same plan—overall, a multi-match classification sequence.

Still referring to FIG. 12, application of the At-Cap Facebook policy set may include notifying the end-user device user (i.e., the service requester) that the Facebook plan has been exhausted and prompting or inviting the user to activate a new plan. If the user declines to activate a new plan (e.g., pressing a "No Thanks" button instead of a plan selection button), the classification flow may be executed, ultimately matching the filter and applying the policy set for the open access plan as shown. By contrast, if the user activates a new plan, the Facebook policy set may be updated to reflect the new plan before being applied to allow the service request.

FIG. 13 illustrates a more specific example of a dynamic policy-set modification described in reference to operation 323 of FIG. 11B with respect to a Facebook marketing interceptor, showing a sequence of specific operations in parallel with their more general counterparts excerpted from FIG. 11B. As shown, when a filter associated with a Facebook marketing interceptor yields a match with respect to a service request at 355 (e.g., detected within network traffic or, in a device-assisted environment, by user input signaling the service request), one or more lack-of-compatible-plan (LCP) policies are executed at 357, in this example, to acquire and apply the user input before applying another policy set in response to the classification match. More specifically, in the example presented, application of the LCP policies yields the following actions:

present a notification through the end-user device user interface indicating the lack of a compatible plan for the Facebook service request, the notification being accompanied by one or more offers for one or more request-compatible user-paid or sponsored Facebook plans (i.e., Facebook plan upsells);

receive user input in response to the notification, such as detecting a button press indicating a request to activate a user-paid or sponsored Facebook plan, or a button press declining to activate a Facebook plan; and if the user-input indicates a Facebook plan activation, update one or more Facebook policy sets accordingly.

Note that the various notifications that may be presented in the multiple match context may be prioritized in a number of ways. For example, the SDC user may explicitly specify multi-match notification priority or may specify algorithmic/heuristic criteria for prioritizing the notifications (e.g., weight-based prioritizing scheme, prioritizing in order of first or last re-match encountered, with notifications cascaded until the end-user purchase an access-enabling service, etc.).

Continuing the example shown in FIG. 13 and assuming that the user input indicates a Facebook plan activation, the updated Facebook policy sets are then applied at 359 to allow the requested Facebook access and charge the newly activated Facebook plan. If the end-user had instead declined to activate a Facebook plan, for example by pressing a "Later" button, the marketing interceptor policy set may permit a re-match, which may result in eventual application of the no-match policy set (e.g., a generic interceptor policy set).

Provisioning Instruction Translator

FIG. 14A illustrates an exemplary set of outputs generated by an integrated service design center 360, and more specifically by a provisioning instruction translator 363 within the service design center. As shown, a plan/catalog design engine 361 generates a catalog descriptor in response to input from one or more service designers (i.e., service design center user(s) or operator(s)) and outputs the catalog descriptor to provisioning instruction translator 363. In one embodiment, the catalog descriptor includes one or more object files and/or other data records that constitute a complete definition a service-plan catalog, including definitions of all incorporated service plans and/or plan bundles (including all properties associated with and objects incorporated within such plans/bundles) together with prioritization information, service discovery information and any other information provided by a user or automatically generated by the service design center in connection with the plan catalog.

A subscriber management engine 362 is provided to enable definition of one or more subscriber and/or end-user device groups (e.g., by device credential) based on input from one or more subscriber managers (i.e., service design center user(s) or operator(s), any of which may also be a service designer). An identified set of one or more of the user-defined subscriber groups (and/or end-user device groups) is associated with the catalog specified by the catalog descriptor and output from subscriber management engine 362 (i.e., as a set of subscriber identifiers/credentials and/or end-user device identifiers/credentials) to provisioning instruction translator 363. In one implementation, for example, the set of subscriber identifiers includes information that identifies various network elements associated with the identified subscribers and/or end-user devices to enable provisioning instruction translator 363 to identify the overall set of network elements (and/or end-user devices in a device-assisted service environment) for which provisioning instructions are to be generated.

In the embodiment of FIG. 14A, provisioning instruction translator 363 receives network implementation and/or configuration information that, in combination with the subscriber ID set and catalog descriptor, enables determination of individual network elements and/or end-user devices for which provisioning instructions are to be generated. In the example shown, for instance, provisioning instruction translator 363 generates provisioning instructions for a user notification interface, access classification function, notification function, access control function, access accounting function and policy-state transition function. Instructions for more or fewer network element and/or end-user device functions may be generated in alternative embodiments, and the instructions for any of the functions shown may include multiple sets of instructions directed to different network elements and/or end-user devices that cooperatively perform control functions, accounting functions, notification functions or any other functions necessary or desirable in connection with network-delivered services. Accordingly, the collective set of provisioning instructions are output from provisioning instruction translator 363 (and thus from service design center 360) to various network elements 364 and/or to one or more end-user devices 365 to effectuate the plan catalog within selected end-user devices as designed and identified by the one or more service designers/subscriber managers. As shown, network elements may include a diverse set of appliances, servers, systems and so forth, as needed to render the planned services, and may include, for example and without limitation, any number of the following: gateway server, GGSN (gateway support node for general packet radio service), PCRF/PCEF/TDF (policy control rule function/policy control enforcement function/Traffic Definition Function), Home Agent, HLR (Home Location Register), HSS (Home Subscriber Server), OCS (online charging system), OFCS (offline charging system), push notification server, base station controller, network switch, SMSC (SMS Center), MMSC (Multimedia Messaging Service Center) and so forth. Similarly, the end-user devices within a device-assisted-services, may include any type of device to which network-delivered services are to be rendered, including mobile phones (e.g., smartphones), tablet/laptop/desktop computers, specialized devices such as e-book readers or network-interactive navigation systems, intermediate networking devices, network-connected media players, machine-to-machine (M2M) appliances and so forth.

Simplified Policy Architecture

Figure 14B:
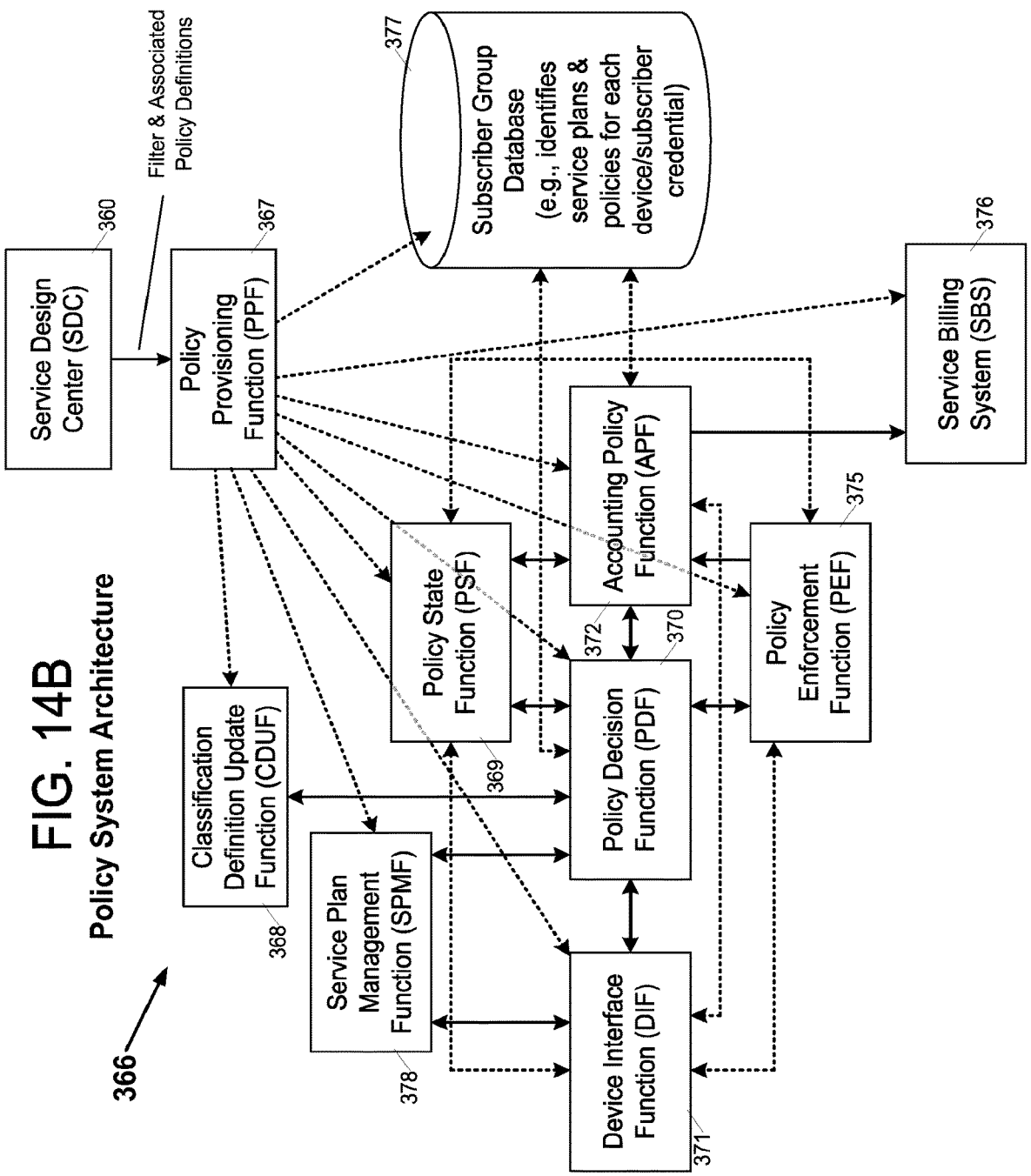
FIG. 14B illustrates an embodiment of a policy system architecture that may employ an integrated service design center according to various embodiments disclosed herein.

FIG. 14B illustrates an embodiment of a policy system architecture 366 that leverages a consistent and integrated (joint) policy definition and enforcement framework to provide significantly enhanced policy enforcement capability, lowered complexity and reduced network cost, reduced latency in user service notifications, and real time interaction between service plan policy options and user preferences to enhance the user experience and increase the opportunities to effectively market and sell new types of services and service plans or bundles.

A significant advantage of policy system architecture 366 is the capability to jointly define and enforce service control policy, service accounting policy and service notification policy. Definition (or design) of joint service policy is accomplished in service design center (SDC) 360, which may be implemented according to any of the various embodiments disclosed herein. In some embodiments, joint definition of service policy comprises using a common user interface and policy object creation or definition environment as a unified policy creation and management platform for two or more of the three key service network policy types: control, accounting and notification, thus providing a common or integrated environment that enables an SDC user to define service activity filters (definitions for a classification of service) and the policies that are associated with the filters to enforce a desired set of service plan policies. In the embodiment shown, the filter and associated policy definitions designed within SDC 360 may be supplied to a policy provisioning function 367 (e.g., including a provisioning instruction translator as discussed above) which serves in turn to convert those definitions into provisioning instructions for the various policy functions shown in FIG. 14B.

The Policy Enforcement Function 375 (PEF) is configured to enforce the real-time policies associated with each filter identified/defined in the output of policy provisioning function 367. In a number of embodiments, PEF 375 identifies communication flows, associates each flow with a device credential or subscriber credential, and performs a filter match search on the flows with filter and policy instruction definitions that are assigned to that device or subscriber by Policy Decision Function 370 (PDF). The filters define service activity classifications and the policy or policies associated with a given filter are implemented when the PEF executes a policy enforcement instruction in response to communication activities determined to match the filter parameters. Examples of classifications performed using the filters include but are not limited to classification of voice, data, text, with classification of data including, for example and without limitation, identification (or detection) of streaming traffic, VOIP, video, audio, downloads, peer to peer, communication associated with a website, communication associated with an application or application server, communication associated with a particular network end point, communication associated with a particular logical channel or data path, communication associated with an Access Point Name (APN), communication associated with a Virtual Private Network (VPN), communication associated with a proxy server, communication associate with a partner network connection.

Examples of policy enforcement instructions or actions executed by PEF 375 include access control instructions (e.g., communication or traffic control instructions), accounting instructions, and notification instructions. Access control instructions may include, for example and without limitation, block, allow, throttle, cap, delay, prioritize, cap and re-match, cap and no-match, hold and wait for user response, cap and wait for user response, increase priority, decrease priority. Examples of accounting instructions include, but are not limited to, allocate accounting to a service accounting bucket identifier, allocate accounting to a user service accounting bucket, stop allocating accounting to a user plan service accounting bucket, allocate accounting to a service sponsor accounting bucket, stop allocating accounting to a service sponsor accounting bucket, allocate to a carrier accounting bucket. In some embodiments, a notification policy includes but is not limited to identify a particular notification trigger event and provide an event identifier and device or subscriber credential associated with the trigger event. The notification trigger events are fed to the Device Interface Function 371 (DIF) where the notification trigger identifier is used to determine the proper notification for delivery to the device associated with the device (or subscriber) credential.

Policy instructions are provided to PEF 375 by the Policy Decision Function 370 (PDF) in the form of policy instruction sets (e.g., comprising filters (or components) and associated policy enforcement instructions), with each device credential or subscriber credential being assigned to one or more policy instruction sets, for example, according to records within device group/subscriber group database 377. In a number of embodiments, PDF 370 operates in near real-time to update the filter definitions and/or the policy instruction sets delivered to the PEF. PDF 370 may perform such updates primarily when changes occur in the policy state reported to PDF 370 by the Policy State Function 369 (PSF) The PSF 369 detects changes in policy state that have a bearing on service plan policies. Examples of policy state include, without limitation, any one of or combination of: a state of service usage (e.g. specified usage amount, usage amount above or below a service limit or within or outside a set of limits, a rate of service usage); an elapsed amount of time, specified time or time interval such as a specific time of day or specified portion of a day (e.g., 7:00 am-5:00 am) or week (e.g., Monday-Friday); foreground or background access; a network state including type of network (e.g. mobile operator, 2G, 3G, 4G, WiFi), whether a home network or roaming network, using a specific APN or any APN; a network busy status or other condition; one or more available QoS states; a geography (e.g., a geographical location); a temporal event in connection with a network state such as transitioning into a network or transitioning out of a network; classification scanning states such as a classification indicating that the requested service activity is to be blocked for the end-user device, a classification that disallows the requested service but permits continued classification scanning, etc. In some embodiments, policy state becomes a modifier or index to assist PDF 370 in determining which policies are to be evaluated in connection with a given classification scan (and thus which filters are to be evaluated by PEF 375). For example, PDF 370 may apply the policy state or a value derived therefrom as an index to identify a subset of one or more policies to be evaluated in connection with a given flow (e.g., an active policy set as described in reference to FIGS. 11A and 11B), thus streamlining the classification scan by limiting the set of filters to be evaluated to those associated with the indexed policy subset. As a more specific example, policy state values may be quantified into quintiles or other tuples (e.g. below service limit, above service limit) to enable efficient, integer-based indexing of an applicable policy subset. Such implementations tend to streamline implementation and operation within the PDF and PEF (e.g., reducing the policy decision logic relative to more compute-intensive techniques) and enable straightforward specification of precise, multi-faceted policy state definitions (and association of policy state with classification events within service policy definitions) within SDC 370.

As an example embodiment for how policy state can be utilized as an index, an SDC administrator might have a policy design goal as follows: for data usage, allow data and account for data bucket usage until 50% of a plan usage limit is hit, at 50% of a plan usage limit issue a one-time notification informing a device user that they have used 50% of their plan limit, from 50% to 90% of plan usage limit account for data bucket usage, at 90% of the plan usage limit issue a one-time notification informing a device user that they have used 90% of their plan limit and offer an upgrade service option for more usage, from 90% to 100% throttle the speed to 0.75 Mbps and account for data bucket usage, at 100% of the plan usage limit cap usage and send a notification explaining that the plan limit has been reached and offering the upgrade service option. The SDC policy designer can define policy states to be indexes for policy instructions to be applied conditioned on the value of the index. In this case, the policy index variable is "data usage as a percentage of plan limit" and when the data usage is below 50% of the plan limit the policy state indexes a "first set" of filters and corresponding policies comprising a filter definition of "data communication" that is associated with a control policy of "allow", a charging policy of "account to user data bucket", and a notification policy of "no notification". The combination of filters and policies are also referred to as a policy instruction set in what follows. Continuing the example, when the data usage reaches 50% of the plan limit the policy state indexes a "second set" of filters and corresponding policies comprising a filter definition of "data communication" that is associated with a control policy of "allow", a charging policy of "account to user data bucket", and a notification policy of "one time notification trigger #1" with the notification trigger #1 being associated with a notification delivery informing the user they have hit 50% of the plan limit. The one time notification is a notification policy construct to issue one time notification messages, whereas another way to accomplish a one-time notification is to allow the PEF to continue issuing notification triggers but implement notification message suppression rules in the DIF. Continuing the example, when the usage hits 90% of the plan limit, the policy state indexes a "third set" of filters and corresponding policies comprising a filter definition of "data communication" that is associated with a control policy of "throttle to 0.75 Mbps", a charging policy of "account to user data bucket", and a notification policy of "one time notification trigger #2" with the notification trigger #2 being associated with a notification delivery informing the user they have hit 90% of the plan limit and offering the service upgrade. Continuing with the example, when the usage hits 90% of the plan limit, the policy state indexes a "fourth set" of filters and corresponding policies comprising a filter definition of "data communication" that is associated with a control policy of "cap", a charging policy of "account to user data bucket" or "stop accounting" (this is an option since usage has been capped until the user chooses another plan), and a notification policy of "one time notification trigger #3" with the notification trigger #3 being associated with a notification delivery informing the user they have hit 100% of the plan limit so service is blocked and offering the service upgrade.

In another embodiment, a network busy state variable or a time of day variable can both be converted into indexes by defining limits or ranges with limits between the ranges as described above. Indexing instruction sets is an efficient way to modify policy as a function of policy state variables since the PDF can simply use a table of policy state index transitions to index different policy instruction sets, thus simplifying PDF logic. This technique also provides for a very predicable method for defining sophisticated policies in the SDC that are based on policy state, but are also very efficient to implement in the PDF, PEF, APF and DIF. Such embodiments simplify the logic in the PDF and PEF because the policy decision logic is reduced from other approaches and the manner in which the policy varies as a function of policy state can be easily configured within the SDC.

In some embodiments when a particular policy state variable or index of multiple policy state variables changes state, the PDF updates only the portion of a policy instruction set that is associated with the filters and policies impacted by the policy state transition. In other embodiments, it simplifies the PDF decision logic for the PDR to simply update all the filters and policy instructions in a policy instruction set when any policy state variable or index changes state, even though many of the filters and policies may remain unchanged. In another embodiment, the PDF updates the policy instruction set on a periodic basis whether a policy state variable or index has changed or not. This further simplifies the decision logic in the PDF with no meaningful loss of performance provided the time increment between updates is small with respect to time periods between policy state changes and with respect to an amount of service used during the time between updates.

Still referring to the architecture embodiment of FIG. 14B, PEF 375 monitors service use and passes an accounting of service use to the Accounting Policy Function 372 (APF). In a number of embodiments, for example, the PEF monitors and accounts for service usage with respect each filter (or component) and passes a measure of the service usage to APF 372 along with a filter (or component) identifier. In other embodiments (or configurations), PEF 375 aggregates the use for multiple filters (or components) into a service accounting "bucket" and passes a measure of the service accounting bucket use to APF 372 along with a bucket identifier. In either case (or configuration), the APF may pass service usage records to Service Billing System 376 (SBS) to be rated and converted into bills for end-users and/or service partners.

In a number of embodiments, DIF 371 establishes a communication channel (e.g., a secure channel) with an application, agent or SMS function on each of the end-user devices in a given device group (or subscriber group) to assist in delivering notifications to the end-user devices and, in some implementations, to receive end-user responses to such notifications from the end-user devices (e.g. service offer responses, acknowledgement responses, service choice/preference responses). For example, DIF 371 may communicate with the application or agent on each of the devices in the device (or subscriber) group using a pre-defined protocol (e.g., an application programming interface (API) protocol) established to make the communication of notifications, offers and user responses more efficient and useful for device users. In the case of a device-assisted network, DIF 371 may also be configured to request or instruct the application or agent on each of the devices in the device (or subscriber) group to assist in implementing or enforcing various notification policies, control policies and/or accounting policies. DIF 371 may accept user responses to notifications and service plan offers and relays them to Service Policy Management Function 378 (SPMF). DIF 371 may also perform an activation server function to activate a new service plan with respect to an end-user device or group of end-user devices. Such activations may be assisted by a sponsored service (e.g., implemented at least in part in PDF 370 and/or PEF 375) that allows the end-user device restricted access to the DIF.

The various types of notifications delivered to an end-user device by DIF 371 include, without limitation, notifications associated with service usage amount (including percentage or other fraction of service used or remaining), service limit reached or imminent, service overage, a service overage indication with request for end-user acknowledgement, a service condition that requires or may benefit from a service plan purchase or upgrade (with offer for such purchase or upgrade provided with notification of the service condition), notification of a roaming condition (including a roaming condition that may require or benefit from an end-user acknowledgment or other response), provision of one or more service offers, provision of one or more service offers together with a request or prompt for an end-user response (e.g., selection of one of multiple offered service options, thus constituting an acceptance of a service offer), provide a message or offer associated with a marketing interceptor trigger.

DIF 371 may forward notification responses (or information derived therefrom) received from end-user devices to various other functions within policy system architecture 366, including SPMF 378, which maintains service policy configuration information for each end-user device in a device (or subscriber) group and uses that information to manage active service policy sets for respective end-user devices. When a service plan is changed or an aspect is modified, SPMF 378 instructs the PDF 370 to implement the new service plan policies, and the PDF in turn instructs PEF 375 to implement the appropriate real-time policy implementation instructions to realize the service plan policies.

The Classification Definition Update Function (CDUF) 368 provides updates to classification definitions, for example, to enable associative classification. Associative classification provides for changing filter definitions as additional filter parameters are determined to be necessary due to the changing nature of some websites and other internet destinations.

The simplified policy architecture provides numerous significant advantages over conventional arrangements, including without limitation:

- All the policy definitions required to commercialize new service offers are accomplished in a single service plan definition environment, the SDC.
- All traffic monitoring and processing is accomplished in one real time policy function, the PEF.
- The PEF is the only policy function that processes the communication path (e.g. data path), and the simple nature of what the PEF does makes the simplified policy architecture highly scalable. All policies for control, accounting and notification are based on simply matching filters with communication parameters and executing a finite set of real time policy implementation instructions on the communication flows that match the filter parameters. Changes at the PEF level of policy occur when the PDF modifies the filters or associated policy implementation instructions provided to the PEF. The filters and associated policy implementation instructions implemented by the PEF are termed policy instruction sets. Since the PEF determines all of the communication events that trigger control, accounting and notifications, the policy definition environment is simplified and joint policy design is possible. Unifying policy event detection in one function also makes it possible to have simultaneous real time coordination between two or more of the control, accounting and notification events that are initiated by a policy event. Although the PEF comprises a simple architecture wherein it performs an ordered search for filter matches and then implements the policy instruction corresponding with the filter that is matched, the SDC policy object hierarchy, Z-order protocol for determining multi-match policy and the expansion of PEF command types provides for industry leading policy sophistication at the time this is being written.
- Employing policy state as a qualifier or modifier of policy allows the decision logic in the PDF to be simplified. In some embodiments, the PDF in large part simply observes changes in policy state and when the policy state reaches a pre-defined state the PDA is pre-configured to simply look up a new pre-configured policy instruction set and pass it to the PEF. The SDC can be used to define all the policy state transitions where PEF policy is desired to be changed, and for each defined Policy state a new PEF policy instruction set can be configured in the SDC and provisioned into the PDF along with the information necessary to identify each policy state that corresponds to each policy instruction set.
- Notifications can be triggered in real time off of the same policy events that cause changes in control policy and/or accounting policy. This provides for a very elegant and effective real time synchronization of user notifications about service use or changes in service status, making for a more comfortable and enjoyable user experience. Service usage reporting to the user can be easily done in real time. When a service plan upgrade or new service plan purchase is required to accomplish a service activity the user is interested in, the user's attempt to use the service activity can be instantly detected and an offer can be presented to the user interface of the device with very little delay. This makes the service experience more interactive and can be very attractive for certain markets where services are purchased in smaller increments and the user population is beleaguered with either being charged for service overage, or running out of service or purchasing more service than the user really requires to avoid the former two conditions. With real time purchase capability users never need to worry about hassles or overages when they run out of service because they can use a service app or service processor agent to re-up their service plan in real time.
- Service control, accounting and notification can be accomplished in real time at a very granular level, depending on the traffic inspection and/or application awareness capabilities of the PEF.
- The simplified and unified environment also makes it simpler to define sponsored services and to virtualize services across mobile operator networks as disclosed herein while implementing a highly capable billing platform capable of billing any number of entities for various classifications of the service use consumed by a given device.

In the case of a device-assisted network, policy system architecture 366 may be implemented largely by service processor execution within an end-user device (e.g. PEF=PEA, PIA; PDF=PDA, PCA), with network elements (PEF=a simplified PCEF or GGSN; PDF=an enhanced OCS or PCRF), or with a combination of network elements and device agents.

As will be appreciated in view of the disclosures herein, the functions illustrated in FIG. 14B and described in the context thereof can be implemented by elements in the network system, by elements in an end-user's device, or by a combination of elements in the network system and elements in an end-user's device. For example, the functions could be implemented entirely by one or more network-based elements, or entirely by one or more device agents on the end-user device, or by a combination of one or more network-based elements and one or more device agents. In some embodiments, the functions are implemented by a network-based service controller, or by a device-based service processor, or by both a network-based service controller and a device-based service processor.

It should be appreciated that although the various functions have been given names, and have been illustrated and described herein as being independent functions, it will be appreciated that other names can also be used for these functions, and that an implementation may implement the functions differently than shown or described herein. In particular, a single element (whether network-based or device-based) may perform more than one of the functions, or more than one element may perform a single function. The figures and descriptions presented herein are exemplary and are not meant to be limiting.

As a particular example, the policy decision function could be implemented by, for example, a policy rules element in the network system, or by a policy control agent on the device, or by a combination of a policy rules element in the network system and a policy control agent on the device. Likewise, the policy enforcement function could be implemented, for example, by a policy enforcement element in the network system, or by a policy enforcement agent, a policy implementation agent, and/or a modem firewall on the device, or by a combination of a policy enforcement element in the network system and one or more agents or elements on the device. As another example, the service policy management function could be implemented, for example, by a service controller or a policy management server in the network system, or by one or more device agents on the device, or by a combination of a service controller or a policy management server in the network system and one or more agents on the device. As another example, the accounting policy function could be implemented, for example, by a charging element and/or accounting/billing server/system in the network system, or by a billing agent and/or a service monitoring agent on the device, or by a combination of a charging element and/or accounting/billing server/system in the network system and a billing agent and/or a service monitoring agent on the device. Likewise, the device interface function could be implemented, for example, by a service controller in the network system, or by a user interface agent on the device, or by a combination of a service controller in the network system and a user interface agent on the device. More generally, various embodiments of network architectures, systems and constituent device agents, network elements and/or other components that may be deployed to define, enforce and otherwise implement service policies in accordance with disclosures herein, including for example and without limitation, the policy system architecture of FIG. 14B, are disclosed in further detail within U.S. application Ser. No. 12/380,780, filed Mar. 2, 2009 and entitled "AUTOMATED DEVICE PROVISIONING AND ACTIVATION") and other patent applications identified above under the caption Cross-Reference to Related Applications, with all such patent applications hereby being incorporated by reference in their entirety.

Policy Enforcement

As discussed in the context of FIG. 14A, the provisioning instructions output from the service design center (SDC) are provided to various network elements and/or to one or more end-user devices to effectuate the plan catalog within selected end-user devices as designed and identified by the one or more service designers/subscriber managers. The network elements may include a diverse set of appliances, servers, systems and so forth, as needed to render the planned services, and may include, for example and without limitation, any number of the following: gateway server, GGSN, PCRF, PCEF, TDF, Home Agent, HLR, HSS, OCS, OFCS, push notification server, base station controller, network switch, SMSC, MMSC, and so forth. These network elements implement or enforce policies (e.g., control, accounting, and/or notification) to implement a service plan applicable to an end-user device.

FIG. 14C illustrates a further example of various functions that may be involved in enforcing policies for an end-user device in accordance with some embodiments in which end-user device 385 does not include a service processor.

Policy rules element 381 represents one or more network elements responsible for policy-making and control decisions, such as, for example, dynamically managing and controlling data sessions, or determining the applicable accounting policy for a data session. Policy rules element 381 may have, for example, some or all of the functionality of the 3GPP policy and charging rules function (PCRF). Policy rules element 381 determines the appropriate rules to apply to service usage by an end-user device to implement the appropriate policies. For example, in some embodiments, policy rules element 381 keeps track of the statuses of different service plans (or service plan components) associated with end-user device 385, such as whether usage under each plan is still allowed, or whether the plan has been exhausted. Policy rules element 381 can track any characteristic or variable that triggers or contributes to a policy change (e.g., any variable or characteristic that requires a change in the notification policy or policies, the control policy or policies, and/or the accounting policy or policies associated with end-user device 385). Policy rules element 381 may identify, understand, or define policies in terms of one or more high-level rules or objective, such as, for example, "No streaming video allowed between the hours of 9:00 P.M. and midnight."

Policy enforcement element 382 represents one or more network elements responsible for enforcing policies applicable to end-user device 385. In some embodiments, policy enforcement element 382 enforces gating and/or quality-of-service for individual packet flows. In some embodiments, policy enforcement element 382 tracks service usage associated with end-user device 385 to support charging. Policy enforcement element 382 may have, for example, some or all of the functionality of a 3GPP policy and charging enforcement function (PCEF). Policy enforcement element 382 may be, for example, a gateway. Policy enforcement element 382 may operate using one or more low-level rules or instructions that implement the high-level rules or objectives identified, understood, or defined by policy rules element 381.

Charging element 384 represents one or more network elements responsible for real-time charging of subscribers based on service usage. Charging element 384 may have some or all of the functionality of the 3GPP online charging system (OCS).

Notification element 383 represents one or more network elements responsible for providing notification messages to end-user device 385. Notification element 383 is communicatively coupled over the wireless access network to end-user device 385 (indicated by the dashed-line arrow). Notification element 383 either itself sends notifications to end-user device 385, or notification element 383 initiates the sending of notifications to end-user device 385. Notification messages sent by notification element 383 are configured to assist end-user device 385 in presenting a notification to a user of end-user device 385 through a user interface of end-user device 385 (e.g., a visual notification through a display, an audible notification through a speaker, etc.).

SDC 380 sends provisioning instructions to one or more elements (i.e., policy rules element 381, policy enforcement element 382, charging element 384, and/or notification element 383) to allow the elements to implement the policies designed using SDC 380. For example, SDC 380 can provide information to policy rules element 381 to enable policy rules element to determine the policy or policies that currently apply to end-user device 385. This determination may be based on, for example, a network state, a time of day, or of the other factors previously discussed. After determining the applicable policy or policies for end-user device 385, policy rules element 381 provides information to policy enforcement element 382. The information (e.g., a setting, an instruction, a direction, a high-level objective, etc.) allows policy enforcement element 382 to enforce the applicable policy or policies for end-user device 385.

As a simple example to illustrate the interaction of policy rules element 381 and policy enforcement element 382, assume that SDC 380 has provided to policy rules element 381 provisioning instructions based on a determination that end-user device 385 is governed by a parental control that prohibits data usage between 9:00 P.M. and midnight. At 8:30 P.M., end-user device 385 requests access to YouTube. Policy rule element 381 has determined that, because the time is not between 9:00 P.M. and midnight, the applicable control policy is "allow." Policy rule element 381 has provided information to policy enforcement element 382 that instructs policy enforcement element 382 to allow the requested access to YouTube until further notice. At 9:00 P.M., policy rules element 381 determines that the applicable control policy for the device is no longer "allow" because the parental control applies. Policy rules element 381 determines the applicable control policy ("block") and provides information to policy enforcement element 382 to enable policy enforcement element 382 to enforce the policy. Thus, policy rules element 381 uses the information provided by SDC 380 to modify policies applicable to end-user device 385. In particular, policy rules element 381 provides information to policy enforcement element 382 to change the enforced policies based on changes detected by policy rules element 381.

Policy enforcement element 382 can also send information to policy rules element 381. For example, policy enforcement element 382 can inform policy rules element 381 that policy enforcement element 382 blocked (or allowed) a traffic stream or a traffic attempt.

As illustrated in FIG. 14C, policy rules element 381 can communicate with notification element 383. In some embodiments, policy rules element 381 provides information (e.g., a trigger) to notification element 383 to cause notification element 383 to initiate or send a notification to end-user device 760. For example, if policy rules element 381 obtains information indicating that a new service plan or service plan option has been activated for end-user device 760, policy rules element 381 can provide information to notification element 383 that results in notification element 383 sending or initiating the sending of a notification configured to inform a user of end-user device 760 of the new service plan or service plan option. If end-user device 760 is capable of communicating a user response to the notification back to notification element 383 (e.g., if end-user device 760 includes an application program that enables end-user device 760 to establish a secure communication link with notification element 383 and send back a user response to the notification), notification element 383 can then send information to policy rules element 381 to inform policy rules element 381 of the user's response. It will be appreciated that policy rules element 381 can trigger a wide variety of notifications, including notifications described elsewhere in this document.

As also illustrated in FIG. 14C, policy enforcement element 382 can provide information (e.g., a trigger) to notification element 383. In some embodiments, when policy enforcement element 382 applies a different policy to a service usage by end-user device 760, policy enforcement element 382 provides a trigger to notification element 383. The trigger provides information about the actions of policy enforcement element 382, such as, for example, that a previously-allowed service usage is now being blocked, or an accounting rate (cost) of a service usage has changed. In some embodiments, based on the trigger from policy enforcement element 382, notification element 383 determines whether to send a notification message to end-user device 760. In some embodiments, notification element 383 sends a notification message to end-user device 760 in response to the trigger from policy enforcement element 382 without any decision-making by notification element 383. It will be appreciated that policy enforcement element 382 can trigger a wide variety of notifications, including notifications described elsewhere in this document.

As also illustrated in FIG. 14C, SDC 380 can provide information (e.g., a trigger) to notification element 383. For example, if an administrator configures a new service plan or service plan option that is available to end-user device 760, SDC 380 can provide information to notification element 383 that results in notification element 383 sending or initiating the sending of a notification configured to inform a user of end-user device 760 of the availability of the new service plan or service plan option. It will be appreciated that SDC 380 can trigger a wide variety of notifications, including notifications described elsewhere in this document.

As also illustrated in FIG. 14C, charging element 384 can provide information (e.g., a trigger) to notification element 383. For example, if a billing amount associated with usage of the wireless access network by end-user device 760 reaches a specified limit, charging element 384 can provide information to notification element 383 that results in notification element 383 sending or initiating the sending of a notification configured to inform a user of end-user device 760 that the billing amount has reached the specified limit. It will be appreciated that charging element 384 can trigger a wide variety of notifications, including notifications described elsewhere in this document.

Notification element 383 can send a variety of different notification messages, such as any of the notifications described herein, in response to various triggers from policy enforcement element 382, policy rules element 381, charging element 384, or SDC 380. For example, if a service plan associated with end-user device 760 has been exhausted, notification element 383 can send a notification message that includes an offer to repurchase or replenish the service plan, or an offer for a different or additional service plan. As another example, if a service usage billing rate or cost has changed, notification element 383 can send a notification message informing end-user device 760 of the change. As described previously (e.g., in explaining FIGS. 11B, 12, and 13), the notification message can request an acknowledgment of the change, or it can offer a different or more economical service plan option to the user.

In some embodiments, notification element 383 is able to receive information from end-user device 760. In some embodiments, end-user device 760 includes some intelligence (i.e., an application program, a software agent, a service processor, an operating system component, etc.) that enables end-user device 760 to establish a communication link with notification element 383 so that notification element 383 can conduct bi-directional communications with end-user device 760. In some embodiments, when a notification message provided by notification element 383 to end-user device 760 prompts a response from a user, the user response can be obtained by notification element 383, which can then communicate pertinent information (e.g., an acknowledgment of a billing rate change, acknowledgment or approval of a roaming condition, selection of a service plan or service plan option, etc.) to policy rules element 381. Policy rules element 381 can then adapt one or more policies based on the user response and provide updated information to policy enforcement element 382 so that policy enforcement element 382 can enforce the updated policy or policies. For example, if the response indicates that the user has agreed to purchase a new or additional service plan, policy rules element 381 determines the appropriate policy or policies based on the fact that the user has agreed to purchase a new or additional service plan.

It is to be understood that the functions described in the context of FIG. 14C can be disposed differently from those shown. For example, the functions of policy rules element 381, policy enforcement element 382, notification element 383, and charging element 384 may be performed by more or fewer elements than illustrated in FIG. 14B. It is also to be understood that the functions illustrated in FIG. 14C may communicate differently (i.e., communications can be bi-directional where illustrated as uni-directional) without departing from the spirit of the disclosures herein.

In some embodiments, a portion of policy implementation/enforcement is performed by the end-user device, and a portion is performed by network elements. FIG. 14C illustrates the various functions that may be involved in enforcing policies for an end-user device in accordance with some embodiments in which end-user device 390 includes service processor 392. As compared to FIG. 14C, FIG. 14C adds service processor 392 to end-user device 390 and service controller 388, which resides in the network system. Service controller 388 is communicatively coupled to service processor 392 over the wireless access network (illustrated by a dashed-line arrow). Service controller 388 may be software, hardware, or a combination of software and hardware. Service processor 392 may be software, hardware, or a combination of software and hardware. In some embodiments, service processor 392 comprises one or more operating system (OS) components. In some embodiments, service processor 392 comprises one or more application programs. In some embodiments, service processor 392 comprises one or more software agents.

In some embodiments, service controller 388 obtains provisioning instructions or information from SDC 380 and, based on the instructions or information from SDC 380, communicates policy control and/or implementation information (e.g., a setting, an instruction, a high-level objective, a policy, etc.) to service processor 392. In some embodiments, service processor 392 has one or more policy enforcement agents (or policy implementation agents) in an operating system kernel or stack, and these one or more policy enforcement agents enforce one or more of the applicable policies. In some embodiments, service processor 392 also has one or more policy decision agents that modify the one or more policies that are enforced by the one or more policy enforcement agents in a manner similar to how policy rules element 381 modifies policies that are enforced by policy enforcement element 382. In some embodiments, the one or more policy decision agents identify, define, or understand one or more high-level policy objectives or rules. In some embodiments, the one or more policy enforcement agents operate using low-level settings or instructions provided by the one or more policy decision agents.

In some embodiments in which end-user device 390 includes service processor 392, notification element 383 performs the notification functions described in the context of FIG. 14B. In some embodiments, notification element 383 sends part of the content of a notification message that is to be presented through a user interface of end-user device 390 (e.g., text for presentation through a device display, an indication that a user has one minute left of a voice plan, etc.), and end-user device 390 obtains, from memory on end-user device 390, the rest of the content of the notification message (e.g., formatting information for the notification, pre-determined text or background for display through the device display, or an MP3 file corresponding to an audible notification when a user has one minute left of a voice plan, etc.).

In some embodiments, service processor 392 sends information (e.g., a trigger) to notification element 383. In some embodiments, service controller 388 is able to perform some or all of the functions of notification element 383.

In some embodiments, when a notification message sent by notification element 383 to end-user device 760 prompts a response from a user, the user response can be sent by service processor 392 to service controller 388, which can then communicate pertinent information (e.g., an acknowledgment of a billing rate change, acknowledgment or approval of a roaming condition, selection of a service plan or service plan option, etc.) to policy rules element 381. Policy rules element 381 then adapts one or more of the network-enforced policies that are enforced by policy enforcement element 382 based on the user response and provides updated information to policy enforcement element 382 so that policy enforcement element 382 can enforce the updated network-enforced policy or policies.

In some embodiments, service processor 392 establishes a secure (e.g., encrypted) communication link with service controller 388. In some embodiments, service controller 388 communicates over the secure communication link to provide policy information enabling service processor 392 to implement a device-portion of a service policy.

It is to be understood that the functionalities described in the context of FIG. 14C can be disposed differently from how they are shown in FIG. 14C. For example, service controller 388 may perform some or all of the functions of policy rules element 381 and/or policy enforcement element 382, and/or notification element 383, and/or charging element 384. Likewise, one or more of policy rules element 381, policy enforcement element 382, notification element 383, and charging element 384 may perform some or all of the functions of service controller 388. Additionally, the functions of service controller 388, policy rules element 381, policy enforcement element 382, charging element 384, and notification element 383 may be performed by more or fewer elements than illustrated in FIG. 14C. It is also to be understood that the functions illustrated in FIG. 14C may communicate differently (i.e., communications can be bi-directional where illustrated as uni-directional) without departing from the spirit of the disclosures herein.

It should be appreciated in view of the disclosures herein that the functions illustrated in FIGS. 14B and 14C and described above can be used to implement "multi-match" classification and the triggering of multiple policy events per match described previously.

Service Design Center (SDC) User-Interface: Object-Based Policy Development

Figure 92:
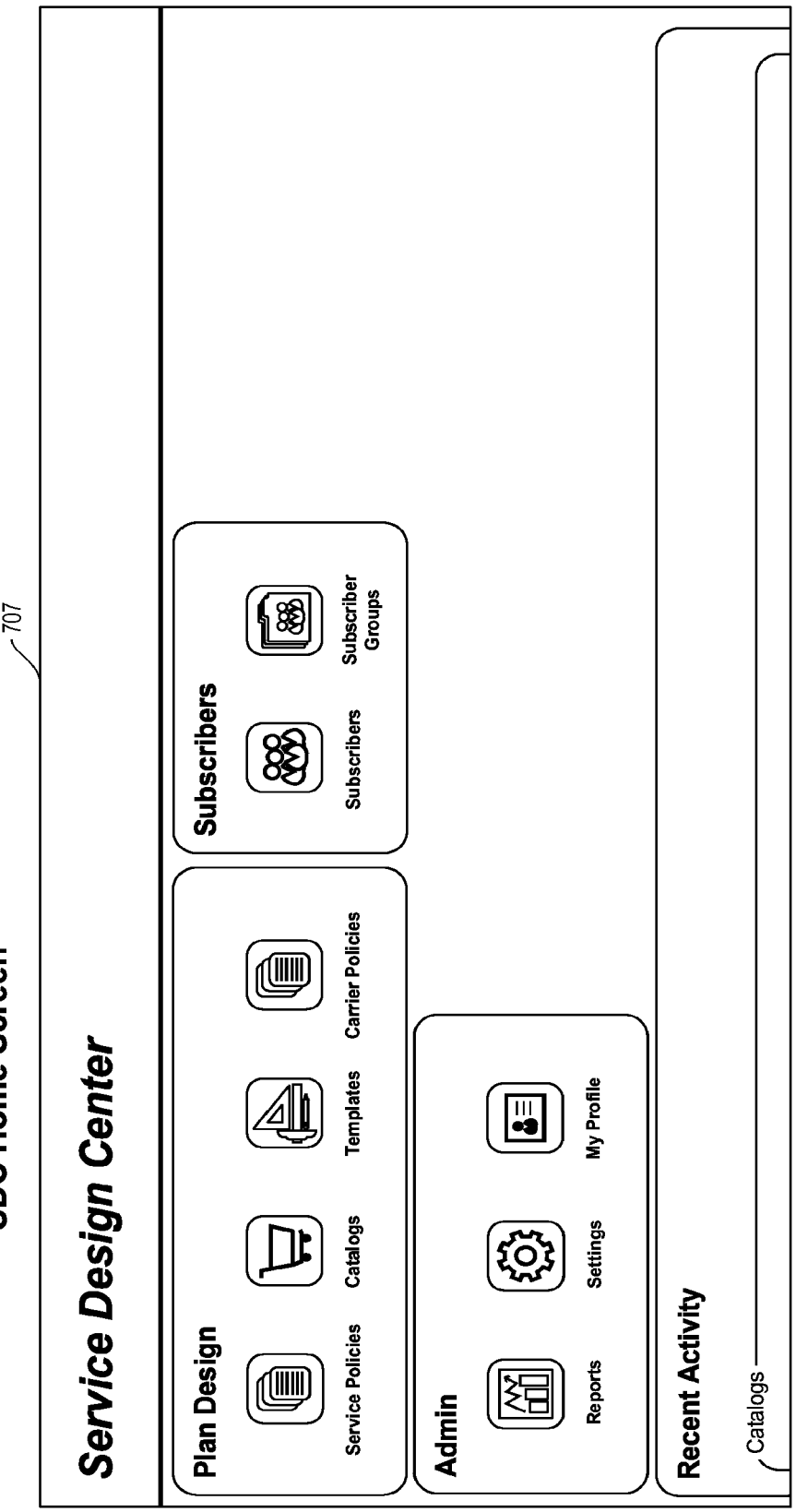
FIG. 92 illustrates an exemplary service designer home screen that presents navigation icons organized in relation to the plan design, subscriber management and SDC administrative functions described in reference to FIGS. 15-91.

FIGS. 15-92 depict exemplary displays generated within a computing-system embodiment of a service design center ("SDC") and presented via a user-interface (UI) to a user of the computing system (e.g., a service designer, subscriber manager or other operator of the service design center). In terms organization, FIGS. 15-49 align generally with the service design hierarchy shown in FIG. 5, while FIGS. 50-74 relate to various aspects of service discovery design within plan catalogs (including the hierarchical discovered-service definition shown in FIG. 5). FIGS. 75-92 relate to various additional capabilities and features of the service design center embodiment, including object template design (FIGS. 75-78), carrier policy management (FIG. 79), subscriber management (FIGS. 80-86), reporting and analytics (FIG. 87), sandbox management (FIGS. 88-91) and an exemplary service design center organization (FIG. 92).

In various embodiments described herein and illustrated in the user-interface figures described below, the service design center enables a service designer to manage service policy design through creation, organization, testing, revision and deployment of reusable policy objects (or policy-related objects) at various levels of the service design hierarchy. More specifically, the integrated service design center prompts and assists an SDC user in at least the following:

Definition of a filter, including prompting the SDC user to create a filter object, store filter object, name filter object, re-use filter object in another service design use case, copy or clone filter object (e.g., to modify and re-name), provide revision control and dating of filter object, manage testing and/or approval cycle for filter object.

Grouping a collection of one or more filters within a service policy component, including prompts to create a component object, store component object, name component object, re-use component object in another service design use case, copy or clone component object, (e.g., to be modified and re-named), provide revision control and dating of component object, manage testing and/or approval cycle for component object.

Association of filters and/or service policy components with service policies, including prompting the SDC user to create service policy objects, store policy object, name policy object, re-use policy object in another service design use case, copy or clone policy object (e.g., to be modified and re-named), provide revision control and dating of policy object, manage testing and/or approval cycle for policy object.

Association of filters and/or service policy components with policy states and service policies to create event-qualified (or policy-state conditioned) policy objects, including prompting the SDC user to create event-qualified service policy objects, store policy object, name policy object, re-use policy object in another service design use case, copy or clone policy object (e.g., to be modified and re-named), provide revision control and dating of policy object, manage testing and/or approval cycle for policy object.

Grouping of filters, components and/or policy objects to create plans and/or bundle objects, including prompting the SDC user to create plan/bundle objects, store plan/bundle object, name plan/bundle object, re-use plan/bundle object in another service design use case, copy or clone plan/bundle object (e.g., to be modified and re-named), provide revision control and dating of plan/bundle object, manage testing and/or approval cycle for plan/bundle object.

Arranging classification matching priority of filters, components and/or policies to create ordered policy objects or ordered plans and bundles including prompting the SDC user to create classification priority definition (or schema), store classification priority definition, name classification priority definition, re-use classification priority definition in another service design use case, copy or clone classification priority definition (e.g., to be modified and re-named), provide revision control and dating of classification priority definition, manage testing and/or approval cycle for classification priority definition.

Grouping of plans and bundles into catalog objects made available to device groups, user groups, demographic groups, partners, according to geographies, according to available network type (e.g. home, roaming, WiFi, carrier identifier, etc.), including prompting the SDC user to create catalog objects, store catalog object, name catalog object, re-use catalog object in another service design use case, copy or clone catalog object (e.g., to be modified and re-named), provide revision control and dating of catalog object, manage testing and/or approval cycle for catalog object.

Each of the foregoing policy-related objects (there may be other such objects beyond those listed) within the SDC may be rendered as a graphical element on a display of the service design center, thus enabling the SDC user to interact intuitively with the various objects, dragging and dropping objects into a service policy design within the integrated service design environment. For example, once designed, policy-related objects can be selected with a mouse (or other point-and-select user-input device) from the SDC user interface and included in one or more new service plan designs.

With regard to revision control and object testing, a service plan catalog can indicate tested/verified/approved objects versus non-tested/verified/approved objects. Depending on type of service plan (e.g. engineering prototype, QA test, user beta test, production), an object can be rejected from being included in a plan if it is not of equal or higher test/verification/approval level. Also, device groups can vary according to the level of testing/verification/approval for policy objects. For example, a small group may be provided for engineering, a medium group for beta-testers, and a larger group for production. As another example, multiple smaller groups may be provided for beta test, with different versions of policy objects to be tested by each group. Policy objects associated with the most successful beta-test group may be fine-tuned and used for production.

In each of the various UI displays shown herein, one or more constructs to receive input from the SDC user may be presented including, for example and without limitation, by images of "click-able" buttons, data-entry fields, text prompts or hyperlinks (e.g., highlighted, colored or otherwise emphatically formatted alphanumeric strings signifying that another UI display or window may be launched by hovering over or clicking the string), and/or various icons or symbols indicating that a responsive action may be triggered by user-interaction with the icons/symbols (e.g., by clicking and/or dragging the icon/symbol with a mouse, stylus, finger-to-touchscreen, or other pointer control; pressing physical buttons on a keyboard or other user input device; speaking into a microphone; etc.). Each such user-input construct presented by the SDC should be understood to be a prompt, request and/or instruction to the SDC user to interact with the user-input construct (i.e., by performing button click, click-and-drag, button press, keypad/keyboard entry, speech, etc.) and thereby provide user input to be received and acted upon by the service design center. Accordingly, while a service designer and/or subscriber manager is occasionally referred to as "doing" or otherwise performing a function in connection with the service design center such as "creating a design object," or "changing a design characteristic," it should be understood in all such cases that the underlying service design center embodiment performs such function in response to or accordance with input provided by the user. Moreover, as discussed below, the service design center itself may be instantiated within a computing device through execution of programmed instructions (programmed code), with the computing device itself implemented by one or more programmed processors, dedicated hardware function blocks or any combination thereof, disposed in one or more discrete devices, including a network-interconnected set of discrete devices.

SDC User Interface: Design Hierarchy—Plan Catalogs

Proceeding from top to bottom through the design hierarchy shown in FIG. 5, FIG. 15 depicts a plan catalog display 401 presenting the names and descriptions of previously designed catalogs in a list, prompting the SDC user to select any of the catalogs (e.g., by clicking the catalog name or description) for modification, further design input, inspection/review and/or publish approvals, etc. For example, when the user selects an "ItsOn Demo" catalog, the catalog name and description are presented in a new display 405, together with an enumerated list of design actions that the SDC user may undertake with respect to the selected catalog, including reviewing and publishing (i.e., generating provisioning instructions for) a completed catalog design. In the implementation shown, the SDC user may invoke additional displays associated with the enumerated design actions shown in display 405 by clicking highlighted text within a design action of interest in any order.

FIG. 16 depicts an exemplary "Plans & Bundles" display 409 presented in response to user selection of the "Configure plans & Bundles" option in the design-action list shown in FIG. 15. As shown, the Plans & Bundles display prompts the SDC user to create a new plan and/or a new bundle within the selected catalog ("ItsOn Demo"), and also includes a listing of service plans previously designed and incorporated within the catalog and thus corresponds to the "included plan(s)/bundle(s)" aspect of the catalog design shown in FIG. 5. In the embodiment presented, the pre-existing service plans (any or all of which may be plan bundles) are organized in respective data, voice, messaging and app tables (note that the latter two categories do not appear in the static image shown, but are available by scrolling within the UI display), and characterized by a plan icon, internal name, display name, plan class and price, all of which may be specified within the service design center. "Pencil" and "Trash" icons are displayed in connection with each listed service plan, prompting the user to edit the service plan definition (including the displayed characteristics) and delete the service plan from the catalog, respectively.

FIG. 17 depicts an exemplary "Plan Priorities" display 411 corresponding to the plan priority aspect of the catalog design shown in FIG. 5 and presented in response to navigation input (e.g., user selection/clicking of a "next" button) within the Plans & Bundles display. In the implementation shown, plans are organized in tables according to plan class (e.g., sponsored, paid, activation, etc.), with the plan prioritization within a given class being enumerated in the leftmost column of the table adjacent to an up-down icon that a user may click to raise or lower plan priority within the class (i.e., relocate the plan in the plan-class list to reflect its adjusted priority). In one embodiment, the relative priorities between plans in different classes is fixed by the implementation of the SDC, with the priorities being implied by the order in which the plan classes are presented from top to bottom within the plan priorities display. Thus, any sponsored plan (only one of which is shown in this particular example) is prioritized ahead of any user-paid plan. Accordingly, as discussed above, a service activity that may otherwise be allowed under both a sponsored plan and a user-paid plan will first be metered and accounted for under the sponsored plan. In alternative embodiments, the SDC user may be prompted to adjust the priorities of plan classes (e.g., by dragging a given plan-class table ahead of or below another plan-class table in the top-to-bottom priority order) and/or to adjust the priority of a given plan ahead or below that of any other plan without regard to plan class.

Figure 18:
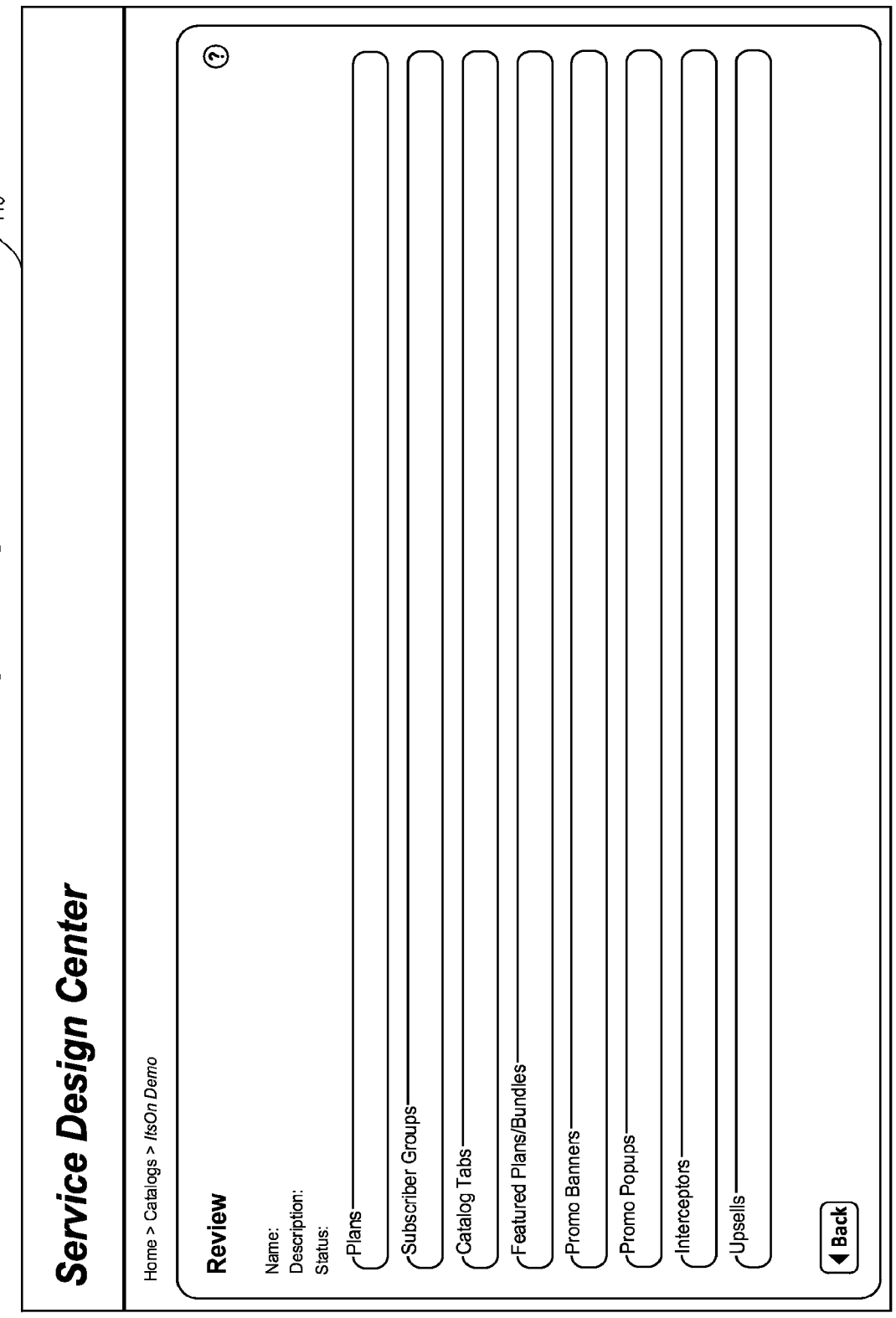
FIG. 18 depicts a "Review" display presented to enable the SDC user to quickly scan a plan catalog design and make changes with respect to various catalog design aspects.

FIG. 18 depicts a "Review" display 415 presented (e.g., in response to navigation input) to enable a user to quickly scan a plan catalog design and make changes with respect to various catalog design aspects. In the example shown, the incorporated plans (and their designs) may be reviewed and revised, as can various additional aspects of the catalog design described below, including associated subscriber groups, catalog tabs, featured plans/bundles, promotional banners, promotional popups, interceptors and upsells.

SDC User Interface: Design Hierarchy—Service Plans

FIG. 19 illustrates an exemplary "Plan Properties" display 419 presented in response to user selection of the "New Plan" option in the Plans & Bundles display shown in FIG. 16. Proceeding from top to bottom, the Plan Properties display prompts the SDC user to choose a service policy to be included in the service plan design (i.e., per the "included service policy" aspect of the plans & bundles design shown in FIG. 5) as well as other information characterizing or defining the plan, including: a plan name, stock-keeping unit (SKU), carrier plan identifier, plan activation date, plan deactivation date and plan class (e.g., paid, activation or sponsored, though different/additional classes may apply in alternative embodiments). The user is additionally prompted to indicate whether the plan is shareable (i.e., whether a subscriber may share with other end-device users under the same account), how the plan is to be limited (e.g., by time used or data used), the volume of data usage included per billing cycle if data-usage limited, whether the plan constitutes a base plan that may be selected within a plan catalog, the criteria (or criterion) for triggering usage reporting, and whether the plan is to be hidden within the displayed set of plans on an end-user device (a feature that may be restricted to particular plan classes, such as activation or sponsored default plans in the example shown). Various other plan-characterizing or plan-defining features may be presented for user selection in alternative embodiments, and/or any of the features shown may be omitted in a trimmed-down implementation.

Figure 21:
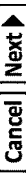
FIG. 21 shows another view of the Plan Properties display following user-selection of a particular service policy.

FIG. 20 illustrates a Service Policy selection display 423 presented in response to user input (i.e., mouse click, keystroke, screen-touch, etc.) specifying the "Choose a Service Policy" option in the Plan Properties display of FIG. 19. In the example shown, service polices are listed by name, type (e.g., data, voice, messaging, etc.), and incorporated filter(s), enabling the user to select any of the listed service policies to be incorporated within the plan being designed or revised. FIG. 21, for example, shows another view of the Plan Properties display (419a) following user-selection of the "Amazon App" service policy; a selection that incorporates (or includes or associates) the Amazon App service policy into the "Test" plan being designed.

Figure 22:
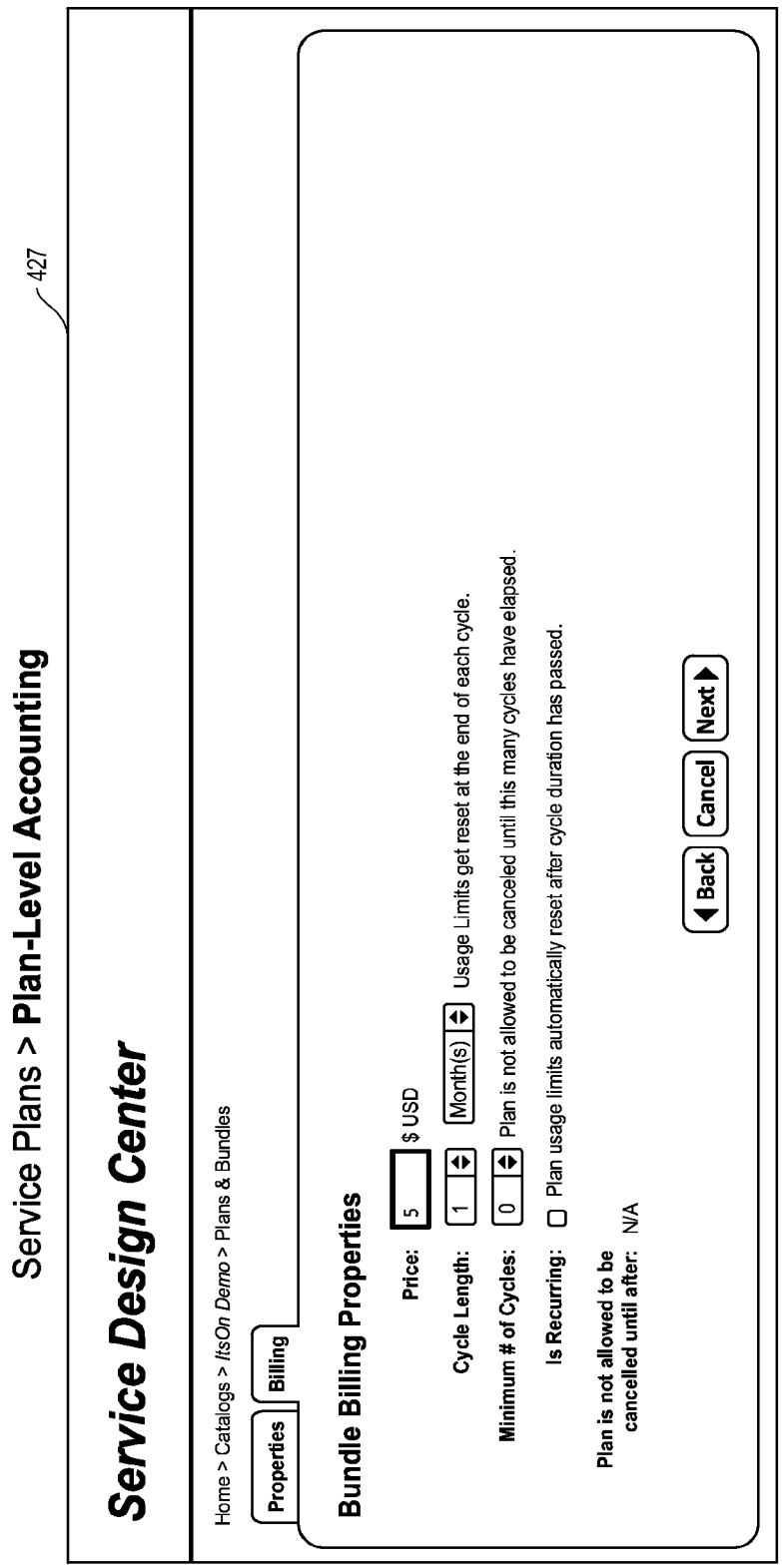
FIG. 22 depicts a "Plan Billing Properties" display presented in response to navigation input within the Plan Properties display of FIG. 19.

FIG. 22 depicts a "Plan Billing Properties" display 427 corresponding to the "plan-level accounting" aspect of the catalog design shown in FIG. 5 and presented in response to navigation input (e.g., user selection/clicking of a "next" button) within the Plan Properties display. As shown, the Plan Billing Properties display is presented as a new tab in connection with the ongoing plan design, thus allowing the SDC user to quickly switch between plan design displays. This tab feature is employed in a number of display embodiments presented herein, though any other organizational feature may be used in alternative embodiments (e.g., folders, hyperlinked pages, etc.).

Still referring to FIG. 22, the Plan Billing Properties display prompts the SDC user to specify a price (in U.S. dollars in this example, though other denominations may be specified in SDC configuration settings or in the Plan Billing Properties display); a billing cycle duration in terms of a selected cycle interval (e.g., yearly, monthly, weekly, daily, hourly, number of minutes) and number of such intervals per cycle; a minimum number of cycles that must elapse before the plan may be canceled; whether the plan is a recurring or one-time plan; and, if applicable, a date that must be passed before the plan may be canceled. Further billing (or accounting) characteristics may be prompted for in alternative embodiments and/or unused characteristics in the depicted Billing display may be omitted.

Figure 23:
FIG. 23 depicts a "Plan Display Properties" display presented in a new tab in response to navigation input within other plan-design displays.

FIG. 23 depicts a "Plan Display Properties" display 431 presented in a new tab in response to navigation input within other plan-design displays. In the example shown, the SDC user is prompted to specify or revise: an icon to be displayed in connection with the plan (e.g., as shown in FIG. 16 to the left of each internal data plan name); a display name; an optional usage label display name to be displayed in connection with service usage reporting; a short description; a longer description (including, for example, an HTML hyperlink to an associated web page or other object); and a usage display selection. In the embodiment of FIG. 23, for instance, the usage display options include: unit usage only (unit being the usage reporting unit specified in the Plan Properties display of FIG. 21), cycle usage, both unit usage and cycle usage, or the static label specified as the usage label display name. More or fewer usage display options may be provided in other embodiments.

Figure 24:
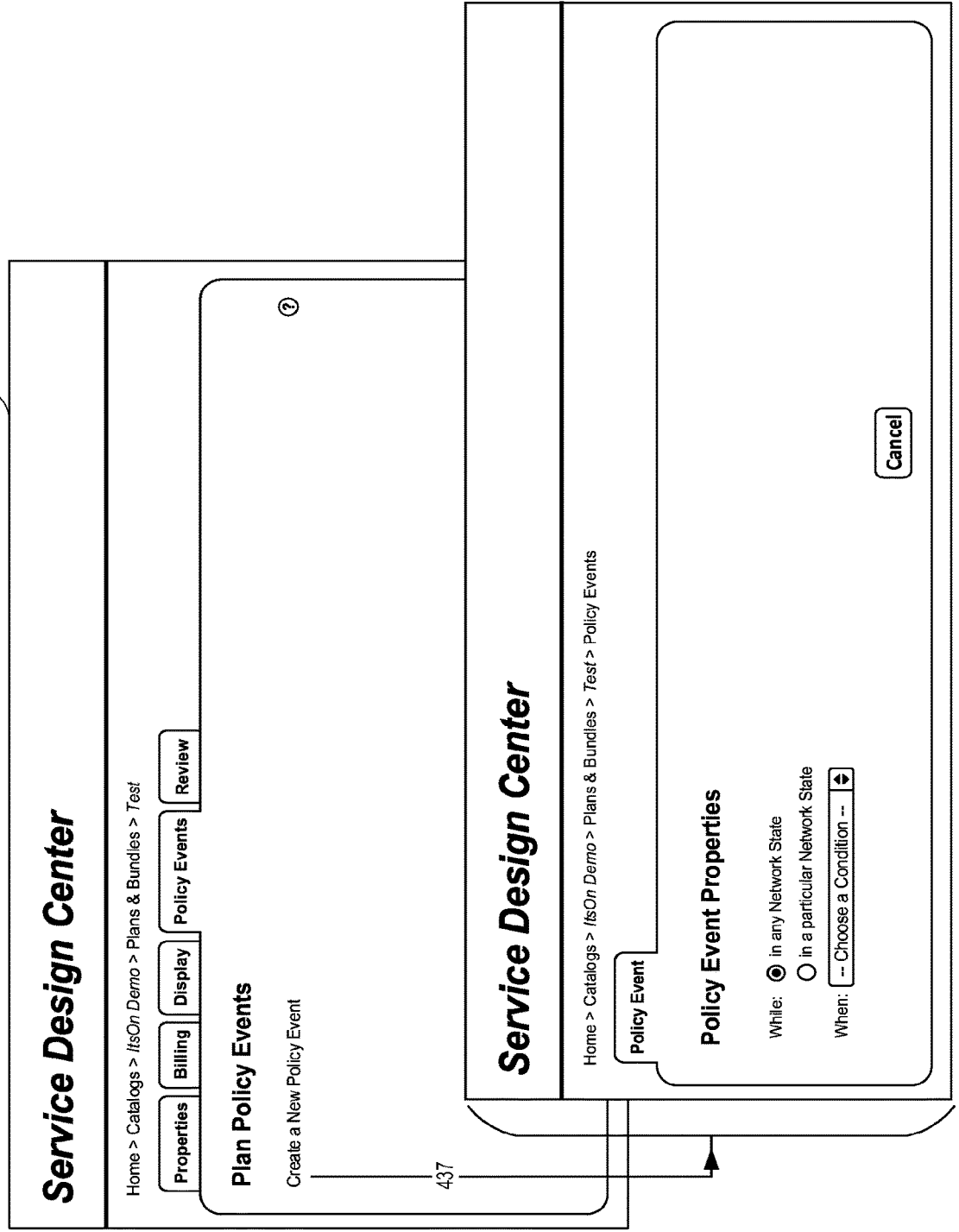
FIG. 24 illustrates an exemplary "Plan Policy Events" display presented in response to navigation input from the Plan Display Properties window.

FIG. 24 illustrates an exemplary "Plan Policy Events" display 435 corresponding to the "policy events" aspect of the plan design organization shown in FIG. 5 and presented in response to navigation input from the Plan Display Properties window. The Plan Policy Events display presents a "create a new policy event" text prompt, which, if clicked or otherwise selected by the SDC user, triggers presentation of the exemplary "Policy Event Properties" display shown at 437. The Policy Event Properties display, in turn, prompts the SDC user to specify one or more policy states to be associated with classification objects of the service policy (or service policies in the case of a bundle) incorporated within the plan. More specifically, in the embodiment shown, the Policy Event Properties display prompts the SDC user to specify, as part of the policy state definition, whether the policy event is triggered while in "any network state" or "in a particular network state," with the latter selection triggering presentation of more detailed network state definition prompts as discussed in greater detail below. The Policy Event Properties display additionally prompts the SDC user to specify a service "condition" which, together with the network state specification, constitutes the policy state definition. Examples of selectable service conditions (e.g., plan-usage thresholds, classification results, qualification with respect to the specified network state, etc.) are discussed in further detail below in connection with policy events defined within individual service policies.

Still referring to FIG. 24, each policy event definition created with respect to a given plan may be listed in the Plan Policy Events display together with prompts to the SDC user to delete or edit the listed policy event definitions. While not specifically shown in FIG. 24, a triggered-action field may be presented to prompt the SDC user to specify a triggered action (e.g., as shown in the service-policy-level policy event definition of FIG. 33).

SDC User Interface: Design Hierarchy—Service-Plan Bundles

Figure 26:
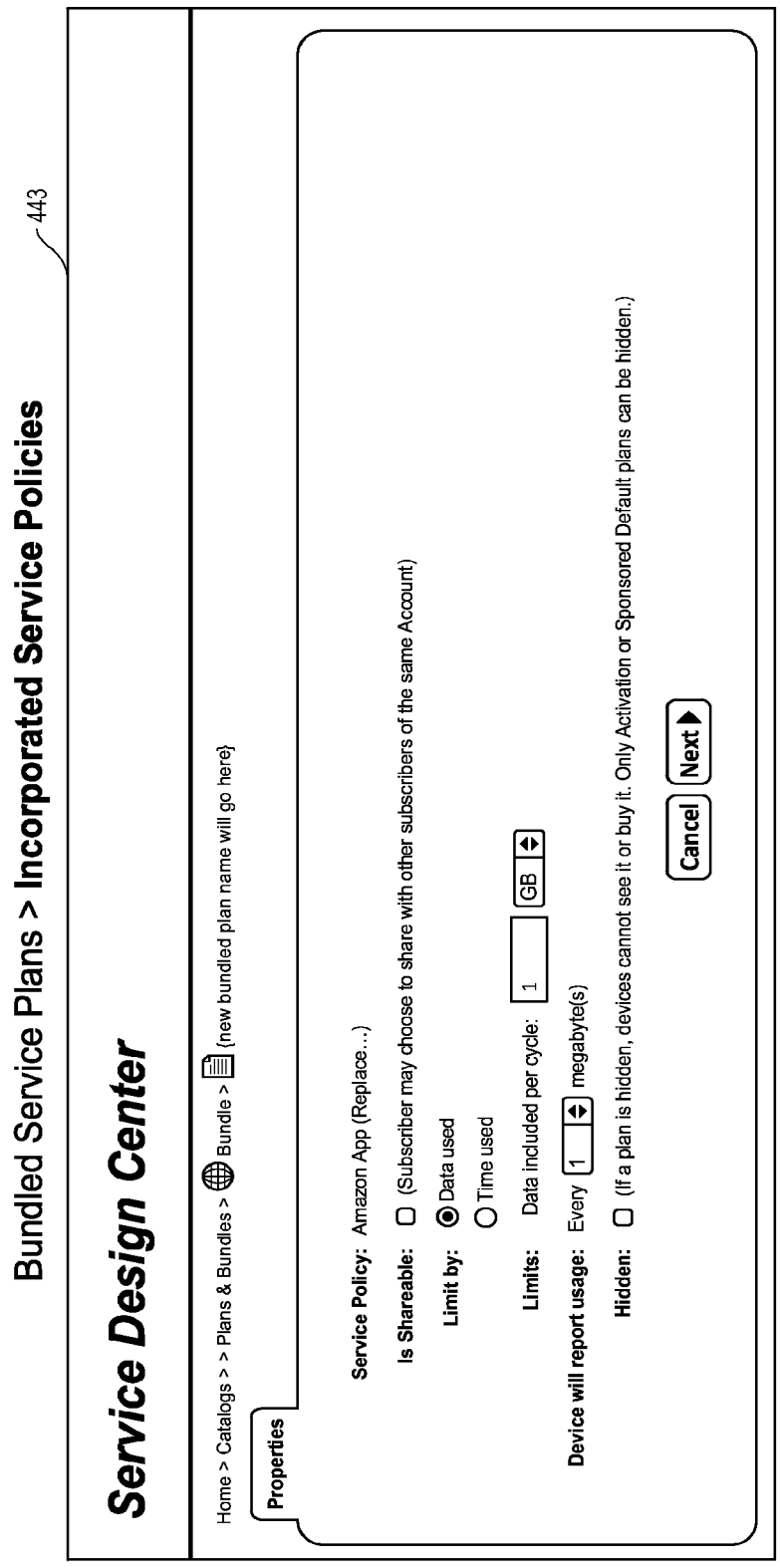
Figure 27:
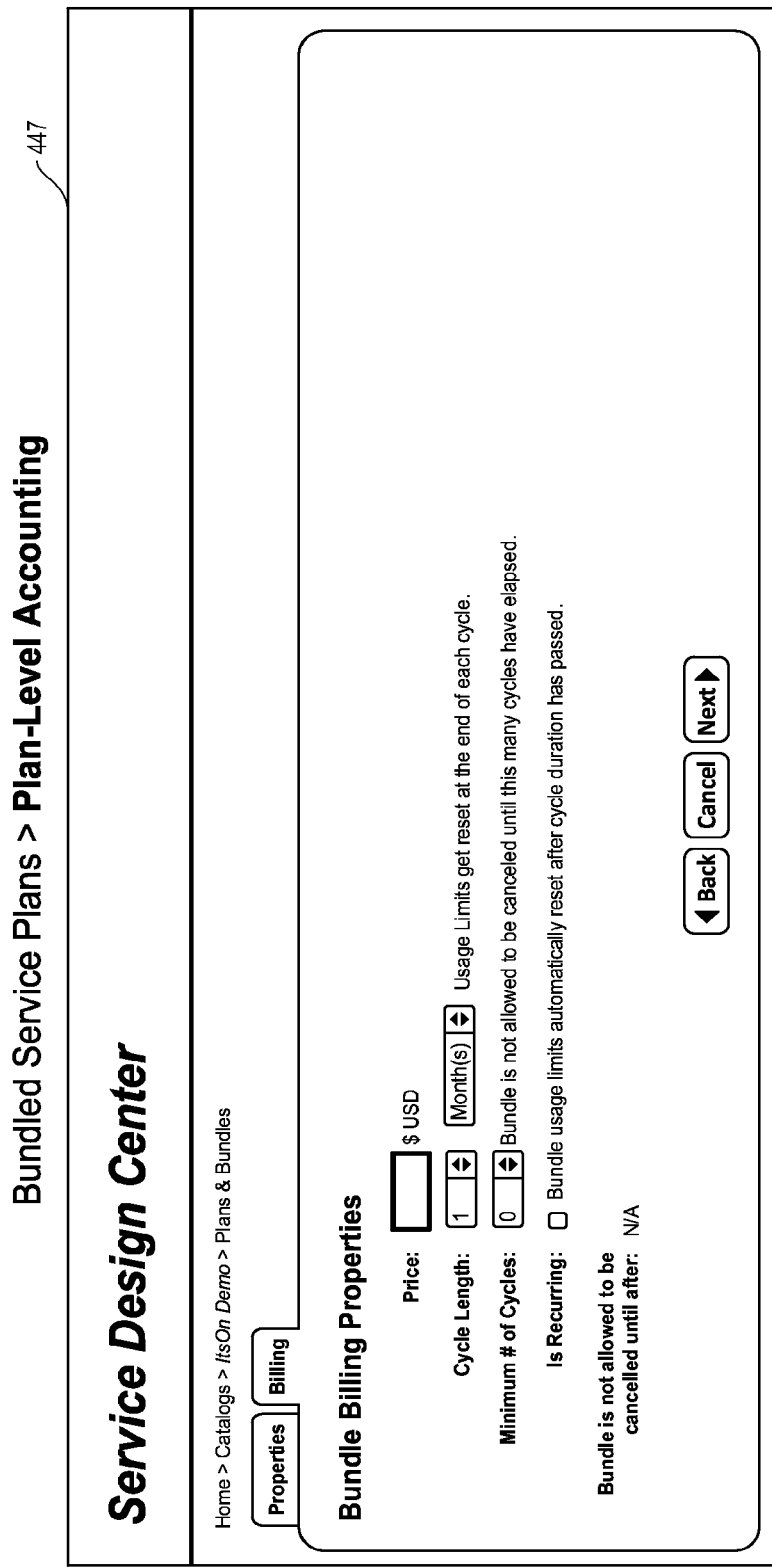
FIG. 27 illustrates a "Bundle Billing Properties" display that corresponds to the Plan Billing Properties display of FIG. 22.
Figure 28:
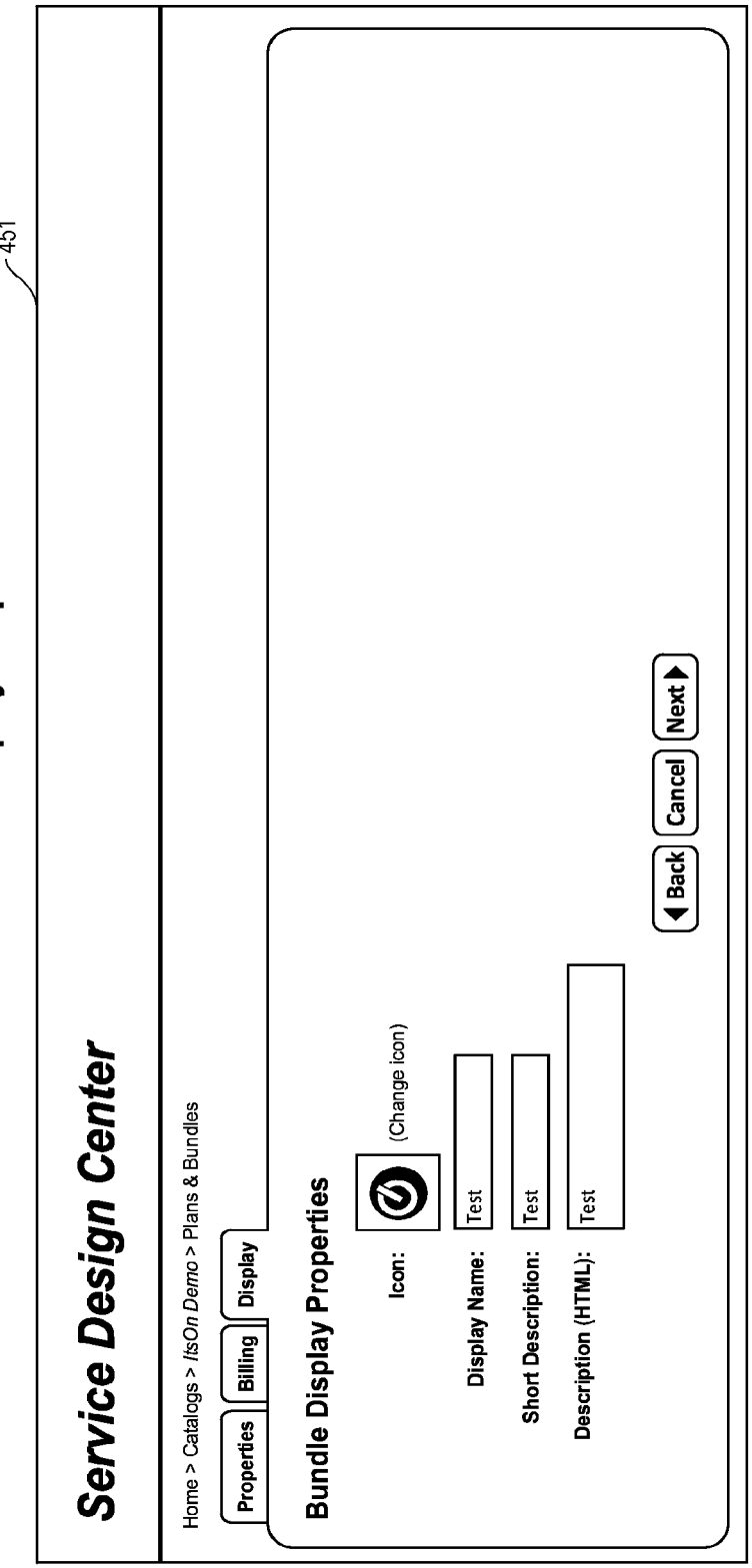
FIG. 28 illustrates a "Bundle Display Properties" display that corresponds to the Plan Display Properties display of FIG. 23.

FIGS. 25-28 illustrate displays relating to bundled plans, which, at least in the embodiments shown, may be viewed as a special class of plans having two or more service policies instead of a single service policy. In effect, the various properties combined with a selected service policy to form a plan are combined with multiple service policies to form a "plan bundle," with at least one example being a bundle of two or more service policies drawn from respective voice, messaging, data, and/or apps categories. Accordingly, FIGS. 25 and 26 illustrate exemplary "Bundle Properties" and "Bundled Plan Properties" displays (439, 443) that present a collective set of information and prompts corresponding to the Plan Properties display shown in FIG. 19, but with the service policy definition being split out from the general properties to enable specification of multiple service policies. Similarly, FIG. 27 illustrates a "Bundle Billing Properties" display 447 that corresponds to the Plan Billing Properties display of FIG. 22, and FIG. 28 illustrates a "Bundle Display Properties" display 451 that corresponds to the Plan Display Properties display of FIG. 23. Note that usage display prompts are omitted from the bundle display properties in the embodiment shown (i.e., in view of the multiple service policies), but a separate set of usage display prompts may be provided for each incorporated service policy in alternative embodiments. Also, in one embodiment (not specifically shown), the Bundle Billing Properties Display enables the SDC user to specify both a total price for the plan bundle (e.g., as shown in FIG. 27), as well as individual prices for constituent plans of the bundle, thus enabling a subscriber (or sponsor or other paying entity) to be charged the total price for the bundle, while applying the constituent plan prices to calculate taxes and other charges which may apply non-uniformly to plans in different service categories.

SDC User Interface: Design Hierarchy—Service Policies

FIG. 29 illustrates an exemplary "Service Policies" display 455 corresponding to the "Service Policies" aspect of the plan design hierarchy shown in FIG. 5. As shown, display 455 includes a list of previously defined service policies identified by name and policy type, any of which may be selected by the SDC user (e.g., by clicking on a listed service policy) for revision and/or further design input. Thus the service policy listing serves to prompt the SDC user to revise or further design a given service policy, and a "New" button is also presented to prompt the SDC user to create a new service policy which, after creation, will appear in the service policy list.

Figure 30:
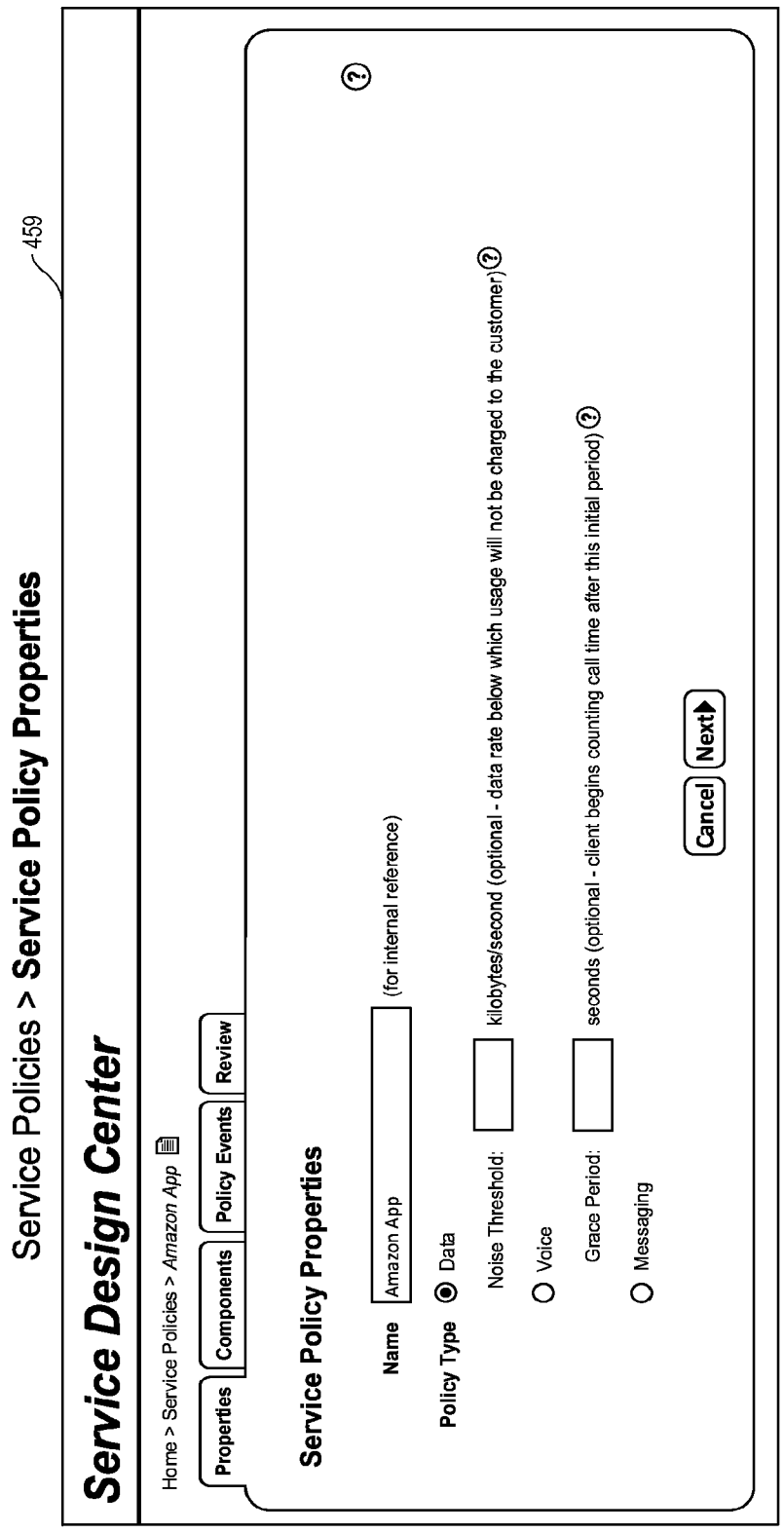
FIG. 30 illustrates, as the first of several tabbed displays presented in connection with service policy creation or revision, an exemplary "Service Policy Properties" display.

FIG. 30 illustrates, as the first of several tabbed displays presented in connection with service policy creation or revision, an exemplary "Service Policy Properties" display 459. As shown, Service Policy Properties display 459 prompts the SDC user to enter or change the service policy name (as will or may already appear in the list in FIG. 29), and to specify a policy type. In the embodiment presented, the user is further prompted to specify one of three policy types (Data, Voice or Messaging), though more or fewer policy type selections may be presented in alternative implementations or configurations. In the case of a "Data" policy type, the user is prompted to specify, as an optional "noise threshold," a data rate (e.g., in kilobytes per second) below which usage will not be charged to the subscriber. Similarly, the SDC user is prompted to specify an optional "grace period" within which call time under a Voice policy type is not counted (i.e., call time not metered until after the grace period expires).

FIG. 31 illustrates a tabbed "Service Policy Components" display 463 presented in response to navigation input within the Service Policy Properties display (e.g., clicking the "next" button presented in that display or clicking the "Components" tab) and which corresponds to the component inclusion and component priority aspects of service policy design depicted in FIG. 5. In the example shown, the Service Policy Components display presents a list of previously defined service policy components, organized by component service class, together with prompts inviting the SDC user to edit or delete any of the previously defined service policy components, create a new component from scratch or clone an existing component (i.e., make a new and distinct instance or copy of an existing component). The SDC user is also instructed (in effect, prompted to) set or adjust relative priorities of service policy components within a given service class by dragging (e.g., clicking and dragging) a selected service policy component to a different position within the list of service policy components within a given service class. In the embodiment shown, the service policy components are prioritized first by service class and then by their listed order within a service class (hence the priority adjustment by changing the component listing order within a given service class), with the class-to-class priorities being fixed by SDC implementation or configuration. In alternative embodiments, the SDC user may be permitted to adjust priorities without regard to service class.

Figure 32:
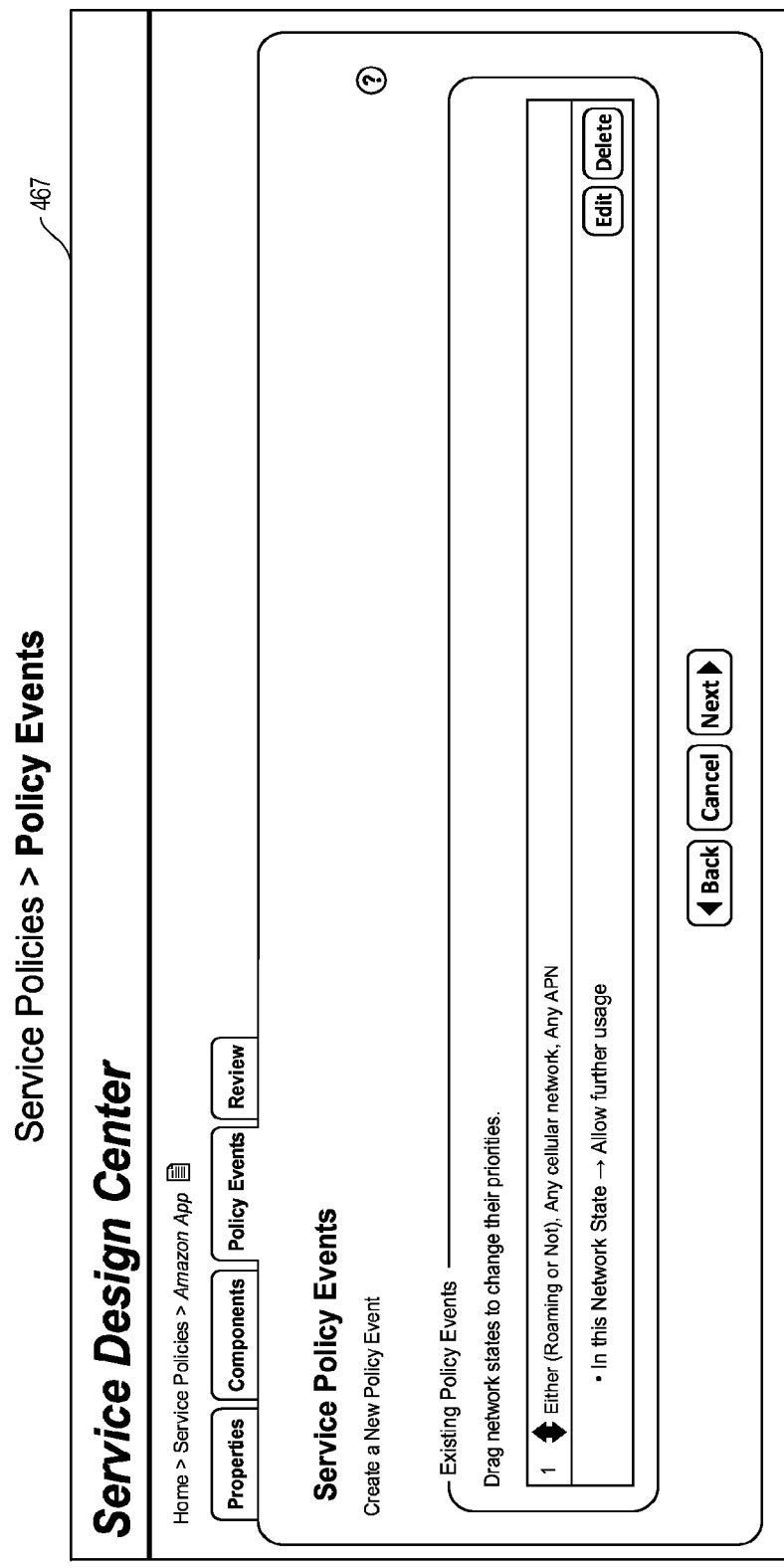
FIG. 32 illustrates a tabbed "Service Policy Events" display presented in response to navigation input within another service policy design display.
Figure 33:
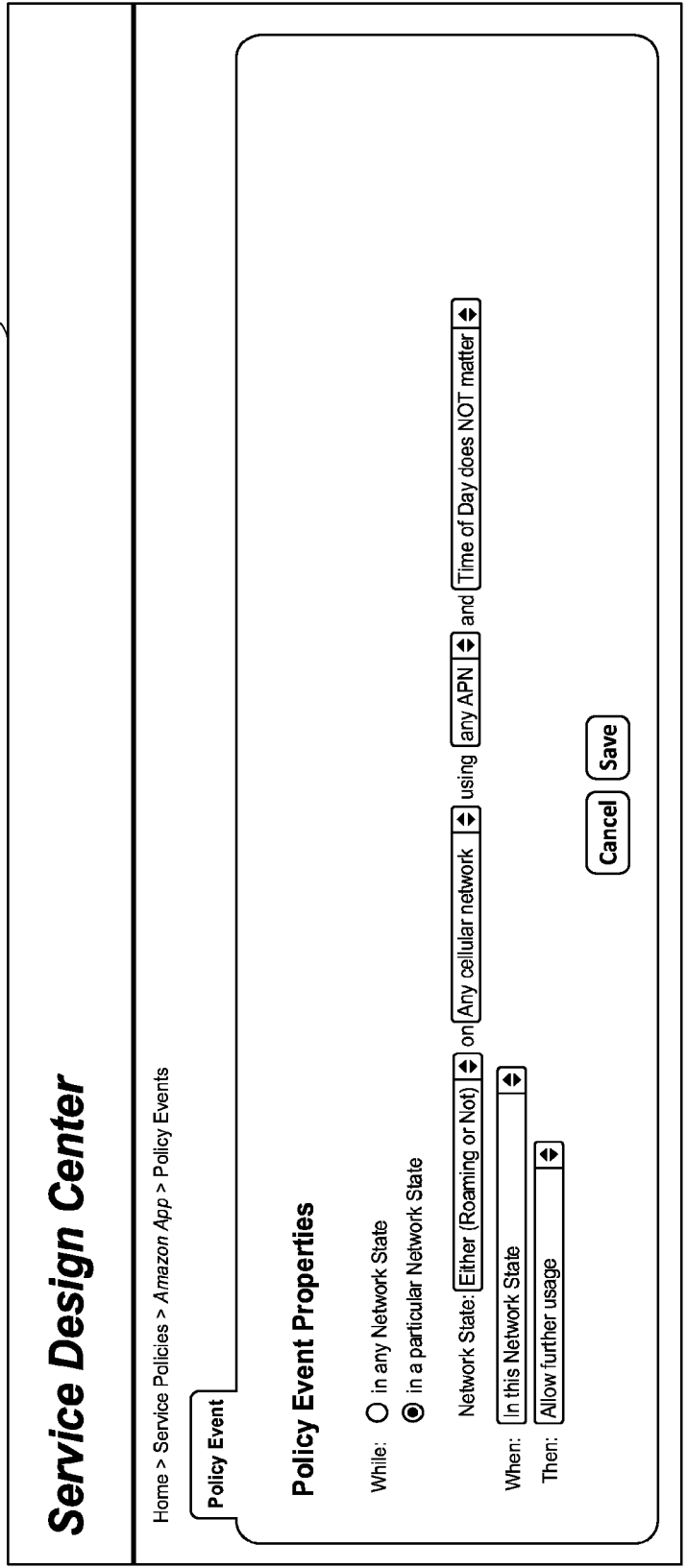
FIGS. 33-41 illustrate views of an exemplary "Policy Event Properties" display presented in response to navigation input from the "Service Policy Events" display and showing examples of user-selectable options in connection with policy state definition.
Figure 34:
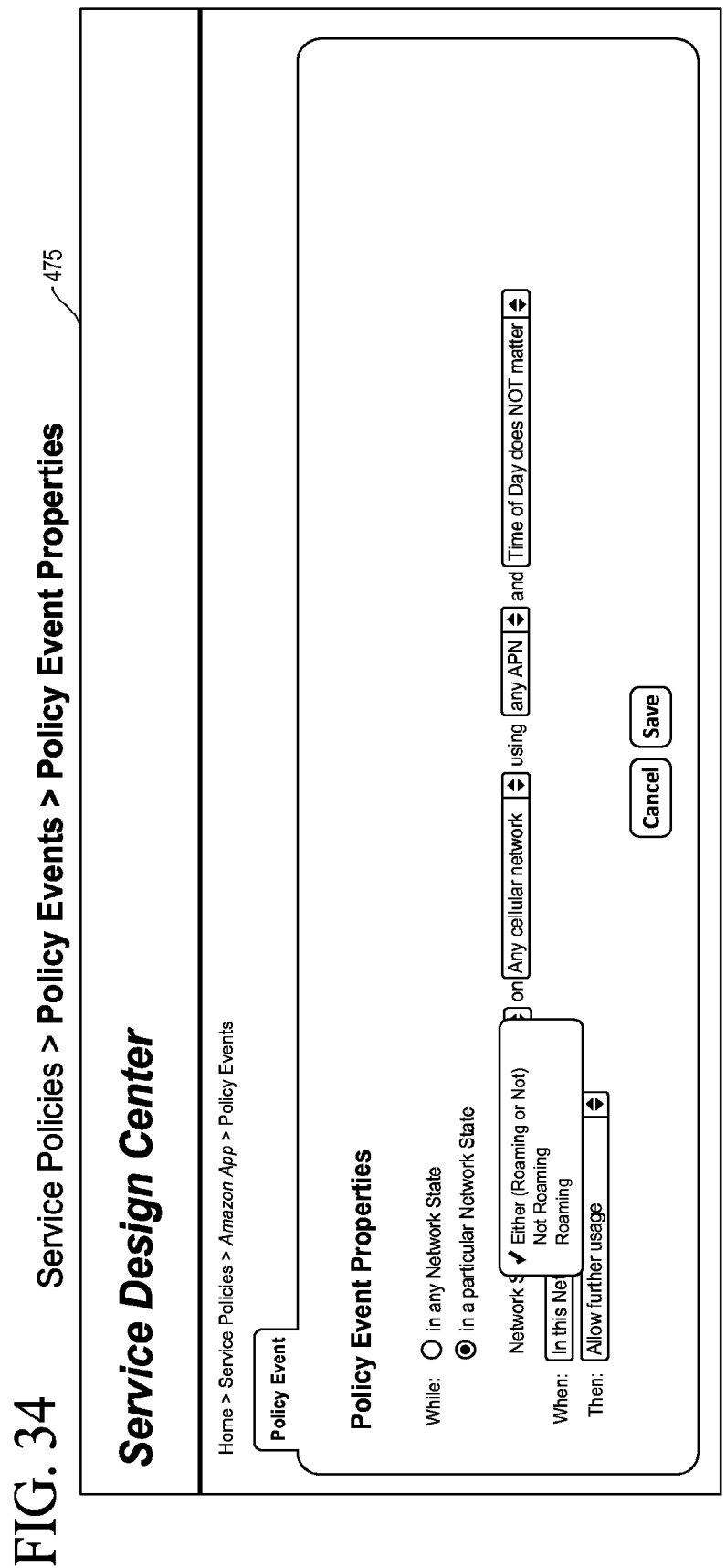
Figure 35:
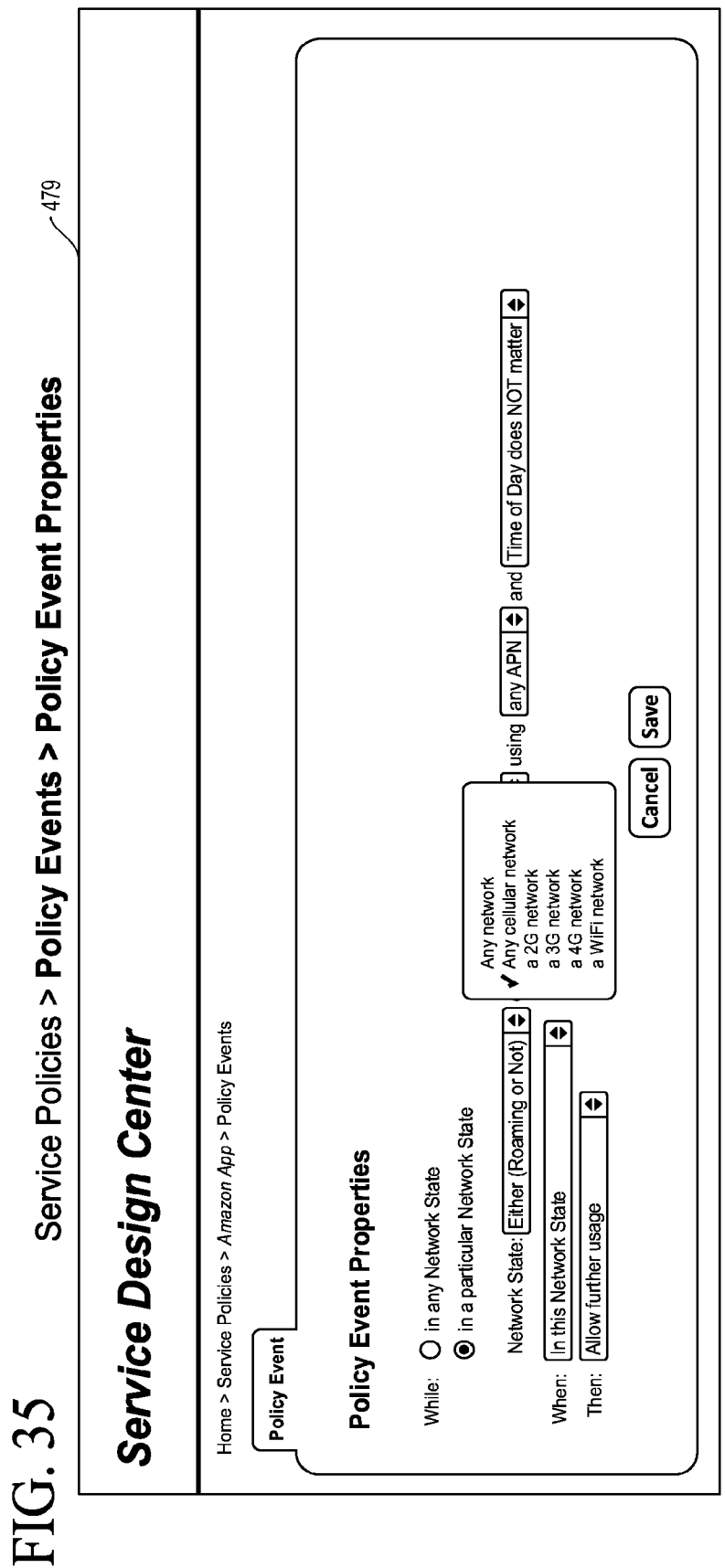
Figure 36:
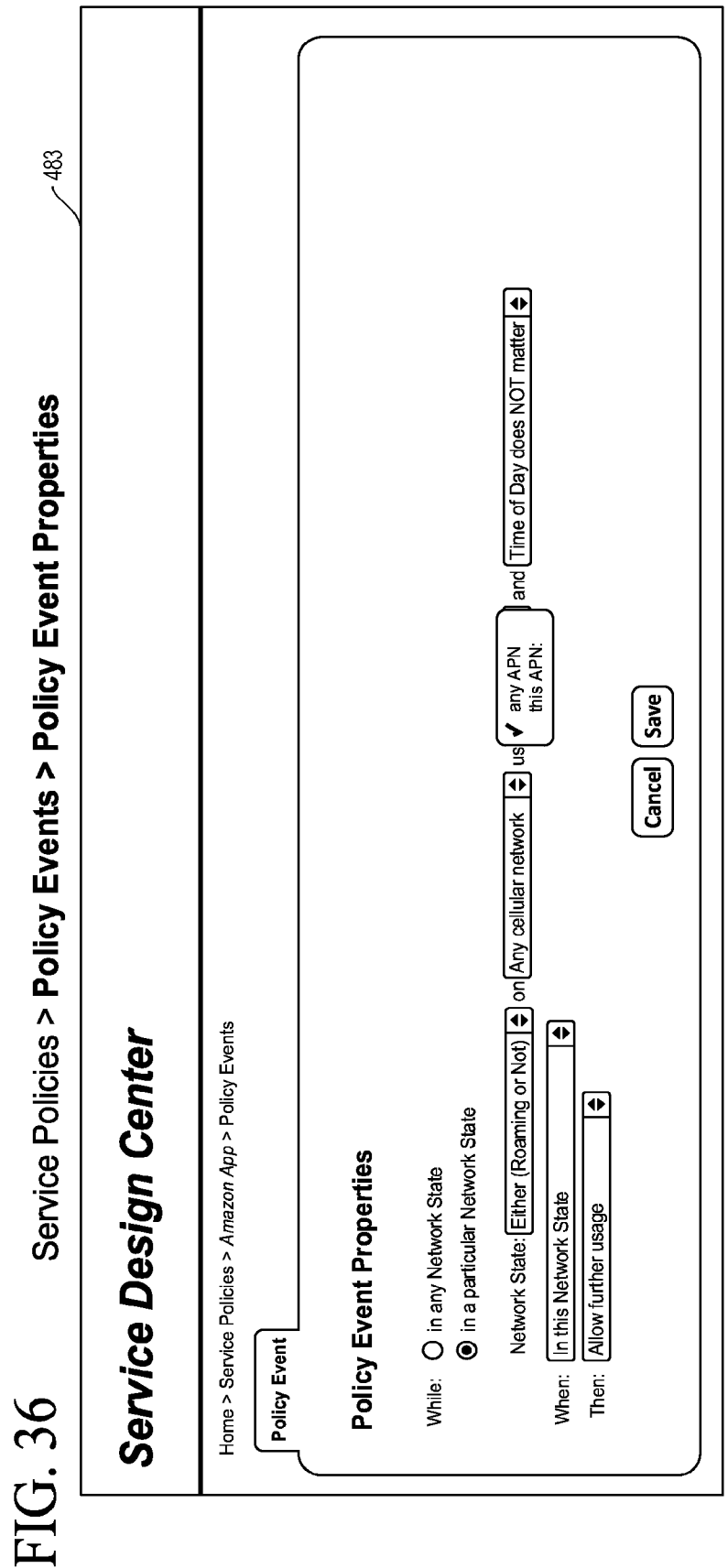
Figure 37:
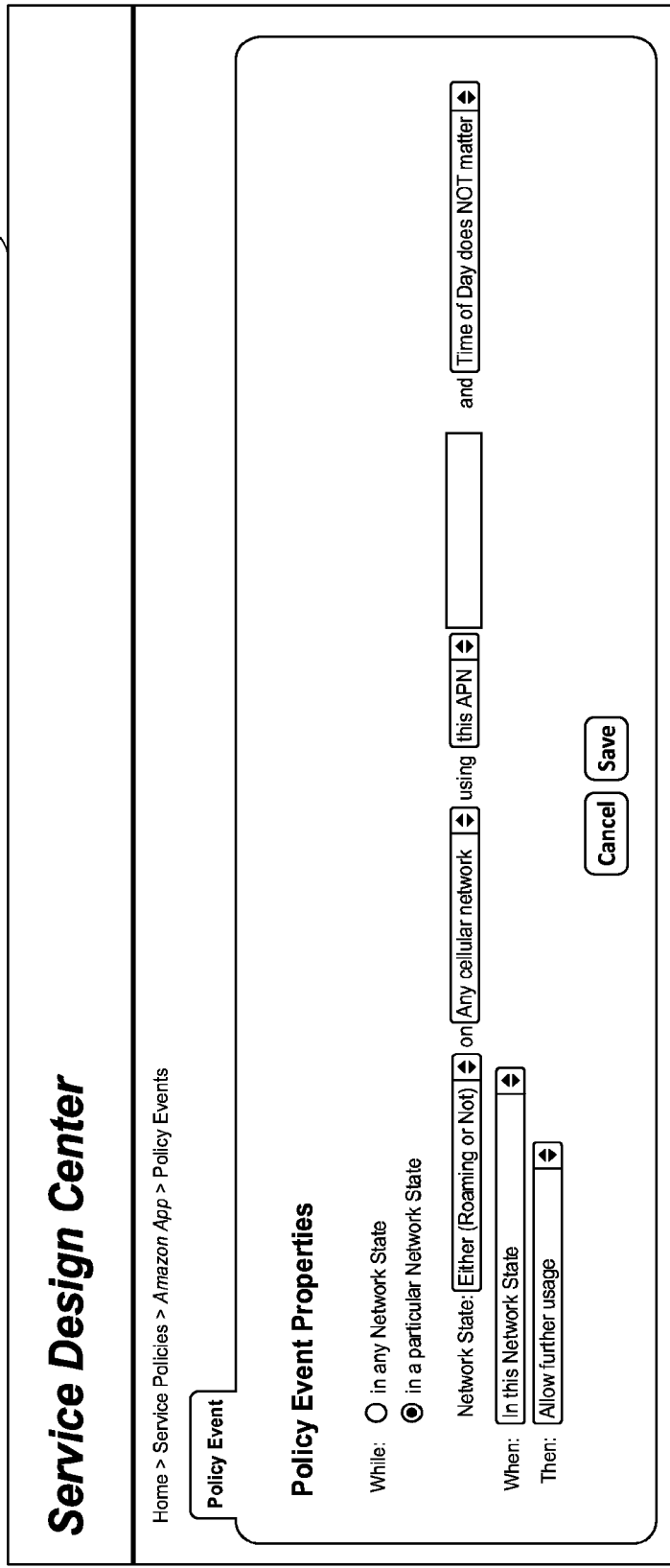
Figure 38:
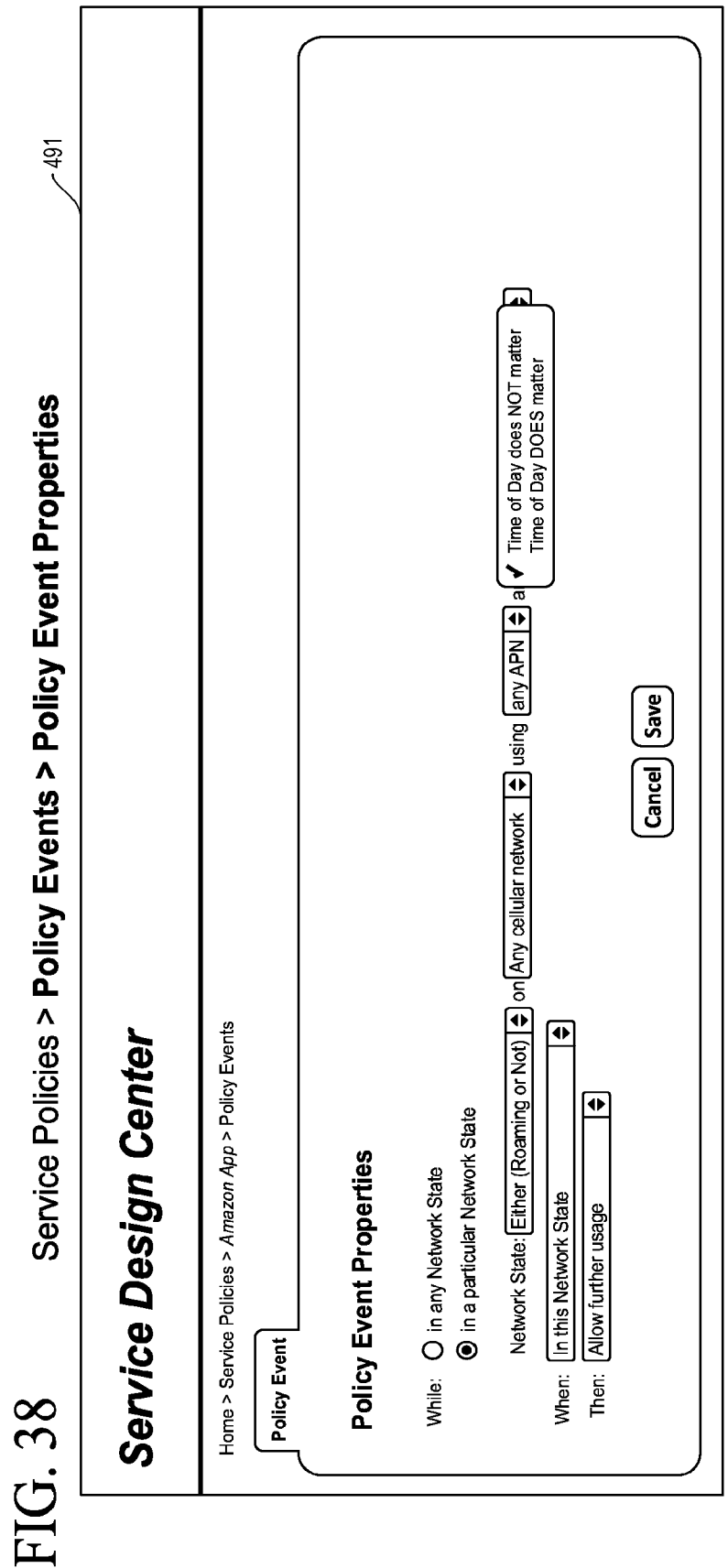

FIG. 32 illustrates a tabbed "Service Policy Events" display 467 presented in response to navigation input within another service policy design display and which corresponds to the policy event aspect of service policy design depicted in FIG. 5. In the embodiment shown, the Service Policy Events display lists all existing policy event definitions included by the service policy under design, prompts the user to edit or delete any of the policy events, create a new policy event and/or change the relative priorities between policy events by dragging policy events definitions to desired positions within the policy event list. Thus, the SDC user may associate multiple policy events with a service policy and control the order in which the policy events are to be evaluated in connection with policy application. For example, the SDC user may define different policy states for each of a set of policy events, and then control the operational sequence effected by those policy events (e.g., executing the action specified under policy event A, but not policy event B if a particular policy state is detected in connection with a classification event) to provide precise control over end-user device operation and/or plan usage.

FIGS. 33-41 illustrate views of an exemplary "Policy Event Properties" display presented in response to navigation input from the "Service Policy Events" display and showing examples of user-selectable options in connection with policy state definition. Display 471 shown in FIG. 33, for example, illustrates a set of network state definition fields presented in response to SDC user selection of an "in a particular Network State" condition. In the depicted embodiment, the network state definition enables specification of a roaming state (e.g., roaming, not roaming, or either (roaming or not) as shown in display 475 of FIG. 34), a network type (e.g., any cellular network, 2G network, 3G network, 4G network or WiFi network as shown in display 479 of FIG. 35, though various other network types may also be specified), a network access point name (APN) specification (e.g., any APN or a particular APN as shown in display 483 of FIG. 36, with the particular APN selection triggering display of an APN selection or entry field as shown in display 487 of FIG. 37), and a time of day specification (e.g., a temporal condition allowing indication of whether time of day does or does not matter as shown in display 491 of FIG. 38). Specifying that "Time of Day DOES matter" in connection with the network state definition triggers an additional prompt (i.e., display field) for the user to enter or select a time of day and/or time interval within a day or other period.

Figure 39:
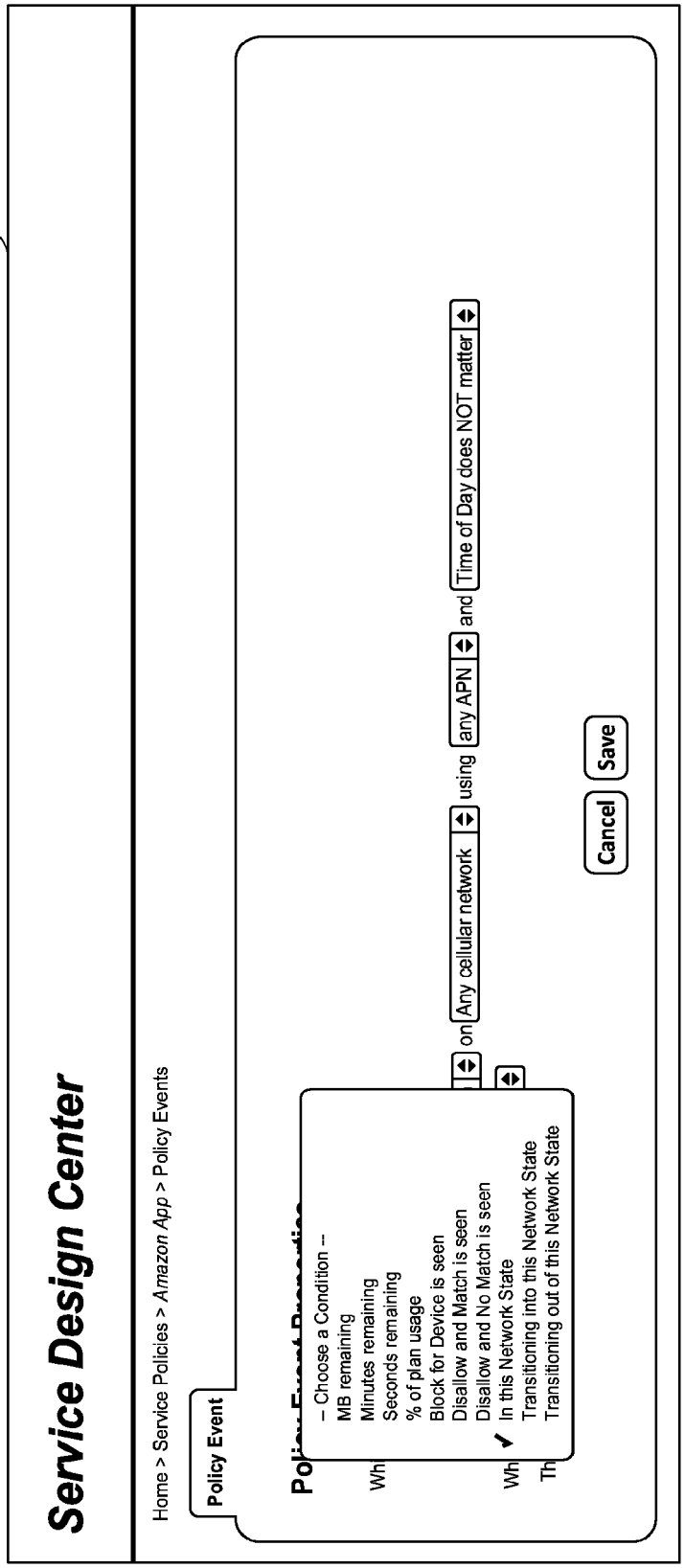

Still referring to the exemplary Policy Event Properties displays, FIG. 39 illustrates user-selectable options presented in connection with a temporal condition prompt ("When"), including service usage states (e.g., megabytes (MB) remaining, minutes remaining, seconds remaining), classification scanning states (e.g., block for device is seen, disallow and match is seen, disallow and no match is seen), qualifiers to the network state definition described above (e.g., in this network state, transitioning into this network state, transitioning out of this network state), and thus joining with the network state/time-of-day qualifier to form an overall policy-state specification. The classification scanning states may relate, for example and without limitation, to multi-match classification results and/or application of multiple policy events. For example, the "disallow and match is seen" (also referred to herein as "cap and match") corresponds to a multi-match result in which an initial classification match results in a disallow policy action (i.e., disallowing further usage with respect to the subject service policy due to reaching a usage limit or completing a plan cycle), but with continued classification that results in a secondary classification match. Similarly, the "disallow and no match is seen" (cap and no match) corresponds to a multi-match result in which an initial classification match triggers a disallow policy action, but with continued classification that yields no further match. The "block for device is seen" is a classification scanning state indicating that the requested service is not to be permitted and further matching is to be prevented (i.e., hard stop) and may be used to trigger a notification to that effect.

The exemplary policy state definitions permitted under the SDC examples shown in FIGS. 32-41 are intended to be illustrative and not exhaustive. More generally, the SDC enables definition of arbitrarily complex, multi-dimensional (i.e., tuple) policy states that may be used qualify filter matching events (including "always true" classification event settings as discussed above), including, for example and without limitation:

Define roaming network conditions (e.g. device is communicating over a roaming network)

Define filters into components for certain classifications of service activities that are to be restricted during roaming conditions (e.g. background application traffic, OS updates, synch service updates)

Associate filters/components with control policies (e.g. block, delay, defer, aggregate or time window, random back off, throttle) and condition control policy on network roaming conditions.

Define roaming network conditions (e.g. device is communicating over a roaming network)

Define filters into components for certain classifications of service activities that are to be restricted during roaming conditions (e.g. background application traffic, OS updates, synch service updates)

Define roaming usage levels (e.g. below limit 1, from limit 1 to below limit 2, from limit 2 and up)

Associate filters/components with control policies (e.g. block, delay, defer, aggregate or time window, random back off, throttle) and condition control policy on network roaming conditions and roaming usage level (e.g. from 0 to limit 1 allow, from limit 1 to limit 2 defer/delay/aggregate or time window/random back off/throttle, above limit 2 block).

Amount of use, limit not reached, limit reached, multi-limit definitions

Type of network (carrier identifier, 2G, 3G, 4G, home, roaming, cellular, WiFi, femto/indoor/macro, partner roaming/non-partner roaming)

Time of day

Geography/location

Foreground/background

Network busy state or network performance level

Figure 40:
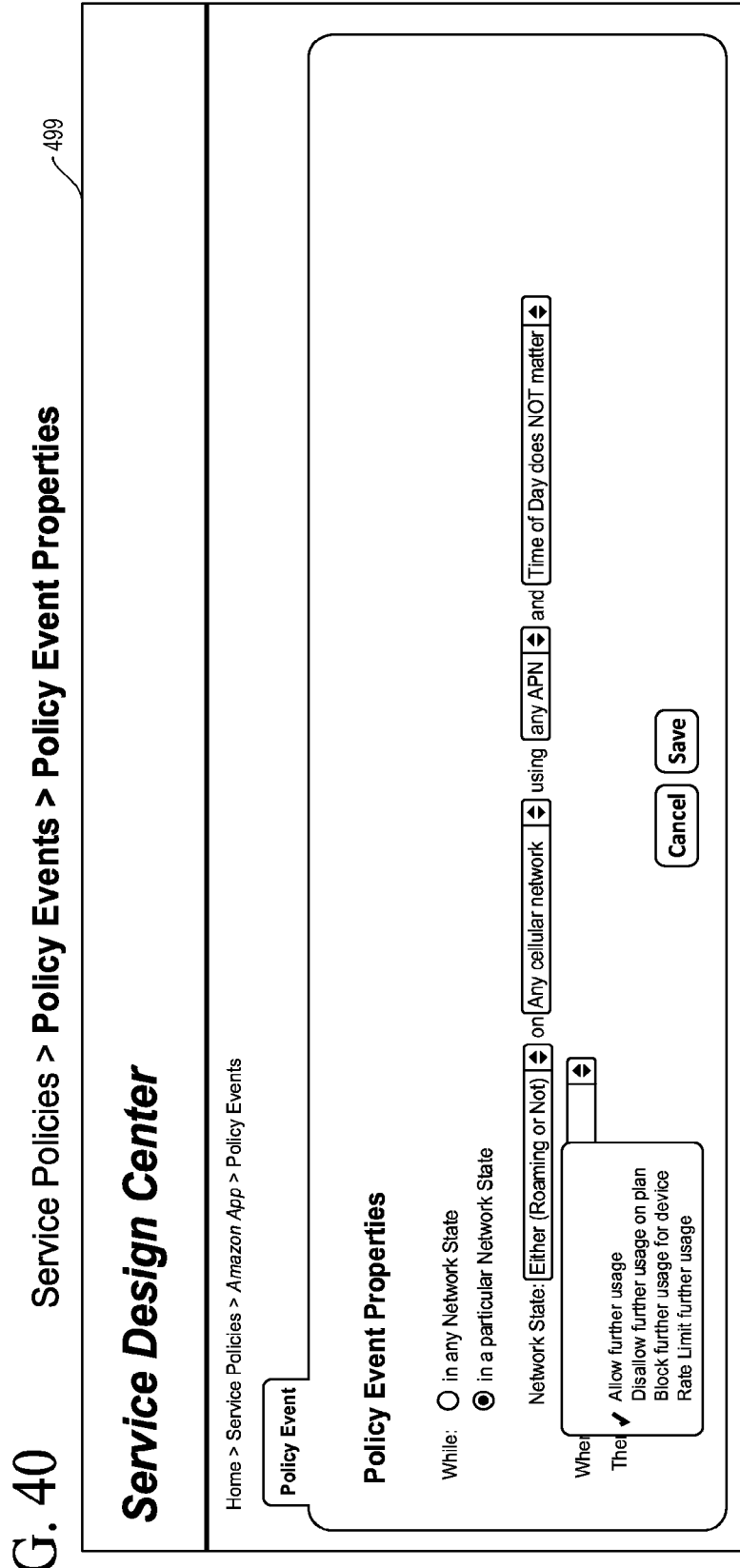

FIG. 40 illustrates, within another view of the Policy Event Properties display (499), an exemplary set of user-selectable control policy actions to be applied when the corresponding policy state is reached, including without limitation: allow ("allow further usage"), disallow ("disallow further usage on plan" or "block further usage for device"), and rate-limit or throttle ("rate limit further usage"). Various additional control policy actions may be specified in alternative embodiments.

Figure 41:
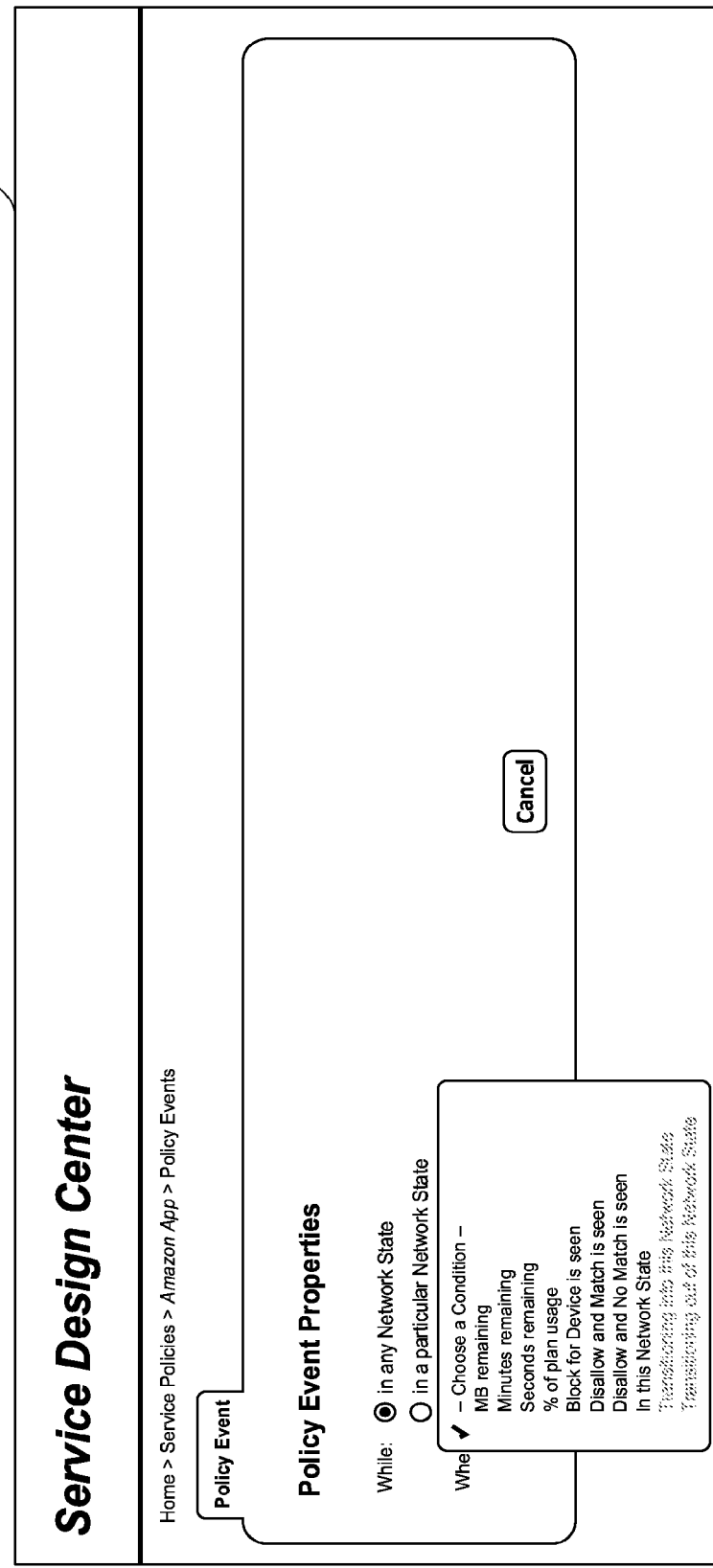

FIG. 41 illustrates another view of the Policy Event Properties display (503), in this case after the SDC user selects "in any network state" as the network state definition. The "in any network state" setting ensures that the network state criteria will be met at all times (i.e., yielding a Boolean "True" result in all cases), effectively removing the network state as a factor in the policy state determination. As shown, the network state qualifiers "transitioning into this network state" and "transitioning out of this network state" are rendered unavailable within the list of selectable temporal conditions as those qualifiers have no logical effect when "in any network state" is selected as the network state definition.

Figure 42:
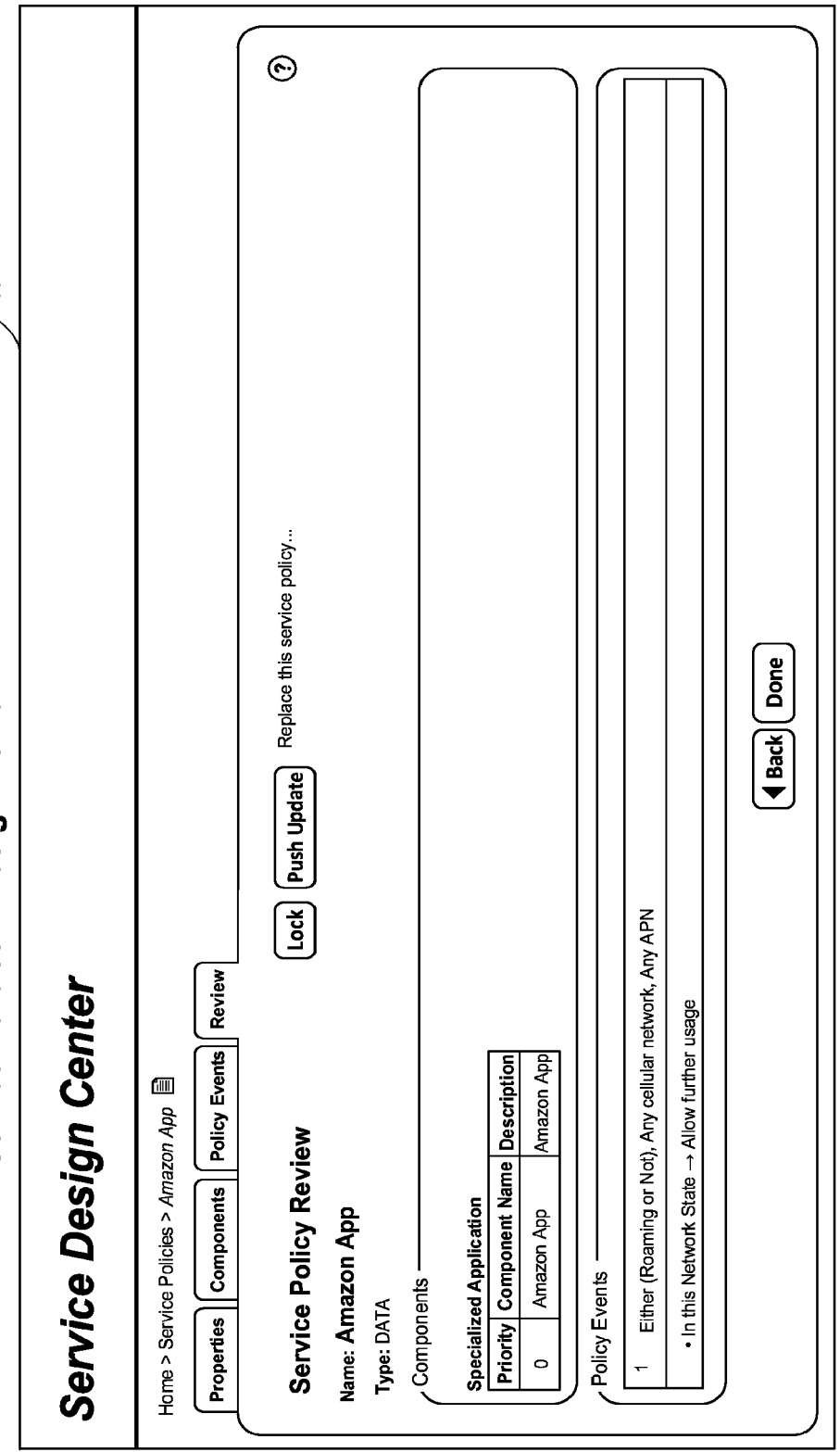
FIG. 42 depicts an exemplary "Service Policy Review" display that enables the SDC user to see at a glance the service policy components and policy events included within a service policy design.

FIG. 42 depicts an exemplary "Service Policy Review" display 507 that enables the SDC user to see at a glance the service policy components and policy events included within a service policy design. As shown, buttons are presented to prompt the user to "Lock" the service policy (i.e., preventing the service policy from being revised without predetermined permissions) and/or "Push Update" the service policy, which propagates the service policy or any revisions upwards through the design hierarchy to any incorporating service plans and plan catalogs and also to any end-user device that currently employs this policy. Push Update enables the SDC user to push updates to the subject service policy to existing end-user devices, for example, to correct mistakes within or otherwise improve/revise an original service policy design. The user may also click a text prompt "Replace this service policy . . . " to obtain a display that enables selection of a replacement service policy definition.

SDC User Interface: Design Hierarchy—Service Policy Components

Figure 43:
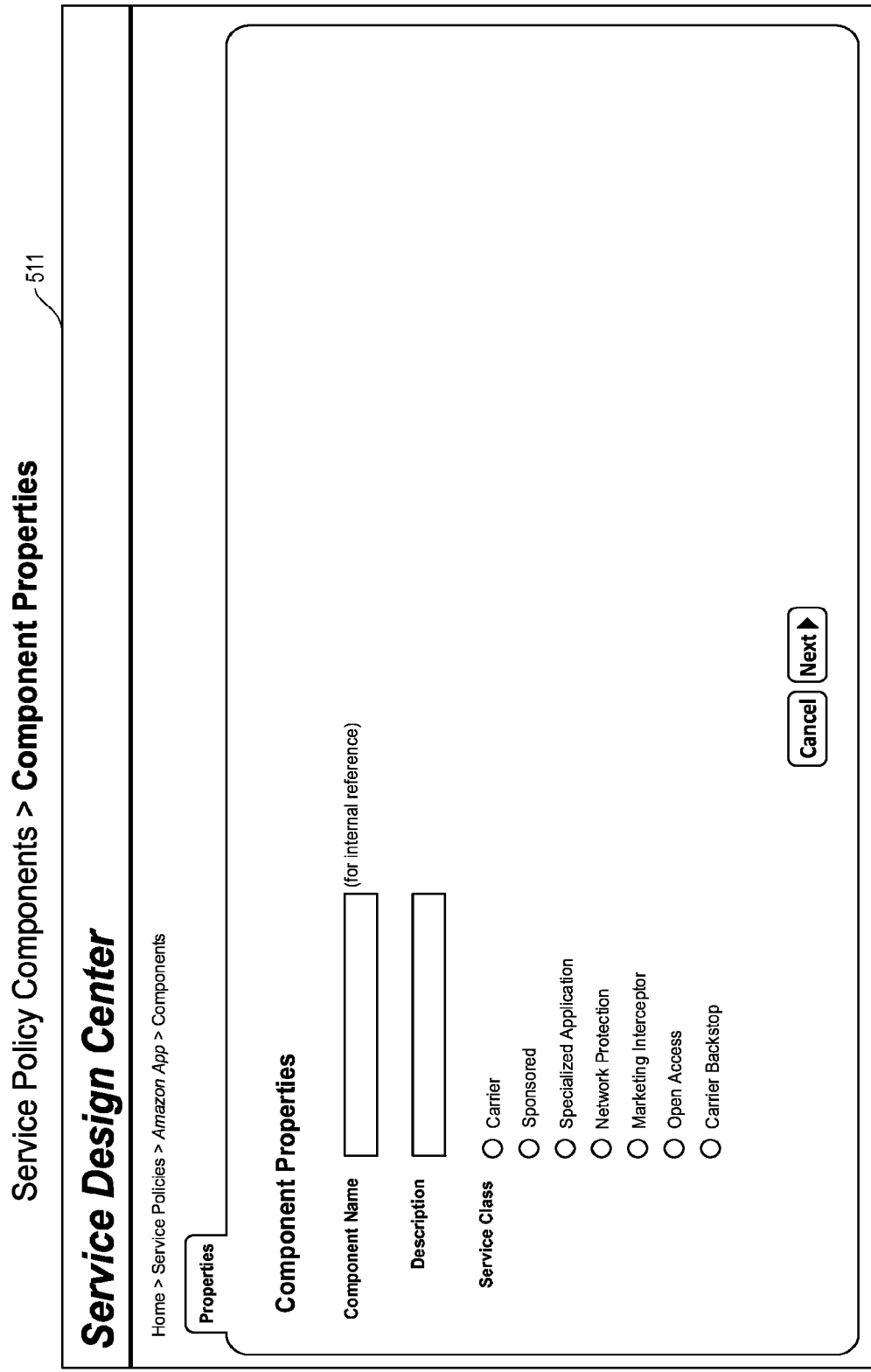
FIG. 43 illustrates a tabbed "Component Properties" display presented in response to navigation input within the Service Policy Components display shown in FIG. 31.

FIG. 43 illustrates a tabbed "Component Properties" display 511 presented in response to navigation input within the Service Policy Components display shown in FIG. 31 and which corresponds to the policy component level of the design hierarchy depicted in FIG. 5. In the embodiment shown, Component Properties display 511 prompts the SDC user to enter a component name, description and service class, with the service classes being listed in order of descending, built-in priority. As mentioned above, the service class priorities may be adjustable by the SDC user in alternative embodiments.

Figure 44:
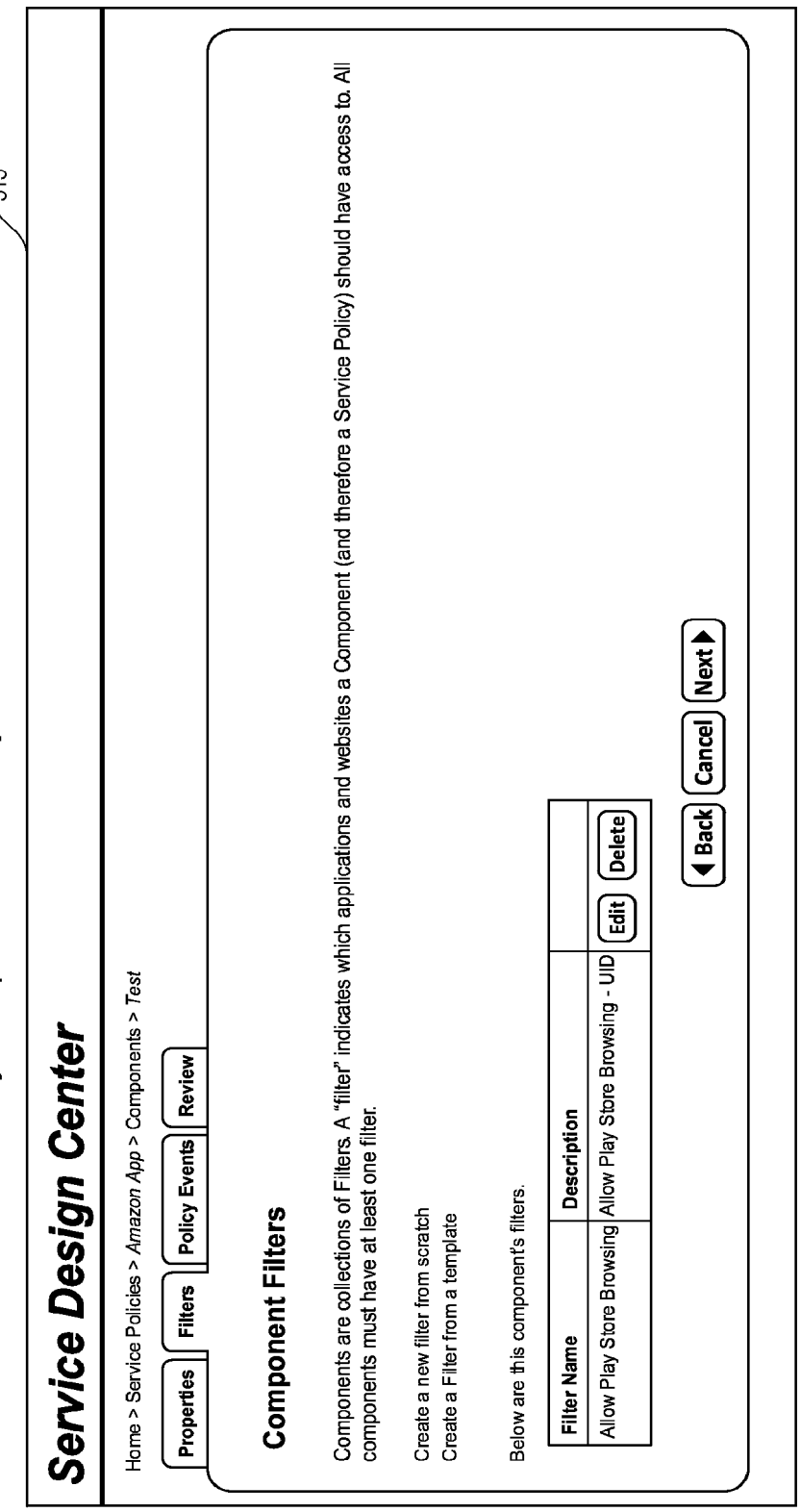
FIG. 44 illustrates a tabbed "Component Filters" display presented in response to navigation input within the Component Properties display and corresponding to the included filters aspect of policy component design depicted in FIG. 5.
Figure 45:
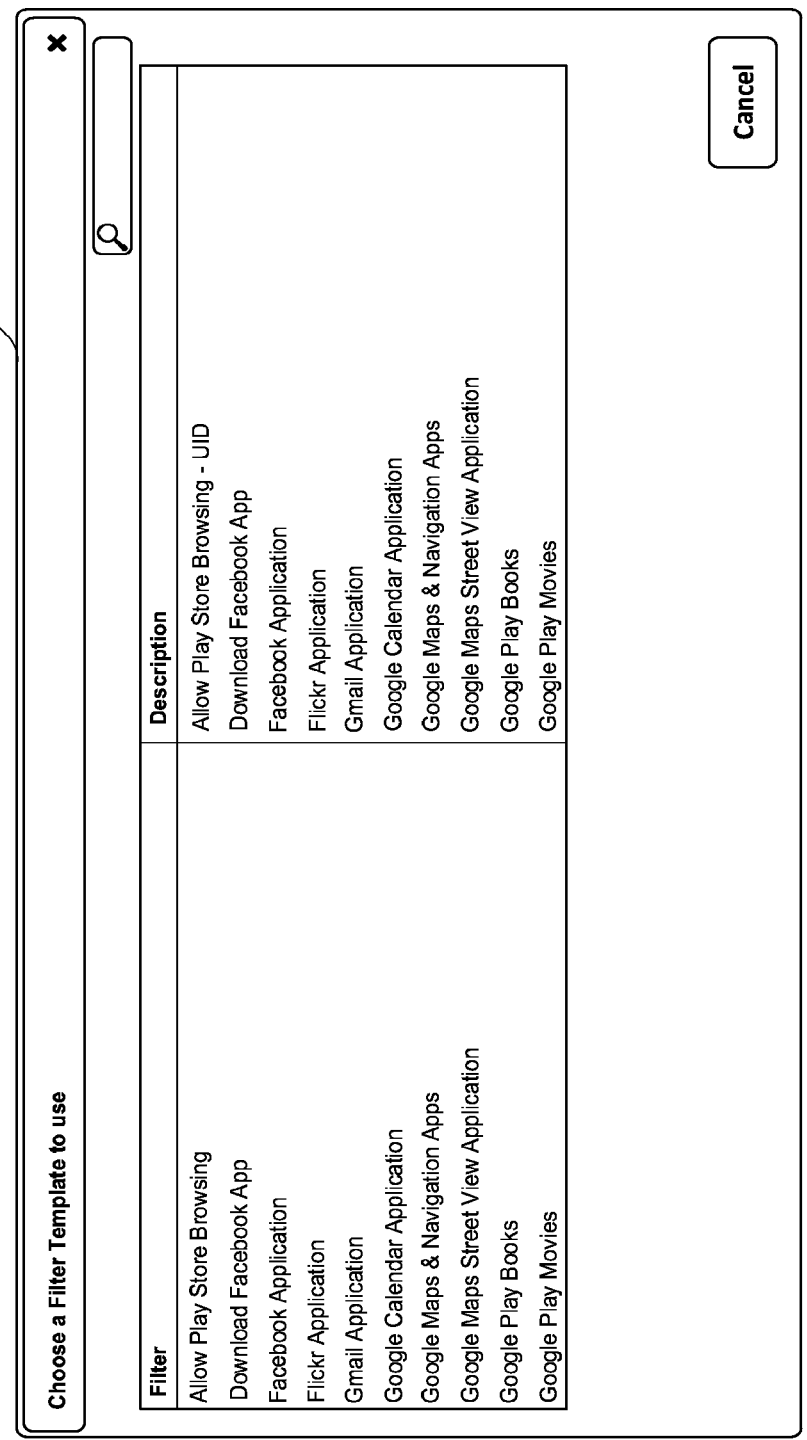
FIG. 45 depicts a list of SDC-user-selectable filter templates presented in response to navigation input within the Component Filters display of FIG. 44.

FIG. 44 illustrates a tabbed "Component Filters" display 515 presented in response to navigation input within the Component Properties display and corresponding to the included filters aspect of policy component design depicted in FIG. 5. In the implementation shown, Component Filters display 515 prompts the SDC user to create a new filter from scratch, create a filter from a template (e.g., selecting a previously defined filter template from a list as shown at 519 in FIG. 45), or edit or delete filters previously incorporated into (e.g., created within) the policy component under construction. Filters, which constitute base-level classification objects in the SDC implementation illustrated in FIGS. 15-92, are evaluated with respect to an actual or attempted service access (i.e., a "service activity") to yield a match or no-match determination, with a service-access match constituting a classification event (or classification match) as discussed in reference to FIG. 2. Filters may be characterized by various service-activity matching criteria and as either multi-match (re-matching) or single-match (non-re-matching) classification objects. These and other filter characteristics are described in further detail below.

Figure 46:
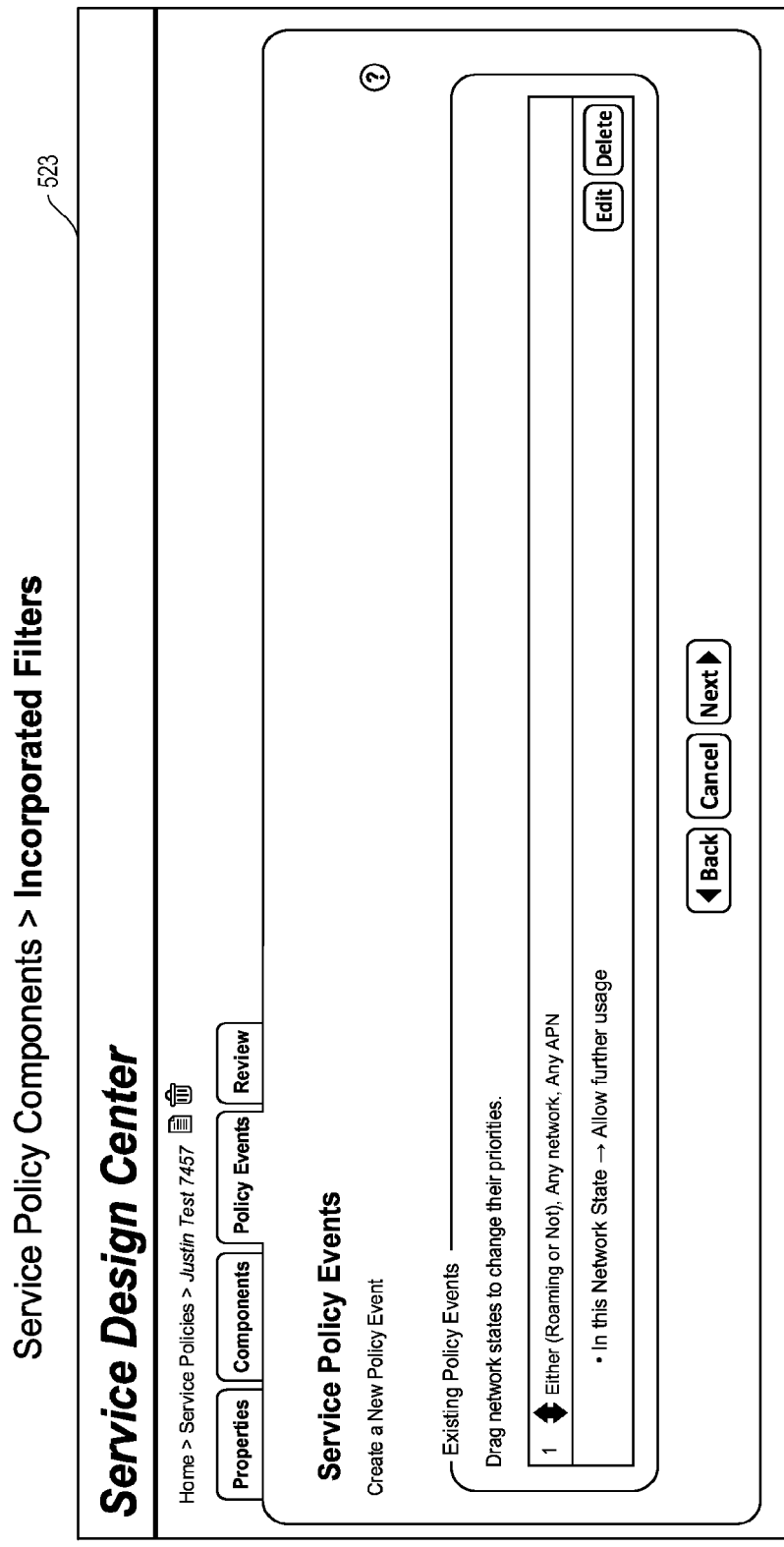
FIG. 46 illustrates an exemplary component-level "Policy Events" display that enables definition of policy events at the policy component level of the design hierarchy depicted in FIG. 5.
Figure 47:
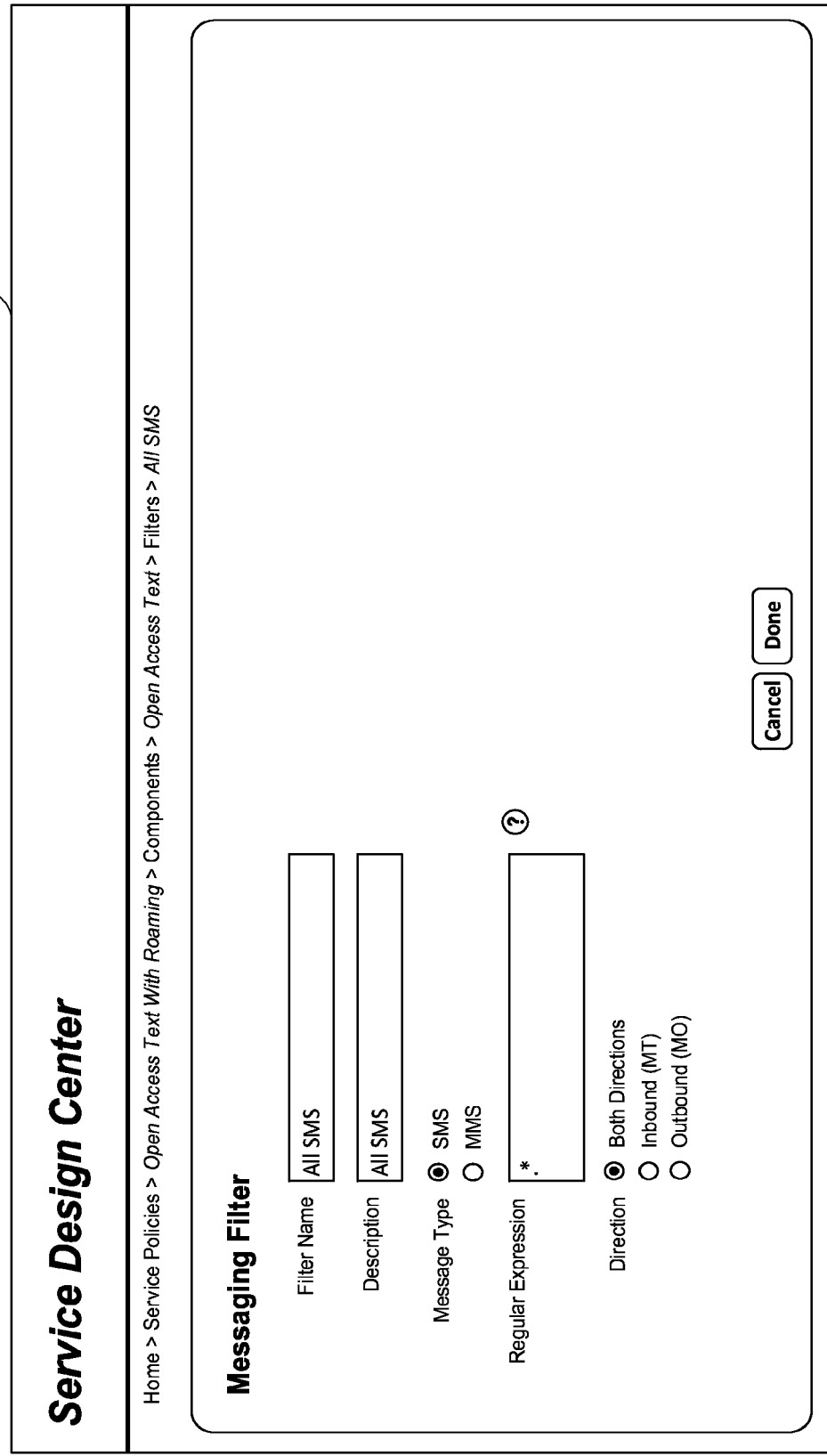
FIGS. 47A-47C illustrate exemplary "Filter Properties" displays presented in response to navigation input within the Component Filters display.

FIG. 46 illustrates an exemplary component-level "Policy Events" display 523 that enables definition of policy events at the policy component level of the design hierarchy depicted in FIG. 5. As shown, the component-level Policy Events display presents generally the same policy event definition options and prompts as the service-policy-level Policy Events display described in reference to FIGS. 31-37, but allows more targeted policy definition through association with the filter(s) of a single service policy component rather than all components within the service policy (as do service-policy-level policy event definitions).

SDC User Interface: Design Hierarchy—Filters

FIGS. 47A, 47B and 47C illustrate exemplary filter design displays for data, messaging and voice traffic, respectively. More specifically, FIG. 47A illustrates an exemplary "Filter Properties" display 527 (for data filters) presented in response to navigation input within the Component Filters display (FIG. 44) and corresponding to the filter level of the design hierarchy depicted in FIG. 5. In the data-filter embodiment shown, Filter Properties display 527 prompts the SDC user to enter a filter name and description, and also to optionally specify the filter as "associative-only" (a characteristic discussed in further detail below) and as either a single-match filter (i.e., specified by clicking the "Once matched, perform no further classification" check-box adjacent the filter description to indicate that no further classification is to be performed once the filter is matched) or a filter that requires multiple packets to be inspected to yield a classification match. More specifically, by checking the "once matched, perform no further classification" check-box instructs the classifier to stop looking any further after a match is detected. As an example, the "Once matched . . . " check-box may be checked in the case of an app-based filter to ensure that classification is limited to app-based traffic (or service activity) and not another data type (as defined by a different filter).

The Filter Properties display additionally prompts the user to enable filtering by remote destination, by application, by target operating system, by content, by protocol and/or by port number. In the case of remote destination filtering, the user is prompted to specify filtering by IP address (which may be a single IP address or a block of addresses signified by "slash" addressing) or domain, and in the latter case to specify whether referrers are to be loaded and whether to enable associative filtering. If associative filtering is enabled, the user may specify whether the associative filtering is to be carried out temporally (i.e., selected by marking the checkbox "By seconds" and entering the applicable number of seconds) and/or by data volume (selected by marking the "By bytes of data" checkbox and entering the applicable byte count).

If the SDC user specifies filtering by application, the user is prompted to enter a package ID and to click a text string to bring up a package name search display. The user is also prompted to specify whether the identified package is to be validated (i.e., by checking the "Validate this Application" checkbox). Similarly, a user that specifies filtering by target operating system (i.e., checking the corresponding checkbox) is prompted to choose a target operating system from a list, a user that specifies filtering by protocol is prompted to select a protocol from a set of protocols, and a user that specifies filtering by port is prompted to enter a port number. Note that the specific transport layer protocol options shown in connection with protocol filtering (i.e., TCP and UDP and thus protocols predominantly associated with non-streaming and streaming services, respectively) may be supplemented by other transport layer protocols, protocols from other layers of the internet protocol suite and/or protocols from protocol suites other than the internet protocol suite in alternative embodiments.

Continuing with filtering criteria, if the user specifies filtering by content, the user is prompted to specify the direction of the filter with respect to network traffic and also whether the filter relates to generic content and/or user-defined content. Receiving a specification of filter direction may be useful, for example, in searching for regular expressions (i.e., "RegEx implementations), as it may be necessary to inspect incoming traffic to determine classification (e.g., certain protocols such as SMTP). In other cases, for example where classification requires a multiple-packet match (e.g., using linked filters), it may be necessary to inspect an outbound packet and then search for a corresponding inbound packet to affirmatively match). If the user specifies that the filter is directed to generic content, the user is prompted to select one or more generic content types (e.g., flash video converter, etc.). Similarly, if the user specifies that the filter is directed to user-defined content, the user is prompted to select one or more user-defined content types (e.g., Google login service type). Although not specifically shown, the SDC user may also be prompted to enter a RegEx string as a user-defined type. Still referring to FIG. 47, Filter Properties display 527 further prompts the user to specify the manner of launcher widget display, including specifying a display name, a usage bar chart next to the domain icon, specify a custom icon to be used (including specification of a PNG file or other icon image file). Note that, in the implementation shown, multiple check-boxes are permitted to be checked (e.g., domain+protocol type+Operating system, etc.) thus establishing that all such conditions must be met for classification to be achieved.

FIG. 47B illustrates an exemplary "Filter Properties" display 528 for messaging filters presented in response to navigation input within the Component Filters display during design of a messaging service policy component. In the messaging-filter embodiment shown, Filter Properties display 528 prompts the SDC user to enter a filter name and description, and also to specify the type of messages to which the filter is to be applied: SMS (short-messaging service) or MMS (multimedia messaging service), in this example. The user is also prompted to enter an optional Regular Expression (i.e., a flexible pattern that specifies strings of text (optionally with wildcards) to be identified within messaging traffic for any of a variety of purposes, including security and message manipulation) and to specify a direction of the message traffic to be filtered: inbound, outbound or both directions.

FIG. 47C illustrates an exemplary "Filter Properties" display 529 for voice filters presented in response to navigation input within the Component Filters display during design of a voice service policy component. In the voice-filter embodiment shown, Filter Properties display 529 prompts the SDC user to enter a filter name and description, and also to enter an optional Regular Expression to be identified within voice traffic (e.g., dialed strings). The SDC user is also prompted to specify a direction of the voice traffic to be filtered: inbound, outbound or both directions.

As with characteristics of all the SDC user interface displays presented herein, the filter options and characteristics described in connection with FIGS. 47A-47C are merely illustrative and may be revised or supplemented in numerous ways in alternative embodiments. More generally, any filter characteristic or parameter which may varied, selectively enabled, or otherwise configured in connection with service plan design may be presented as or in connection with a user-input prompt within the Filter Properties display or any other SDC display in alternative embodiments. For example, filter classification types may include, for example and without limitation, any or all of the following:

Voice
Text
Data
Traffic classified by traffic type, basic data, streaming, VOIP, music, video, downloads, synch services
Traffic classified by application
Traffic classified by network destination, address, server, url, website, gateway identifier, proxy identifier
Traffic classified by logical channel or logical path, APN, a path to a particular network endpoint, a PDP context, a VPN, a PPP session, a login credential used to gain access to a network (such as a username or password), a communication path to a proxy server, a path to a partner server, a path to a partner network
Traffic associated with a particular QoS level, best effort, streaming, real time interactive, guaranteed.

SDC User Interface: Plan Catalog Design—Base Plans

Figure 48:
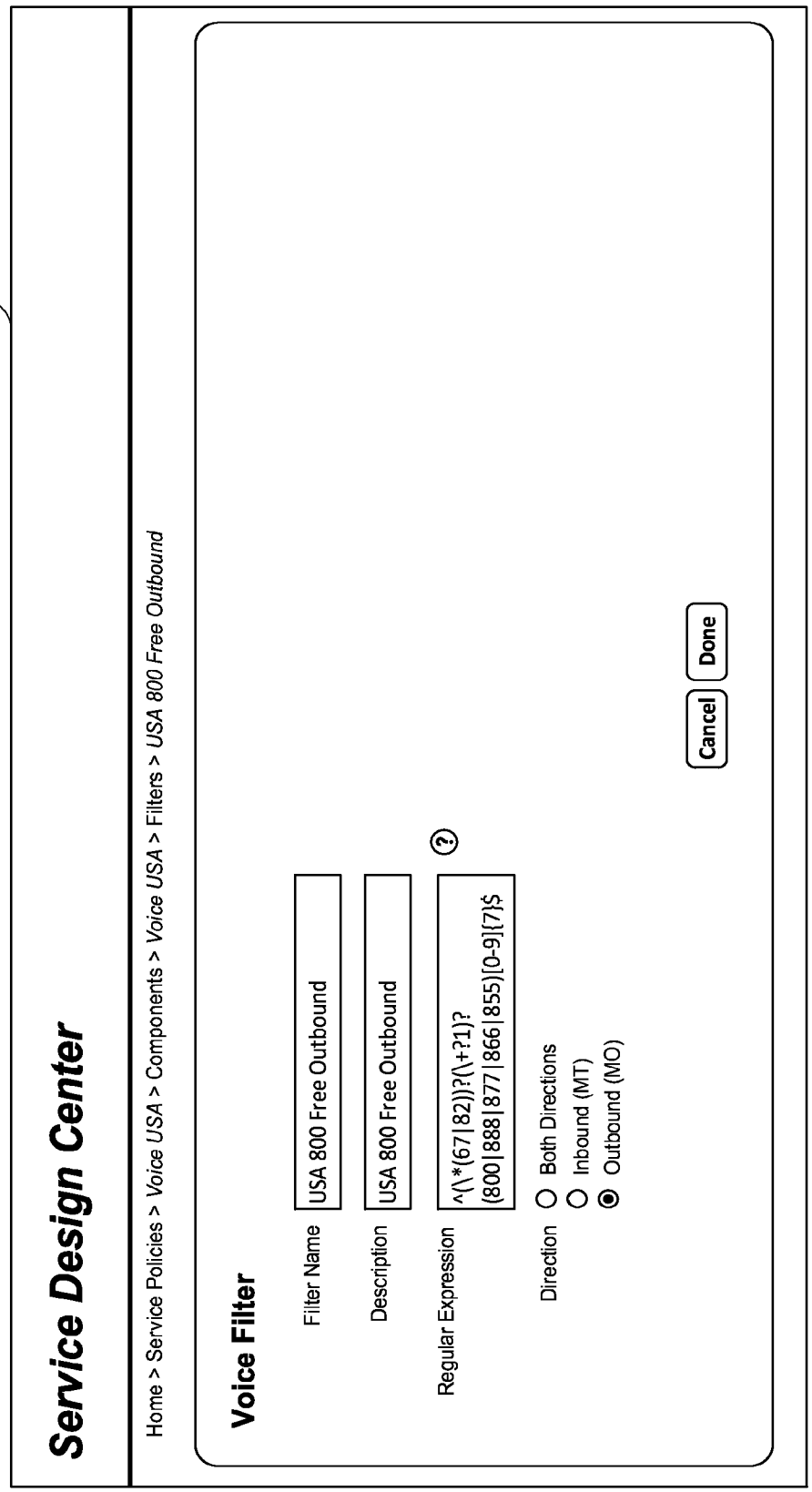
FIG. 48 illustrates an exemplary "Base Plan Sets" display that lists base plan set definitions incorporated or created within a plan catalog.

As mentioned in connection with the plan catalog level of the FIG. 5 design hierarchy, the SDC user may specify a backstop or "base" set of plans that constitute a minimum or default service level within a given plan catalog. FIG. 48 illustrates an exemplary "Base Plan Sets" display 531 that lists base plan set definitions incorporated or created within the "ItsOn Demo" catalog, and also prompts the SDC user to choose or create a new base plan set definition, or to edit or delete a listed base plan set definition. As the list of base plan set definitions shows, a base plan set definition may include a label, display icon, and descriptions of and total price for included voice, messaging, and/or data service policies.

Figure 49:
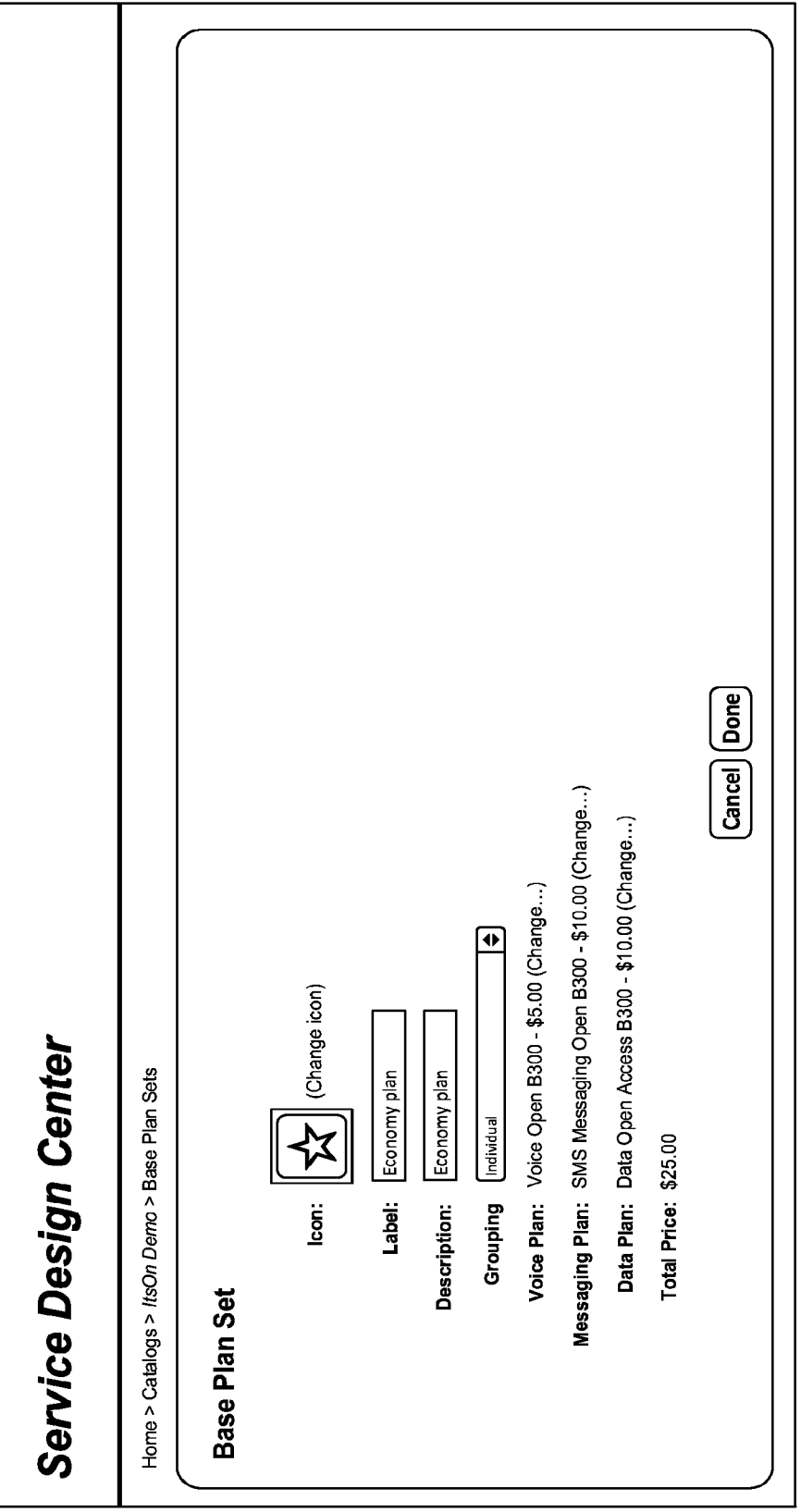
FIG. 49 illustrates an exemplary "Base Plan Set" display presented in response to navigation input from the Base Plan Sets display.

FIG. 49 illustrates an exemplary "Base Plan Set" display 535 presented in response to navigation input (i.e., from the Base Plan Sets display of FIG. 48) to enable an SDC user to create or revise a base plan set definition. In the embodiment shown, the SDC user is prompted to specify or change the base plan set icon, label and description, and also to specify the nature of the base plan set grouping. Base plan set grouping enables the SDC user to specify, for example, whether the base plan set applies to single user accounts, family accounts, tablets, smartphones, etc., thus enabling further refinement as to what plan sets are offered to a given to a given device type or account type. The user is further prompted to choose or change the voice, messaging and data plans (or any subset of those plan types) to be included within the base plan set. As shown, the constituent plan pricing is tallied by the SDC to form the total price of the base plan set.

SDC User Interface: Plan Catalog Design—Service Discovery

As mentioned above, FIGS. 50-75 relate to service discovery management features provided within the service design center to enable a service designer to control the manner in which available services are discovered by or promoted to the end-device user. These features include, for example and without limitation, enabling the SDC user to configure the presentation and organization of the plan catalog and constituent plans as they will appear within the end-user device (FIGS. 50-55), specify plans to be featured within the plan catalog (FIG. 56), configure generic interceptors and marketing interceptors (FIGS. 57-65), configure promotional banners and promotional popups (FIGS. 66-72), and configure upsell notifications to be presented in connection with policy events (e.g., reaching service usage milestones) or other events (FIGS. 73-75). Each of these service discovery management features is discussed in greater detail below.

Figure 50:
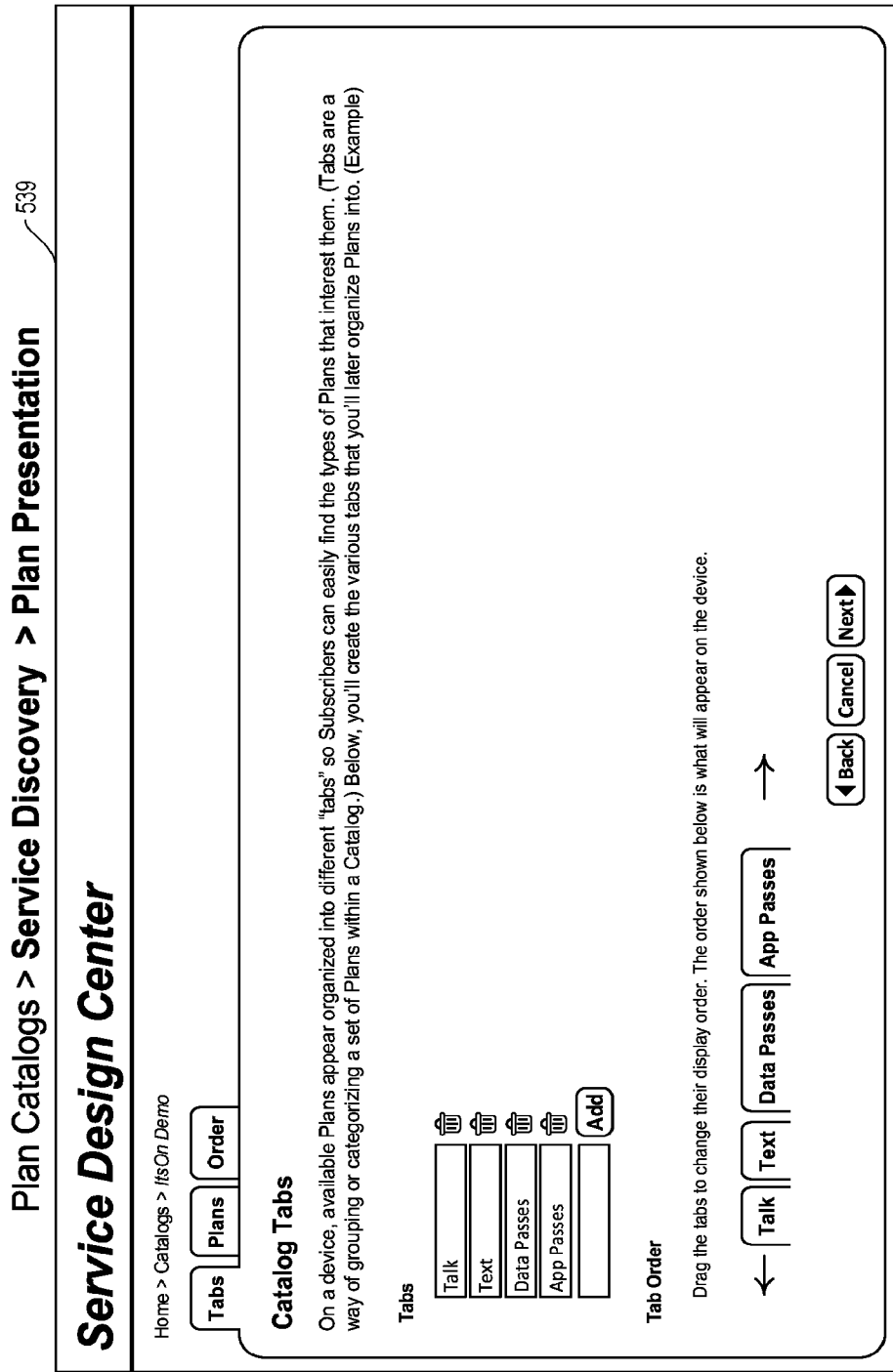
FIG. 50 illustrates an exemplary "Catalog Tabs" display that guides SDC user development of a catalog organization, organizing the constituent plans as they will appear on the user interface of an end-user device.

FIG. 50 illustrates an exemplary "Catalog Tabs" display 539 that guides (prompts) SDC user development of a catalog organization, organizing the constituent plans as they will appear on the user interface (e.g., touchscreen or other display) of an end-user device. As mentioned above, while a tabbed plan organization is employed in a number of embodiments (i.e., plans categorized and displayed within respective tabs that emulate an set of physical folder dividers), any other practicable organization of service plans and/or bundles within respective views to be presented on the end-user device may be employed, including a single-view scrollable list with plans organized under category headings, separate categorical displays (e.g., enabling a user to swipe from display to display), and so forth. In the embodiment shown, the Catalog Tabs display (itself part of a tabbed set of catalog-presentation design displays) prompts the SDC user to specify the number of tabs and the name or caption of each tab (i.e., title, legend, label, etc., wherever presented on the tab), and also setting the left-to-right order in which the tabs will be displayed on an end-user device, by clicking and dragging an individual tab within a tab-order display. The service designer may add as many new tabs as may be practical within the target end-user device display by clicking an "Add" button and entering a tab name (caption) or deleting a previously added tab by clicking a trash icon adjacent its name.

FIG. 51 illustrates an exemplary "Plans in Each Tab" display 543 reached by navigation input from the Catalog Tabs display or other catalog-presentation design display. As shown, the Plans in Each Tab display lists each service plan and plan bundle included within the plan catalog (a catalog named "ItsOn Demo" in this example) along a column axis by internal plan name and plan display name; lists the tabs specified in the Catalog Tabs display (see FIG. 50) along a row axis; and presents a grid of selection buttons to prompt the SDC user to select a given tab for the plan or bundle listed in the corresponding row. Thus, in the example depicted, "Text," "Text 450" and "Text 50" plans have been designated for presentation within a "Text" tab, and other sets of plans have likewise designated for presentation within "Data Passes," "Talk" and "App Passes" tabs. The Plans in Each Tab display additionally informs the SDC user that all listed plans are offerable via upsells, promotional banners and a featured plans list (each discussed below), prompting the user to click a highlighted text field, "Featured Plans list" to invoke a display that enables the user to view and revise a list of featured plans.

Figure 53:
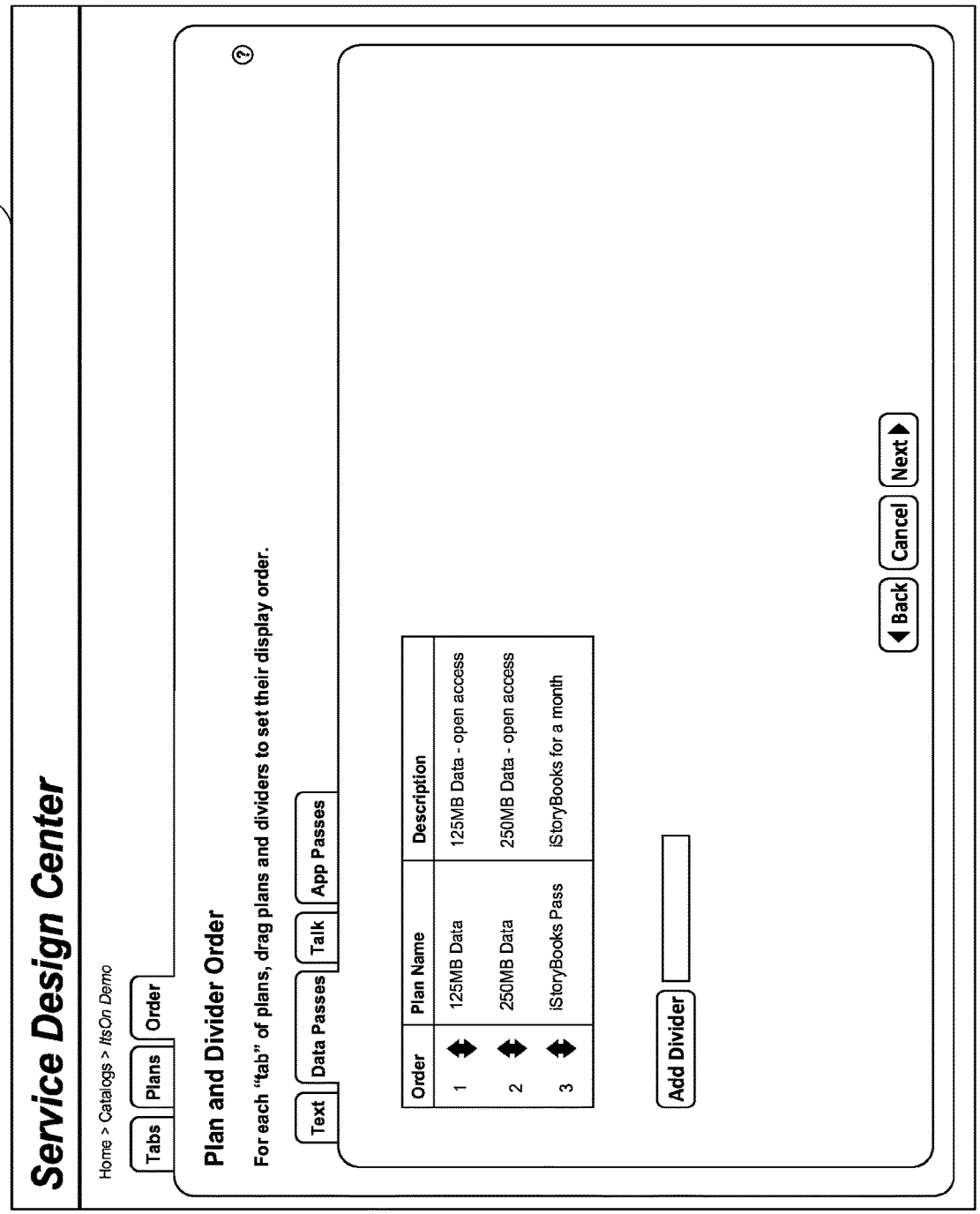
Figure 54:
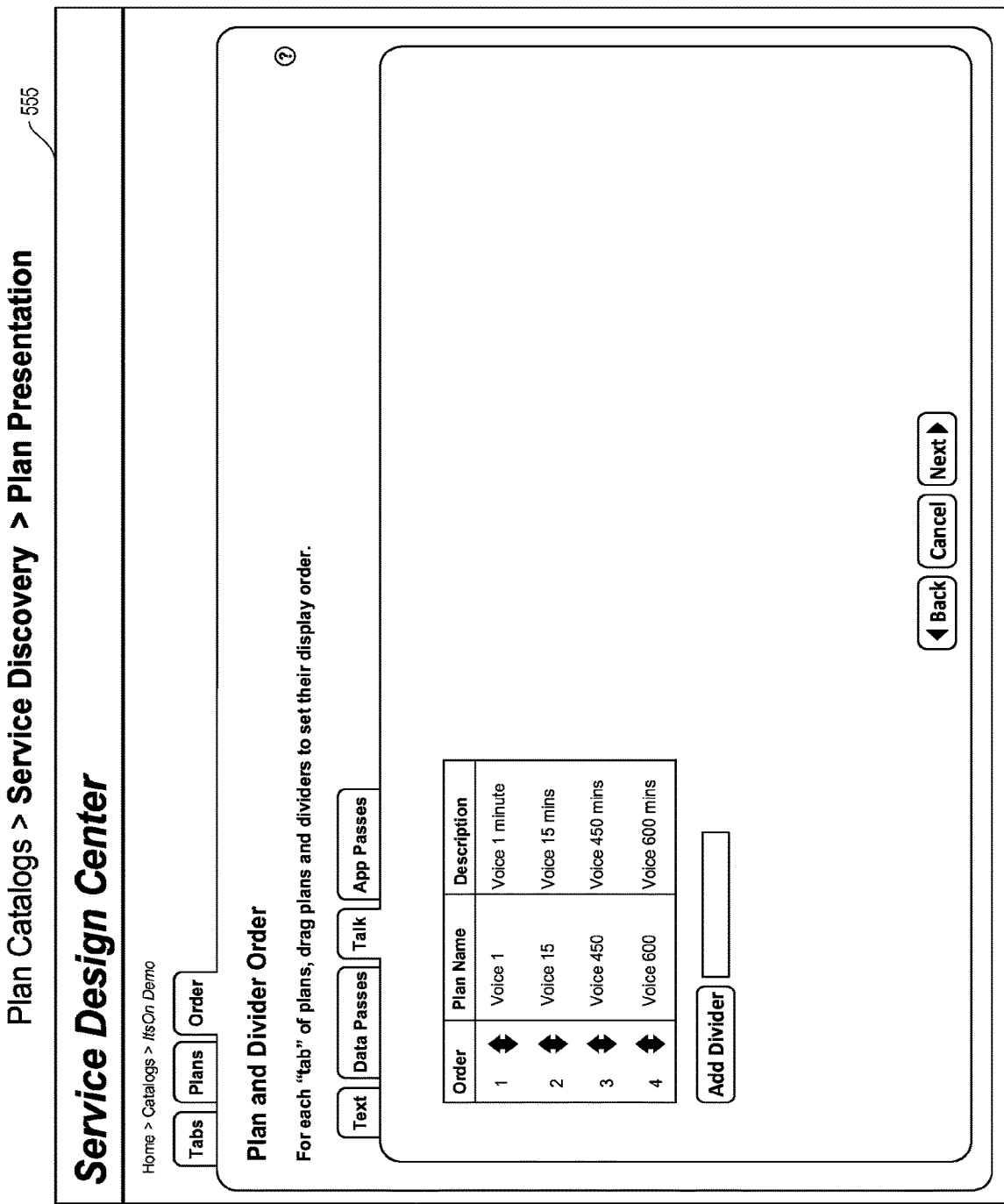
Figure 64:
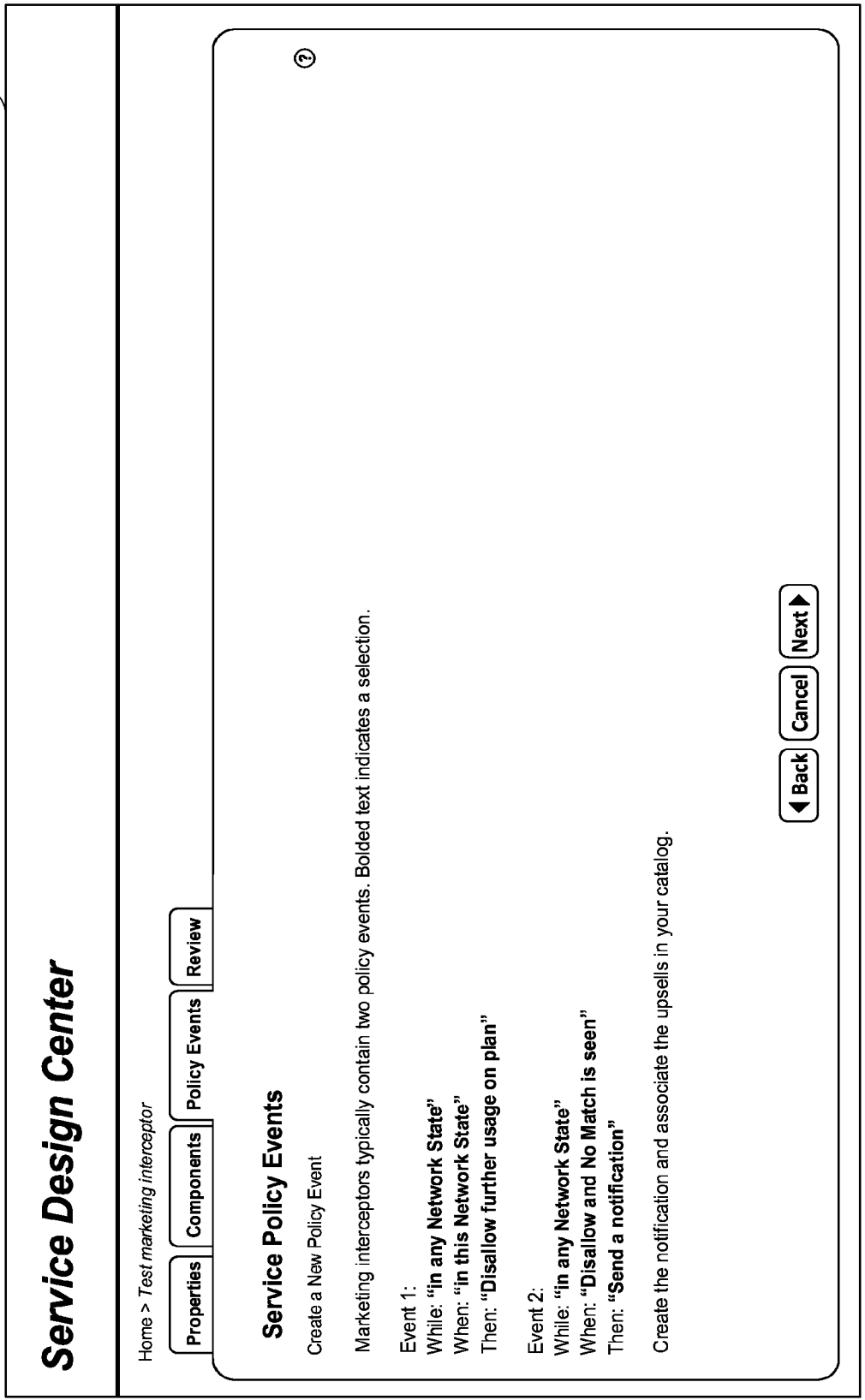

FIG. 52 illustrates an exemplary "Plan and Divider Order" 547 display reached by navigation input from the Plans in Each Tab display or other catalog-presentation design display. In the embodiment shown, the Plan and Divider Order display prompts the SDC user to select a plan-category tab (i.e., one of the tabs specified in the Catalog Tabs display) and, within that tab, to drag the listed plans up or down within the list to set their order of display within an end-user device. The SDC designer is also prompted to add a divider (e.g., a line, bar or other graphic that allows plans to be separated into subgroups within a given plan-category tab) by specifying a divider name, thus triggering the SDC to render the divider within the plan list as shown by the "Test divider." After adding a divider, the SDC user is prompted to drag the divider to a position between listed plans to establish its disposition in the display of the end-user device. FIGS. 53, 54 and 55 illustrates exemplary views (551, 555, 559) of the Plan and Divider Order display with respect to each of the other plan-category tabs shown (i.e., "Data Passes," "Talk," "App Passes").

FIG. 56 illustrates an exemplary "Featured Plans and Bundles" display 563 reached by navigation input within, for example, the Plans In Each Tab display of FIG. 51 (e.g., clicking a "Featured Plans list" text prompt). In the embodiment shown, the Featured Plans and Bundles display lists all plans and plan bundles within the catalog (e.g., showing the plan or bundle name, description, type and price) and prompts the SDC user to designate selected plans to appear in a "Featured" list of plans by selectively checking the checkbox adjacent each listed plan. In one embodiment, the featured plan list is a list of plans and/or bundles displayed within the end-user device upon end-user selection (i.e., clicking, pressing, etc.) of a "view plan catalog" icon. Accordingly, the SDC user is enabled to select a specific subset of the plans and/or bundles within a plan catalog to be promoted to an end-user on a sure-to-be viewed (i.e., high profile or otherwise more prominent than other) display of the end-user device.

FIG. 57 illustrates an exemplary "Interceptors" display 567 presented in response to navigation input (e.g., "next" button click) within the catalog presentation displays of FIGS. 50-55. As shown, the Interceptors display prompts the SDC user to specify (or edit the specification of) backstop "generic" interceptors that present lack-of-compatible-plan notifications in response to a service activity that yields no classification match—that is, no compatible plan has been activated and no marketing interceptor has been implemented in connection with the service activity. The Interceptors display also prompts the SDC user to create a new marketing interceptor or revise a previously designed marketing interceptor (e.g., by clicking within a list of previously designed marketing interceptors, not specifically shown in FIG. 57). As discussed below, marketing interceptors may be viewed as service policies that function to (i) detect (i.e., classify) end-user service requests for which no compatible plan has been activated; (ii) notify the end-user that no compatible plan has been activated in connection with the service request; and (iii) display an on-the-spot offer of one or more compatible plans that the end-user may activate (i.e., purchase in the case of a user-paid plan) to allow the requested service. Generic interceptor design is described below in reference to FIGS. 58-60, and marketing interceptor design, which is effectively a service policy design in the SDC embodiment shown in FIGS. 15-92, is described in reference to FIGS. 61-64.

FIG. 58 illustrates a tabbed "Notification Properties" display 571 presented in connection with generic interceptor design and thus in response to navigation input within the Interceptors display (e.g., clicking an edit button associated with a generic interceptor). As shown, the Notification Properties display prompts the SDC user to enter a notification name and description, specify the manner in which the notification is to be rendered within an end-user device (i.e., on foreground only, background only, or as an audible notification only) and specify whether the notification result (i.e., user-input provided in response to the notification) is to be sent to a notification server (e.g., a push server, or other notification result destination). The SDC user is also prompted to control the end-user experience with respect to the notification, for example, by limiting the number of times the notification is to be rendered on an end-user device, and/or enabling the end-user to suppress the notification (e.g., from within a preferences menu or in response to an initial display of the notification itself).

FIG. 59 illustrates an exemplary "Message Properties" display 575 presented in response to navigation input within the Notification Properties display and thus as a further aspect of generic interceptor design. In the embodiment shown, the Message Properties display prompts the SDC user to provide text for each of a number of message fields, including a message title, subtitle, short text (e.g., to be recorded in an abbreviated log of messages that may be maintained on the end-user device) and long text. As the SDC user enters these message characteristics, the title, subtitle and long text of the message are displayed in a mock handset on the SDC user interface as shown at 576, thus enabling the SDC user to view the notification message as it will be perceived by a user of an end-user device. As shown, the SDC user is prompted to enter each message characteristic in each of multiple languages/dialects, a sampling of which are shown.

FIG. 60 illustrates an exemplary "Button Properties" display 579 presented in response to navigation input within the Message Properties display (or tab selection from the Notification Properties display) as another aspect of generic interceptor design. In the embodiment shown, the Button Properties display prompts the SDC user to click any of a number of check boxes (580) that enable respective buttons to be presented with the notification message on the display of an end-user device and that may be clicked or otherwise interacted with by the end-user to trigger a particular action. As shown, the SDC user is prompted to specify the text to be included in each enabled button in one or more languages/dialects, and also to specify which button is to have the initial focus (i.e., be the default button" when the notification is presented. The SDC user is also prompted to check a "Display Upsell Plans" button to enable specific plans to be advertised/offered for end-user purchase in an upsell notification. As with the Message Properties display of FIG. 59, a mock-up of an end-user device may be presented to the SDC user to enable the SDC user to view the organization of the enabled buttons as they will appear on the end-user device.

FIGS. 61-65 illustrate a tabbed set of service policy definition displays presented in connection with marketing interceptor design and thus in response to navigation input within the Interceptors display of FIG. 57 (e.g., clicking the "new" marketing interceptor button). As shown, the exemplary "Service Policy Properties" display 583, "Service Policy Components" display 587, "Component Properties" display 591, "Service Policy Events" display 595 and "Service Policy Review" display 599 of FIGS. 61-65, respectively, prompt the SDC user to define a marketing interceptor service policy and constituent components and policy events generally as described above in reference to FIGS. 29-47. As explained within the Service Policy Events display (FIG. 64), a marketing interceptor may be implemented as a multiple-policy-event service policy, having a first policy event that yields a "disallow further usage on plan" control policy and a second policy event that defines a notification to be sent in the event of a "disallow and no match is seen" policy state. Through this dual policy event definition, the service policy underlying a marketing interceptor is able to detect lack of compatible plan in connection with one or more classification events and responsively present notifications to the end-device user. From a service design perspective, marketing interceptors enable discovery of available service plans by detecting designer-specified service requests for which there is no compatible plan, and offering/upselling one or more service plans for purchase (or other activation) by the end-user to accommodate the otherwise non-permitted service request.

FIG. 66 illustrates a pair of exemplary promotional banner displays 603 and 605 that enable the SDC user to configure promotional banners to be displayed within the end-user device in connection with constituent plans and bundles of a plan catalog. In the implementation shown, for example, the SDC user is prompted to select or create promotional banners to appear on the introductory view of the plan catalog, for instance, above the tabs for different categories of plans. In one embodiment, as the end-user progresses from one tab to the next (e.g., from voice, to messaging, to data to app passes), a different promotional banner is presented on the display of the end-user device. Additionally, if the end-user selects a plan (or bundle) for purchase or sponsored activation, an associated promotional banner, as specified by the SDC user, may be displayed on the plan's (or bundle's) "buy" page.

Referring specifically to the "Promo Banners" display 603, the SDC user may also select a plan from language-specific lists of plans (thus enabling specification of language-specific banners in connection with a given plan), and may control the order in which the banners within a given list are presented. Using this feature, the SDC user may define the order in which promotional banners scroll across the end-user device. Additionally, the SDC user may specify the frequency with which a given banner is presented during a single rotation of the banner list (e.g., once every cycle through the list, twice per cycle through the list, etc.). The exemplary "Promo Banner" display 605 shown in FIG. 66 is presented in response to navigation input to Promo Banners display 603 and prompts the user to define the promotional banner and its association with a selected plan or bundle. More specifically, Promo Banner display 605 prompts the SDC user to specify a locale and/or language for the banner (thus enabling promo banners to be organized in the language-specific list shown in Promo Banners display 603), a promotional image, the name of the plan or bundle to be linked or associated with the promotional banner, and an activation date and deactivation date of the promotional banner. The banner activation and deactivation dates control when the end-user device is to start and stop showing the banner. For example, if an advertiser pays for a one-week promotional banner display, the SDC user may specify appropriate banner activation and deactivation dates to show the banner for one week. The SDC user is prompted to conclude the promotional banner definition by clicking a "Save" button, which triggers the SDC to record the promotional banner definition and list the newly created or revised promotional banner in Promo Banners display 603.

FIG. 67 illustrates an exemplary "Promo Popups" display 607 that prompts the SDC user to define general and targeted promotional popups, the former to be sent to every subscriber associated with a given plan catalog (in this case the "ItsOn Demo" catalog), and the latter to be sent to a designer-specified list of subscribers (i.e., all or fewer than all the catalog-associated subscribers). In the particular embodiment shown, the Promo Popups display includes text prompts to invite the SDC user to define new promo popups (general or targeted), and also lists all previously defined general and targeted promotions together with prompts inviting the SDC user to edit or delete a given promotional popup.

FIGS. 68-72 illustrate a tabbed set of promotional popup design displays presented in response to navigation input within the Promo Popups display of FIG. 67 (e.g., clicking either of the "New General Promo Popup" or "New Targeted Promo Popup" text prompts or clicking the "Edit" icon associated with a pre-existing promotional popup). In the exemplary "Promotion Schedule" display 611 shown in FIG. 68, the SDC user is prompted to specify the presentation frequency, time of day, and initial date of the promotional popup under design. Upon clicking a next button, a "Notifications" display is presented as shown in FIG. 68, prompting the SDC user to create a new notification or to copy a notification from a listed set of notification templates as shown at 613. In the case of a new notification, the SDC user is prompted to specify properties of the notification message, including the message itself. When a template notification is copied, the SDC user is prompted to revise the copied notification as desired, including editing or completely rewriting the notification message. Thus, the template establishes a starting point—once copied, the SDC user can modify it as needed (and then optionally save the modified version as a new template).

Figure 70:
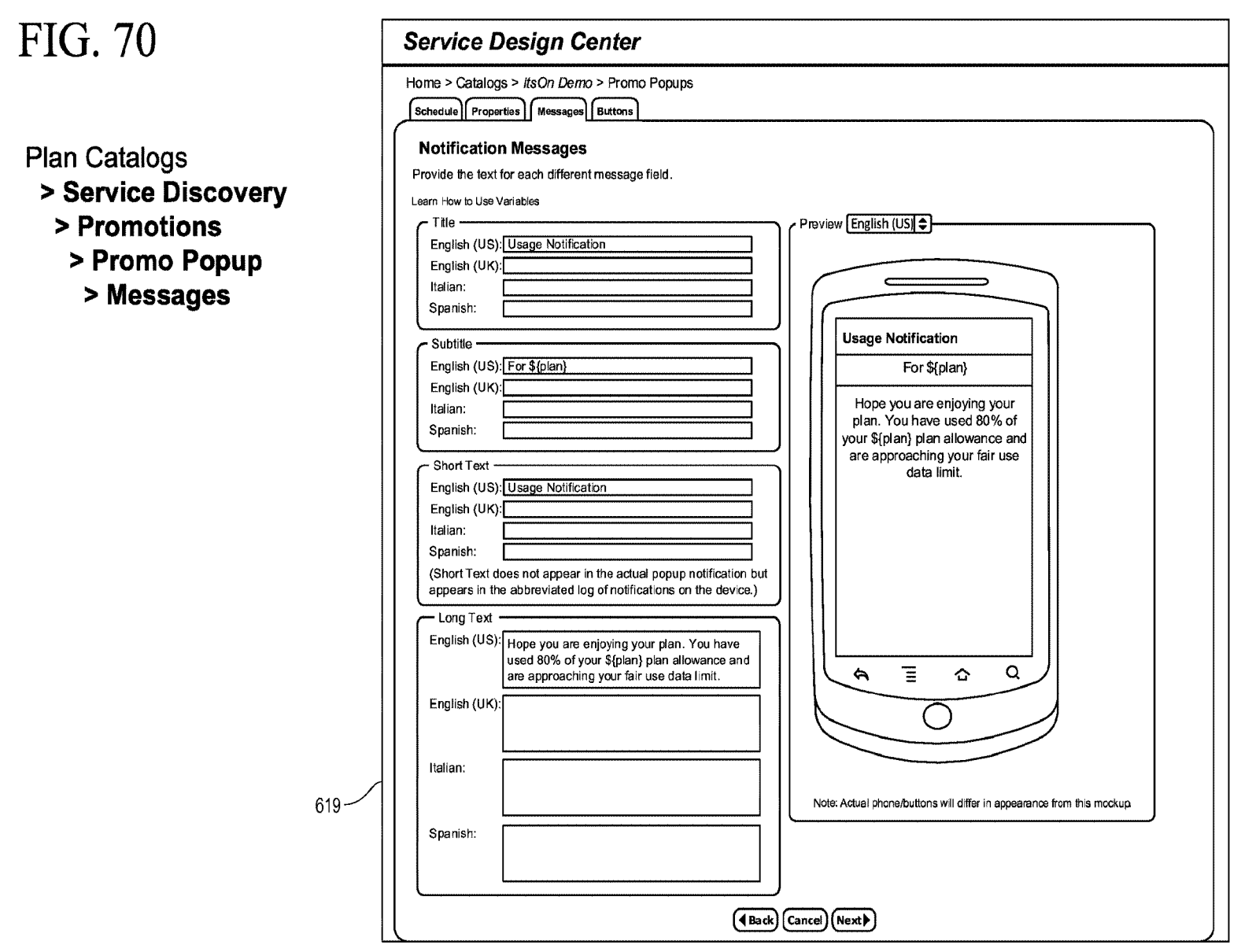

Continuing through the tabbed promotional popup design displays, FIG. 69 illustrates an exemplary Notification Properties display 615 that prompts the SDC user to specify the notification name, description, rendering manner, user interaction, and whether to send the notification result to a notification server, all generally as described above in reference to the Notification Properties display of FIG. 59 (i.e., in connection with interceptors). FIG. 70 illustrates an exemplary "Notification Messages" display 619 that prompts the SDC user to enter text within a number of message fields, including a message title, message subtitle, short notification message and long notification message, each in a number of language-specific fields (English (US), English (UK), Italian and Spanish are shown in the particular SDC configuration shown, but any language may be accommodated in alternative configurations). As the SDC user fills in the message fields, the entered text is displayed both within the entry fields and also in a preview or mockup of an end-user device, thus permitting the SDC user to organize the message text fields in view of the end-user experience, in effect, providing immediate feedback as to the manner in which the notification message will be perceived by the end-user.

FIGS. 71 and 72 illustrate upper and lower portions (623, 627) of an exemplary "Notification Buttons" display which enables the SDC user to specify buttons to be presented in connection with the promotional popup (i.e., together with the notification message) while previewing the button layout within a mockup of an end-user device. In the embodiment shown, the Notifications Buttons display prompts the SDC user to:

- check a "Display Upsell Plans" checkbox to indicate that specific plans are to be advertised for purchase in connection with the notification (i.e., whether the notification is presented in an "upsell");
- specify buttons that are to be presented within the end-user device in connection with the notification (and in the preview), together with actions triggered in response to button click (or press);
- for each button to be presented within the end-user device, specify text labels (in one or more of various languages) to be displayed within the button outline in the end-user device and preview; and
- specify which of the buttons to be presented within the end-user device is to reflect the default choice (i.e., have initial focus—shown to be the "Cancel" button in this example).

In the embodiment shown in FIGS. 71 and 72, buttons selected by the SDC user in the button actions selection panel are displayed in the end-user device mockup in a predetermined configuration, as they will appear in the end-user device. In alternative embodiments, the SDC user may be prompted to drag the buttons to desired locations within the mockup to effect button placement within the UI display of the end-user device. As shown, the SDC user may select the button language to be presented in the mockup, enabling confirmation that the button layout appears in accordance with design in each desired language.

FIG. 73 illustrates an exemplary "Upsells" display 631 that enables the SDC user to view various discovered-service definitions and ensure that each offers at least one service plan or bundle (i.e., upsell) in connection with an end-user notification. In the embodiment shown, for example, the SDC user is prompted to add or edit upsells associated with promotional popups, generic interceptors, marketing interceptors, and policy event notifications, listing the extant discovered service definitions within each category and the number of plan/bundle offers associated with each.

FIG. 74 illustrates an exemplary "Configure Upsell" display 635 presented in response to navigation input within the "Upsells" display of FIG. 73. That is, when the SDC user clicks the "Edit" text prompt associated with the "data" type generic interceptor, the Configure Upsell display is presented as shown in FIG. 74 to enable the SDC user to choose plans and bundles to be offered in connection with the "Data LCP2" generic interceptor. As shown, a list of selectable plans and bundles (e.g., all plans and bundles in the catalog in one embodiment) is presented within a scrollable window, with each plan/bundle being identified by display icon, name, description and price and having an associated checkbox to enable its selection. The three selected plans/bundles are displayed within a "Display Order" window as shown, together with an invitation/prompt to the SDC user to drag any of the listed plans (or bundles) within the Display Order window (e.g., by clicking and dragging the double-ended arrow icon associated with a given plan) to a different position within the list and thereby change the order in which the listed plans are presented in the upsell (i.e., in the notification specified in connection with the generic interceptor in this example).

FIG. 75 illustrates another exemplary "Configure Upsell" display 639 presented when the SDC user clicks the "Edit" text prompt associated with the "100% Facebook Usage" policy event. Again, the SDC user is prompted to choose plans and/or bundles to be offered in connection with a user notification; in this case, a policy event notification indicating that a Facebook plan has been completely consumed. In one embodiment, after at least two plans have been selected in the Configure Upsell display, the Display Order window shown in FIG. 73 is presented. Hence, the Display Order window is not presented within the Configure Upsell display shown in FIG. 75 as no plans have yet been selected.

SDC User Interface: Template Design Objects

Figure 76:
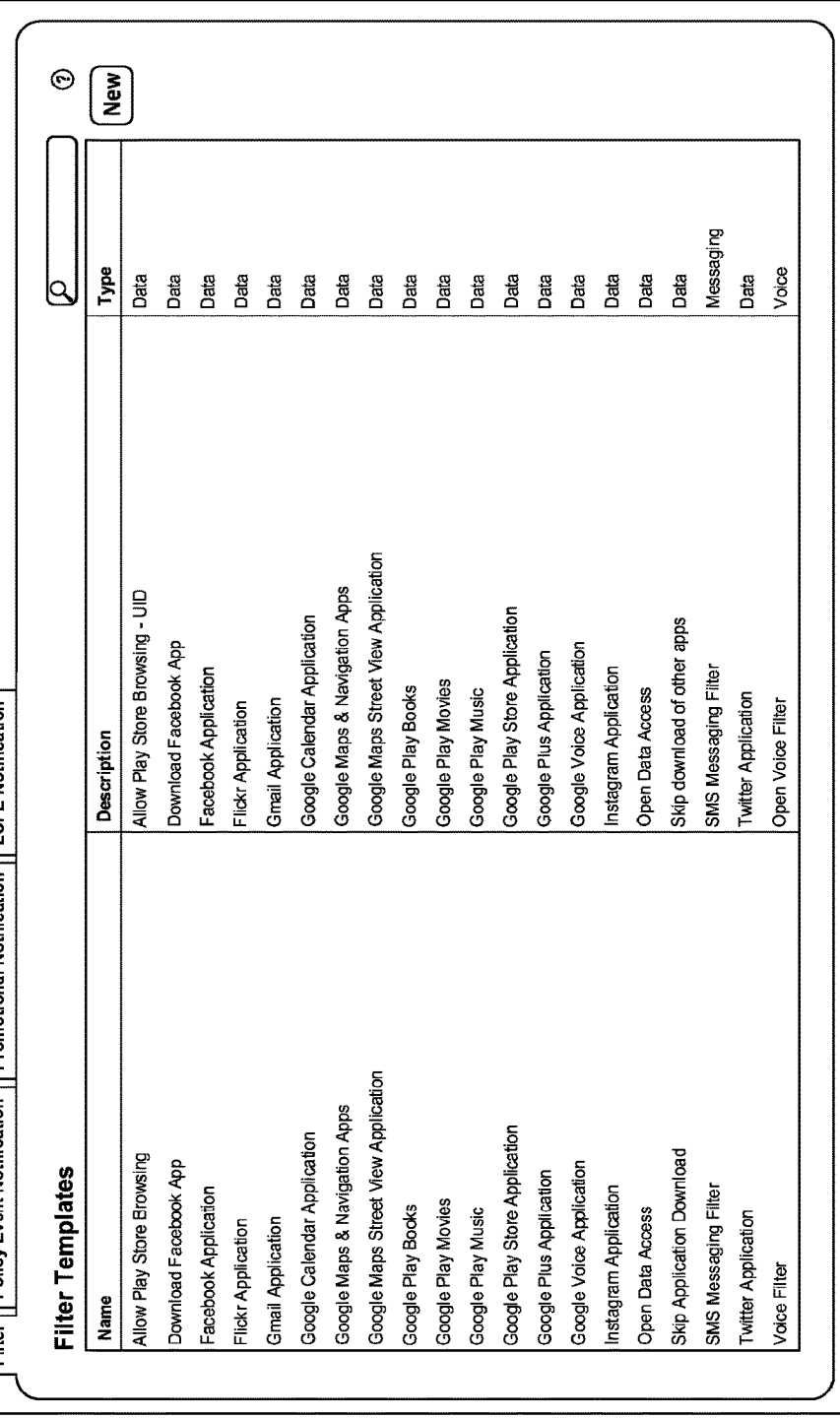

FIGS. 76-79 illustrate design-object templates that may be selected within other service design displays, enabling a design object, once created and saved as a template, to be reapplied or cloned (i.e., copied) in numerous subsequent designs. The result is a more efficient, less error prone service design process, as any debugging and testing effort expended to qualify a given template object is leveraged in each subsequent deployment or cloning of that object. Referring first to FIG. 76, which depicts an exemplary "Filter Templates" display 643, the SDC user is prompted to select a filter design to be inspected or edited from a list of filter templates. The user is also prompted to create a new filter template (i.e., by clicking the "New" button on the right-hand side of the filter list).

FIG. 77 illustrates an exemplary "Policy Event Templates" display 647 containing a list of policy event notifications and corresponding button configurations. Again, the SDC user is prompted to select any of the template notifications/button-configurations for editing and also to generate new template objects to be included within the policy event template list. FIG. 78 similarly depicts an exemplary "Promotion Templates" display 651 containing a list of promotional notifications and corresponding button configurations, prompting the SDC user to select any of the template notifications/button-configurations for editing or inspection and to generate a new template object to be included within the list of templates. FIG. 79 illustrates an exemplary list of notifications/button-configurations 655 that may be invoked during marketing interceptor design within an "LCPE Templates" display, again prompting the SDC user to select any of the template notifications/button-configuration for editing or inspection, or to create a new template object to be included within the list of templates. Though a specific set of template objects is shown in connection with the SDC embodiment of FIGS. 15-92, any other re-usable design object may be the subject of template creation in alternative embodiments, with corresponding template objects presented within shared or respective template object displays.

SDC User Interface: Carrier Policy Design

Figure 80:
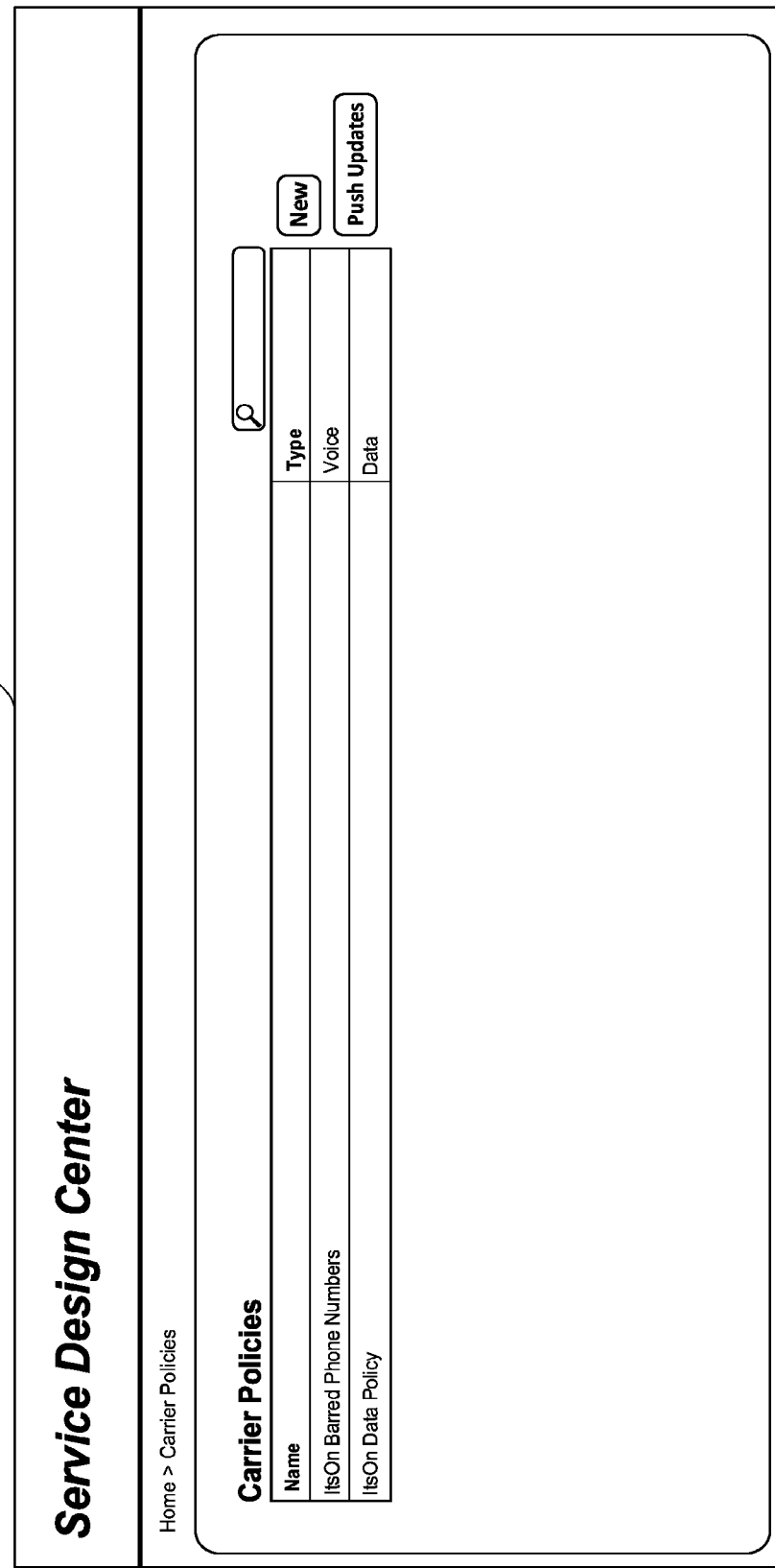
FIG. 80 illustrates an exemplary "Carrier Policies" display generated within a service design center embodiment to enable carrier policy definition.

FIG. 80 illustrates an exemplary "Carrier Policies" display 659 generated within a service design center embodiment to enable carrier policy definition. As shown, the SDC user is prompted to generate new carrier policies (clicking a "New" button), propagate updates within pre-existing plan catalogs and automatically update existing affected end-user devices (i.e., by clicking a "Push Updates" button), or to select listed carrier policies for editing or review by clicking on the name of the listed carrier policy. Carrier policies do not expire and lack an associated accounting policy in some embodiments, but may alternatively expire and/or include one or more accounting policies in other cases.

SDC User Interface: Subscriber Management

FIGS. 81-87 depict exemplary displays generated by a subscriber management engine within a service design center embodiment and that enable the SDC user (e.g., a "subscriber manager" which may also be a service designer) to configure and maintain groups of subscribers and associate individual subscriber groups with respective plan catalogs. While the depicted displays relate to organizations and management of subscribers and groups of subscribers, corresponding management of end-user devices and device groups may alternatively or additionally be provided for within the SDC, thus enabling the SDC user to design and allocate services according to whatever end-user division may best suit a given application or organization.

FIG. 81 illustrates an exemplary "Subscribers" display 663 that presents an overall list of subscribers for which services may be designed/managed using the service design center, the list being drawn, for example, from a subscriber database maintained within or accessible by the service design center. As shown, each listed subscriber is identified by a subscriber identifier (ID), phone number and nickname, though various other information may be collected for each subscriber and optionally presented within a different configuration of the list. The SDC user is prompted to add new subscribers by clicking a "New" button, and to edit the information associated with a listed subscriber by clicking on a text field for that subscriber within the list.

FIG. 82 illustrates an exemplary "Properties" display 667 presented in response to navigation input within the Subscribers display (i.e., clicking the "New" button or selecting a subscriber within the list). As shown, the Properties display prompts the SDC user to enter a subscriber record that includes an identifier, phone number, nickname, locale and/or language, and status for each subscriber in the SDC subscriber set (additional or alternative data entry fields may be presented in alternative embodiments), saving the subscriber record by clicking "Done" or saving and being prompted to enter another subscriber record by clicking "Save and New." In the example shown, the SDC user is prompted to complete the status entry by selecting one of a predetermined number of status values from a list including, without limitation, "active," "Fraud", "Inactive", "Suspended," and "Potential Fraud," thus enabling the SDC user to qualify subscribers for purposes of service design and provisioning. Various other status values may be ascribed to subscribers in alternative embodiments.

FIG. 83 illustrates an exemplary "Subscriber Groups" display 671 presented, for example, in response to navigation input from a home screen of the service design center (discussed below). As shown, the Subscriber Groups display presents a list of subscriber groups identified by group name and description, and prompts the SDC user to define a new subscriber group by clicking a "New" button or edit a previously defined subscriber group by clicking the subscriber group within the list, with either action bringing up a tabbed set of subscriber group management displays shown, for example, in FIGS. 84-87.

FIG. 84 illustrates an exemplary "Subscriber Group Properties" display 675 presented in response to navigation input from the Subscriber Groups display. As shown, the SDC user is prompted to enter (or edit) the subscriber group name and description that appear in the subscriber group list in FIG. 83.

FIG. 85 illustrates an exemplary "Subscriber Group Assignments" display 679 presented in response to navigation input within the Subscriber Group Properties display (i.e., clicking a "Next" button or "Plan Catalog and Subscribers" tab) and that prompts the SDC user to assign subscriber groups to a selected plan catalog. More specifically, the Subscriber Group Assignments display prompts the user to select a plan catalog ("JOE Demo" has been selected in the depicted example as shown at 681) and then to drag subscribers from list of available subscribers to a list of chosen subscribers, the latter being thus assigned to (or associated with) the selected plan catalog. In the embodiment shown, subscribers are color-coded (or coded by shading) in the "Available Subscribers" list to identify for the SDC user, for example, subscribers that are not in any subscriber group, assigned to a different subscriber group or already chosen to be included in the subscriber group under definition. The SDC user is also prompted to search for a given subscriber by entering subscriber information (e.g., name, phone number, etc.) into a search field.

FIG. 86 illustrates an exemplary "Import Subscribers into Subscriber Group" 683 display 683 presented in response to navigation input from within other subscriber group management displays. As shown, Import display 683 guides the SDC user in importing subscribers into a subscriber group from a spreadsheet (e.g., a comma-separated-value (CSV) file in this example, though various other data organization formats may be used) or other database. More specifically, the Import display presents a sample organization of the information to be imported (prompting the user to obtain additional information regarding the field requirements by clicking a "What are the field requirements?" text prompt), expresses the file type format (again, CSV in this example) and prompts the SDC user to choose and upload the file of subscriber information. Various other options may be presented in connection with the subscriber import function including, for example, whether to duplicate, overwrite or skip imported subscriber information that conflicts with a pre-existing subscriber. A list of imported subscribers (i.e., consequence of file import) similar to that shown in FIG. 85 for "Available Subscribers," may also be presented, thus permitting the SDC user to selectively associate imported subscribers with a given plan catalog. Non-selected imported subscribers may be left in a "not in any subscriber group" state, but still included within the overall collection of subscribers managed within the service design center (i.e., as listed in FIG. 81).

FIG. 87 illustrates an exemplary "Subscriber Group Review" display 687 presented in response to navigation input from within other subscriber group management displays and which prompts the SDC user to update the device configuration with respect to the subscribers within the newly defined (or revised) subscriber group. That is, within the SDC, there are options (including those described above) to define various operating parameters within the end-user device. When the SDC user clicks the "Update Device Configuration" button, the SDC sends messages to all end-user devices in the subject group instructing/inviting those devices to retrieve the updated configuration data (e.g., polling interval, bootstrap server name, etc.)

SDC User Interface: Reporting and Analytics

FIG. 88 illustrates an exemplary "Available Reports" display 691 presented in response to navigation input from the SDC home screen. As shown, the SDC user is prompted to assess the popularity of applications and domains in connection with managed subscribers (or in general), and thus gain insight that may be applied in service design. The SDC user is additionally prompted to view per-subscriber acknowledgments and SDC client acknowledgments, for example, with respect to end-user license agreements. Examples include, without limitation, plan purchase popularity, plan usage statistics, most active destinations (e.g., domains), plan profitability (e.g., plan cost divided by [cost/usage increment*average usage in a plan]), overall subscriber usage (e.g., voice, text, data), subscriber purchase trends, subscriber usage trends, subscriber group usage and purchase trends, most used applications, average application usage per subscriber, and so forth.

SDC User Interface: Service Design/Subscriber Management Sandbox

Figure 90:
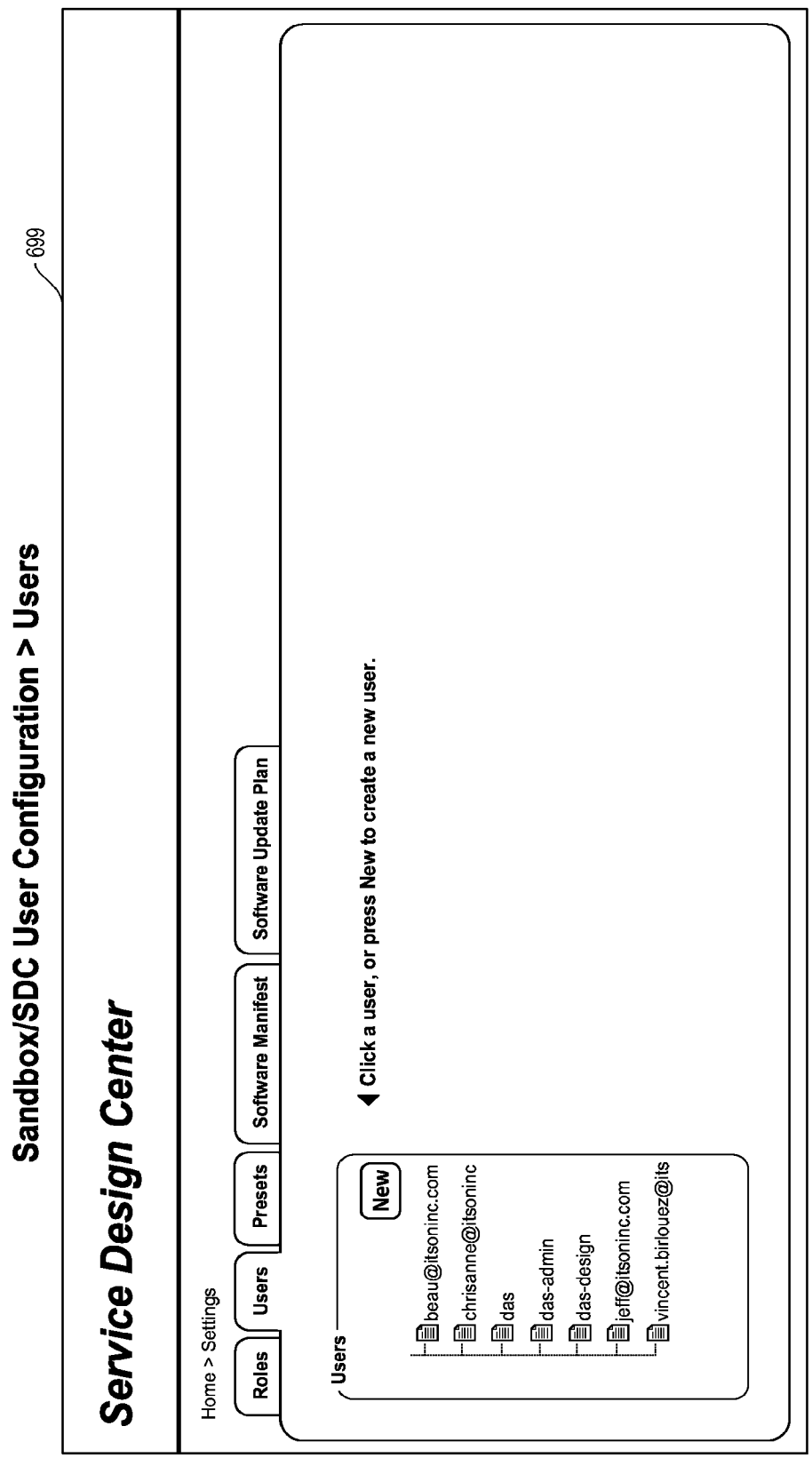

FIGS. 89-91 illustrate exemplary SDC user configuration displays that enable an SDC administrator (a special class of SDC user, e.g., a "super-user") to allocate design/management responsibilities within the service design center to service designers and/or subscriber managers, in effect, creating design/management sandboxes or portals for credentialed individuals as discussed above in reference to FIGS. 2 and 10.

In the exemplary "Roles" display 695 of FIG. 89, the SDC administrator is prompted to select a previously defined role from a list or define a new role with regard to service design and/or subscriber management (i.e., by clicking the listed role or clicking a "New" button, respectively). In the case of a new role definition (i.e., button click on "New"), the SDC administrator is prompted to enter the role name and then select one or more permissions to be granted to a user in the newly defined role. In the embodiment shown, permissions are presented in a list according to permitted function or permission title (the latter implying a level of functional permissions), with a checkbox adjacent each listed permission to permit its selection. In alternative embodiments, lists may be organized hierarchically according to design and management roles (e.g., listing service design permissions and subscriber management permissions under respective headings) and may have any practical granularity in terms of permissions provided. For example, with respect to service design permissions, SDC users assigned a catalog design role may be granted permissions needed to create or modify plan catalogs (or a circumscribed set of plan catalogs), but denied permission to define or modify underlying service-design objects, like plans, service policies, policy components, filters, etc. Conversely, users in a policy specialist role may be granted permissions needed to create and modify lower-level service-design objects (e.g., service policies, policy components, filters etc.), but denied permission to modify plan-level or catalog-level definitions. The policy specialist role may be further confined to template generation, thus enabling a user to be tasked with generation of low-level template objects which may then be applied in service plans and bundles by higher-level policy designers.

Still referring to FIG. 89, the Roles display additionally prompts the administrator to assign users to pre-defined roles, in this example by selecting a user identifier within an "Available Users" list (i.e., clicking on the user ID to highlight the user), and then clicking an arrow button to transfer the user identifier to a list of "Users in Role," thus assigning the identified user to the role selected within the "Roles" subpanel. As explained by instructions presented beneath the "Available Users" and "Users in Role" lists, users may be individually transferred from one list to the other by double-clicking the user identifier, highlighting one or more user identifiers and clicking '>' or '<' buttons to move the users to the opposite list, or moving all users from one list to the other by clicking '>>' or '<<' buttons.

FIG. 90 illustrates an exemplary "Users" display 699 that prompts the SDC administrator to edit and add user profiles, with each user listed, in the example shown, by a user identifier. FIG. 91 illustrates an exemplary "User Profile" display 703 presented in response to navigation input from the Users display (i.e., clicking the "New" user button, or clicking a user ID within the user list). As shown, the User Profile display prompts the SDC administrator (or the listed user if given permission to access his or her own profile) to enter the user's first name and last name and to enter or change the user's password. One or more roles assigned to the user are also presented.

SDC User Interface: Home Screen

FIG. 92 illustrates an exemplary service designer home screen 707 that presents navigation icons organized in relation to the plan design, subscriber management and SDC administrative functions described in reference to FIGS. 15-91. Thus, from within a "Plan Design" icon set, the SDC user may navigate to displays relating to service policy design, catalog design, template design and carrier policies by clicking correspondingly-named navigation icons. Note that displays relating to other aspects of service design (e.g., filters, plans, discovery management, etc.) may be reached by corresponding home-screen icons in alternative embodiments, or by navigation from within one of the "first tier" displays reached by navigation input within the home screen. Similarly, first-tier subscriber management displays relating to subscribers and subscriber groups and first-tier administrative displays relating to reports, settings and user profile may be reached directly via the home screen, with subordinate displays reached from within the first tier displays. In one embodiment, the home screen additionally presents a "Recent Activity" list, showing service design activities and subscriber management activities organized by the nature of the design activity (e.g., catalog, plan, service policy, component, filter, policy event, service-discovery) or management activity (e.g., subscriber definition, subscriber group definition, roles/permissions, etc.) as well as the ID of the SDC user that performed the listed activity and the date performed.

Additional Considerations, Features, and Embodiments

FIGS. 93-104 illustrate, additional considerations, features and embodiments of a service design center, including embodiments having many or all of the features and characteristics described above in reference to FIGS. 1-92.

Figure 93:
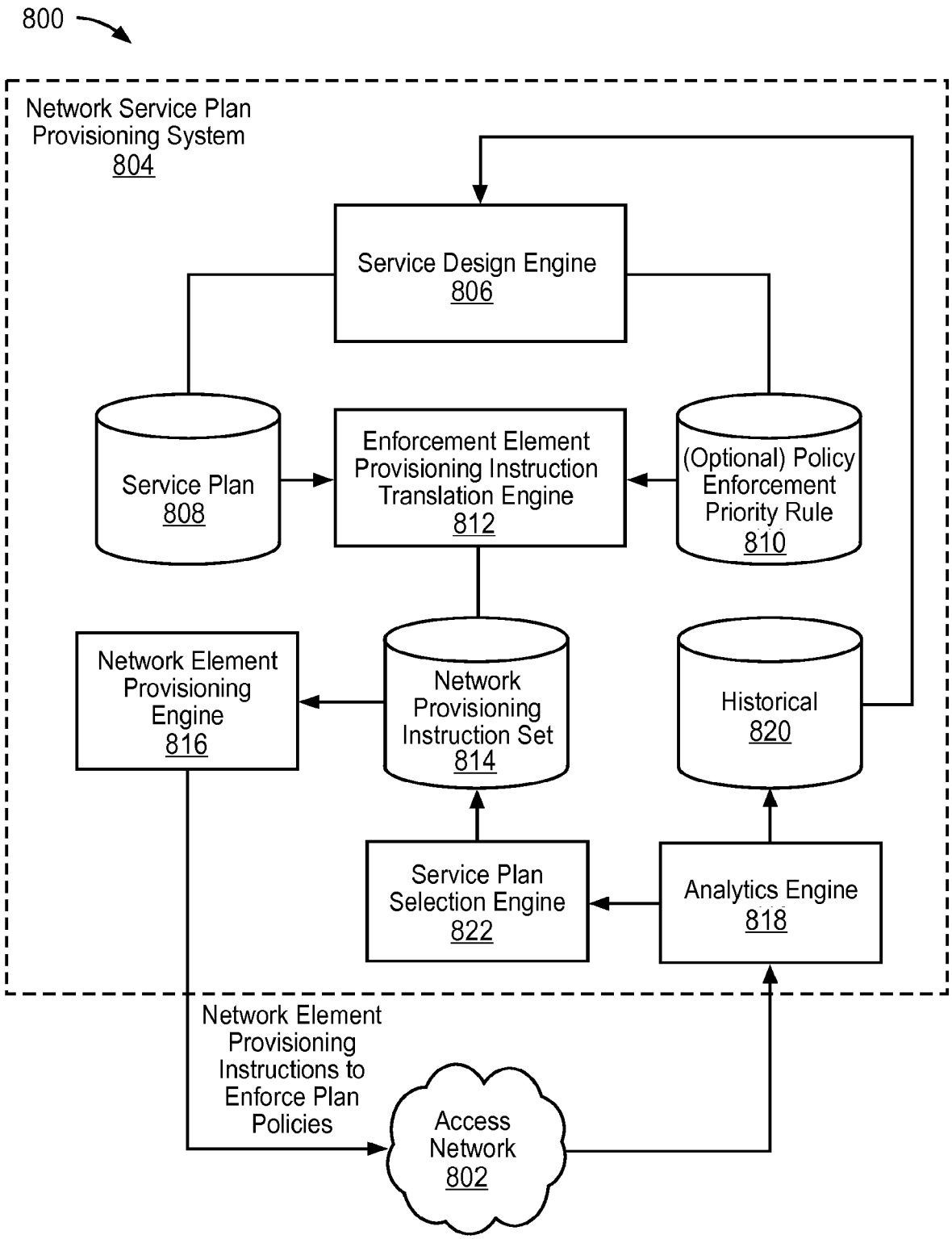
FIG. 93 depicts an example of a system including an access network and a network service plan provisioning system.

FIG. 93 depicts an example of a system 800 including an access network 802 and a network service plan provisioning system 804. In the example of FIG. 93, the access network 802 receives network element provisioning instructions to enforce plan policies from the network service plan provisioning system 804. In a specific implementation, the network service plan provisioning system 804 can receive service plan selection data from the access network, and provide new instructions based upon the selection.

The access network 802 can include a network that can provide network services to a device. The access network 802 can include a wireless network (e.g., WiFi, cellular, or some other wireless technology) and/or a wired network (e.g., LAN or DSL). Wireless or wired devices can be referred to as "on" the access network 802 when the devices complete relevant association, authentication, and/or other procedures that enable to devices to obtain the services offered on the access network 802 in accordance with applicable known or convenient techniques. Advantageously, the devices can have inter-network policies that are provided by the network service plan provisioning system 804 in accordance with techniques described in this paper. Inter-network policies, as the term is used in this paper, refer to traffic control, charging, and notification policies that remain in effect after a device passes from one network to another (e.g., by roaming). Intra-network policies, on the other hand, refer to control traffic control limited to the boundaries of a network (e.g., in-network traffic control, charging, and/or notification policies, plus an optional traffic control policy that permits or prevents roaming to another network).

It is likely that it will be desirable to couple the access network 802 to another network. Networks can include enterprise private networks and virtual private networks (collectively, private networks), which are well known to those of skill in computer networks. As the name suggests, private networks are under the control of an entity rather than being open to the public. Private networks include a head office and optional regional offices (collectively, offices). Many offices enable remote users to connect to the private network offices via some other network, such as the Internet, a public switched telephone network (PSTN), or the like. As used in this paper, a private network is intended to mean a network that is under the control of a single entity or hierarchy of entities. This is typically the case for cellular networks, wireless infrastructure networks, company LANs and WANs, and the like.

In the example of FIG. 93, the access network 802 and the network service plan provisioning system 804 may or may not be on the same private network, or a first entity may own or control a portion of the access network 802 and a second entity may own or control a portion of the access network 802 as well as the network service plan provisioning system 804. For example, a carrier may include the network service plan provisioning system 804, but the access network 802 may include a WiFi network owned by a local business entity. Advantageously, in a specific implementation, the carrier can continue to provide policy control while a subscriber is on the access network 802. Where the access network 802 includes a cellular network of the carrier in this example, even greater policy control may be possible.

It should be noted that a subscriber can be defined broadly to include any applicable device on the access network 802. For example, the access network 802 could include parking meter devices, food-dispensing machines, and automobile onboard computers, as well as smart phones and other devices frequently used by humans.

In the example of FIG. 93, the network service plan provisioning system 804 includes a service design engine 806, a service plan datastore 808, an optional policy enforcement priority rule datastore 810, an enforcement element provisioning instruction translation engine 812, a network provisioning instruction set 814, a network element provisioning engine 816, and analytics engine 818, a historical datastore 820 and a service plan selection engine 822.

The service design engine 806 inputs service plan data structures and other related data that is described later in more detail into the service plan datastore 808. Engines, as described in this paper, refer to computer-readable media coupled to a processor. The computer-readable media have data, including executable files, that the processor can use to transform the data and create new data. An engine can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Datastores, as described in this paper, can be implemented, for example, as software embodied in a physical computer-readable medium on a general- or specific-purpose machine, in firmware, in hardware, in a combination thereof, or in an applicable known or convenient device or system. Datastores in this paper are intended to include any applicable organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

The service plan datastore 808 can store service plan data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In an example of a system where the service plan datastore 808 is implemented as a database, a database management system (DBMS) can be used to manage the service plan datastore 808. In such a case, the DBMS may be thought of as part of the service plan datastore 808 or as part of the service design engine 806 and/or the enforcement element provisioning instruction translation engine 812, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In a specific implementation, the service design engine 806 inputs policy enforcement priority rule data structures in the policy enforcement priority rule datastore 810. An aspect of policy control described in this paper entails the superposition of a first traffic classification filter of a service plan over a second traffic classification filter of the service plan. There is more than one way to accomplish this superposition including, for example, ordering the first and second traffic classification filter such that the first traffic classification filter is applied to a traffic event before the second traffic classification filter, trapping a match of the first traffic classification filter in a kernel until the second traffic classification filter is matched (then applying a first relevant action of an action list), or applying an explicit policy enforcement priority rule. Because implicit policy enforcement priorities can be used, the policy enforcement priority rule datastore 810 is optional. It should be noted that explicit policy enforcement priorities can be mandated in accordance with implementation- and/or configuration-specific parameters or a combination of implicit and explicit policy enforcement priorities can be used. In a specific implementation, explicit priorities trump implicit priorities (e.g., ordering).

In the example of FIG. 93, the enforcement element provisioning instruction translation engine 812 converts service plan data structures in the service plan datastore 808 into respective network provisioning instruction set data structures, which are stored in the network provisioning instruction set datastore 814. The translation engine 812 can also convert the relevant policy enforcement priority rule data structures from the policy enforcement priority rule datastore 810, if applicable, for inclusion in the network provisioning instruction set data structures.

In the example of FIG. 93, the network element provisioning engine 816 provides network element provisioning instructions to enforce plan policies to the access network 802. The network element provisioning instructions are applicable to one or more devices that may or may not currently be on the access network 802. In a specific implementation, the network element provisioning instructions are sent to the access network 802 only when the applicable one or more devices are on the access network 802.

In the example of FIG. 93, the analytics engine 818 receives data from the access network 802, which can include subscriber feedback or instructions. For the purposes of this example, the data is presumed to include service plan selection data, which is used by the service plan selection engine 822. The analytics engine 818 can modify the data in a manner that is useful to the network service plan provisioning system 804, which can include triggering actions based upon feedback or instructions from the access network 802. The data can be stored in the historical datastore 820, which can be used by the service design engine 806. For example, the service design engine 806 can specify whether more or less data should be requested from the device (e.g., based upon network state), determine whether to reduce counts or other notifications, specify parameters that are to be recorded within classifications, or the like.

Network state can be associated with a network busy state (or, conversely, a network availability state). A network availability state can include, for example, a state or measure of availability/capacity of a segment of a network (e.g., a last edge element of a wireless network). A network busy state can include, for example, a state or measure of the network usage level or network congestion of a segment of a network (e.g., a last edge element of a wireless network). In some embodiments, network availability state and network busy state are inverse measures. As used herein with respect to certain embodiments, network availability state and network busy state can be used interchangeably based on, for example, a design choice (e.g., designing to assign background policies based on a network busy state or a network availability state yields similar results, but they are different ways to characterize the network performance and/or capacity and/or congestion). In some embodiments, network availability state and network busy state are dynamic measures as such states change based on network usage activities (e.g., based on a time of day, availability/capacity level, congestion level, and/or performance level). In some embodiments, differential network service usage control of a network service usage activity is based on a network busy state or network availability state. In a specific implementation, there are four levels of network busy state (not busy, light, medium, critical).

In the example of FIG. 93, the service plan selection engine 822 receives service plan selection data from the analytics engine 818. The service plan selection data can be from a device on the access network 802, originate from the access network 802, or a combination thereof. In a specific implementation, the service plan selection data is entered at a device by a user and forwarded to the service plan selection engine 822 through the access network 802.

Upon receipt of the service plan selection data, the service plan selection engine 822 can, if appropriate, select a new network provisioning instruction set in the network provisioning instruction set 814 for provisioning to the access network 802 in the manner described previously. (The service plan selection engine 822 may or may not be capable of triggering the service design engine 806 to modify a service plan, which is translated into a network provisioning instruction set for selection by the service plan selection engine 822.)

Figure 94:
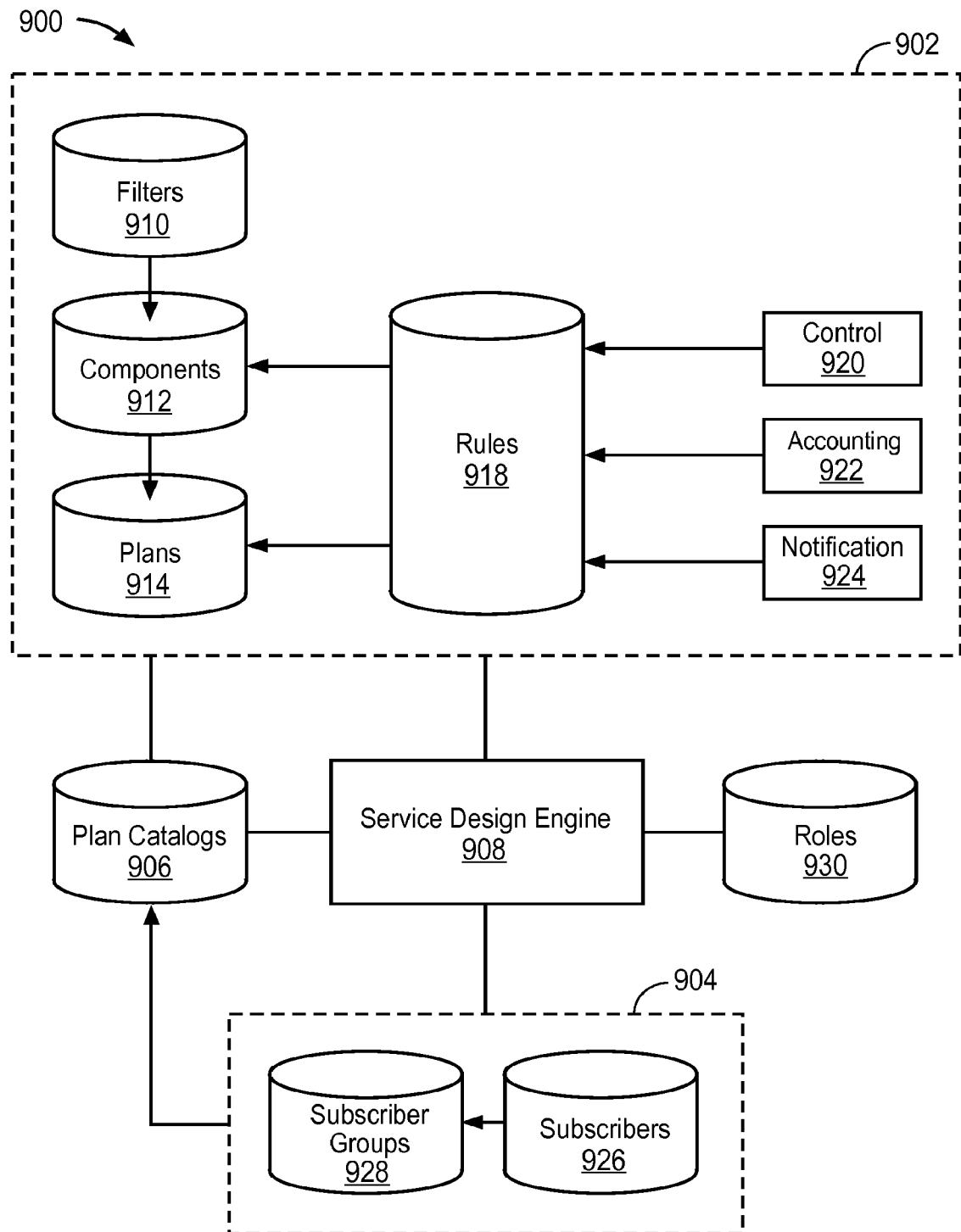
FIG. 94 depicts a conceptual diagram of an example of a hierarchical structure useful for understanding service plan design and provisioning.

FIG. 94 depicts a conceptual diagram 900 of an example of a hierarchical structure useful for understanding service plan design and provisioning. The conceptual diagram 900 includes a collection of datastores associated with service plans 902, a collection of datastores associated with subscribers 904, a plan catalogs datastore 906, and a service design engine 908.

The collection of datastores 902 includes a filters datastore 910, a components datastore 912, a plans datastore 914, a rules datastore 918, a traffic control rule data structure 920, a charging data structure 922, and a notification data structure 924. The filters datastore 910 can include, for example, traffic control filter data structures that, when used, allow, block, throttle, delay (for a fixed period of time), and defer (until an event) a matched traffic event. Aspects of a traffic event to which a filter is mapped can include, for example, by remote destination, by application, by content (e.g., generic content such as streaming, specific content identifiable using regular expressions, etc.), by protocol, by port, by target operating system, to name several. In the context of service design, it has proven convenient to offer designers filter packages that combine a traffic control filter with an action. Such actions can include notify (which triggers a notification to be sent to a notification destination), cap (which increments a count), trap (which traps a match at the kernel level to see if another filter is matched later), and instructions (which can result in some other instruction to be executed).

The components datastore 912 can include, for example, a set of filter packages, including at least one filter, and a set of policies. Because components can inherit policy, it is not an explicit requirement that a component include at least one policy. However, when a component is assembled in a service plan offering, the component will have either a policy in the set of policies or will inherit a policy.

The plans datastore 914 can include, for example, a hierarchy of components. The components are organized into classes, which can include, for example, carrier, network protection, application (paid or sponsored), interceptor (marketing interceptor or parental control), bulk, post-bulk, and end-of-life. It at least one implementation, the end-of-life class is handled by a default, rather than a component that is stored in the components datastore 912.

The rules datastore 918 includes policy rules. For illustrative purposes, three policy type data structures are depicted as directed toward the rules datastore 918, traffic control policy data structure 920, charging policy data structure 922, and notification policy data structure 924. The traffic control policy data structure 920 can include a variety of filter packages designed to control the flow of traffic, such as allow or block, and take certain actions in association with the traffic control, such as cap-and-match. The charging policy data structure 922 can be directed to a user or a sponsor (who can subsidize network service usage) and can include a charging code.

The notification policy data structure 924 can be directed to a user, a sponsor, or an engine that takes further action in accordance with variables or constant parameters in the notification and can include content for use by the target of the notification and a trigger (e.g., a selectable button that results in the execution of relevant instructions). Notification types include plan limit thresholds (plan has reached a specified % of charging policy cap), plan cap limit (requested network activity has been capped because charging policy cap has been reached), plan limit overage (overage has reached a specified %; offer the option of overage, new service plan, block ongoing usage, etc.), plan expiration (plan expired; offer option to buy a new plan), activity block event (activity blocked by filter or activity state change), no capable plan (plan does not support the requested network activity, which has been blocked), marketing interceptor (specific message or offer based on current activity or status), promotional message (overview of what plan provides), upsell offer (upsell tiered plan based on current usage). Notification actions can be added to notifications to make them "actionable," which means that a recipient of the notification can provide feedback or instructions in response to the notification. Notification actions can include, for example, OK/dismiss, cancel, acknowledge, buy (links to buy workflow), more info (e.g., more information regarding why a traffic event was blocked, suggestions for traffic activity changes or service plan purchase), back (call a previous workflow screen), next (call a next workflow screen), launch (launch URL or application). Notification customizations can include foreground, background, foreground/background (display in foreground if activity is in foreground and in background otherwise), title, subtitle, text, icon, buttons/actions, "do not show again" (will not show again for a specified time), default target button (specifies a default response action), or the like.

The collection of datastores associated with subscribers 904 includes a subscribers datastore 926 and a subscriber groups datastore 928. The subscribers datastore 926 includes subscriber data structures that include information about subscribers. A minimalist subscriber data structure is likely to at least include a subscriber identification that is unique within the system 900 or universally, such as an International Mobile Subscriber Identity (IMSI). It may also be useful to include such information as a phone number, device type, and/or International Mobile Equipment Identity (IMEI).

The subscriber groups datastore 928 includes subscriber group data structures that include groupings of subscribers. The types of groupings that can be done in a system depends upon the amount of information that is known about subscribers. For example, subscribers can be grouped by device type, device characteristics, demographic characteristics of the subscriber, region, etc.

The plan catalogs datastore 906 includes plan catalog data structures that are available to consumers or providers of network service plans. The plan catalog data structures are combinations of components from the collection of datastores associated with service plans 902 and the collection of datastores associated with subscribers 904.

The service design engine 908 can manage the datastores depicted in the example of FIG. 94. Aspects of service design and/or provisioning can be assigned to agents of the system 900. The amount of control over the system that an agent is granted is based upon the role of the agent, which can be recorded in the roles datastore 930. Roles can be set to super user, portal admin, system admin, or some other role that is applicable to the capabilities of the design center (e.g., whether it is a carrier design center, or a sandbox for an enterprise, applications developer, community-based organization, gifting organization, Mobile Virtual Network Operator (MVNO), etc.) and the human agent who is using the system.

Screenshots of a user interface for a specific implementation of a service design engine, such as the service design engine 908, can be used to illustrate some of the functionality of the service design engine 908. FIGS. 95A-95Z, 96A, and 96B depict screenshots of a User Interface (UI) for a specific implementation of a service design system.

Figure 95A:
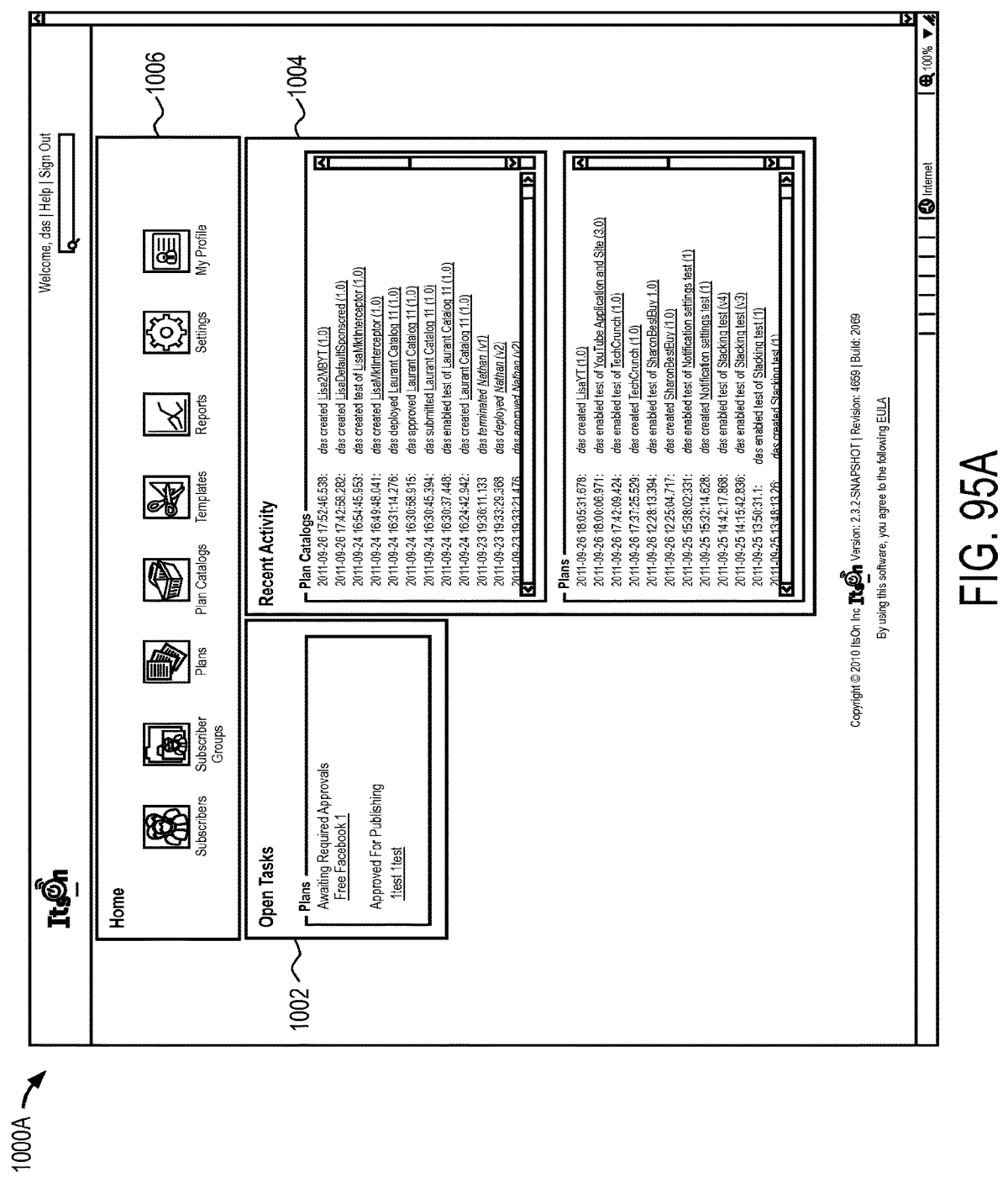
Figure 95B:
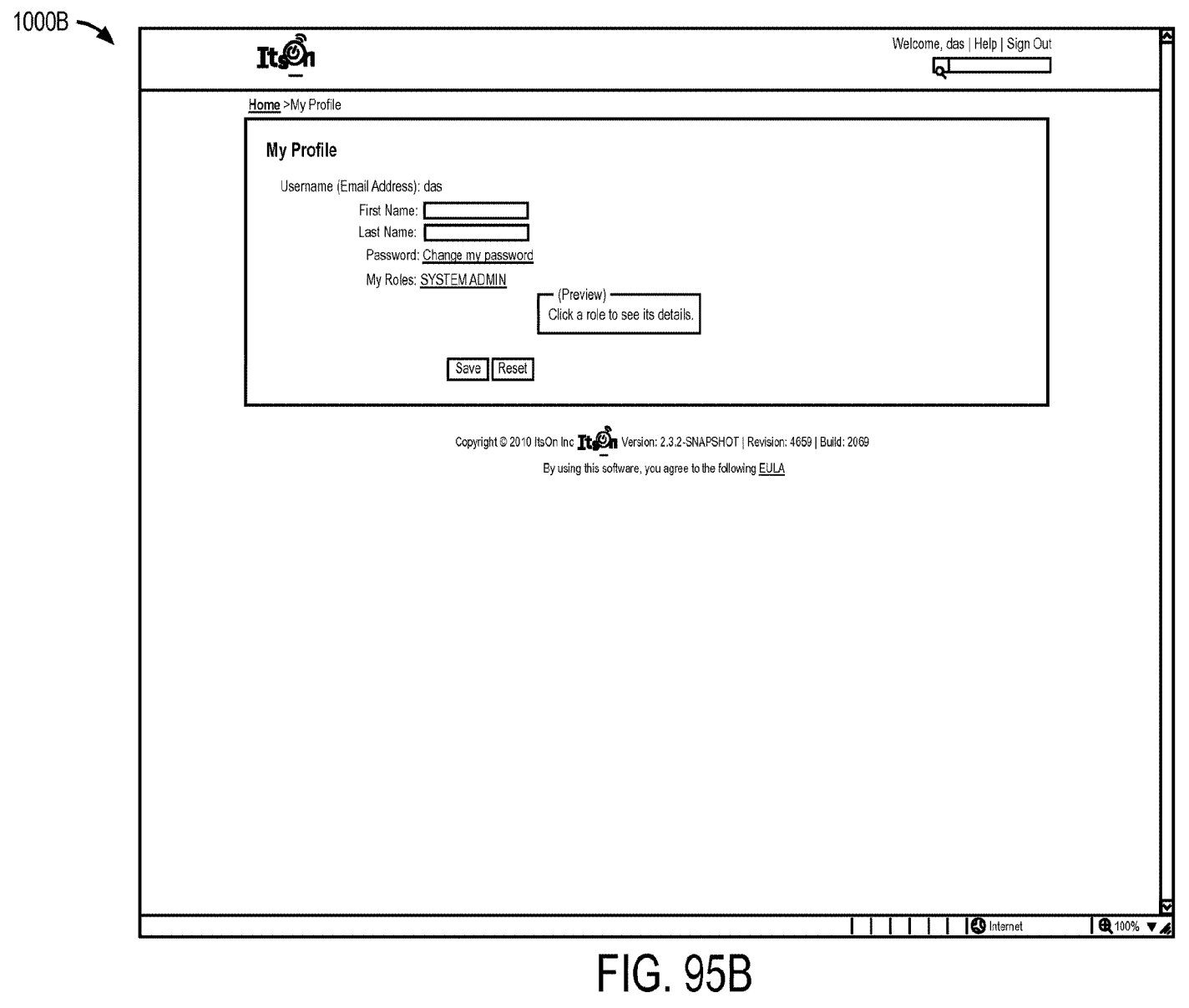

In the example of FIG. 95A, following login, a designer is directed to a service design center UI home page with an open tasks field 1002, a recent activity field 1004, and a menu buttons field 1006. The open tasks field 1002 can include drafts that are awaiting approval, beta tests that are awaiting publication/deployment, and deployed plans that are targeted for termination, or other open tasks. The recent activity field 1004 can include as much or as little information as is deemed useful to designers.

The menu buttons field 1006 includes eight buttons, a subscribers button, a subscriber group button, a plans button, a plan catalogs button, a templates button, a reports button, a settings button, and a my profile button. Selecting the my profile button brings a designer to screenshot 1000B (FIG. 95B), where the designer can enter information such as first name, last name, password, and role. Roles can be set to super user, portal admin, system admin, or some other role that is applicable to the capabilities of the design center (e.g., whether it is a carrier design center, or a sandbox for an enterprise, applications developer, community-based organization, gifting organization, Mobile Virtual Network Operator (MVNO), etc.) and the particular designer who is using the system.

Figure 95C:
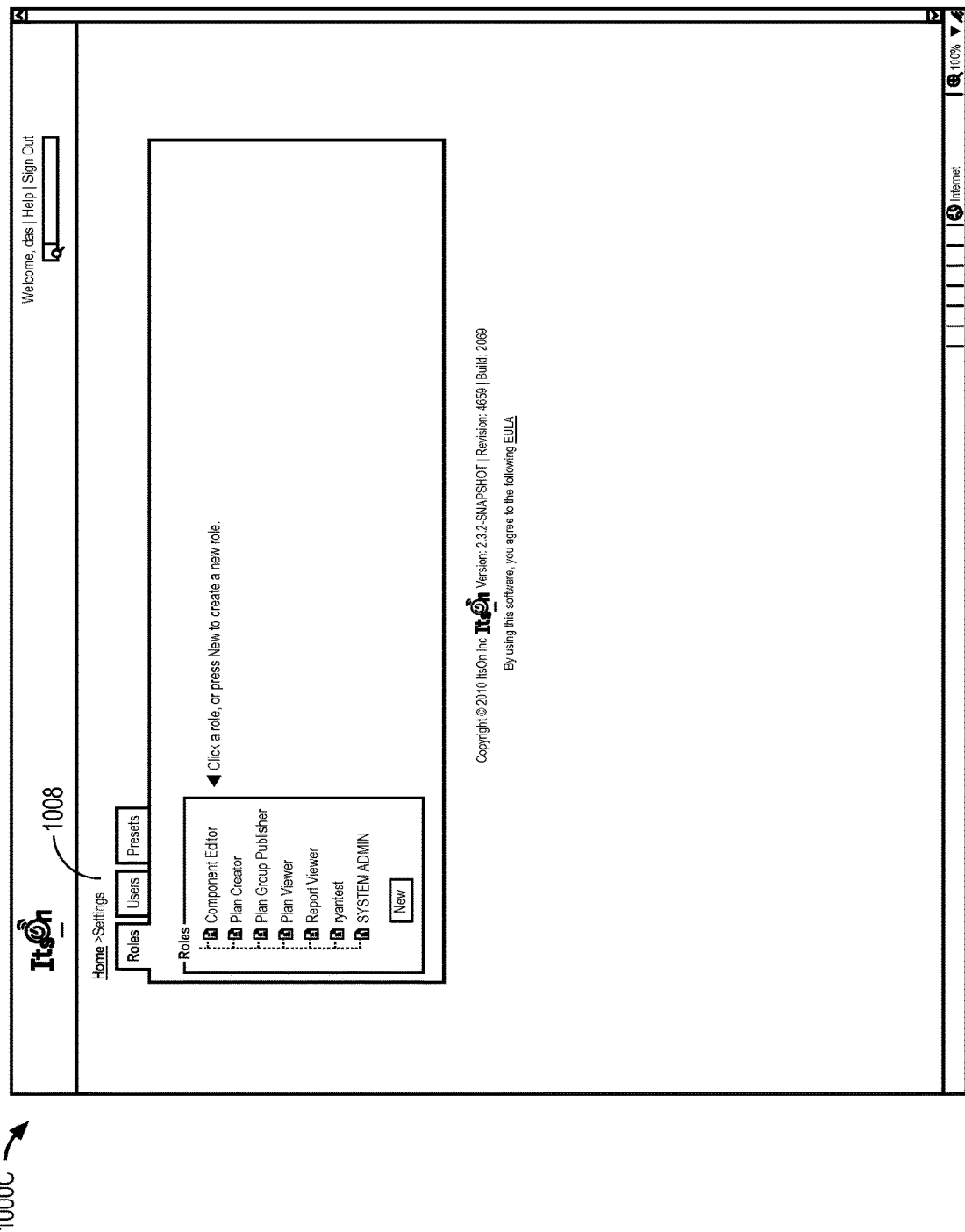
FIGS. 95A-95Z depict screenshots of a specific implementation of a service design system.
Figure 95D:
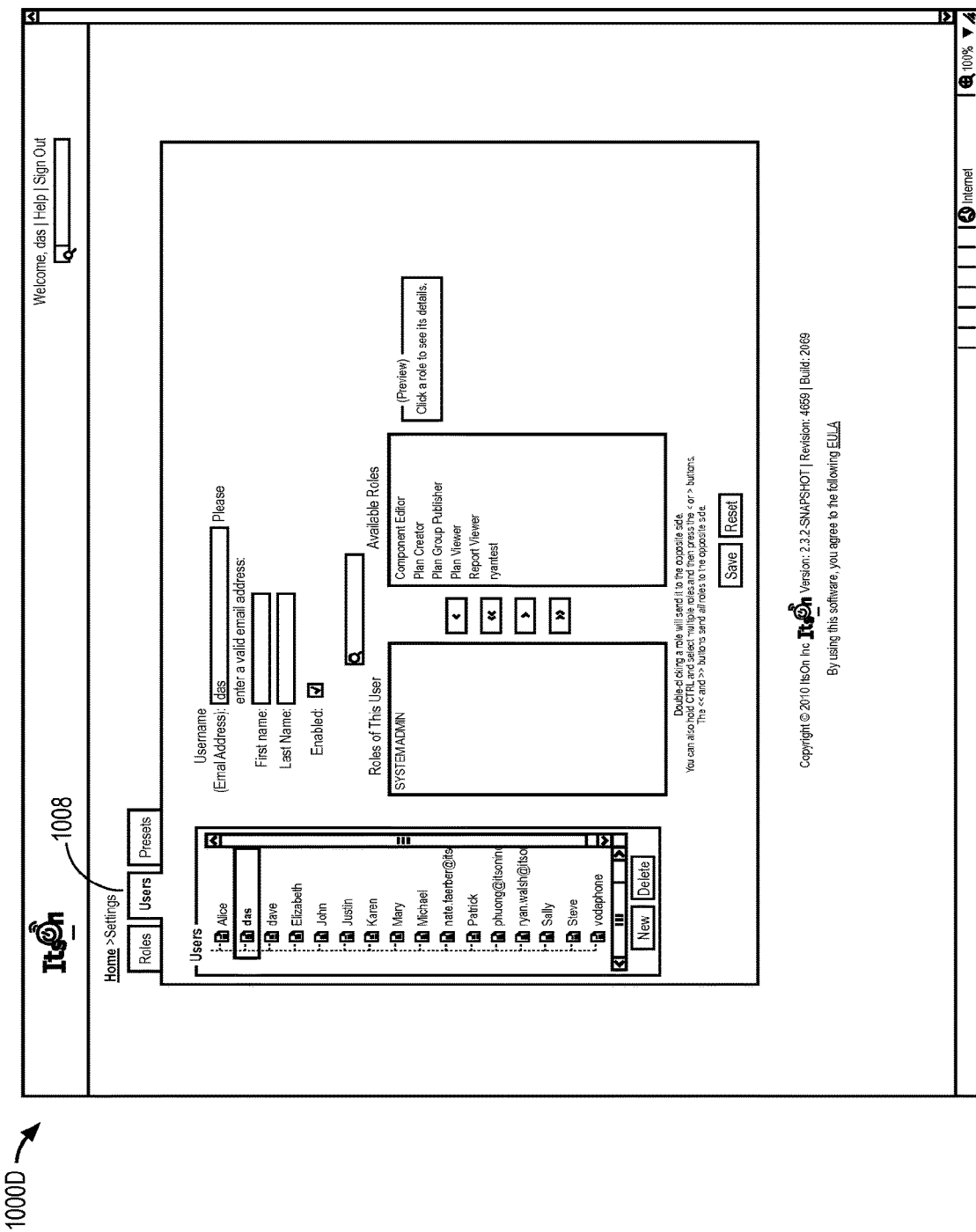
Figure 95E:
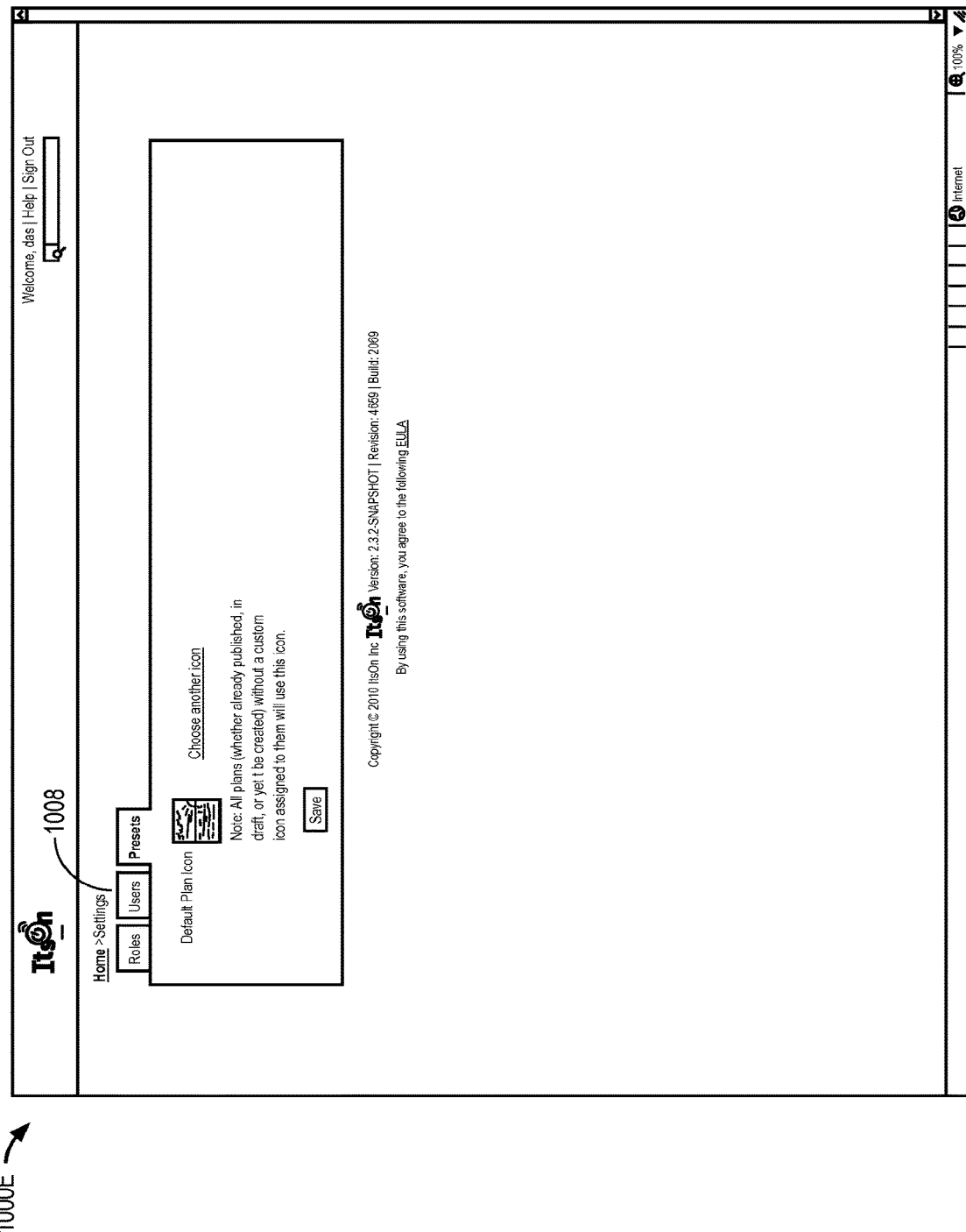
Figure 95F:
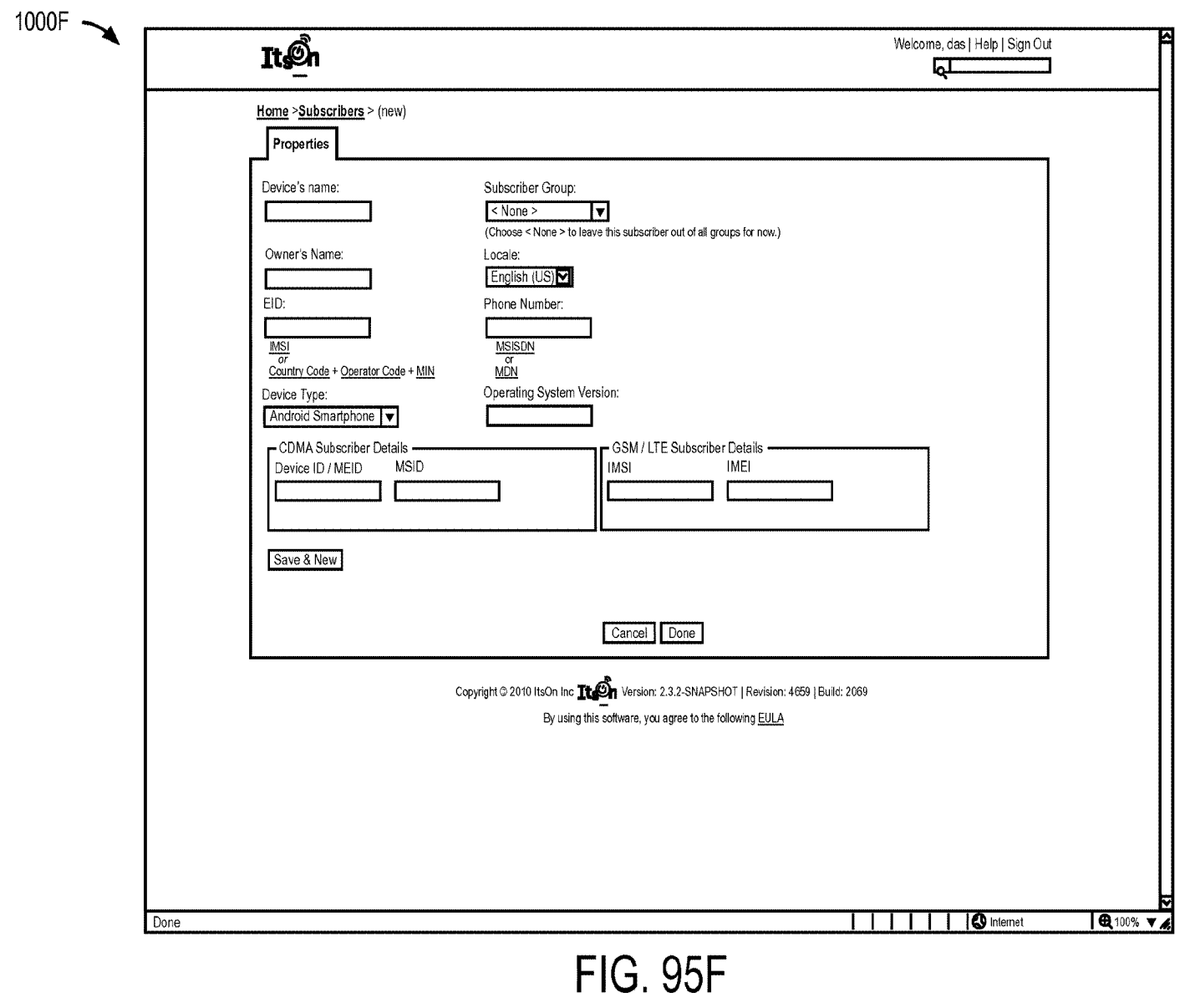
Figure 95H:
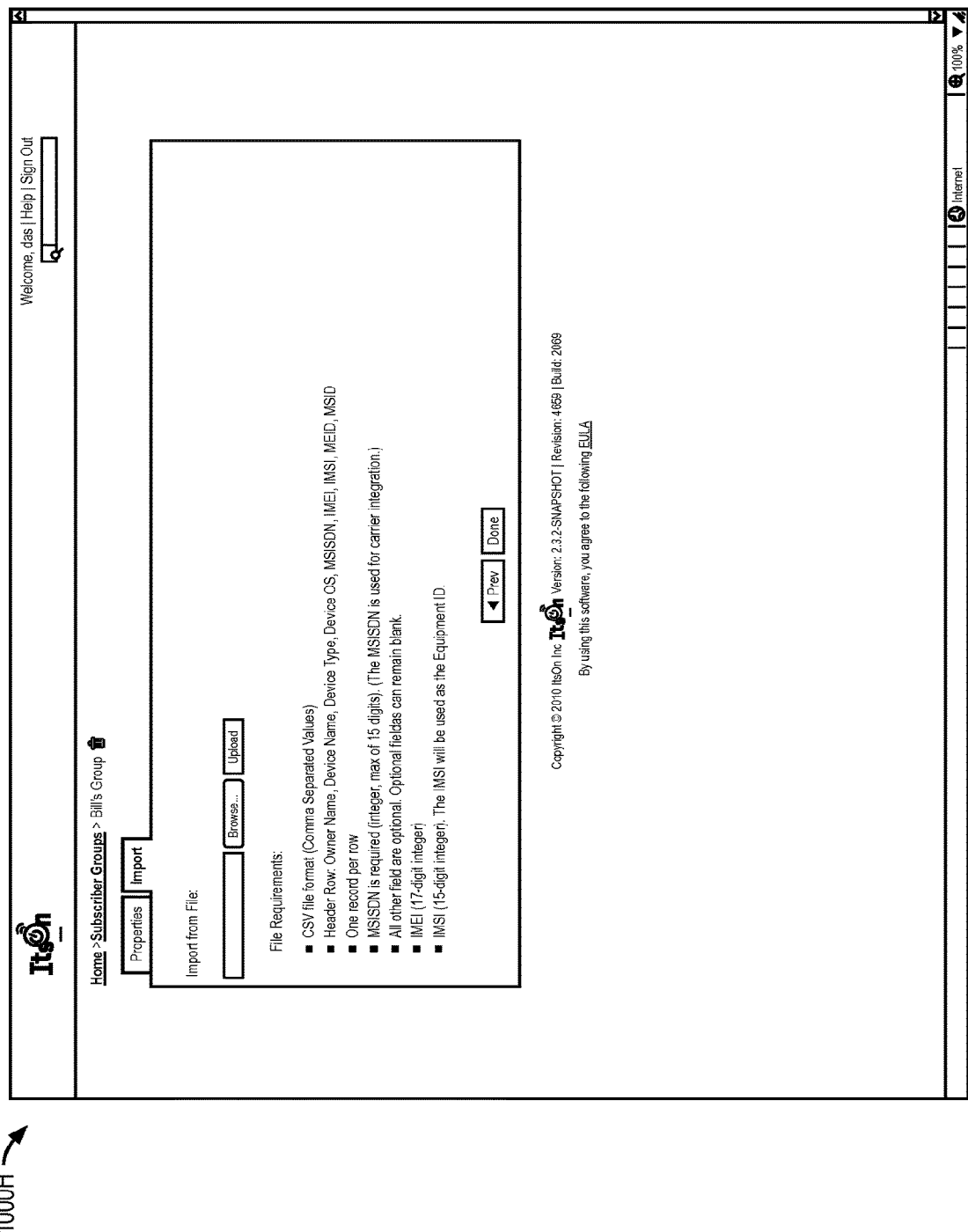

Selecting the settings button of the menu buttons field 1006 brings a designer to screenshot 1000C (FIG. 95C), where the designer can select a roles tab, a users tab, or a presets tab from a tabs menu 1008. Selecting the Roles tab from the tabs menu 1008 enables a designer to add roles, such as component editor, plan creator, plan group publisher, plan viewer, report viewer, and system admin. It may be noted that a designer will not necessarily be able to view all roles in this tab and, in a likely implementation, may be unable to create roles with rights the designer does not have (e.g., a system admin may have fewer rights than a super user and different rights than a portal admin). Selecting the Users tab from the tabs menu 1008 enables a designer to add and edit users. In the example of FIG. 95D (screenshot 1000D), the user das has been selected, and das' details, such as username (email address), first name, last name, whether the user is enabled, roles, and available roles are depicted. Selecting the Presets tab from the tabs menu 1008 enables a designer to choose a default plan icon as depicted in the example of FIG. 95E (screenshot 1000E).

Selecting the subscribers button of the menu buttons field 1006 and selecting a new subscriber brings a designer to screenshot 1000F (FIG. 95F). In this specific implementation, the subscriber information includes a device name, subscriber group, owner name, locale, EID, phone number, device type, operating system version, CDMA subscriber details, and GSM/LTE subscriber details. This information can also be edited for subscribers that are already in the subscribers datastore.

Selecting the subscriber groups button of the menu buttons field 1006 brings a designer to screenshot 1000G (FIG. 95G), where the designer can select a properties tab or an import tab. Choosing to create a new subscriber group prompts the designer to enter a group name and description, and to drag subscribers into the group. Selecting the import tab enables the designer to import subscribers from a subscribers datastore in a batch operation. See, e.g., FIG. 95H, screenshot 1000H. Information can also be edited for subscriber groups that are already in the subscriber groups datastore.

Figure 95I:
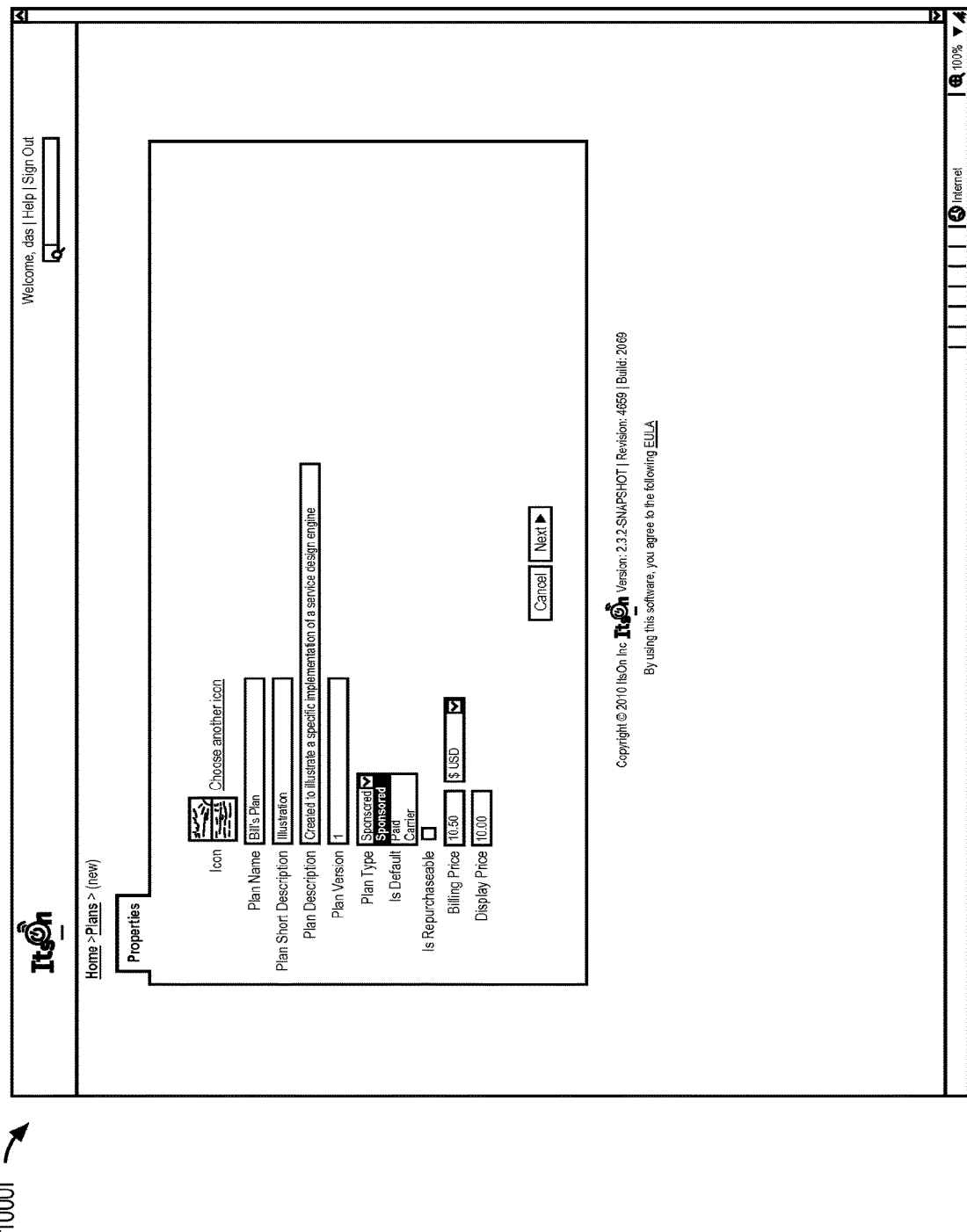
Figure 95J:
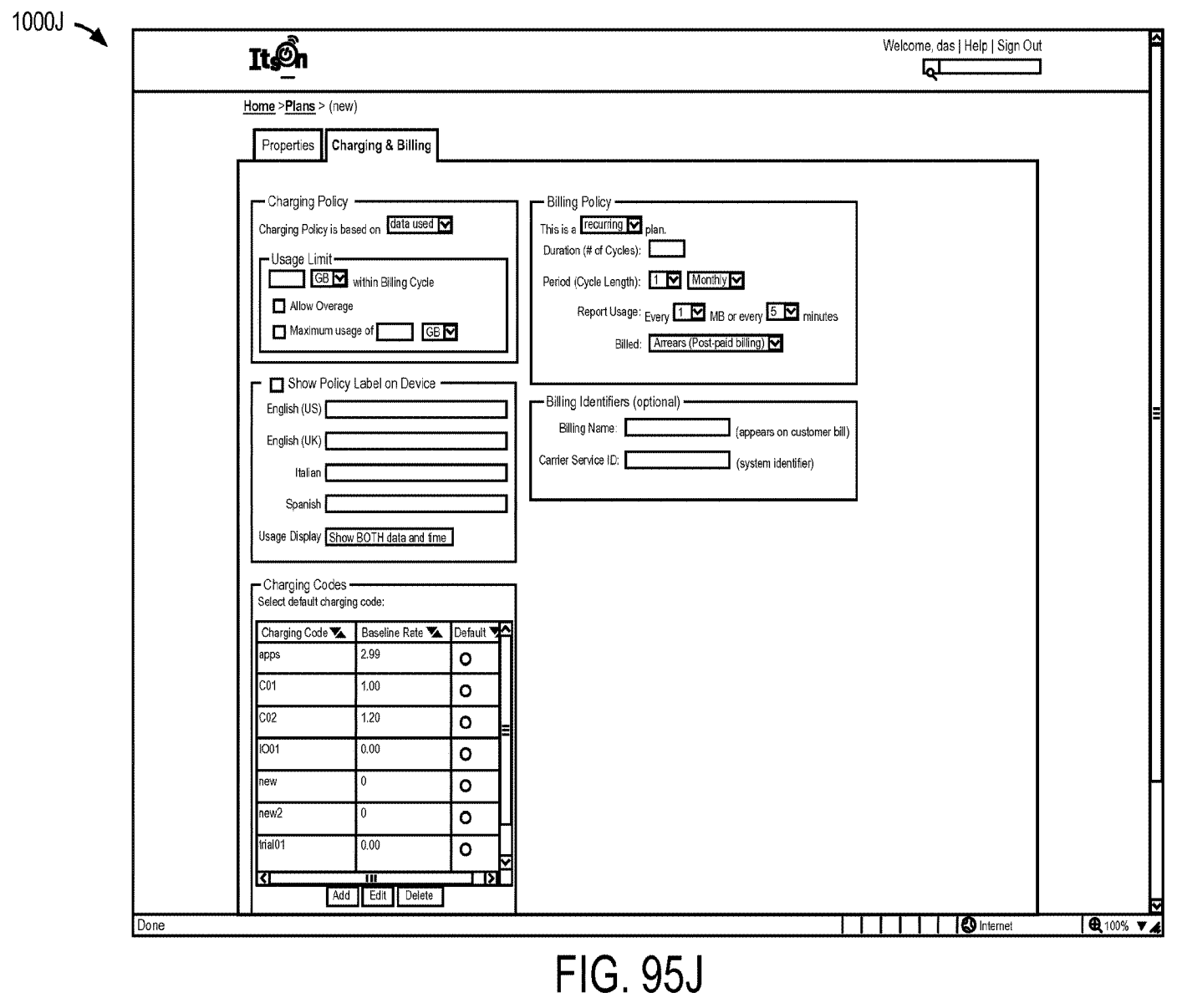
Figure 95K:
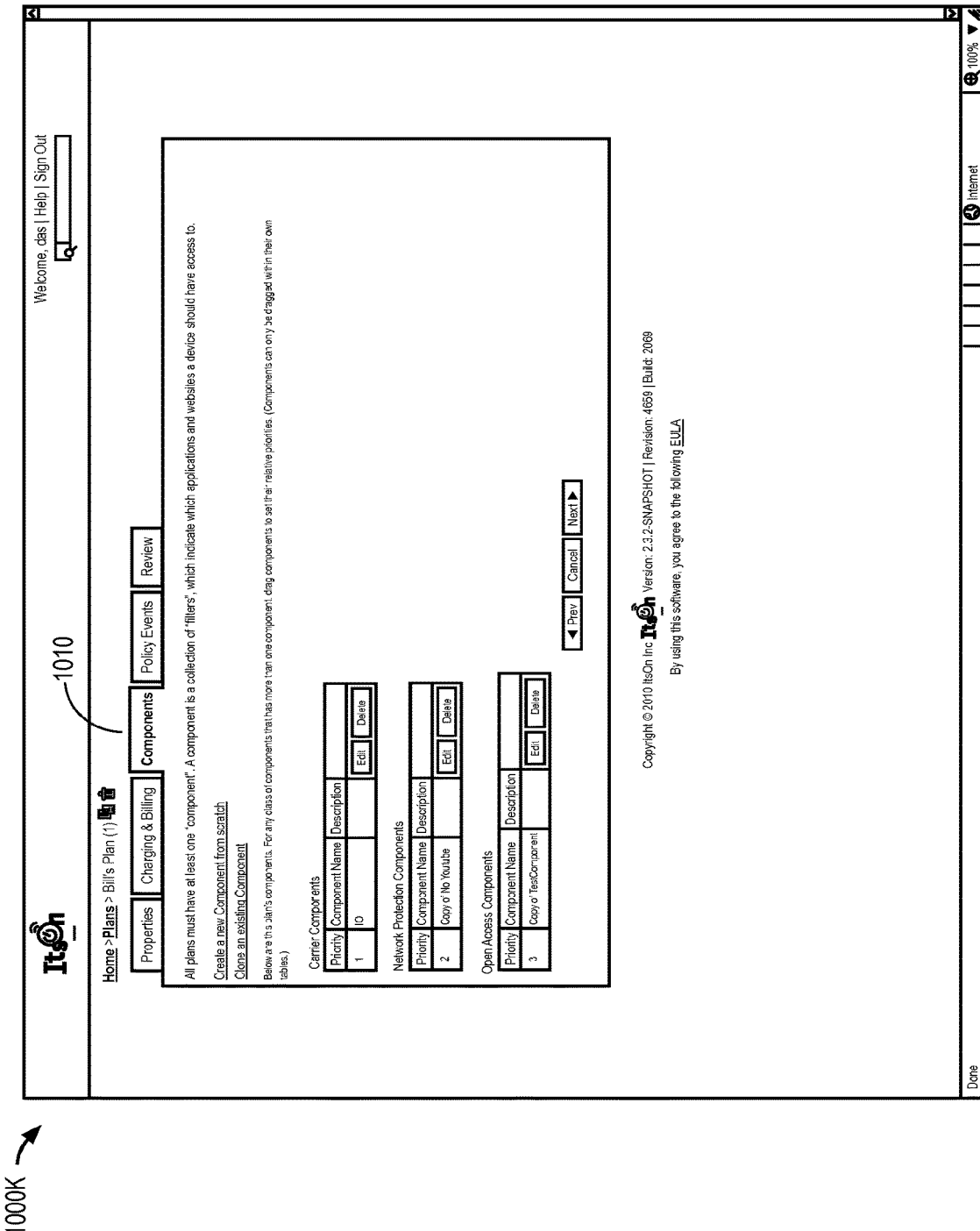
Figure 95L:
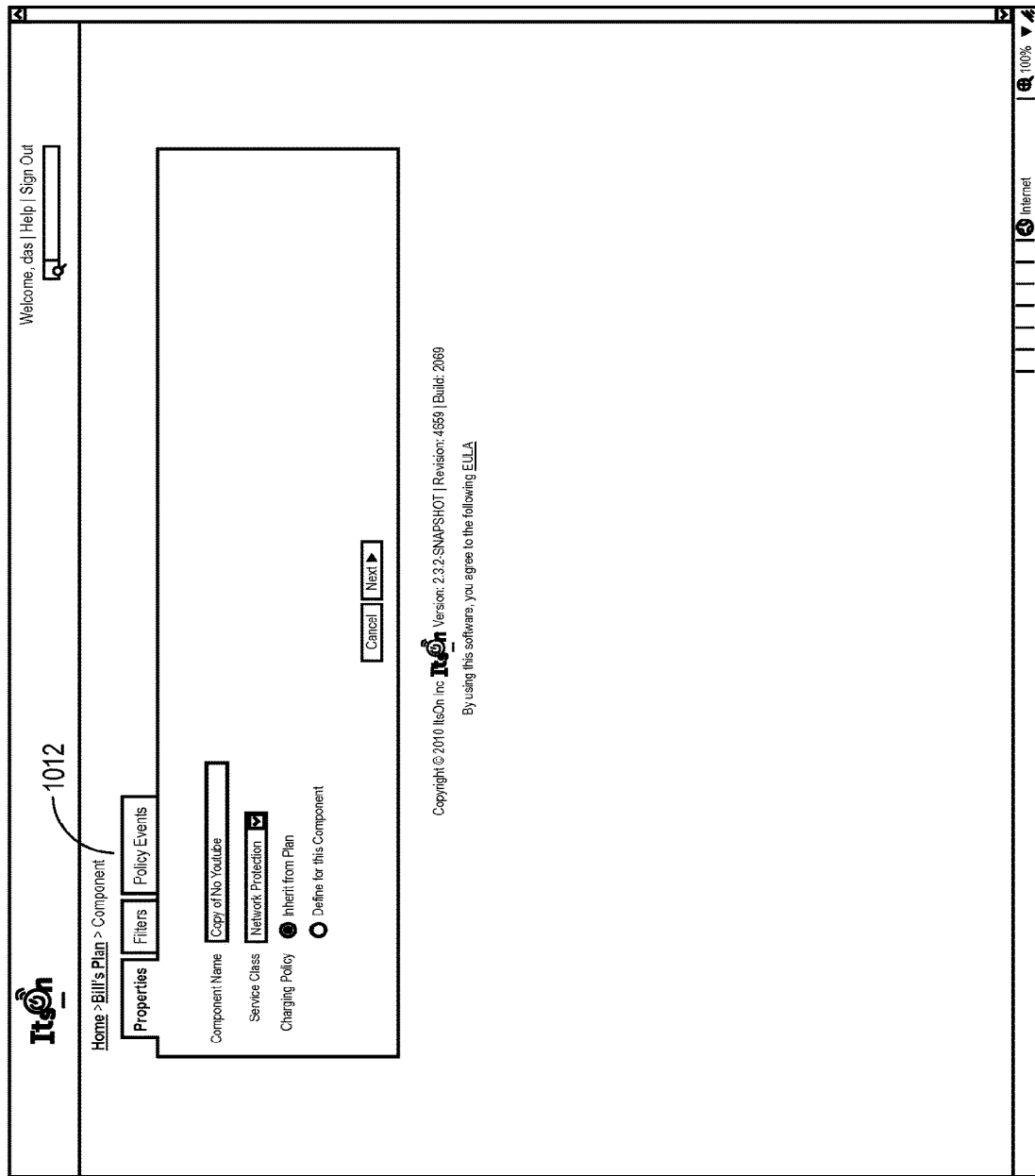
Figure 95M:
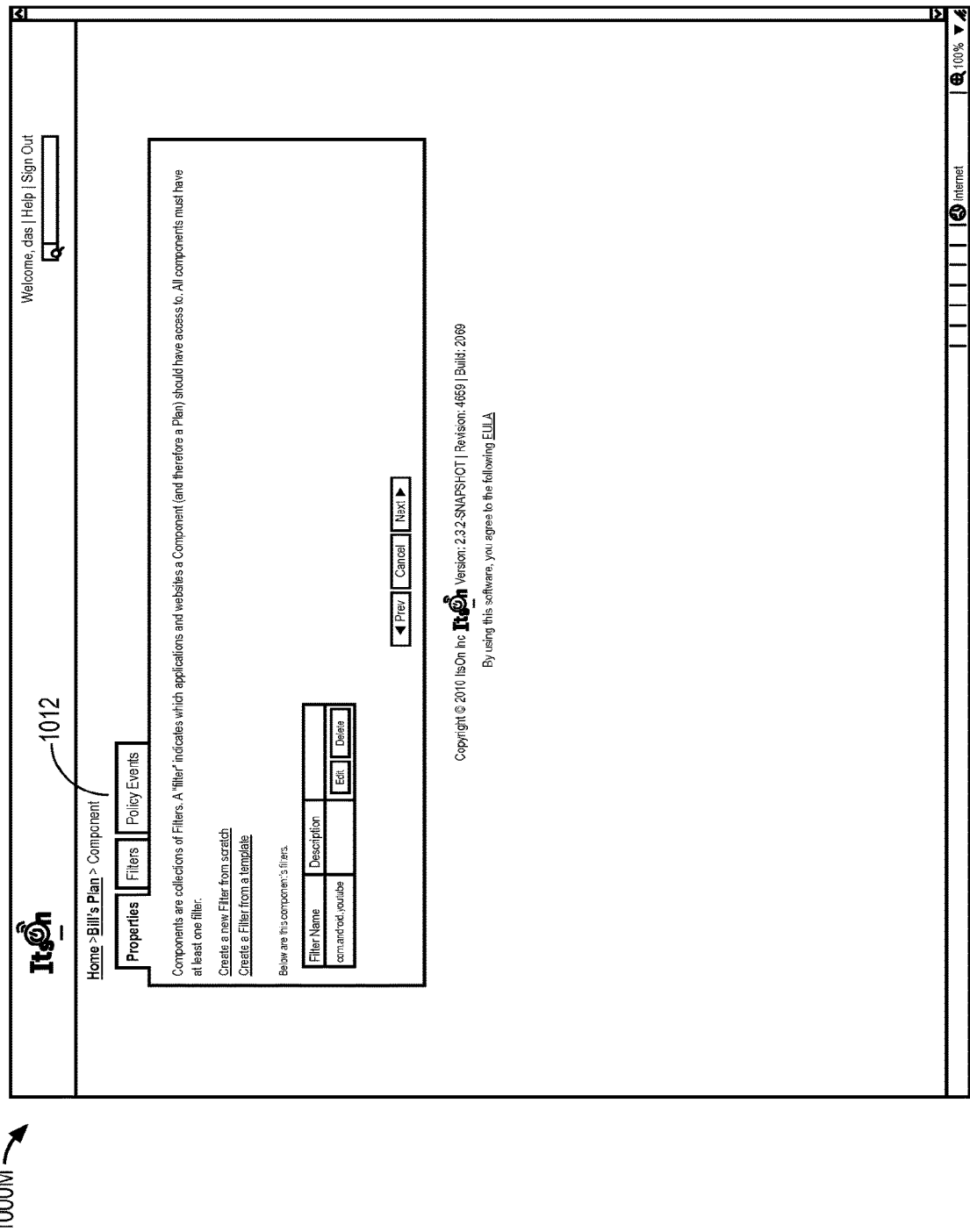
Figure 95N:
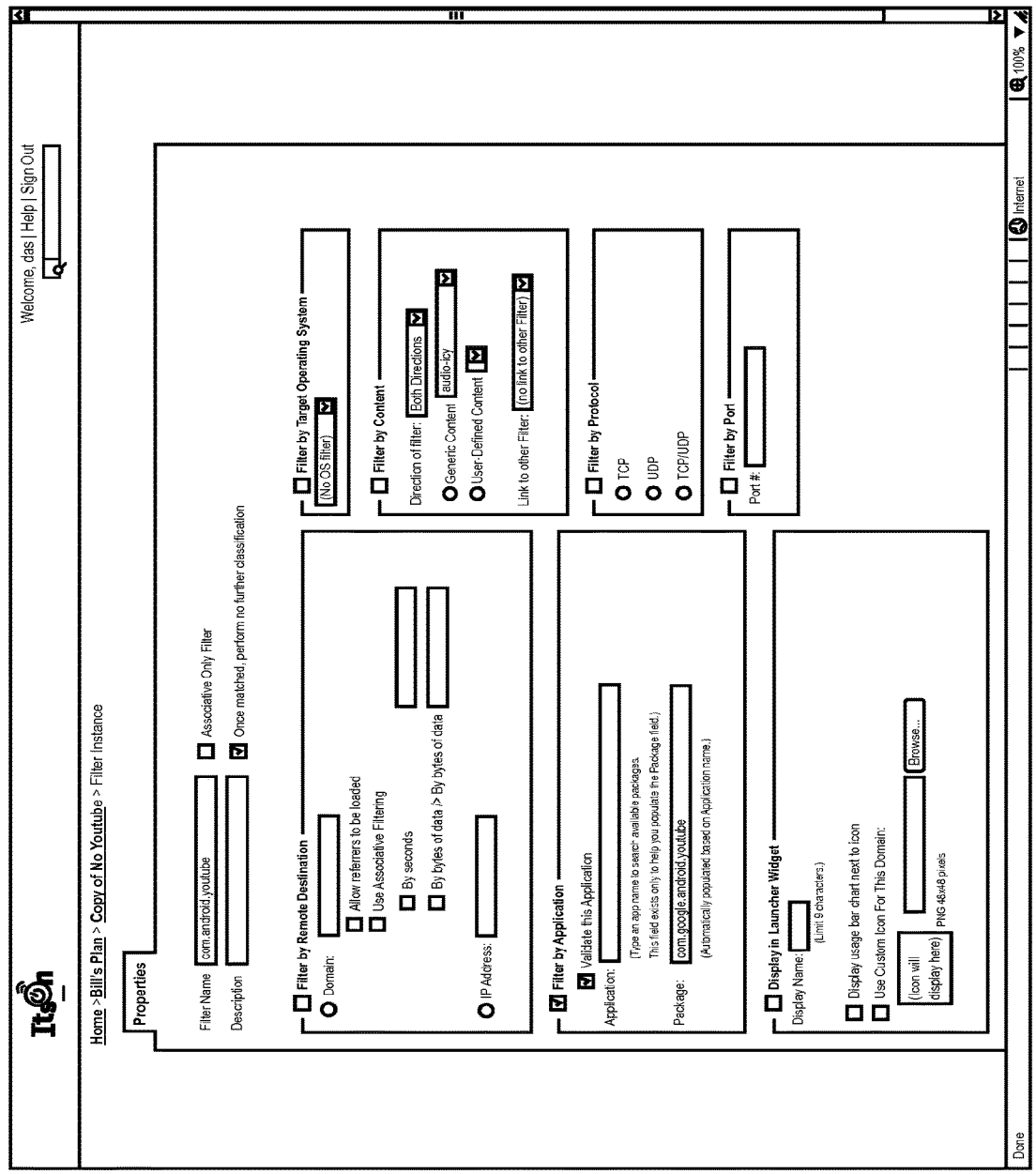
Figure 950:
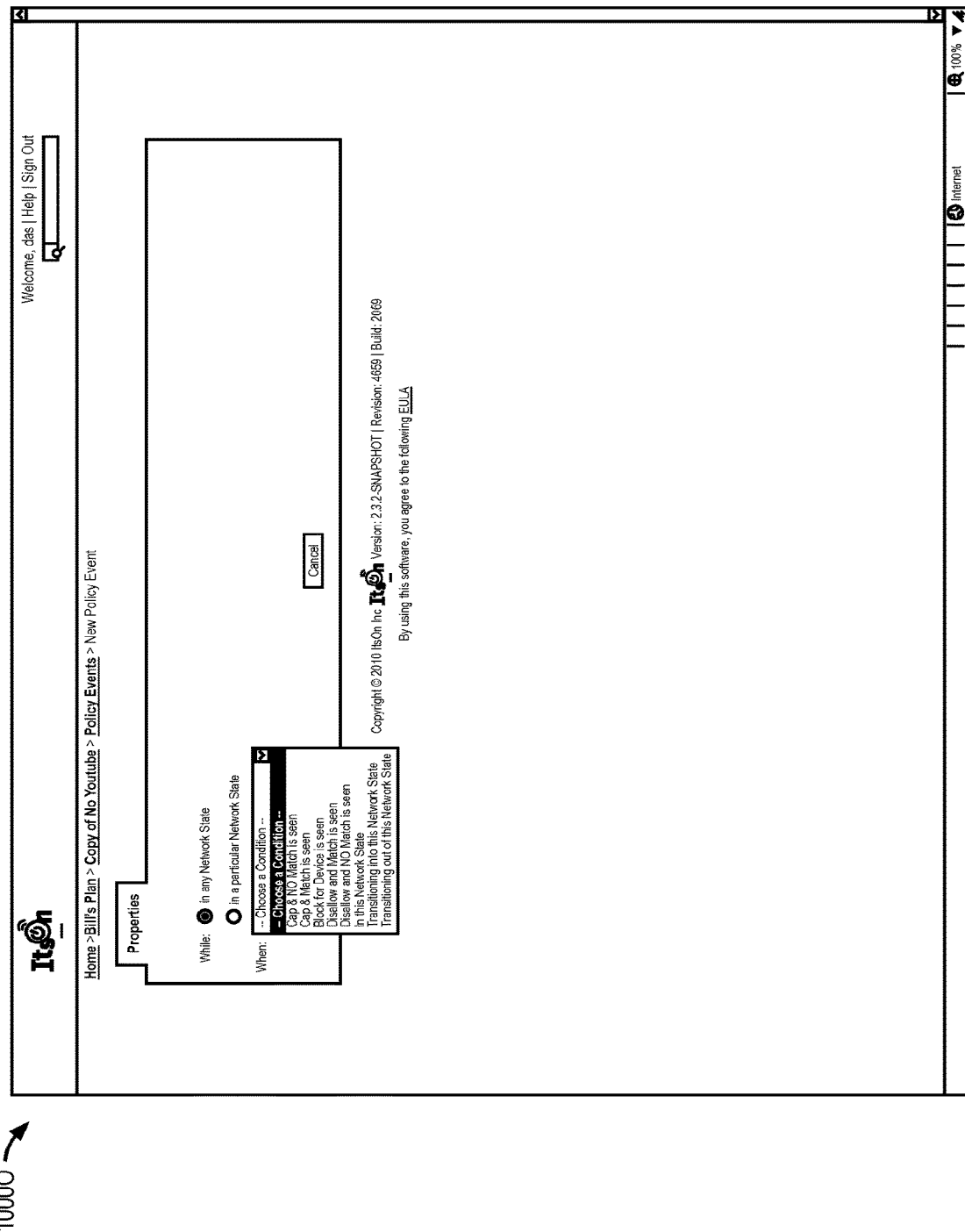
Figure 95P:
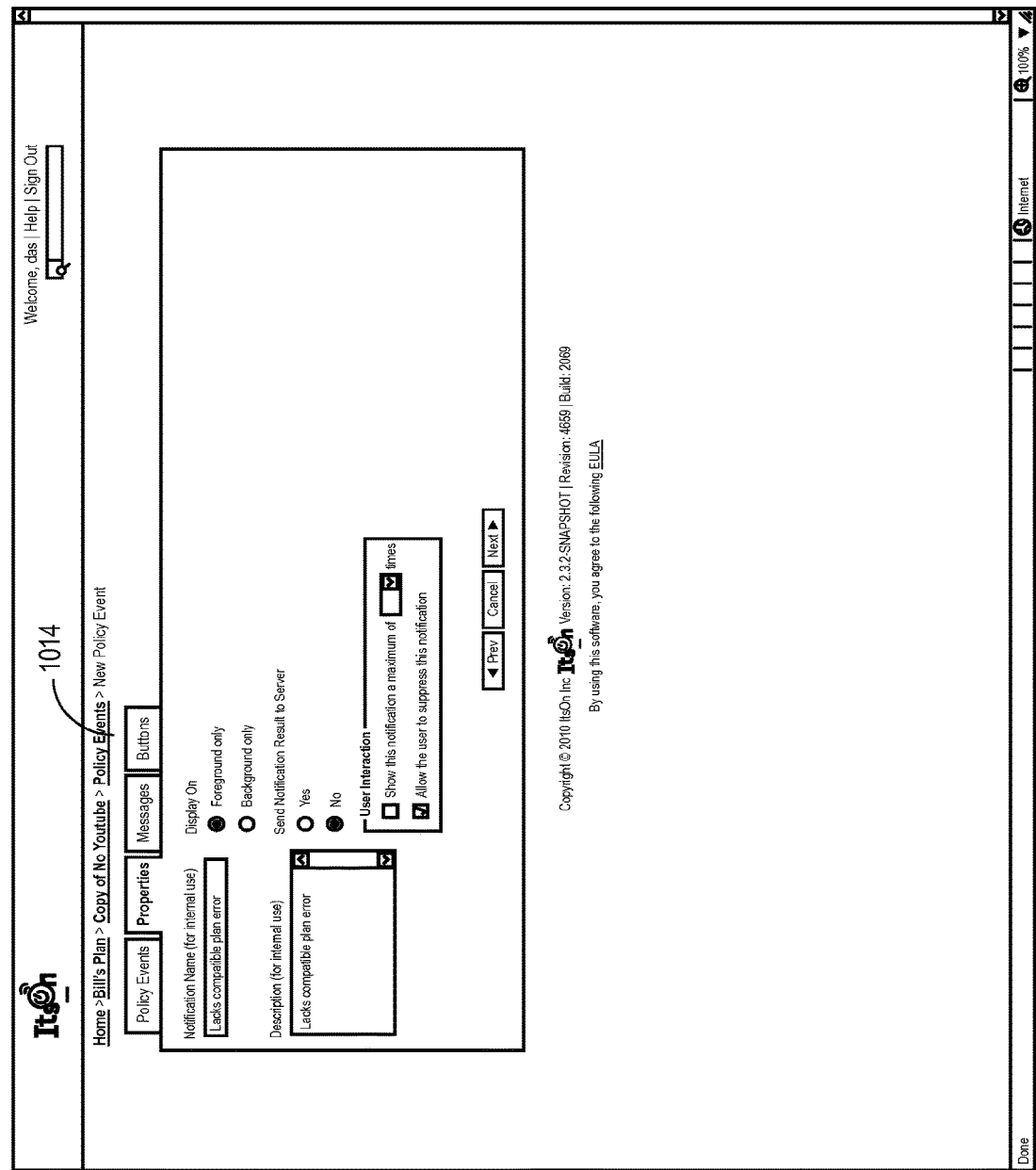
Figure 95Q:
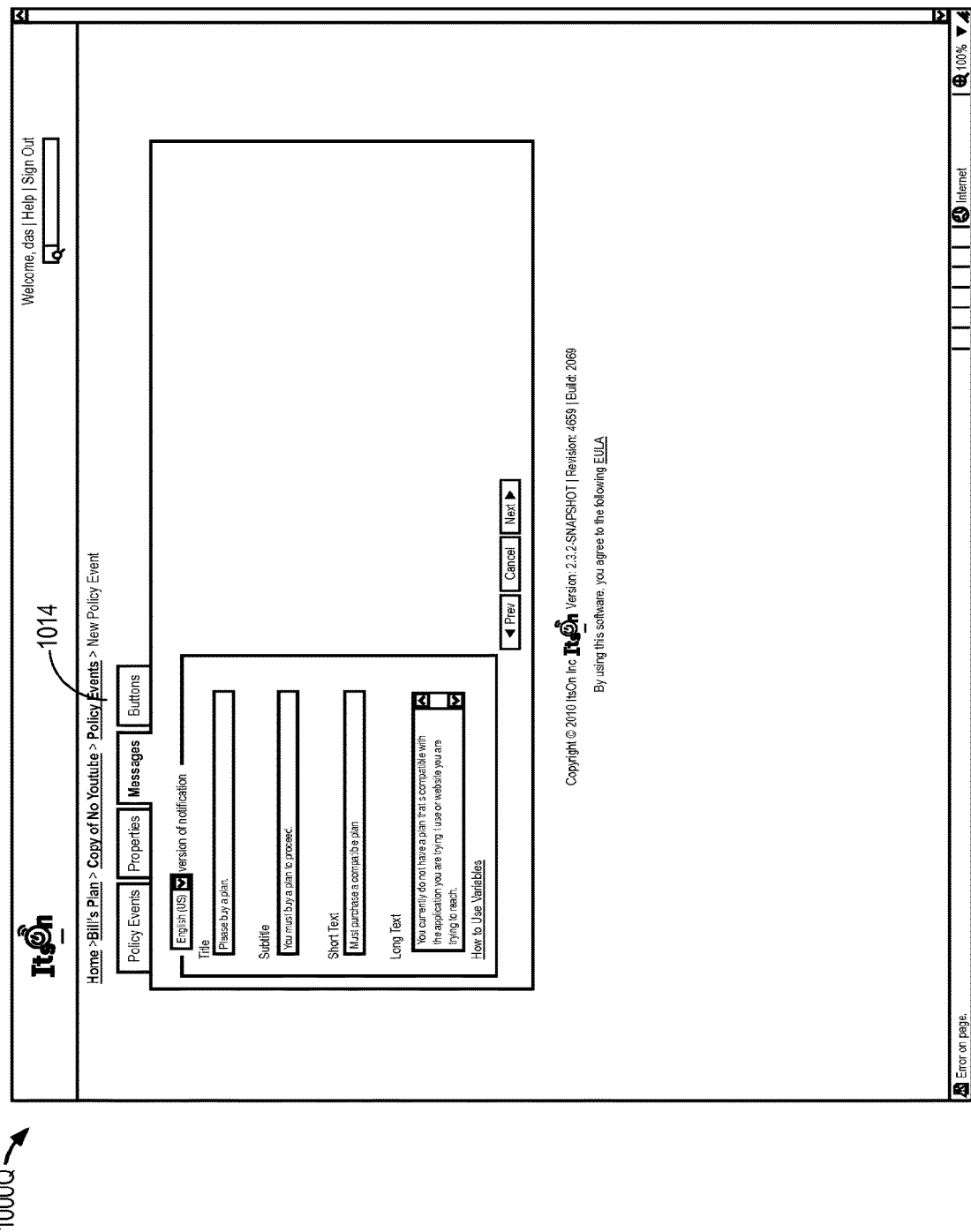
Figure 95R:
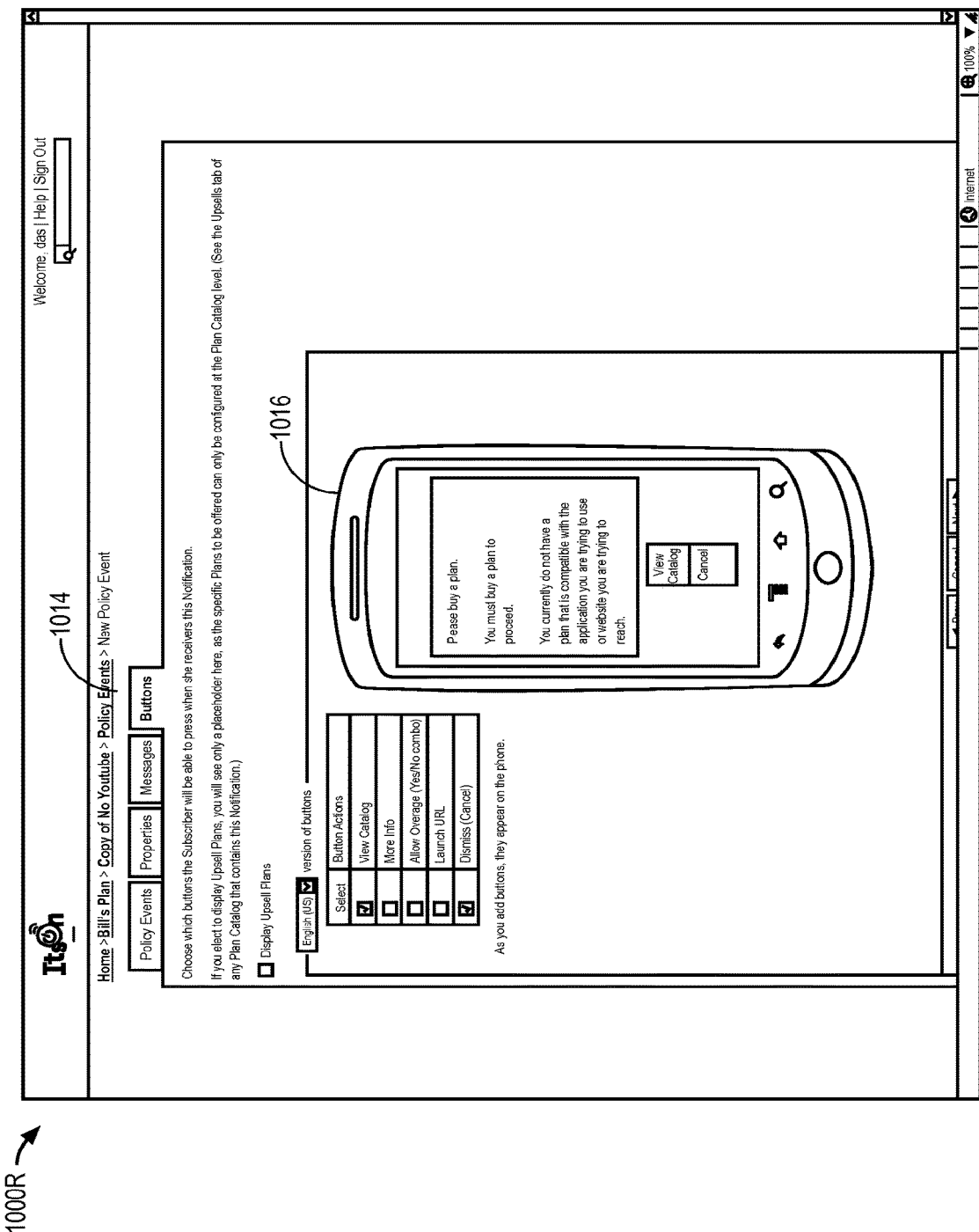

Selecting the plans button of the menu buttons field 1006 and selecting a new plan brings a designer to screenshot 1000I (FIG. 95I). In this specific implementation, the plan information includes a plan icon, a plan name, a plan short description, a plan description, a plan version, a plan type (e.g., sponsored, paid, or carrier), an "is default" checkbox, an "is repurchaseable" checkbox, a billing price, and a display price (in case the billing price is not the same as the billing price). A next screenshot 1000J (FIG. 95J) enables entry of further information about the plan, including charging policy (e.g., based on data used or time spent, usage limits and overage allowances), billing policy (e.g., one-time or recurring, usage reporting, and pre- or post-billing). It is possible in this specific implementation to show a policy label on the device and include billing identifiers. A charging code can also be created or selected by the designer. A next screenshot 1000K (FIG. 95K) includes an option to add components, either by creating a new component or cloning an existing component. In the example of FIG. 95K, three components have been added to the list of components for the plan, with explicit priorities 1, 2, and 3. Note that in this specific implementation, the number of tabs in the tab menu 1010 increases as data is entered for the plan until the tab menu 1010 includes a properties tab, a charging & billing tab, a components tab, a policy events tab, and a review tab.

When the designer selects a component, such as the "Copy of No Youtube," a component screenshot 1000L (FIG. 95L) is displayed, which includes a tab menu 1012 that includes a properties tab, a filters tab, and a policy events tab. (The tab menu 1012 can also include a charging policy tab if a charging policy is defined for the component.) Selecting the properties tab from the tab menu 1012 enables the designer to edit the component name, service class (e.g., carrier, network protection, sponsored, specialized application, market interceptor, parental control, open access, and post-bulk), and whether the component has a charging policy explicitly defined or inherits the charging policy from the plan. It may be noted that the service class could be characterized to include an "end-of-life" service class for when a subscriber has no remaining service plan options, but in this specific implementation the end-of-life setting is not listed as a service class (described later).

Selecting the filters tab from the tab menu 1012 brings the designer to screenshot 1000M (FIG. 95M), where filters can be chosen for a selected component (in this example, the "No Youtube" component). When the designer selects a filter to edit, the designer is brought to screenshot 1000N (FIG. 95N), which facilitates editing of the filter name, description, whether the filter is associative only, whether the filter is "no-match," filtering parameters (e.g., filter by remote destination, filter by application, filter by target operating system, filter by content, filter by protocol, filter by port), and whether and how to display in a launcher widget.

Selecting the policy events tab from the tab menu 1012 and creating a new policy event brings the designer to screenshot 1000O (FIG. 95O) where the designer can select policy events based upon network state when certain conditions (e.g., cap & no match, cap & match, block for a device, disallow and match, disallow and no match, in this network state, transitioning into this network state, and transitioning out of this network state) are met. Continuing to the next screenshot 1000P (FIG. 95P), the designer enters event properties, such as the name of the policy event, a description, whether to display notifications associated with the event in foreground or background, whether to send notification results to service, maximum number of times to send the notification, and whether the user can suppress future notifications. Note that in this specific implementation, the number of tabs in the tab menu 1014 increases as data is entered for the policy event until the tab menu 1014 includes a policy event tab, a properties tab, a messages tab, and a buttons tab.

Continuing to the next screenshot 1000Q (FIG. 95Q), the designer enters message details, such as title, subtitle, short text, and long text. Clicking on "how to use variables" instructs the designer regarding what variables can be added to notifications, such as name of service plan, charging code name, filter (e.g., blocked, throttled, etc.), percentage of plan utilization in bytes or time, application name, overage limit, current overage, throttle rate, date when cycle will refresh, duration of cycle, name of plan matched after current plan reached a cap, name of plan matched after disallow matched, current roaming state, current active network, or host or domain, to name several.

Continuing to the next screenshot 1000R (FIG. 95R), the designer determines whether to display upsell plans and enters buttons to enable subscriber responses to the notification (in this example, the view catalog and cancel buttons are enabled). The phone image 1016 is intended to illustrate how the message and buttons will appear within a device, though the image will not necessarily be a perfect representation.

Figure 95S:
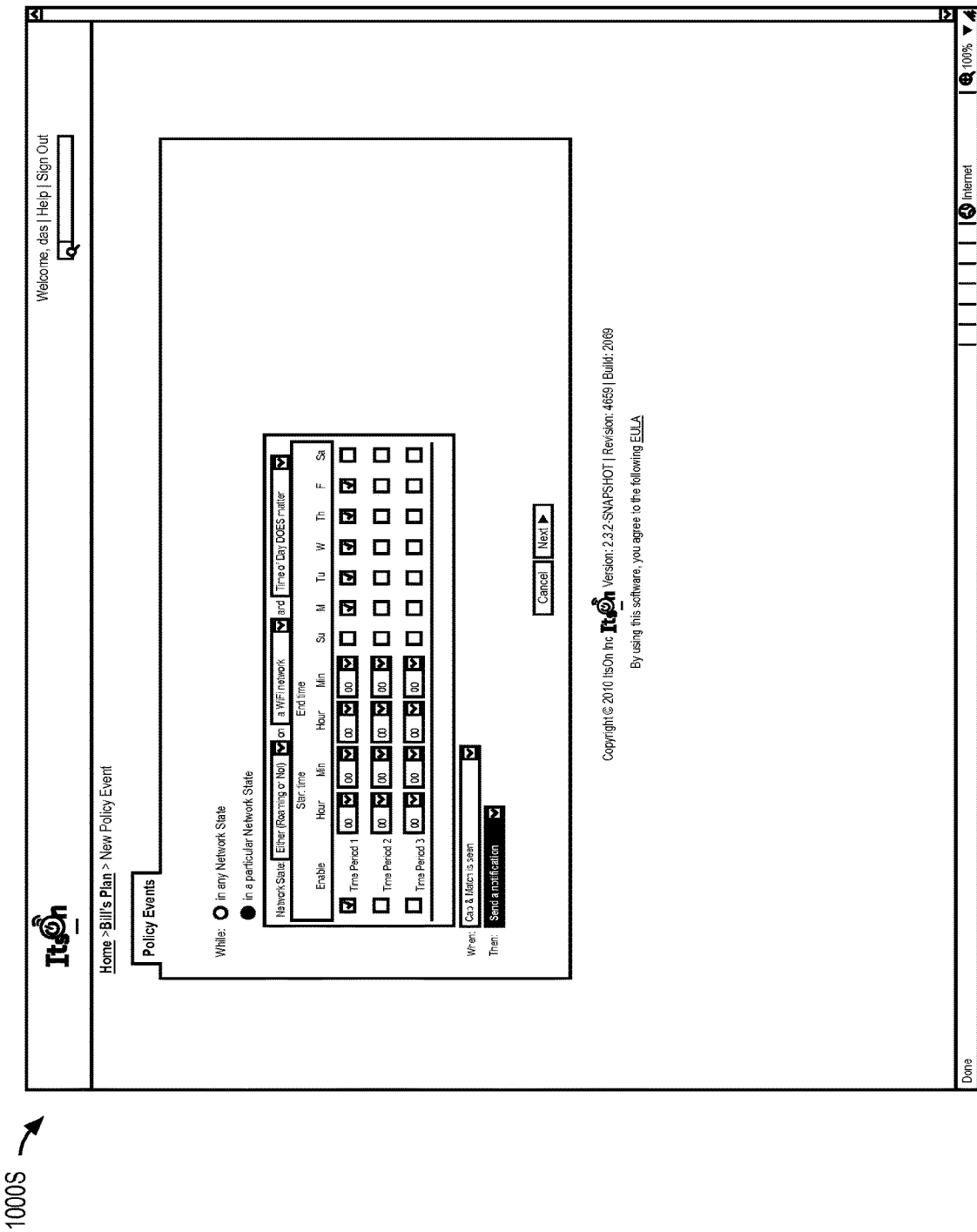

When returning to the plan level (see FIG. 95K), the designer can select the policy events tab from the tab menu 1010 to display screenshot 1000S (FIG. 95S) and enter policy events at the plan level. It may be noted that the policy events described with reference to the examples of FIGS. 95O to 3R were associated with an individual component. In the example of FIG. 95S, a policy event associated with the network state "on a WiFi network" and on a Monday through Friday causes a notification to be sent when a cap and match is seen. Other policy event parameters can be set in a manner similar to those described with reference to FIGS. 3P to 3R.

Figure 95T:

Upon completion of the plan described with reference to FIGS. 3I to 3S, the designer can select the review tab from the tab menu 1010 (see, e.g., FIG. 95K) to display screenshot 1000T (FIG. 95T). It may be noted that the review screen is "cut off," which prevents observation of policy events, but this is not necessary to understand the nature of the review screen. In this example, the plan, which is stored as a "draft" plan, can be published for beta testing (and submitted for approval).

Figure 95U:
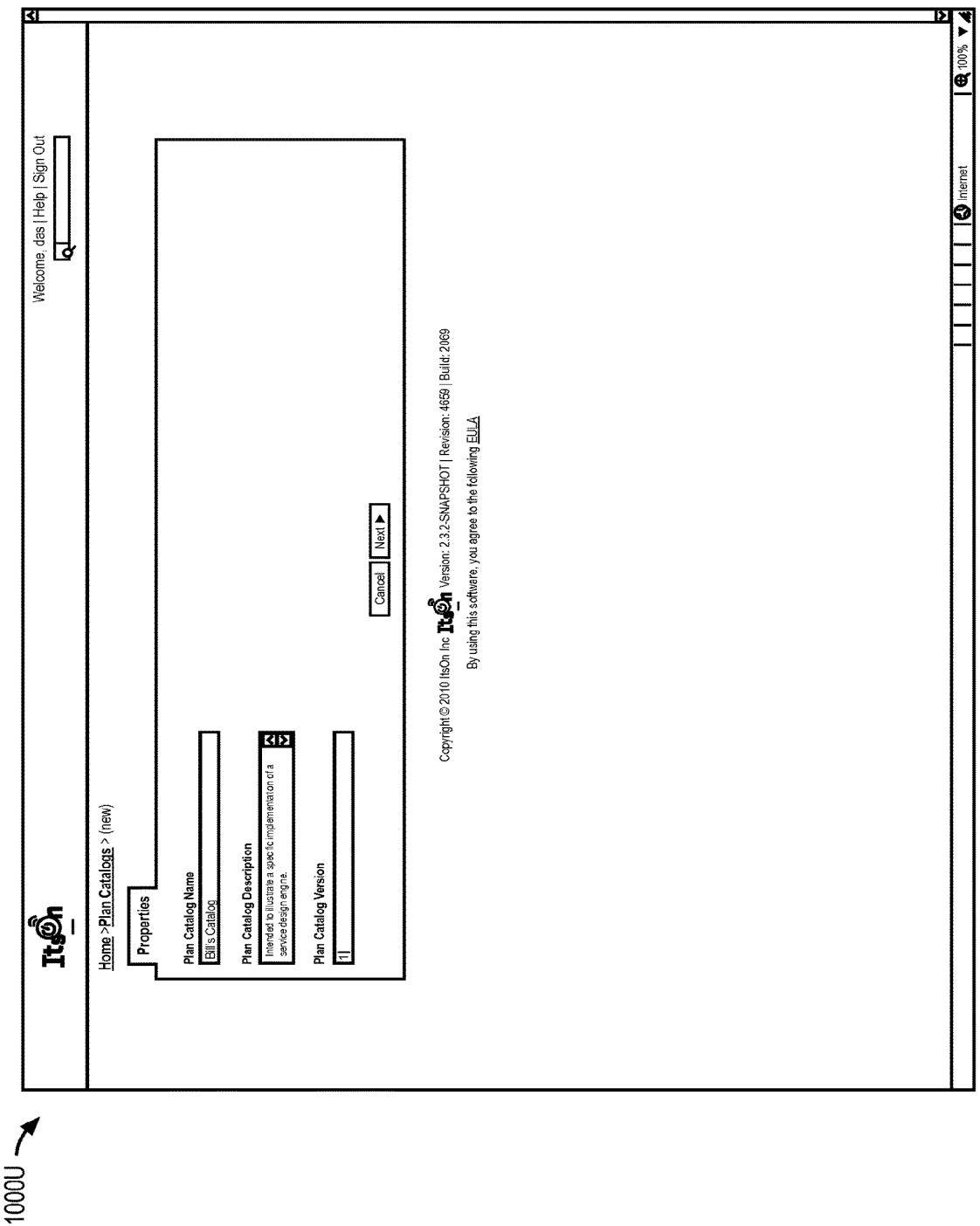
Figure 95V:
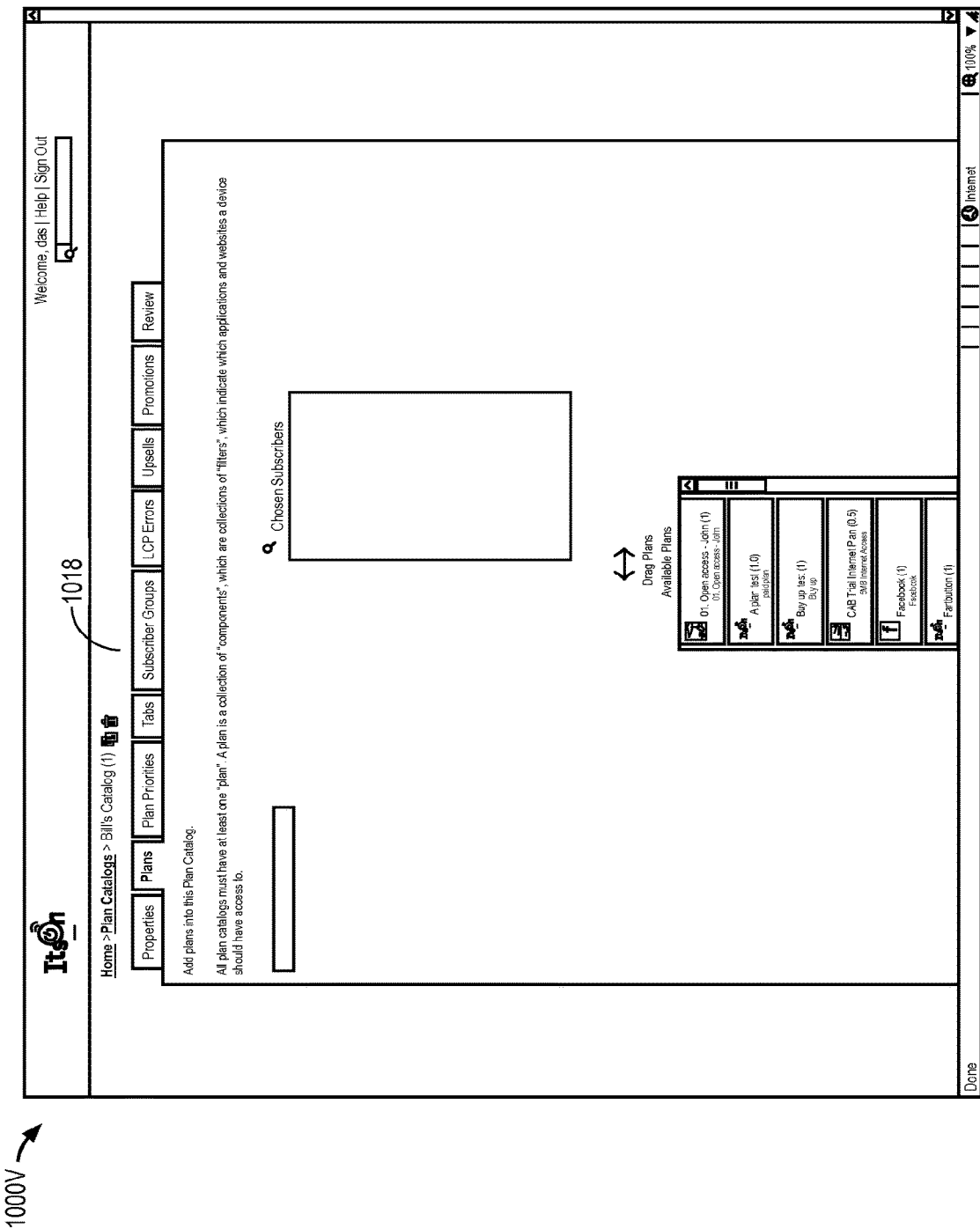
Figure 95W:
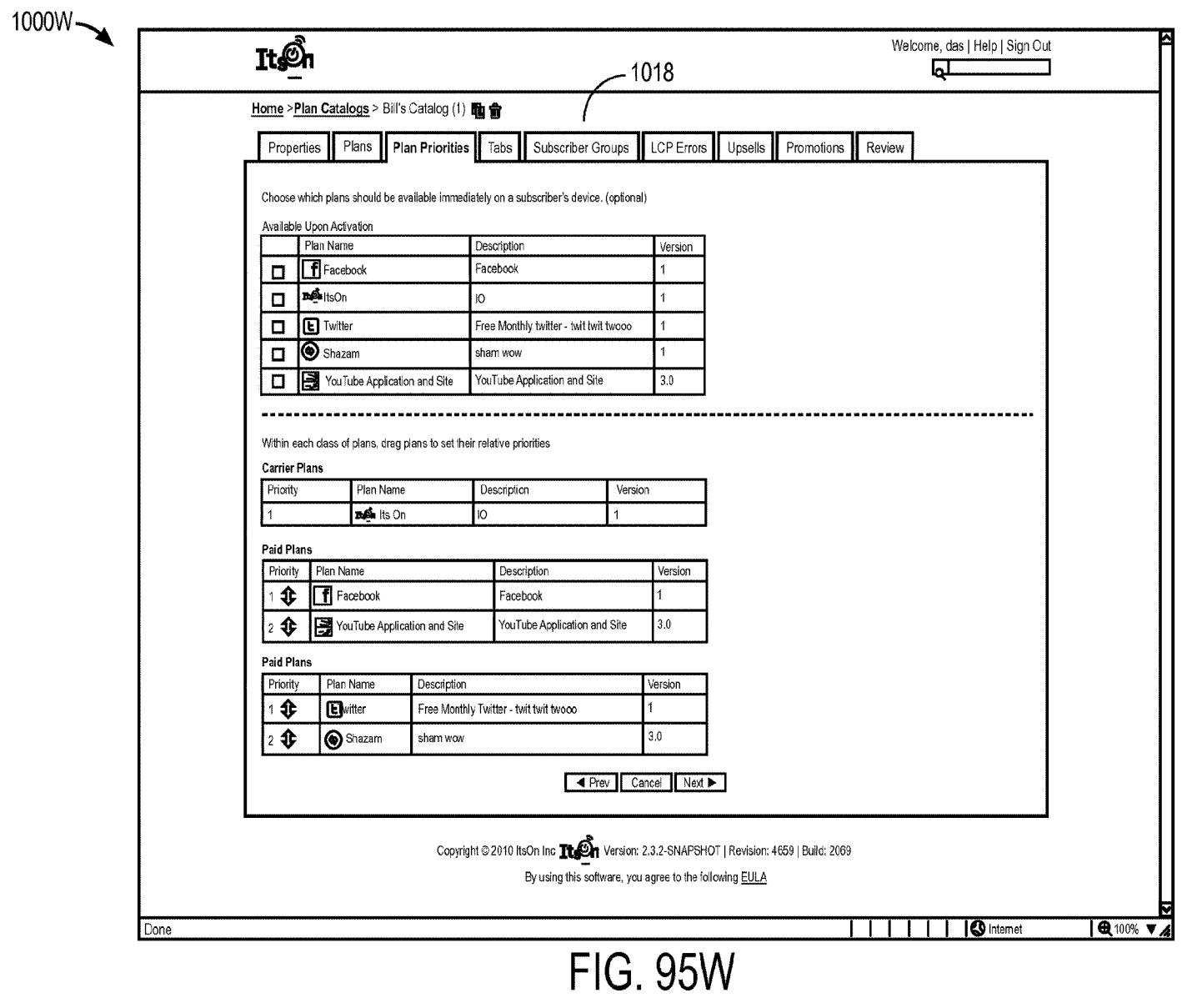
Figure 95X:
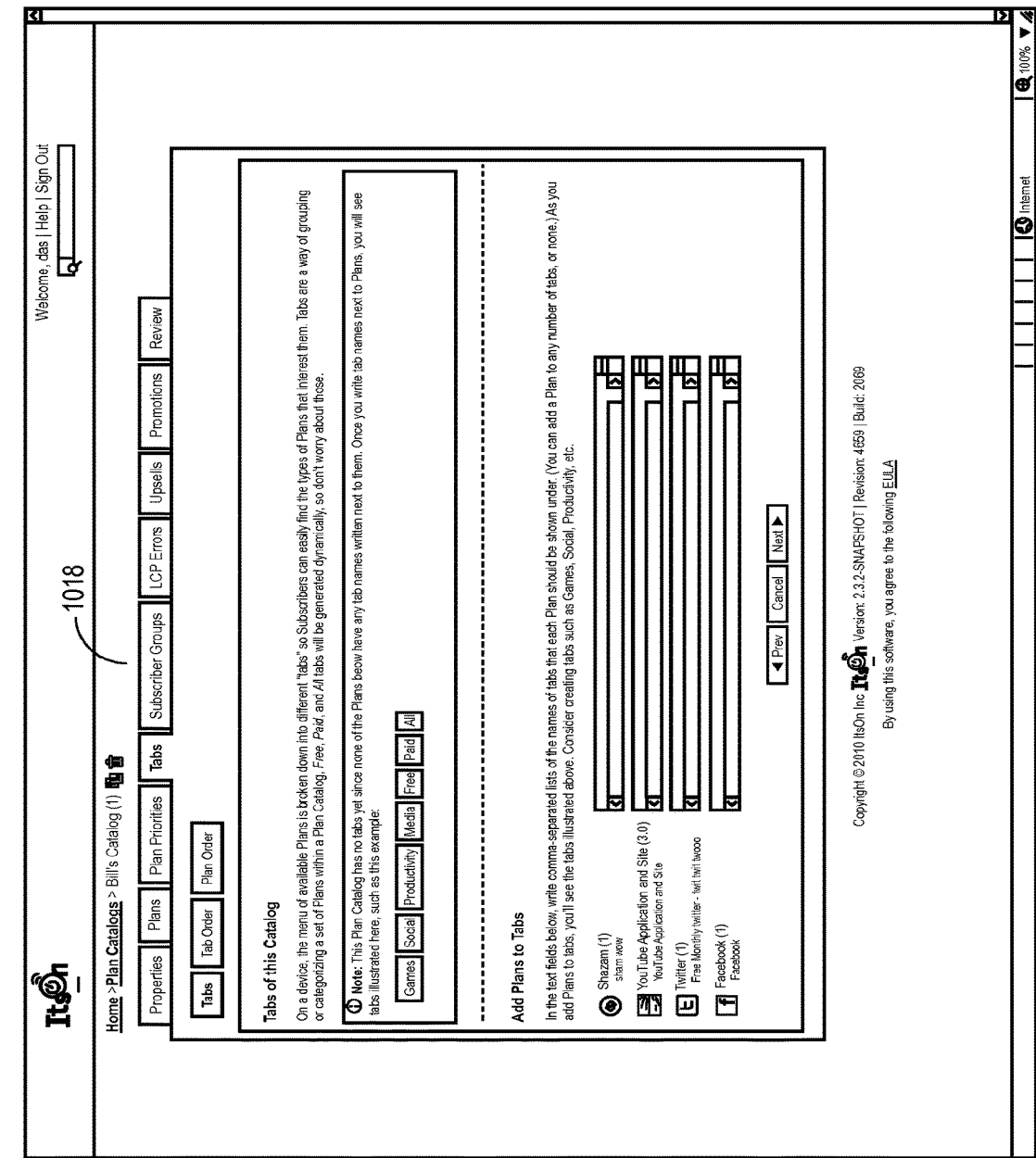
Figure 95Y:
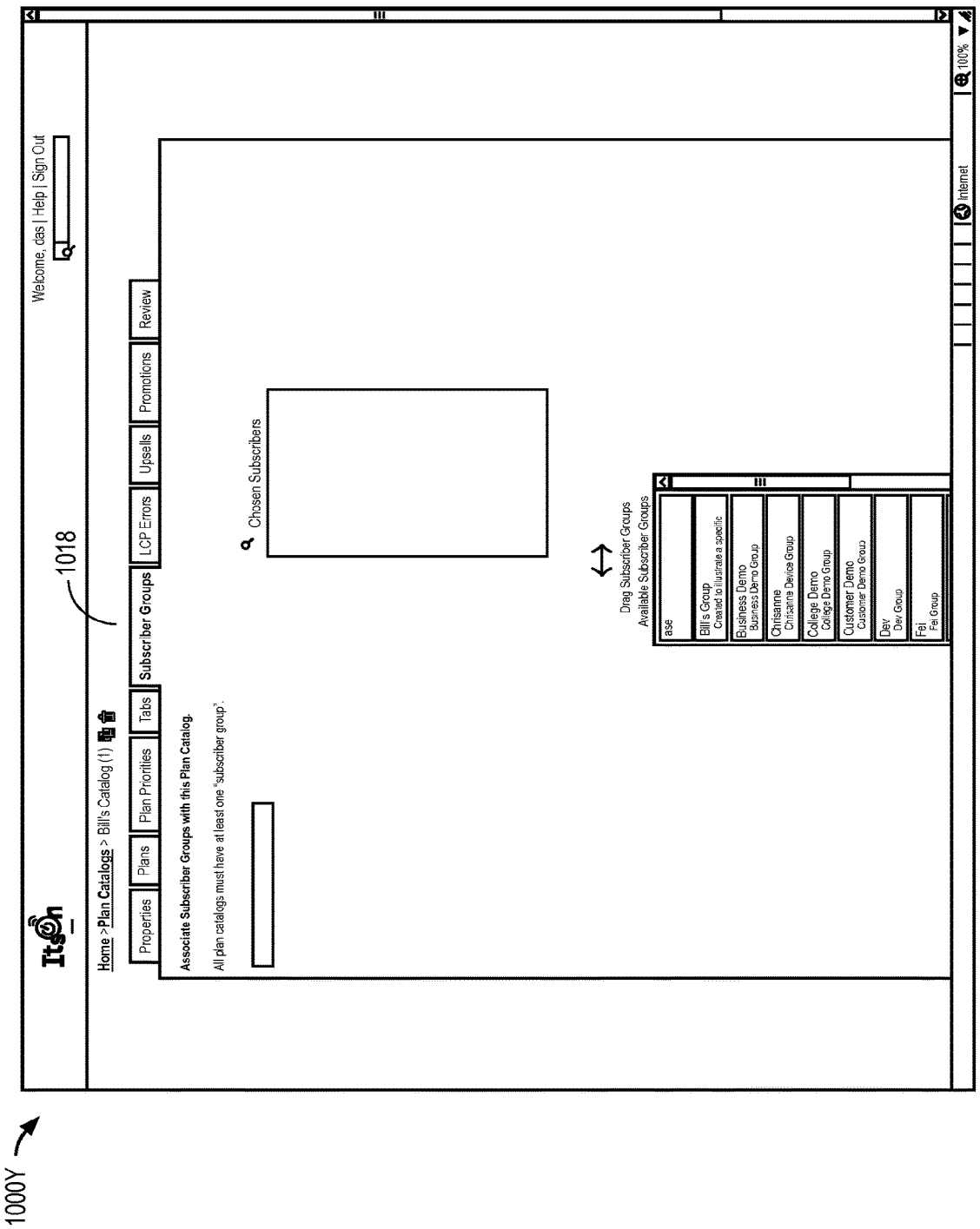

Referring back to the home page (see, e.g., FIG. 95A), selecting the plan catalogs button from the menu buttons field 1006 brings a designer to screenshot 1000U (FIG. 95U). There, the designer can enter a plan catalog name, a plan catalog description, and a plan catalog version (or select a plan catalog from plan catalogs in a plan catalogs datastore). When the designer clicks "next," the tab menu expands into a tab menu 1018, which includes the properties tab, a plans tab, a plan priorities tab, a tabs tab, a subscriber groups tab, an LCP error tab, an upsells tab, a promotions tab, and a review tab, as is illustrated in the example of FIG. 95V. Under the plans tab, the designer can drag plans into a plan catalog.

When the designer selects the plan priorities tab from the tab menu 1018, the designer is brought to screenshot 1000W (FIG. 95W), where the plans of the plan catalog can be prioritized. The plans are prioritized per plan type (e.g., carrier plan, paid plan), and if there are multiple plans within a plan type, the plans can be prioritized within the plan types, as well. Some or all of the plans can also be designated as available upon activation. With versioning, subscribers having a previous plan version can continue to use the previous version, while new subscribers can be offered the most recent version. If an old plan expires, a subscriber can be offered the most recent version, as well.

When the designer selects the tabs tab from the tab menu 1018, the designer is brought to screenshot 1000X (FIG. 95X), where the designer can organize tabs for display of plans. A subscriber's device can display, for example, one or more tabs such as games, social, productivity, media, free, paid, and all, and under the tabs the various plans can be listed in an order that is determinable by the designer.

When the designer selects the subscriber groups tab from the tab menu 1018, the designer is brought to screenshot 1000Y (FIG. 95Y), where the designer can drag and drop subscriber groups.

A Lacks Compatible Plan (LCP) error occurs when a traffic event is received for which there is no active service plan. LCP errors can be treated as a particular kind of policy event. As when designating the parameters of policy events, when the designer selects the LCP errors tab from the menu 1018, the designer has options similar to those described above with reference to FIGS. 3P to 3R. That is, the designer can choose applicable end-of-life properties, messages, and buttons.

Upsells occur when offered from a component, plan, or plan catalog, and can be responsive to traffic events (e.g., an upsell for cheaper network service when using Facebook applications can occur when a subscriber consumes more expensive network services to use Facebook applications) or other events. When the designer selects the upsells tab from the menu 1018, the designer can edit upsell opportunities offered from, e.g., notifications within a plan catalog or any of its plans or components. Upsells can be edited much like policy events (e.g., properties, messages, and buttons).

Figure 95Z:
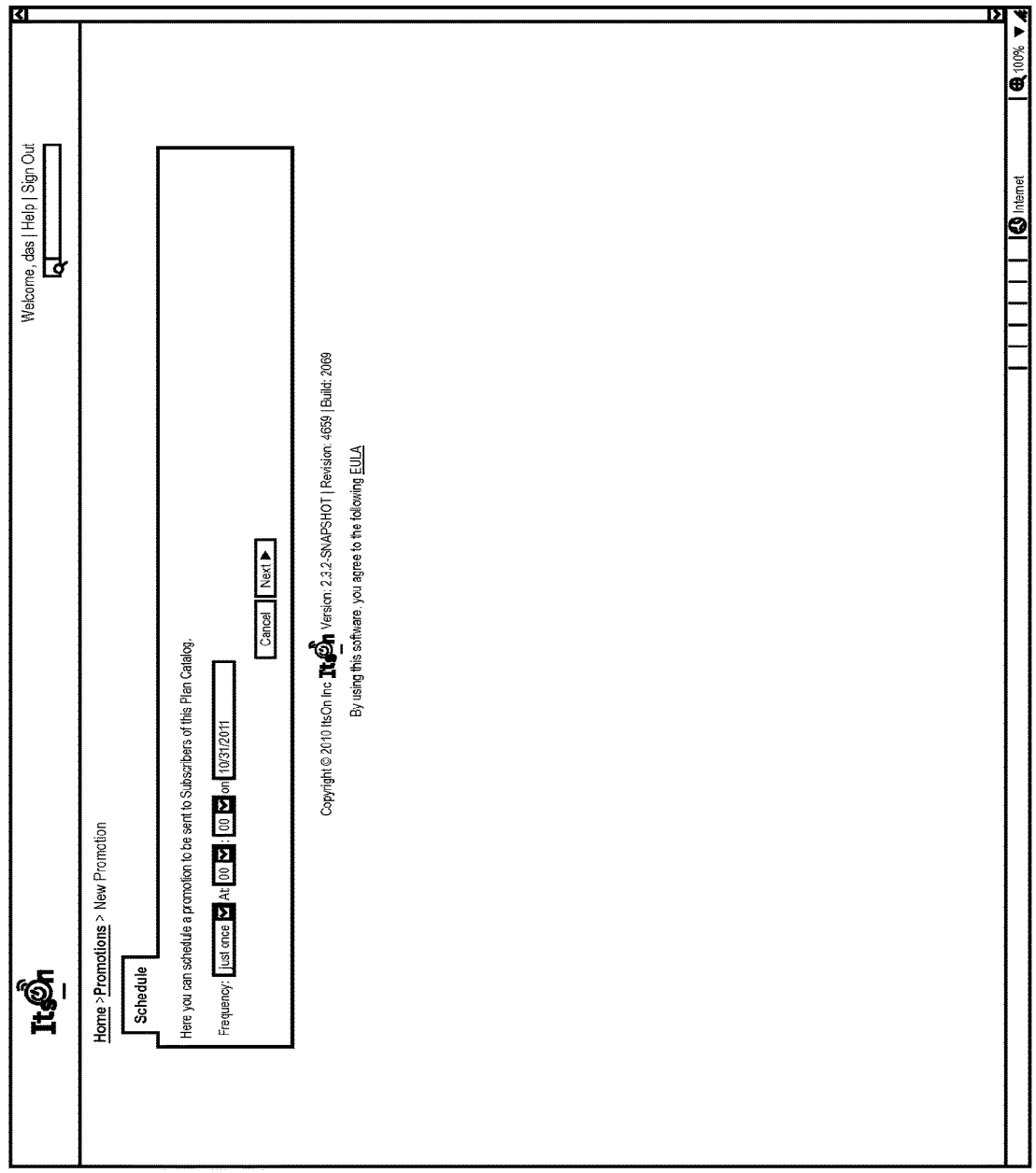

Promotions can be offered once or periodically. When the designer selects the promotions tab from the menu 1018, the designer can edit a frequency of a promotion in screenshot 1000Z (FIG. 95Z). Promotions can be edited much like policy events (e.g., properties, messages, and buttons).

Figure 96A:
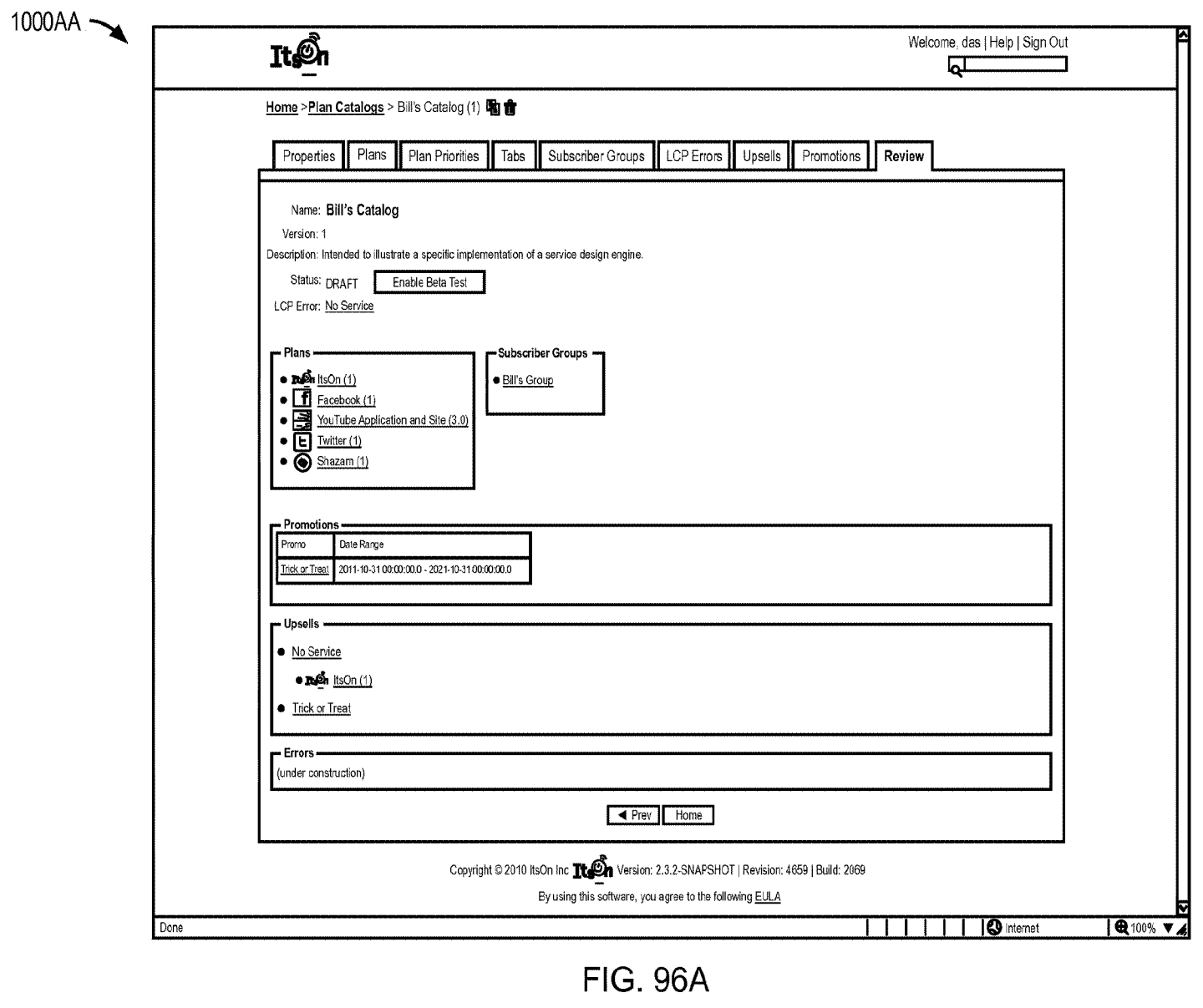

When the designer selects the review tab from the menu 1018, the designer can review the plan catalog as is illustrated in screenshot 1000AA (FIG. 96A).

Referring back to the home page (see, e.g., FIG. 95A), selecting the templates button from the menu buttons field 1006 enables a designer to work on filter templates. Because components can have versions, it can be desirable to create templated filters that, when placed in a component, automatically create a copy of the templated filter. That way, when the filter is changed for one version, it is not changed for another. It is also possible to simply reuse a filter in components, in which case if the filter is changed, it is changed for all of the components into which it was reused.

Figure 96B:
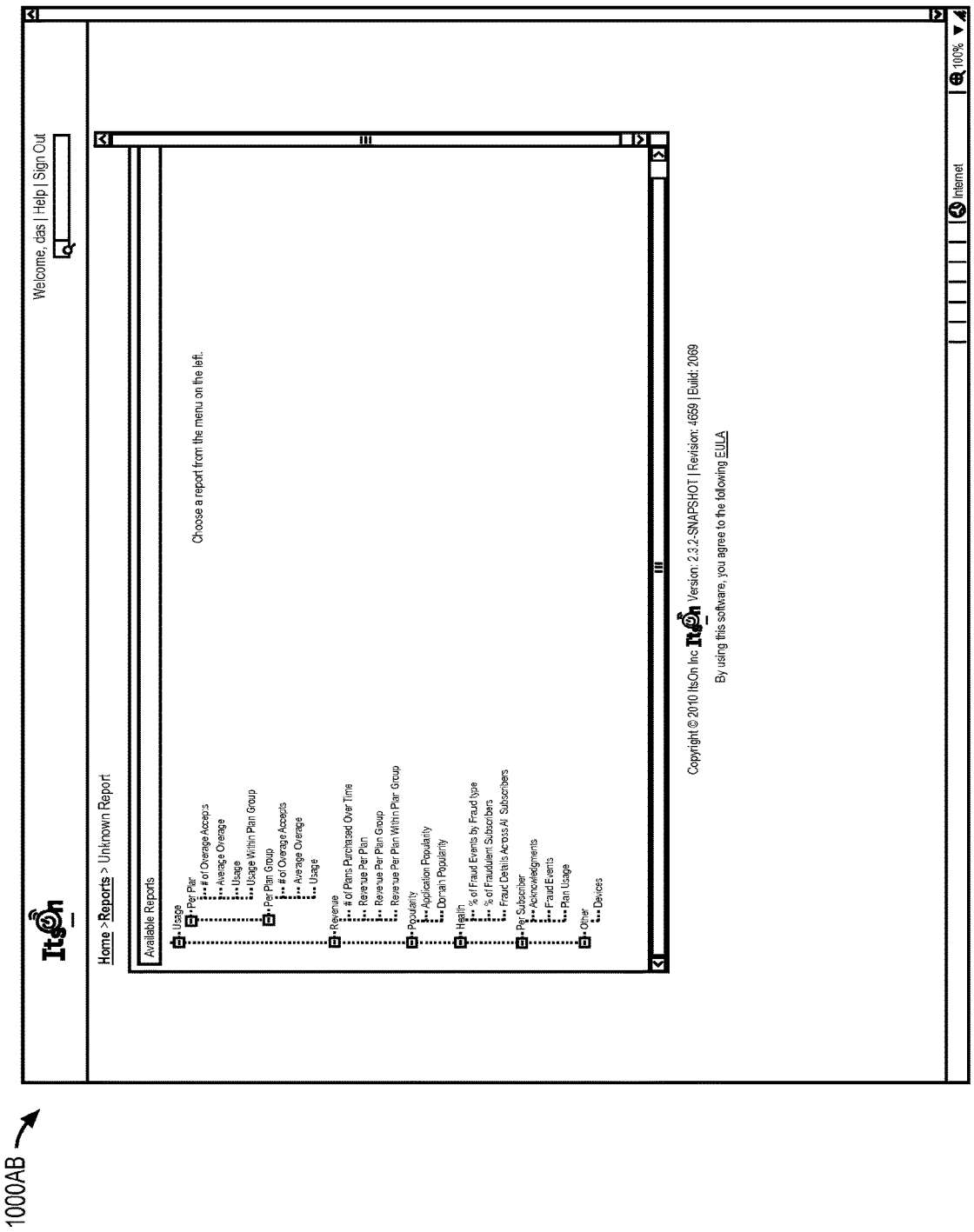

Selecting the reports button from the menu buttons field 1006 enables a designer to review reports. FIG. 96B depicts a screenshot 1000AB with reports that are broken into several categories including, usage, revenue, popularity, health (fraud), per subscriber, and other. Reports are generated using information that is available from datastores of the service design system, which can include data in notifications from subscriber devices or, more generally, access networks.

Figure 97:
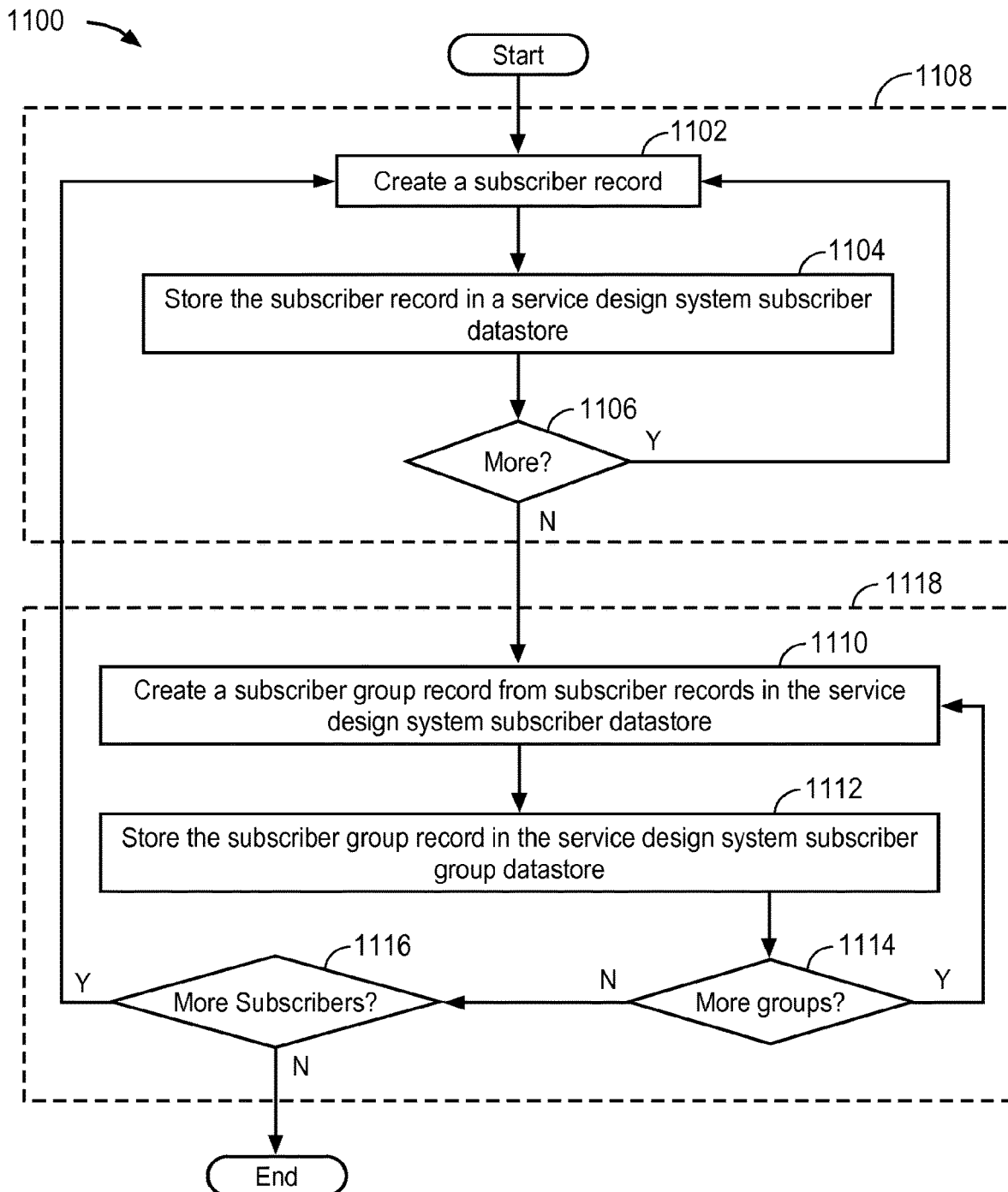
FIG. 97 depicts a flowchart of an example of a method for creating subscriber groups.

FIG. 97 depicts a flowchart 1100 of an example of a method for creating subscriber groups. This flowchart and other flowcharts are depicted in the figures of this paper as serially arranged modules. However, modules of the flowcharts may be reordered or arranged for parallel execution as appropriate.

In the example of FIG. 97, the flowchart 1100 starts at module 1102 with creating a subscriber record. The term "record" as used in this paper can refer to a data structure of any applicable format saved in a data store. A subscriber record can include such information as device name, owner name, EID (e.g., IMSI or Country Code+Operator Code+MIN), device type, subscriber group, locale, phone number (e.g., MSISDN or MDN), operating system version, CDMA subscriber details (e.g., Device ID/MEID and/or MSID), and GSM/LTE subscriber details (e.g., IMSI and/or IMEI). Generally, more information will enable designers to group subscribers together in different ways (e.g., by demographic information), which can result in improved accept rates for targeted notifications.

In the example of FIG. 97, the flowchart 1100 continues to module 1104 with storing the subscriber record in a service design system subscriber datastore. Datastore is a general term that can be applied to almost any data storage receptacle. For the purpose of this example, however, a specific format is expected. It is possible, and even likely, that the service design system subscriber datastore (and the service design system subscriber group datastore, mentioned later) will have an implementation- and/or configuration-specific, though not necessarily proprietary, format. The subscriber record is expected to have such a format appropriate for storage in the expected format of the service design system subscriber datastore. In the event subscriber data is received in the service design system in a format other than the expected format, the subscriber record is created (1102) in the expected format and populated with some or all of the received subscriber data, and potentially with additional data that is obtained by the service design system (e.g., from a datastore or through an admin or other input process).

In the example of FIG. 97, the flowchart 1100 continues to decision point 1106 where it is determined whether there is additional subscriber records to be created. If it is determined that there is additional subscriber records to be created (1106-Y), then the flowchart 1100 returns to module 1102 and continues as described previously for the next subscriber record. A "while loop" 1108 comprising the modules 1102 and 1104 and decision point 1106 is encompassed in the example of FIG. 97 with a dotted box. The while loop 1108 can be executed in batch-mode by importing subscriber data from a data source. The format of the subscriber data can be restricted to the format of the service design system subscriber datastore or formats that a service design engine is capable of converting into the appropriate format. Alternatively or in addition, the while loop 1108 can be executed through an input process one subscriber at a time, either when receiving data from a potential or current subscriber, or from an artificial or human agent of the service design system.

If, on the other hand, it is determined that there are no additional subscriber records to be created (1106-N), then the flowchart 1100 continues to module 1110 with creating a subscriber group record from subscriber records in the service design system subscriber datastore. A subscriber group record may or may not have a substantial amount of metadata. For example, a subscriber group record can be assigned a name and description to make it easier to use the subscriber group record when creating service plans for subscriber groups. An alternative field of the subscriber group record is common subscriber data, though this could also be considered part of the description.

In the example of FIG. 97, the flowchart 1100 continues to module 1112 with storing the subscriber group record in the service design system subscriber group datastore. The issues related to format of subscriber group records are similar to those described previously with reference to module 1104.

In the example of FIG. 97, the flowchart 1100 continues to decision point 1114 where it is determined whether there is additional subscriber group records to be created. If it is determined that there is additional subscriber group records to be created (1114-Y), then the flowchart 1100 returns to module 1110 and continues as described previously for the next subscriber group record. A "while loop" 1118 comprising the modules 1110 and 1112 and decision points 1114 and 1116 is encompassed in the example of FIG. 97 with a dotted box. The while loop 1116 can be executed in batch-mode by importing subscriber records from the subscribers datastore. Alternatively or in addition, the while loop 1118 can be executed through an input process one subscriber at a time, either when receiving data from a potential or current subscriber, or from an artificial or human agent of the service design system. For example, an admin could drag and drop available subscribers into a subscriber group, and the service design engine can create a subscriber group record from available subscribers that were added to the subscriber group in this way.

In a specific implementation, a batch of subscriber data can be imported into the service design system and used to populate a subscriber group. It may be noted that the logical flow in the flowchart 1100 is to create subscriber records (1112) and store the subscriber records (1104) repeatedly (1106) and then create a subscriber group (1110) from subscriber records in the service design system subscriber datastore. However, it is not necessary for the import procedure to create each subscriber record before creating the subscriber group.

In a specific implementation, when a subscriber record with a characteristic that identifies the subscriber record as part of an existing subscriber group record is created and stored in the service design system subscriber datastore, that subscriber may or may not automatically be added to the existing subscriber group record (or an update procedure could add any subscriber records having the relevant characteristics that were not previously added to the subscriber group record when initiated by a subscriber or agent of the service design system).

Referring once again to decision point 1114, if it is determined that there are no additional subscriber group records to be created (1114-N), then the flowchart 1100 continues to decision point 1116 where it is determined whether there are additional subscriber records to be created. If it is determined that additional subscriber records are to be created (1116-Y), then the flowchart 1100 returns to module 1102 and continues as described previously. If, on the other hand, it is determined that no additional subscriber records are to be created (1116-N), then the flowchart ends. It may be noted that in a typical implementation, the method could be restarted at module 1102 or module 1110 if there is another subscriber record or another subscriber group record to be created. Therefore, the end is a logical end to the flowchart 1100, but the process can continue as needed.

Figure 98:
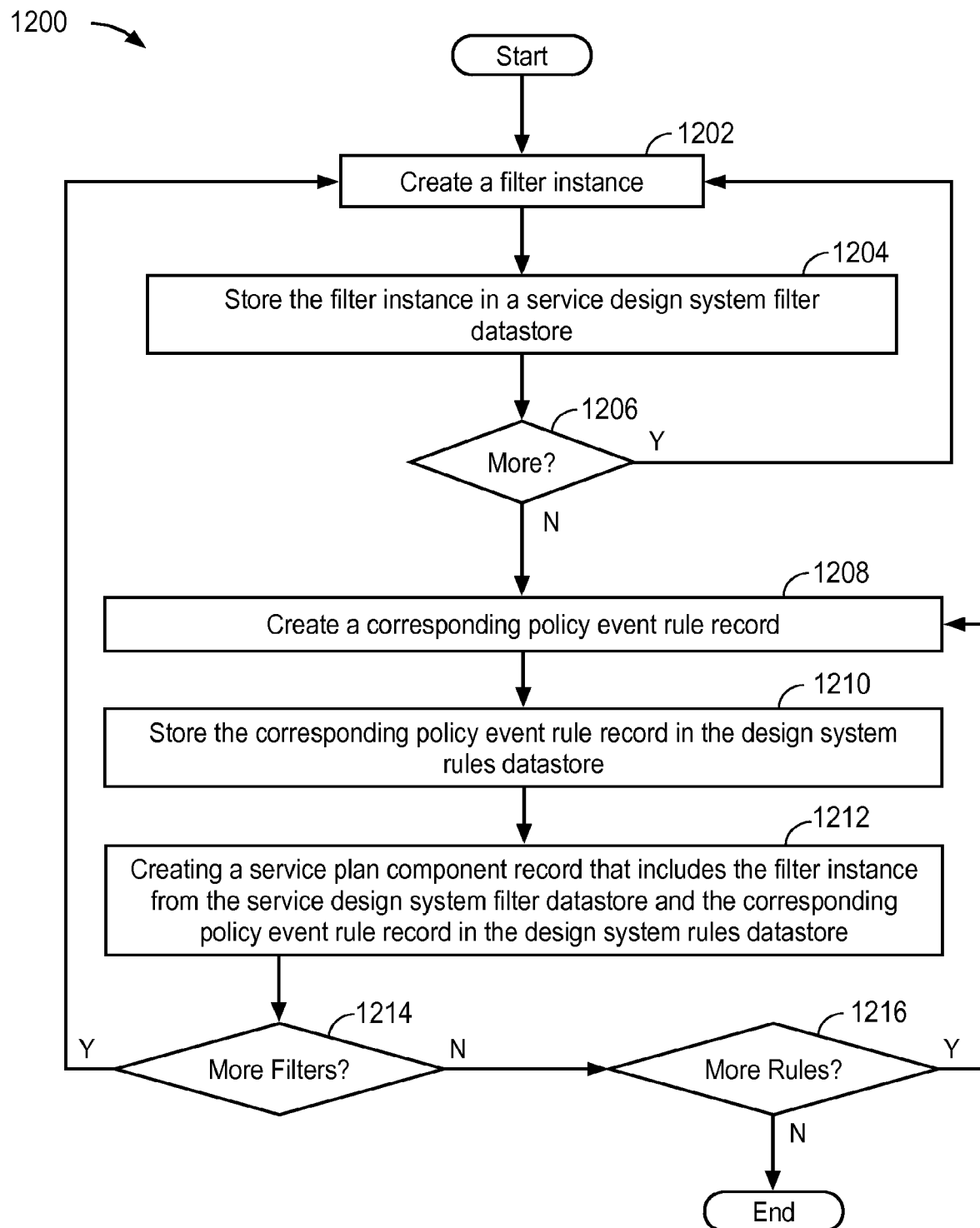
FIG. 98 depicts a flowchart of an example of a method for creating service plan components.

FIG. 98 depicts a flowchart of an example of a method for creating service plan components. In the example of FIG. 98, the flowchart 1200 starts at module 1202 with creating a filter instance. A filter record is created by this action, but the term "instance" is used because of the way in which a filter is used in the system. Specifically, a filter can have global characteristics in the sense that if two service plan components incorporate the filter instance and the filter instance is later changed, the changes are applied to both of the service plan components. Thus, there is a single filter instance that is used in multiple components. Alternatively, a filter instance can be created from a template in the sense that if two service plan components incorporate the filter instance and a change is made to one of the filter instances, the changes are not applied to the other filter instance. Thus, each application of the filter template is a separate filter instance. In a specific implementation, filter instances can be explicitly set to be either global or local. It is also possible to create a global filter template (such that changes to the global filter template are applied to all instances of the filter) as well as local filter instances that can be changed within service plan components without the changes cascading through the system.

In the example of FIG. 98, the flowchart 1200 continues to module 1204 with storing the filter instance in a service design system filter datastore. The service design system filter datastore may have explicit data structure requirements for the filter instance, but will at least include a traffic instance that matches the filter. In a specific implementation, the traffic instances can include traffic events that include a specified remote destination (e.g., a domain or IP address), a specified application (identified by, e.g., name, hash, certificate, signature, other secure ID, etc.), a specified operating system, specified content, a specified protocol (e.g., TCP, UDP, TCP/UDP), or a specified port number. Domain filters can be specified to allow references to be loaded and/or to use associative filtering (e.g., by seconds or by bytes of data). Application filters can be specified to validate applications. Each filter instance stored in the service design system filter datastore can include a filter name and description to make use of the filter easier for human agents.

In a specific implementation, filter instances can be specified to be match or no match filters. A "match" filter does not prevent attempts to match a traffic event to another filter. A "no match" filter prevents a network traffic inspection engine from attempting to match a traffic event to another filter. In a sense, this applies an action to a filter, and the match and no match aspect of a filter can be treated as a filter aspect or an associated action aspect, whichever is more applicable in a given context.

In the example of FIG. 98, the flowchart 1200 continues to decision point 1206 where it is determined whether there are more filter instances to create. If it is determined that there are more filter instances to create (1206-Y) then the flowchart 1200 returns to module 1202 and continues as described previously for a next filter instance.

If, on the other hand, it is determined that there are no additional filter events to be created (1206-N), then the flowchart 1200 continues to module 1208 with creating a corresponding policy event rule record. The policy event rule enables a service plan component to determine what network state (including any network state) is applicable to a policy event. It may be noted that in a specific implementation, the rules can be created without a corresponding filter (e.g., as a stand-alone rule). The policy event rule becomes applicable when a filter matches a traffic event in a way that is specified by the rule. For example, if a traffic event matches a filter instance such that a network state is detected (e.g., in a network state, transitioning into the network state, or transitioning out of the network state), then a rule that specifies these conditions is applicable. Other examples of specified conditions are when a traffic event is allowed, blocked, throttled, delayed, or deferred, each which could be specified to be match or no match.

Policy rules can also define caps, which are met when a count of, e.g., time or bytes, reaches the defined cap. (It may be noted that a count can be considered part of a notification policy.) When a capped policy event has a counter increment to its defined cap, the filter can change from, e.g., allow (when the cap has not been exceeded) to block, throttle, delay, or defer (when the cap has been exceeded). The capped policy event could similarly go from, e.g., throttle (when the cap has not been exceeded) to throttle more (when the cap has been exceeded) or some other combination of filtering activity before and after a cap has been exceeded.

In the example of FIG. 98, the flowchart 1200 continues to module 1210 with storing the corresponding policy event rule record in the design system rules datastore. Policy event rules records can include one or more of a traffic control policy, a notification policy, and a charging policy. Traffic control policy rules are associated with the type of filter to which the traffic control policy rule corresponds (e.g., allow, block, throttle, delay, defer, or take no action). The applicable traffic control can be function of network state, device state, service plan usage state, etc.

Notification policy rules are associated with sending information to a party, such as a subscriber, human or non-human agent of a service design system, a program, etc. In a specific implementation, a notification policy record can be given a name and description, and notification details such as whether the notification is in the foreground or background, the destination of the notification (e.g., to a subscriber, to a server, or to some other party), and interaction that is enabled in association with the notification (e.g., number of times the notification is displayed before it is no longer displayed to a user or an option that enables a user to suppress the notification in the future). Notifications to subscribers and human agents of the service design system will typically include human-readable content, such as a title, subtitle, short text, and/or long text description. Notifications to non-human agents may or may not include the same information, and can include instruction sets that make little or no sense when read by a human. In a specific implementation, notifications can include variables that insert data from datastores, about network state, or other data that can vary over time. A service design agent can include selection options (e.g., buttons) in a notification that enable the recipient to provide feedback or instructions. Useful selection options might include, for example, upsell plans, a service offerings catalog, a request for more information, an indication that overage is desired, launching a URL, and/or dismiss. In a specific implementation, a service design system agent can use a graphical user interface that displays a mobile device with the notification as it would be displayed (perhaps without some icons or other features of the mobile device) to make review of the notification convenient.

Charging policy rules are associated with determining how much to bill for usage (in time or bytes). In a specific implementation, a service plan component can inherit charging policy from a plan in which the component is integrated. So, strictly speaking, in such an implementation, a service plan component record need not have a charging policy rule, though when deployed it can have a charging policy rule due to inheritance. Where the charging policy is defined for a component, the charging policy can be based on data used or time, may or may not have an overage allowance (with an optional maximum overage usage), and will have a rate, which can be specified with a charging code.

In the example of FIG. 98, the flowchart 1200 continues to module 1212 with creating a service plan component record that includes the filter instance from the service design system filter datastore and the policy event rule record in the design system rules datastore. It may be observed that a service plan component will always have a filter and a policy event rule. Assuming the traffic control policy is defined to include "detect" (in addition to allow, block, throttle, delay, defer, to name several), the service plan component can be defined as always including a traffic control policy, where "detect" does nothing more than trigger the policy event when the filter and policy event rule matches a traffic event. Assuming the notification policy is defined to include "none," the service plan component can be defined as always including a notification policy. Assuming the charging policy is defined to include "inherit," the service plan component can be defined as always including a charging policy, which is determined when the component is integrated into a plan from which it can inherit the charging policy.

In the example of FIG. 98, the flowchart 1200 continues to decision point 1214 where it is determined whether more filter instances are to be created. If it is determined that more filter instances are to be created (1214-Y), then the flowchart returns to module 1202 and continues as described previously (though at module 1212, instead of creating a service plan component record, the service plan component record can be modified). If, on the other hand, it is determined that no more filter instances are to be created (1214-N), then the flowchart 1200 continues to decision point 1216 where it is determined whether more policy event rule records corresponding to a filter record are to be created.

If it is determined that more policy event rule records corresponding to a filter record are to be created (1216-Y), then the flowchart 1200 returns to module 1208 and continues as described previously (though at module 1212, instead of creating a service plan component record, the service plan component record can be modified). If, on the other hand, it is determined that no more policy event rule records corresponding to a filter record are to be created (1216-N), then the flowchart 1200 ends.

It may be noted that in a typical implementation, the method could be restarted at module 1202, module 1208, or module 1212 if there is another filter instance, policy event rule record, or service plan component record to be created. Therefore, the end is a logical end to the flowchart 1200, but the process can continue as needed.

Figure 99:
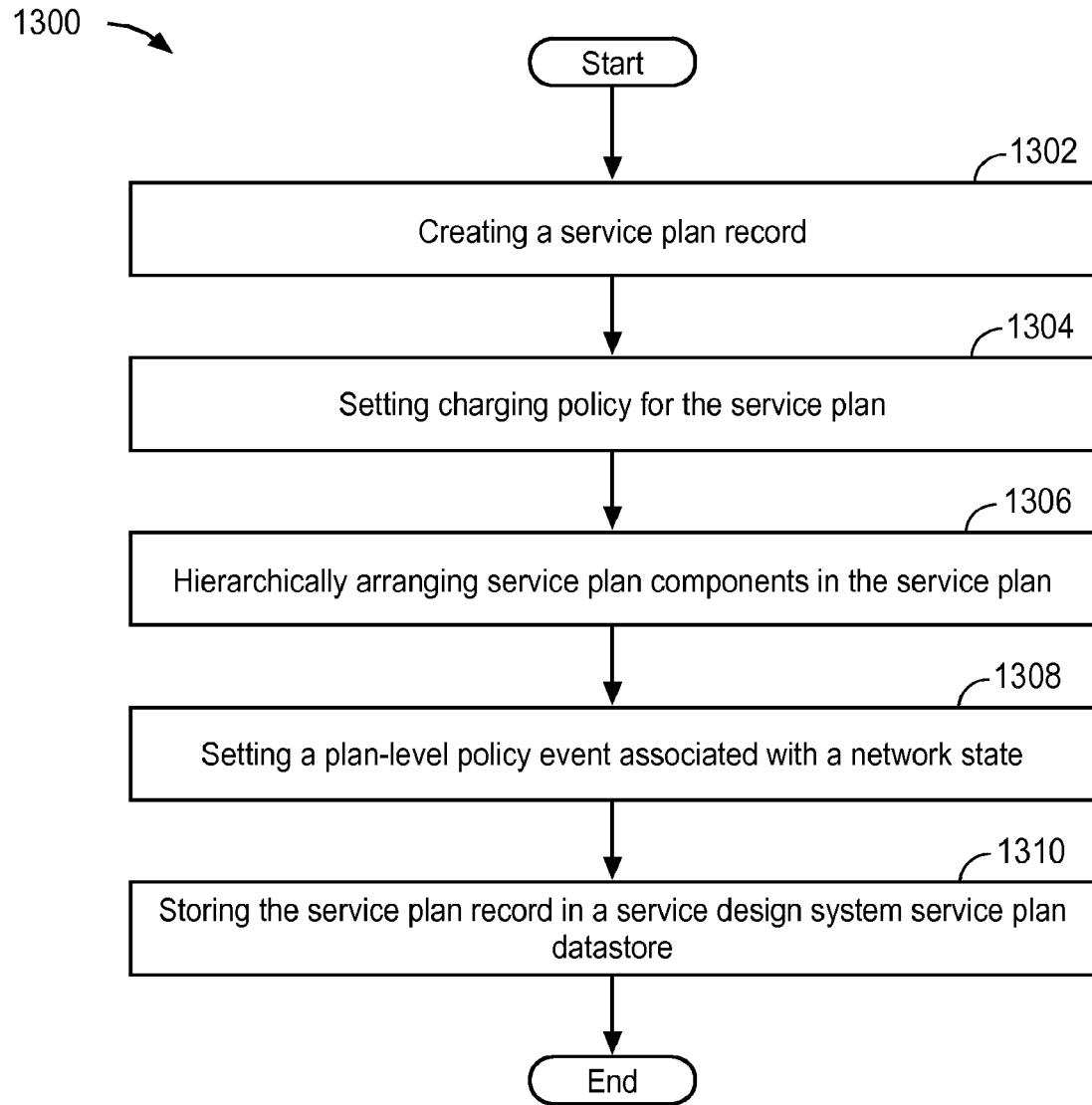
FIG. 99 depicts a flowchart of an example of a method for creating service plans from service plan components.

FIG. 99 depicts a flowchart 1300 of an example of a method for creating service plans from service plan components. For illustrative purposes, it is assumed that filter instances, policy event rule records, and service plan component records that are going to be used in a service plan have already been created. It may be noted that none, some, or all of the filter instances, policy event rule records, and service plan component records could be created at any appropriate point (not depicted) in the flowchart 1300. In a specific implementation, the filter instances and policy event rule records can be used at both the service plan component level (see, e.g., FIG. 98) and at the service plan level.

In the example of FIG. 99, the flowchart 1300 continues to module 1310 with creating a service plan record. The service plan record can include an icon for display on, e.g., subscriber devices, a plan name, a plan short description, a plan description, a plan version, a plan type (e.g., sponsored, paid, or carrier), whether the plan is a default plan, whether the plan is repurchaseable, a billing price, and a display price. Whether a policy label is displayed on a subscriber device can also be set. It may be noted that the service plan record could instead be created after all or a portion of the information associated with the following modules has been provided.

In the example of FIG. 99, the flowchart 1300 continues to module 1304 with setting charging policy for the service plan. The charging policy can be based on data or time usage and can have a usage limit, with or without overage of some amount, the billing policy cycle can be configured as appropriate (e.g., duration, frequency, report usage, pre- or postpaid billing, etc.). Whether billing identifiers are used (e.g., billing name, carrier service ID, etc.) can also be set. If charging codes are used, charging codes can also be identified and set to the default or not as is appropriate for the service plan. The charging policy can be inherited by service plan components of the plan that are configured to inherit the charging policy of the plan.

In the example of FIG. 99, the flowchart 1300 continues to module 1306 with hierarchically arranging service plan components in the service plan. The hierarchical arrangement can be explicit (e.g., by indicating priority in a field associated with a component) or implicit in the ordering of the components. In a specific implementation, the components also have service classes. For example, components could fall into the service classes carrier, network protection, sponsored, paid, parental control, marketing intercept, open access/bulk, post-bulk, and no applicable service plan/end-of-life. Thus, hierarchical arrangement of service plan components can refer to hierarchical arrangement of the service plan components relative to one another, to hierarchical arrangement of the service plan components within a service class relative to other service plan components in that service class, or to both.

Depending upon the implementation, service plan components can be designated to have a service class upon creation (or edit), or the component can be assigned to a service class when the component is added to the service plan. For example, a service plan component could be assigned to a "paid" service class, but could also function appropriately if assigned to a marketing intercept service class. Depending upon the implementation, the component could be designated "paid" upon creation and copied to create a similar "marketing intercept" component, or the component could be designated either paid or marketing intercept upon creation (or have no service class designation), and inserted into the relevant service class when arranged in a service plan. Thus, the hierarchical arrangement can be dynamic by service class (e.g., a designer can pick the class into which to arrange a component) or static by service class (e.g., the component is created within a service class). In a specific implementation, a service plan component with a static service class can be explicitly arranged by priority relative to other service plan components within the service class, a service plan component with a dynamically assigned service class can be explicitly arranged by priority relative to other service plan components within the service class, a service plan component with a static service class can be implicitly arranged by priority within the service class, and a service plan component with a dynamically assigned service class can be implicitly arranged by priority within the service class.

In the examples provided in this paper, the carrier service class is generally treated as the highest priority service class. Carrier plans will include basic network policy. In a specific implementation, carrier plans are automatically enforced on a subscriber device and are not offered in a plan catalog.

In the examples provided in this paper, the second highest priority service class, network protection, can be associated with policy designed to protect network resources (e.g., by detecting devices that are consuming too many network resources and throttling or blocking them). Network protection services can have variable billing policies that are selectable by a subscriber (e.g., to enable foreground processing as opposed to background processing, speed, etc.), but a subscriber may or may not have the ability to modify network protection policy, depending upon the implementation.

In the examples provided in this paper, the third highest priority service class, sponsored, can be associated with service plans that are sponsored in whole or in part by an entity other than the subscriber. Partially sponsored plans can be referred to as subsidized, though the term "sponsored" is intended to include subsidized plans unless otherwise indicated by context. Depending upon the implementation and/or configuration, sponsored plans may or may not be optional. For example, an employee of a company may have a sponsored service plan that is applicable when the employee accesses the company intranet, and the employee may or may not be able to decline the sponsorship. As another example, Facebook may subsidize network resource consumption when a subscriber accesses the Facebook website, and the subscriber may or may not be able to decline the subsidy.

In the examples provided in this paper, the fourth highest priority service class, paid, can be associated with service plans that a subscriber purchases. It is generally the case that a subscriber will be given the option to purchase a paid service plan through, e.g., an actionable service offer. (An actionable service offer is a notification that includes a feedback mechanism, such as an accept button, that a subscriber can select to accept the service offer.) Service offers can be triggered by predefined conditions, such as when a subscriber attempts to do something that a plan would help. (Service offers can also be triggered for sponsored services.)

In the examples provided in this paper, the fifth highest priority service class, parental control, can be associated with service plans that a subscriber purchases or modifies in accordance with an authentication process. Parental control plans can be associated with multi- (or single-) device plans for which a primary subscriber can set policy. Depending upon the implementation, different devices of a multi-device plan can also have different sponsored and paid plans.

In the examples provided in this paper, the sixth highest priority service class, market interceptor, can be associated with service plans that are offered to a subscriber before the subscriber drops to the bulk policy service class. Market interceptor plans can include service offers that are favorable to open access policy in some way.

In the examples provided in this paper, the seventh highest priority service class, open access or bulk, can be associated with a catch-all service plan.

In the examples provided in this paper, the eighth highest priority service class, post-bulk, can be associated with service plans that can be activated in the event no other service plan is applicable. In a specific implementation, post-bulk plans are designed to offer a subscriber a last chance to activate a service plan for something that the subscriber is trying to do, but is unable due to no service plan being available. If the subscriber responds appropriately to a notification, the subscriber may activate a service plan (e.g., a paid service plan) relevant to a present activity.

In the examples provided in this paper, the ninth highest priority service class, end-of-life, is typically associated with a notification that no service plan is available for a detected traffic event.

It is not necessary to utilize all service classes to take advantage of a service class hierarchy in specific implementations. It is also possible to move a class up or down relative to other classes in the hierarchy. For example, the network protection class could be given a priority below paid service class.

In the example of FIG. 99, the flowchart 1300 continues to module 1308 with setting a plan-level policy event associated with a network state. As was described previously, each service plan component can have a traffic control policy, a notification policy, and a charging policy. Policy events can also be set at the plan level. In a specific implementation, the filters and rules that were created when creating service plan components can be reused at the plan level, and if filters and rules are created when creating the service plan (not depicted), then those filters and rules can, be used at the service plan component level. In a specific implementation, the policy events can be associated with a network state. Network state can refer to current or historical parameters (e.g., congestion, previous number of failed attempts to authenticate on the network, time of day, geographic location, type of network, device is roaming, etc.) Policy events can also be set to be applicable for any (i.e., regardless of) network state.

In the example of FIG. 99, the flowchart 1300 ends at module 1312 with storing the service plan record in a service design system service plan datastore. Advantageously, the service plan can be used in multiple service plan catalogs without modification. Alternatively, the service plan record could be cloned for use in various service plan catalogs with or without modification. Where versioning is used, deployed service plans can either be automatically updated to new versions (with a possible grandfathering-in of subscribers to service plan components from prior versions), or the service plans can be wholly or partially templated such that new versions of the service plan do not impact deployed service plan offerings. Depending upon the implementation, a designer can go back to any module to edit parameters (e.g., after reviewing the service plan and determining that a parameter should be changed).

Figure 100:
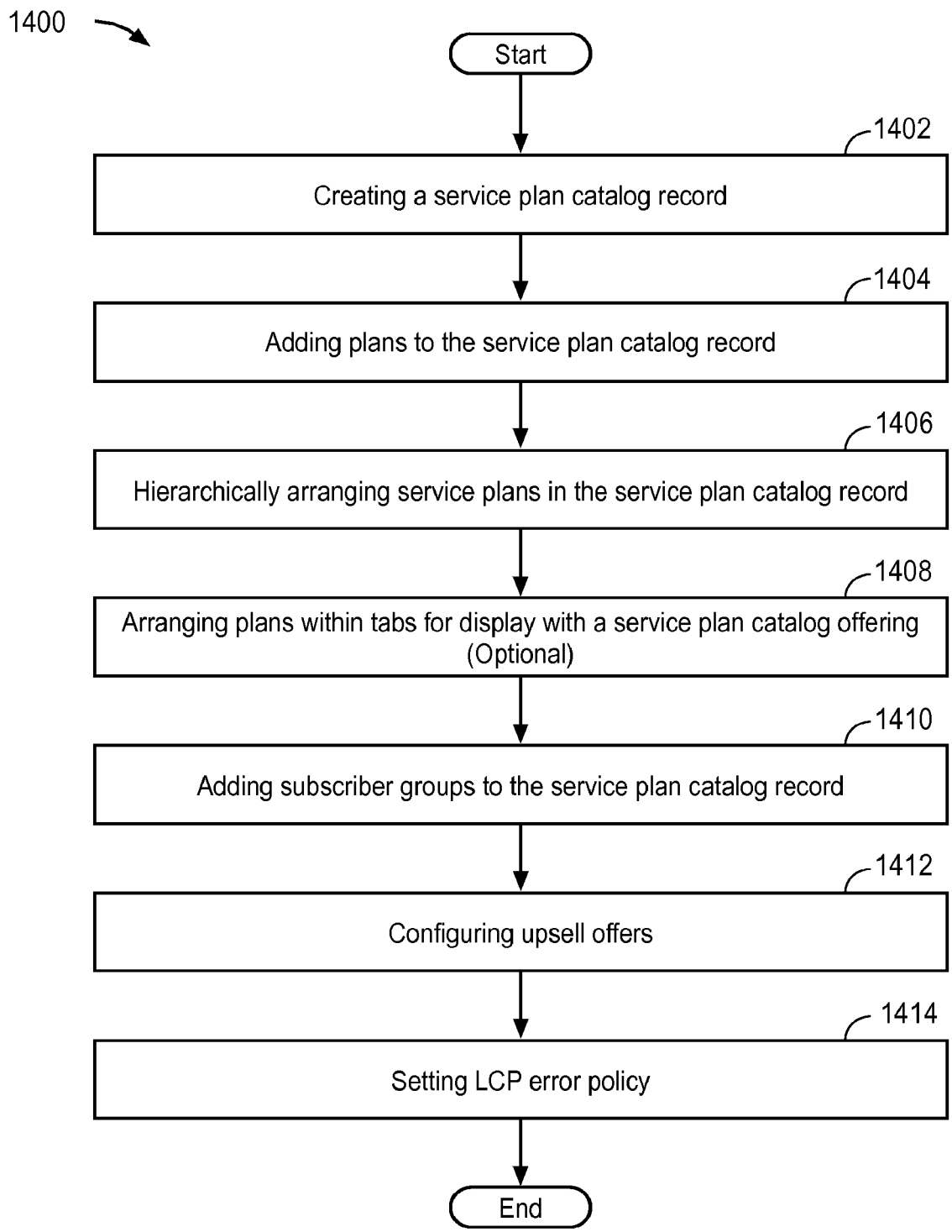
FIG. 100 depicts a flowchart of an example of a method for creating service plan catalogs from subscriber groups and service plans.

A service design engine can use a process, such as the example provided with reference to FIG. 97, to create subscriber groups. The service design engine can also use a process, such as the example provided with reference to FIG. 99, to create service plans. The subscriber groups and service plans can be implemented in service plan catalogs that are provided to access networks for automatic or selective implementation. FIG. 100 depicts a flowchart 1400 of an example of a method for creating service plan catalogs from subscriber groups and service plans.

In the example of FIG. 100, the flowchart 1400 starts at module 1402 with creating a service plan catalog record. The service plan catalog record can include a plan catalog name, a plan catalog description, a plan catalog version, or the like. It may be noted that the service plan catalog record could instead be created after all or a portion of the information associated with the following modules has been provided.

In the example of FIG. 100, the flowchart 1400 continues to module 1404 with adding plans to the service plan catalog record. In a specific implementation, the plans are stored as records in a service design system service plans datastore. In a specific implementation, the plans are represented in a list, and a designer can drag plans from the list into a chosen plans list using a service design system UI. Plans can be designated as available upon activation (or not).

In the example of FIG. 100, the flowchart 1400 continues to module 1406 with hierarchically arranging the service plans in the service plan catalog record. The plans can be arranged by priority relative to one another, which results in a higher priority plan being displayed and/or used first. The plans can also be arranged within a service class relative to other plans in the service class. Service class can be statically assigned to the plans when they are created (or edited) or dynamically assigned during the creation of the service plan catalog. Priorities can be explicit based on a priority indicator, implicit based on a relative location of a plan in the list of plans, or indicated in some other manner. In a specific implementation, a service design system UI enables a designer to drag a plan up or down a list of plans within service classes to establish priority, which is indicated by a priority number that corresponds to the relative order of a plan within a service class.

In the example of FIG. 100, the flowchart 1400 continues to module 1408 with optionally arranging plans within tabs for display with a service plan catalog offering. Tabs can include categories such as games, social, productivity, media, free, paid, all, or the like. An association between a tab and a plan can be formed such that the plan will be displayed under the associated tab when the service plan catalog offering is displayed, e.g., on a subscriber device. A plan can be associated with multiple tabs, and displayed under the multiple tabs. The order of the tabs can be configured, as can the order of the plans within tabs. In this paper, the order of the plans within a tab is not related to the priority of a plan, e.g., within a service class, though such a correlation could be made in alternative implementations.

In the example of FIG. 100, the flowchart 1400 continues to module 1410 with adding subscriber groups to the service plan catalog record. In a specific implementation, the subscriber groups are represented in a list, and a designer can drag plans from the list into a chosen subscriber groups list using a service design system UI. Other methods of adding subscriber groups are anticipated, such as, e.g., by identifying subscriber groups in accordance with subscriber characteristics.

When a service plan catalog is published, the subscriber groups associated with service plans in the service plan catalog identify the subscribers, whether automatically or by selecting the plan, that will have the policies of the relevant service plan enforced on their devices. Depending upon the implementation, publication of a plan can be in beta, which generally means the subscribers to the plan can have the plan changed with or without notice, or deployed, which generally means that subscribers can expect changes to future versions of the plan will not impact them until they need to repurchase the (new version of) the plan.

In the example of FIG. 100, the flowchart 1400 continues to module 1412 with configuring upsell offers. Upsell offers have notification policy that is associated with network state, device state, or subscriber state. For example, if a subscriber uses a great deal of streaming media in a bulk plan, it may be desirable to offer a streaming media plan that, based upon their current or historical usage, will save the subscriber money. As another example, a subscriber who is in a city with a wireless Municipal Area Network (MAN) might receive upsell offers associated with a using the wireless MAN. As another example, a subscriber who frequently accesses Facebook can be offered a service plan that is sponsored by Facebook, thereby decreasing service costs as long as the access is associated with Facebook. As another example, a subscriber who frequently accesses a Facebook competitor could be offered a service plan that is sponsored by Facebook in an effort to draw the subscriber to Facebook (because it is cheaper). As another example, if a subscriber is indicated to have a language preference of Japanese, an upsell offer could target that demographic (e.g., by offering a sponsored service to access an application that is popular among Japanese speakers). As another example, a subscriber who has a particular device state (e.g., the subscriber record includes data that the subscriber uses an iPhone) can be targeted with an upsell offer that is popular with subscribers having such a device state.

Upsell offers can include a suite of all possible choices, or can be limited to offers that are more suitable to the specific historical usage of a particular subscriber. For example, if a subscriber typically consumes around 5 MB of data per unit of time, the system need not provide upsell offers for 10 MB, 100 MB, 1 GB, 10 GB, and 100 GB all at once (even though all might be offered), and instead send an upsell offer of 10 MB only (or, e.g., 10 MB and 100 MB). If usage for the subscriber increases, the subscriber can be notified regarding the larger-size service plans.

The upsell offer could alternatively be added to a service plan component, but in a specific implementation, it was deemed useful to modify upsell offers, even those that might be identified within a service plan component, at the service plan catalog level. In this way, standard upsell components of, e.g., a Facebook plan, can be modified with appropriate notification or other configurations for a given service plan catalog or for specific subscriber groups.

In the example of FIG. 100, the flowchart 1400 ends at module 1414 with setting LCP error policy. An LCP error occurs when a traffic event is not matched to an applicable service plan policy. Setting an LCP error for a service plan catalog enables the LCP error to be handled in an elegant fashion (e.g., by sending a notification to a subscriber that the traffic event can be handled in accordance with an inactive service plan, the notification including an option for the subscriber to activate the inactive service plan). The LCP error notification policy could alternatively be added to a service plan component, but in a specific implementation, it was deemed useful to enable LCP error policy settings at the service plan catalog level because the LCP error policy always comes at the end of attempts to match all active plans in a service plan catalog offering. This results in improved service plan design efficiency. Depending upon the implementation, a designer can go back to any module to edit parameters (e.g., after reviewing the service plan catalog and determining that a parameter should be changed).

Figure 101:
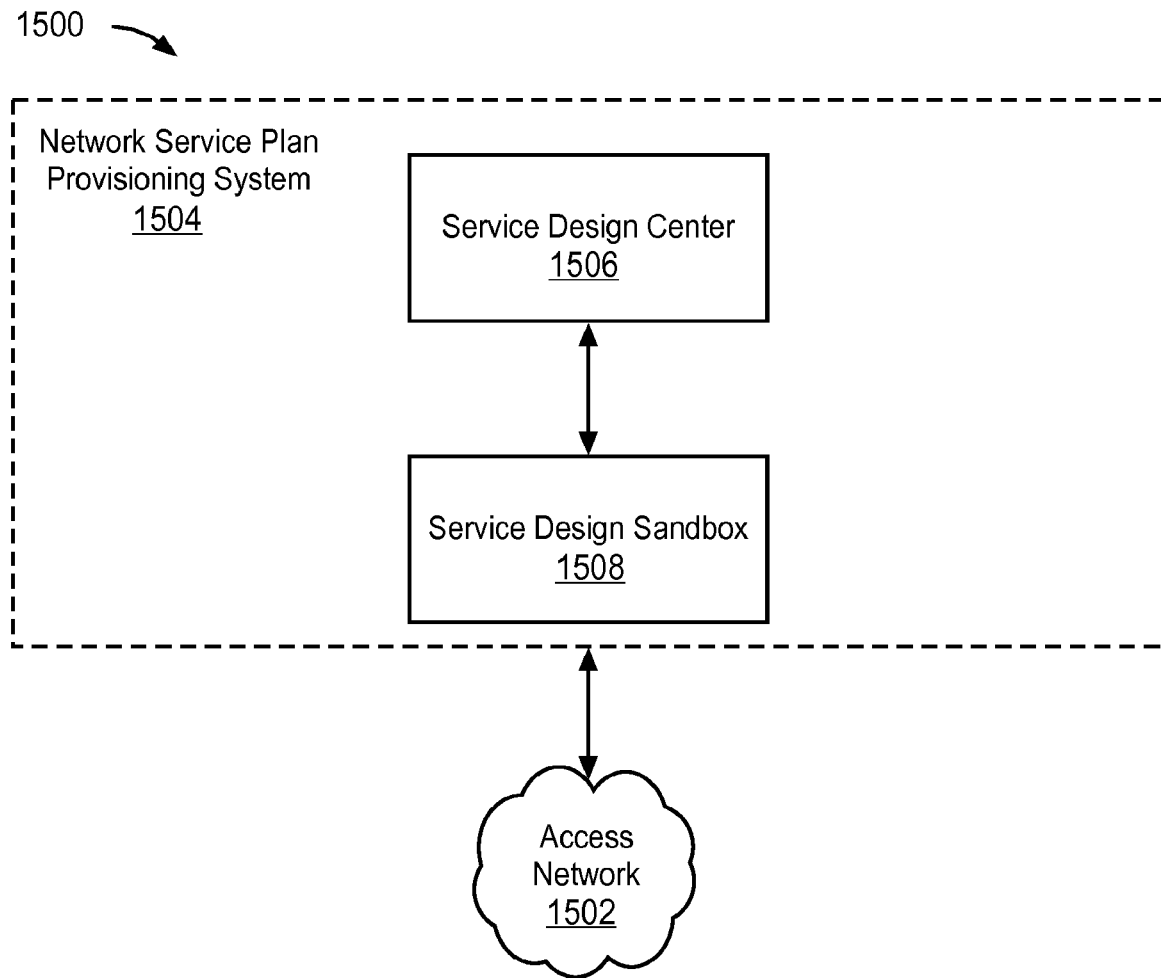
FIG. 101 depicts an example of system including an access network and a network service plan provisioning sandbox system.

FIG. 101 depicts an example of system 1500 including an access network and a network service plan provisioning sandbox system. The system 1500 includes an access network 1502 and a network service plan provisioning system 1504. The access network 1502 is similar to that described with reference to FIG. 93.

In the example of FIG. 101, the network service plan provisioning system 1504 includes a service design center 1506 and a service design sandbox 1508. Conceptually, the service design center 1506 and the service design sandbox 1508 share design and/or provisioning responsibilities. The service design center 1506 and the service design sandbox 1508 can be hierarchically organized. For example, the service design center 1506 can delegate certain roles to the service design sandbox 1508 and perhaps retains an oversight capability for agents of the service design center 1506. For example, the service design sandbox 1508 can be given the ability to impact policy control to a subset of subscriber groups of the network service plan provisioning system 1504. The network service plan provisioning system 1504 can be referred to as "distributed" in this example.

Some examples of entities that might desire to include the service design sandbox 1508 in their networks include enterprises with employees that consume network services, MVNOs, application developers, gifters, and community-based organizations. In the case of enterprises with employees that consume network services, the service design sandbox 1508 can enable fine-tuned control over traffic control and charging policy (as well as notification policy). Assume that XYZ company controls the service design sandbox 1508. XYZ company can create a service plan specific to XYZ company network services on the XYZ company intranet, which will be referred to as the XYZ plan. Specifically, the XYZ company can sponsor the XYZ company network services on the XYZ company intranet for XYZ company employees. A paid plan offered by a carrier that controls the service design center 1506, for example, can still be available for XYZ company employees that are using other network services (or XYZ company could partially sponsor a subset of the other network services). The XYZ plan could also include a component that prevents XYZ company employees from accessing certain restricted sites through the XYZ company intranet and has notification policy associated with the attempted access. Continuing the example, an agent (e.g., IT manager) of the XYZ company can define subscriber groups that comprise XYZ company members and assign different service plans (e.g., different traffic control, notification, or charging policies) to the different XYZ company subscriber groups. For example, employees could get limited usage, managers might get access to more usage and additional services (e.g., email), members of the sales team might get better roaming services, and a CEO might get everything in the carrier's service plan offering, perhaps with XYZ company as a sponsor for all services. Advantageously, split-billing is possible using these techniques, such that XYZ company can pay for sponsored services and XYZ employees can pay for unsponsored services (or for a portion of subsidized services).

In the case of MVNOs, an MVNO can purchase bulk data from a carrier and offer plans based on the bulk. Advantageously for MVNOs, the service design sandbox 1508 enables control over subscribers based on, e.g., network state. Indeed, for all subscribers "owned" by the MVNO, a great deal of policy control can be applied (dependent upon the amount of control a carrier is willing to give to the MVNO). Other providers that can benefit from the sandbox model include mobile virtual network enablers (MVNEs), mobile shared spectrum enablers (MSSEs), and service providers (SPs).

In the case of application developers, the service design sandbox 1508 can specify applications that can be covered by a service plan. The service design center 1506 may or may not be responsible for creating the underlying control mechanism. For example, a company like amazon.com can be given some control over sponsorship settings for applications associated with amazon.com.

In the case of gifters, the service design sandbox 1508 can enable specification of a sponsorship amount that is donated to some other organization, such as a non-profit organization. In the case of community-based organizations, the service design sandbox 1508 can specify free access for a particular network service. For example, the San Francisco Giants organization could have a plan group for fans that grants free access to the official site of the San Francisco Giants. As another example, AAA could sponsor access to services for AAA members.

Agents of the network service plan provisioning system can be given roles that grant access to certain aspects of service design and/or provisioning. For example, agents at the service design center 1506 can have a role system administrator, super user, or the like, while agents of the service design sandbox 1508 can have roles such as enterprise IT manager, MVNO administrator, or the like. Agents of the service design sandbox 1508 can subdivide roles further, if applicable, depending upon implementation.

Figure 102:
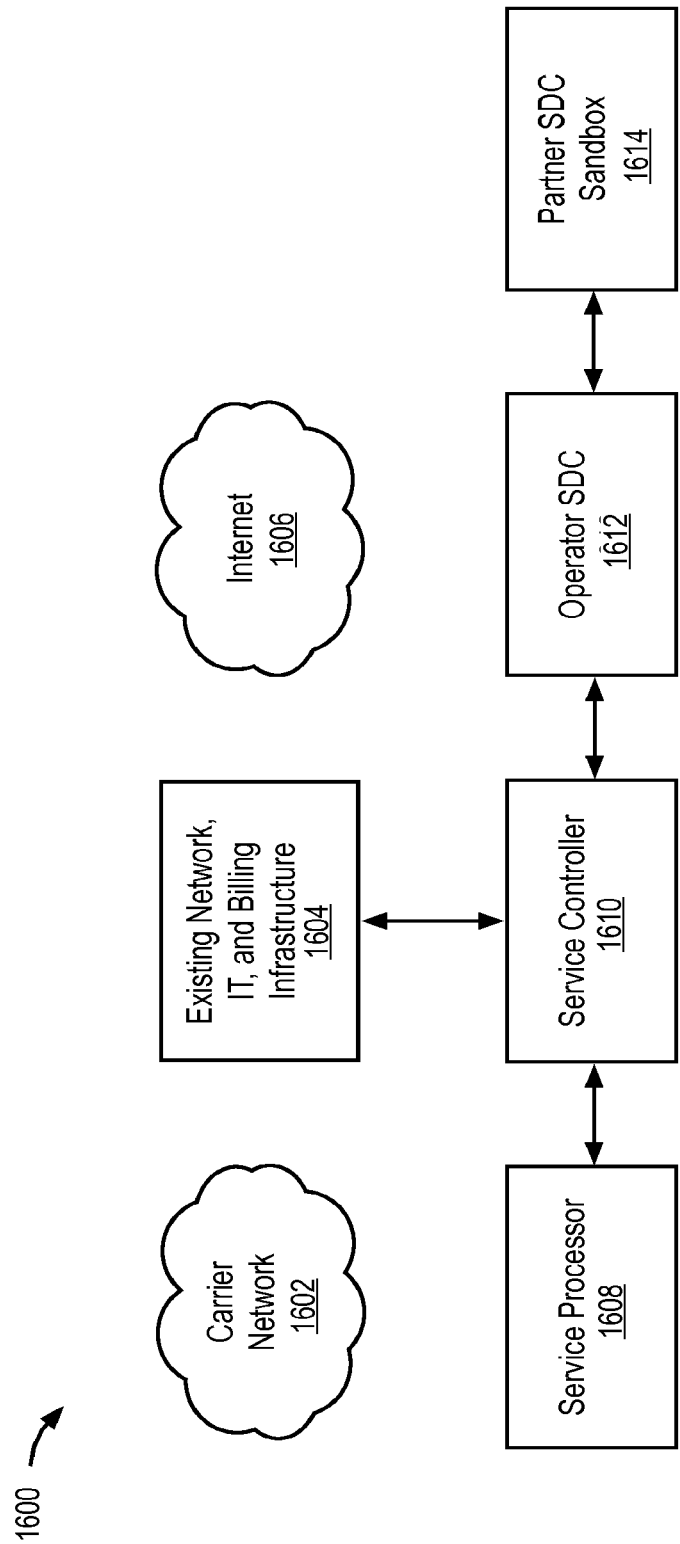
FIG. 102 depicts a conceptual diagram of an example of a service design system sandbox implementation.

FIG. 102 depicts a conceptual diagram 1600 of an example of a service design system sandbox implementation. The conceptual diagram 1600 includes a carrier network 1602, existing network, IT, and billing infrastructure 1604 (referred to as infrastructure 1604), the Internet 1606, a service processor 1608, a service controller 1610, an operator service design center (SDC) 1612, and a partner SDC sandbox 1614. In the example of FIG. 102, the carrier network is coupled to the Internet 1606 via the infrastructure 1604.

The service processor 1608 can be implemented on a client device on the carrier network 1602. In a specific implementation, the service processor 1608 includes a service control device link. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link also provides the communications link and heartbeat timing for the agent heartbeat function. The service control device link can provide an efficient and secure solution for transmitting and receiving service policy implementation, control, monitoring and verification information with other network elements.

In a specific implementation, a client dashboard is presented in a display device by the service processor 1608. The client dashboard can include the following menus: services (purchased, data usage), statistics (applications consuming data, data used in absolute terms or as a %), buy (navigates subscriber through activation, enrollment, plan selection, and purchase workflows), help, and settings (preferences, e.g., language).

The service controller 1610 can be implemented, e.g., in the cloud, and is coupled to the infrastructure 1604.

The operator SDC 1612 is on the Internet, and is coupled to the service controller. The operator SDC 1612 can set up boundaries for "sandboxed" service and allow customizations for partner sets; lock in master tariffs based on negotiated rates for a given partner set or individual partner; create custom log-ins for different partner sets or individual partners; and carry out any applicable techniques appropriate for a service design system. The operator SDC 1612 allows authorized agents to manage service plan components and subscribers. The agents can manage groups (collections of subscribers, SIMs, or devices) to create groups and group directories, assign an identity hierarchy for the operator, associated identifiers with groups, etc. The agents can manage service plans (including one or more components) including plan name and description, groups using the plan, service plan components, service activities, network busy states and connection types, charging policies (including usage limits, thresholds, frequency, time, and payment type), notifications (e.g., for plan usage thresholds, plan cap, expiration, block, overage, no capable plan, etc.), and events (e.g., for plan usage thresholds, plan cap, expiration, block, overage, etc.). The agents can manage service components (logical grouping of one or more filters and rules), including component name and description, plans using the component, network busy states and connection types, charging policies (including usage limits, thresholds, frequency, time and payment type), notifications (e.g., for plan usage thresholds, plan cap, expiration, block, overage, no capable plan, etc.), and events (e.g., for plan usage thresholds, plan cap, expiration, block, overage, etc.). The agents can manage service activities (e.g., activity name, plans using the activity, components using the activity, filter name and description, and filter type details (e.g., operating system, application, remote, port, protocol, etc.). The agents can manage service group plans including assign and publish plan group, create activation workflow screens, create buy workflow screens. The agents can receive, manage, customize, or generate reports for, for example, usage reports by destination for a subscriber over a period of time, usage reports by destination for a range of subscribers over a period of time (top destinations).

The partner SDC sandbox 1614 is coupled to the operator SDC 1612 in an applicable convenient fashion. The partner SDC sandbox 1614 can provide a secure login environment in which a subset of SDC service management controls can be designed and/or used; enable selection from bounded service customization options for one or more device groups under management; customize device UI branding; access real time analytics for service usage, application usage, location, etc.; set up service usage alerts, fraud alerts, theft alerts, etc.; and carry out any applicable techniques appropriate for a service design system that have been delegated to the sandboxed environment.

The service controller 1610 includes a service control server link. In some a specific implementation, device based service control techniques involving supervision across a network (e.g., on the control plane) are more sophisticated, and for such it is increasingly important to have an efficient and flexible control plane communication link between the device agents (e.g., of the service processor 1608) and the network elements (e.g., of the service controller 1610) communicating with, controlling, monitoring, or verifying service policy. For example, the communication link between the service control server link of service controller 1610 and the service control device link of the service processor 1610 can provide an efficient and flexible control plane communication link, a service control link; in some embodiments, this control plane communication link provides for a secure (e.g., encrypted) communications link for providing secure, bidirectional communications between the service processor 1608 and the service controller 1610. In some embodiments, the service control server link provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link also provides the communications link and heartbeat timing for the agent heartbeat function. In some embodiments, the service control server link provides for securing, signing, encrypting and/or otherwise protecting the communications before sending such communications over the service control link. For example, the service control server link can send to the transport layer or directly to the link layer for transmission. In another example, the service control server link further secures the communications with transport layer encryption, such as TCP TLS or another secure transport layer protocol. As another example, the service control server link can encrypt at the link layer, such as using IPSEC, various possible VPN services, other forms of IP layer encryption and/or another link layer encryption technique.

In a specific implementation, the service controller 1610 can include an access control integrity server (e.g., service policy security server). In some embodiments, the access control integrity server collects device information on service policy, service usage, agent configuration, and/or agent behavior. For example, the access control integrity server can cross check this information to identify integrity breaches in the service policy implementation and control system. In another example, the access control integrity server can initiate action when a service policy violation (e.g., QoS policy violation and/or a network capacity controlled services policy violation) or a system integrity breach is suspected.

In a specific implementation, an agent of the service controller 1610 (and/or some other agent of the access control integrity server) acts on access control integrity agent (e.g., service policy security agent) reports and error conditions. Many of the access control integrity agent checks can be accomplished by the server. For example, the access control integrity agent checks include one or more of the following: service usage measure against usage range consistent with policies (e.g., usage measure from the network and/or from the device); configuration of agents; operation of the agents; and/or dynamic agent download.

In a specific implementation, an agent of the service controller 1610 (and/or some other agent of the access control integrity server) verifies device service policy implementations by comparing various service usage measures (e.g., based on network monitored information, such as by using IPDRs or CDRs, and/or local service usage monitoring information) against expected service usage behavior given the policies that are intended to be in place (e.g., a QoS policy and/or a network capacity controlled services policy). For example, device service policy implementations can include measuring total QoS data passed, QoS data passed in a period of time, IP addresses, data per IP address, and/or other measures such as location, downloads, email accessed, URLs, and comparing such measures expected service usage behavior given the policies that are intended to be in place.

In a specific implementation, an agent of the service controller 1610 (and/or some other agent of the access control integrity server) verifies device service policy, and the verification error conditions that can indicate a mismatch in QoS service measure and QoS service policy include one or more of the following: unauthorized network access (e.g., access beyond ambient service policy limits); unauthorized network speed (e.g., average speed beyond service policy limit); network data amount does not match QoS policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, an agent of the service controller 1610 (and/or some other agent of the access control integrity server) provides a policy/service control integrity service to continually (e.g., periodically and/or based on trigger events) verify that the service control of the device has not been compromised and/or is not behaving out of policy (e.g., a QoS policy and/or a network capacity controlled services policy).

In a specific implementation, the service controller 1610 includes a service history server (e.g., charging server). In some embodiments, the service history server collects and records service usage or service activity reports from, e.g., an access network AAA server and/or a service monitor agent of the service controller 1610. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server provides the service history on request to other agents of the service controller 1610, other servers, and/or one or more other agents. In some embodiments, the service history server provides the service usage history to the device service history (e.g., CDR feed and CDR mediation). In some embodiments, for purposes of facilitating the activation tracking service functions (described below), the service history server maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

In a specific implementation, the service controller 1610 includes a policy management server (e.g., policy decision point (PDP) server) for managing service usage policies, such as QoS policies and/or a network capacity controlled services policies. In some embodiments, the policy management server transmits policies to the service processor 1608 via the service control link. In some embodiments, the policy management server manages policy settings on the device (e.g., various policy settings as described herein with respect to various embodiments) in accordance with a device service profile. In some embodiments, the policy management server sets instantaneous policies on policy implementation agents (e.g., policy implementation agent). For example, the policy management server can issue policy settings, monitor service usage and, if necessary, modify policy settings. For example, in the case of a user who prefers for the network to manage their service usage costs, or in the case of any adaptive policy management needs, the policy management server can maintain a relatively high frequency of communication with the device to collect traffic and/or service measures and issue new policy settings. In this example, device monitored service measures and any user service policy preference changes are reported, periodically and/or based on various triggers/events/requests, to the policy management server. In this example, user privacy settings generally require secure communication with the network (e.g., a secure service control link), such as with the policy management server, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server provides adaptive policy management on the device. For example, the policy management server can issue policy settings and objectives and rely on the device based policy management (e.g., service processor 1608) for some or all of the policy adaptation. This approach can require less interaction with the device thereby reducing network chatter on the service control link for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history, and/or other sensitive information) is not communicated to the network without the user's approval. In some embodiments, the policy management server adjusts service policy based on time of day. In some embodiments, the policy management server receives, requests, and/or otherwise obtains a measure of network availability/capacity and adjusts traffic shaping policy and/or other policy settings based on available network availability/capacity (e.g., a network busy state).

In a specific implementation, the service controller 1610 includes a network traffic analysis server. In some embodiments, the network traffic analysis server collects/receives service usage history for devices and/or groups of devices and analyzes the service usage. In some embodiments, the network traffic analysis server presents service usage statistics in various formats to identify improvements in network service quality and/or service profitability. In some embodiments, the network traffic analysis server estimates the service quality and/or service usage for the network under variable settings on potential service policies. In some embodiments, the network traffic analysis server identifies actual or potential service behaviors by one or more devices that are causing problems for overall network service quality or service cost. In some embodiments, the network traffic analysis server estimates the network availability/capacity for the network under variable settings on potential service policies. In some embodiments, the network traffic analysis server identifies actual or potential service behaviors by one or more devices that are impacting and/or causing problems for overall network availability/capacity.

In a specific implementation, the service controller 1610 includes a beta test server (e.g., policy creation point and beta test server). In some embodiments, the beta test server publishes candidate service plan policy settings to one or more devices. In some embodiments, the beta test server provides summary reports of network service usage or user feedback information for one or more candidate service plan policy settings. In some embodiments, the beta test server provides a mechanism to compare the beta test results for different candidate service plan policy settings or select the optimum candidates for further policy settings optimization, such as for protecting network capacity.

In a specific implementation, the service controller 1610 includes a service download control server (e.g., a service software download control server). In some embodiments, the service download control server provides a download function to install and/or update service software elements (e.g., the service processor 1608 and/or agents/components of the service processor 1608) on the device, as described herein.

In a specific implementation, the service controller 1610 includes a billing event server (e.g., micro-CDR server). In some embodiments, the billing event server collects billing events, provides service plan information to the service processor 1608, provides service usage updates to the service processor 1608, serves as interface between device and central billing server, and/or provides trusted third party function for certain ecommerce billing transactions.

In a specific implementation, the service processor 1608 provides an additional layer of access control. For example, an access network AAA server can provide necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. In some embodiments, the Access Network AAA server also provides the ability to suspend service for a device and resume service for a device based on communications received from the service controller 1610. In some embodiments, the Access Network AAA server also provides the ability to direct routing for device traffic to a quarantine network or to restrict or limit network access when a device quarantine condition is invoked. In some embodiments, the Access Network AAA server also records and reports device network service usage.

In some embodiments, different profiles are selected based on the selected network connection (e.g., different service profiles/policies for WWAN, WLAN, WPAN, Ethernet and/or DSL network connections), which can be referred to as multimode profile setting. For example, service profile settings can be based on the actual access network (e.g., home DSL/cable or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller 1610 can be owned by the hotspot service provider that uses the service controller 1610 on their own without any association with an access network service provider. For example, the service processor 1608 can be controlled by the service controller 1610 to divide up the available bandwidth at the hotspot according to QoS or user sharing rules (e.g., with some users having higher differentiated priority (e.g., potentially for higher service payments) than other users). As another example, ambient services (e.g., as similarly described herein) can be provided for the hotspot for verified service processors.

In some embodiments, the service processor 1608 and service controller 1610 are capable of assigning multiple service profiles associated with multiple service plans that the user chooses individually or in combination as a package. For example, a device starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email, and SMS service. In this case, the service controller 1610 would obtain from the billing system in the case of network based billing (e.g., or the service controller 1610 billing event server in the case of device based billing) the billing plan code for the new Internet, email and SMS service. In some embodiments, this code is cross referenced in a database (e.g., the policy management server) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device service processor. In some embodiments, the service processor 1608 can determine the superset profile rather than the service controller 1610 when more than one "stackable" service is selected by the user or otherwise applied to the device. The flexibility of the service processor 1608 and service controller 1610 embodiments described herein allow for a large variety of service profiles to be defined and applied individually or as a superset to achieve the desired device service features.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent, service monitor agent (e.g., charging agent), or another agent or function (or combinations thereof) of the service processor 1608 provides a DAS activity map. In some embodiments, a policy control agent, service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by socket (such as by IP address, protocol, and/or port), by socket id (such as port address/number), by port number, by content type, by application or application type, and/or any other service usage activity classification/categorization) with associated IP addresses and/or other criteria/measures. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments for providing QoS for DAS and/or for providing DAS for protecting network capacity. In some embodiments, the DAS activity map is used to provide the user various UI related information and notification techniques related to service usage as described herein with respect to various embodiments. In some embodiments, the DAS activity map is used to provide service usage monitoring, prediction/ estimation of future service usage, service usage billing (e.g., bill by account and/or any other service usage/billing categorization techniques), DAS techniques for ambient services usage monitoring, DAS techniques for generating micro-CDRs, and/or any of the various other DAS related techniques as described herein with respect to various embodiments.

Figure 103:
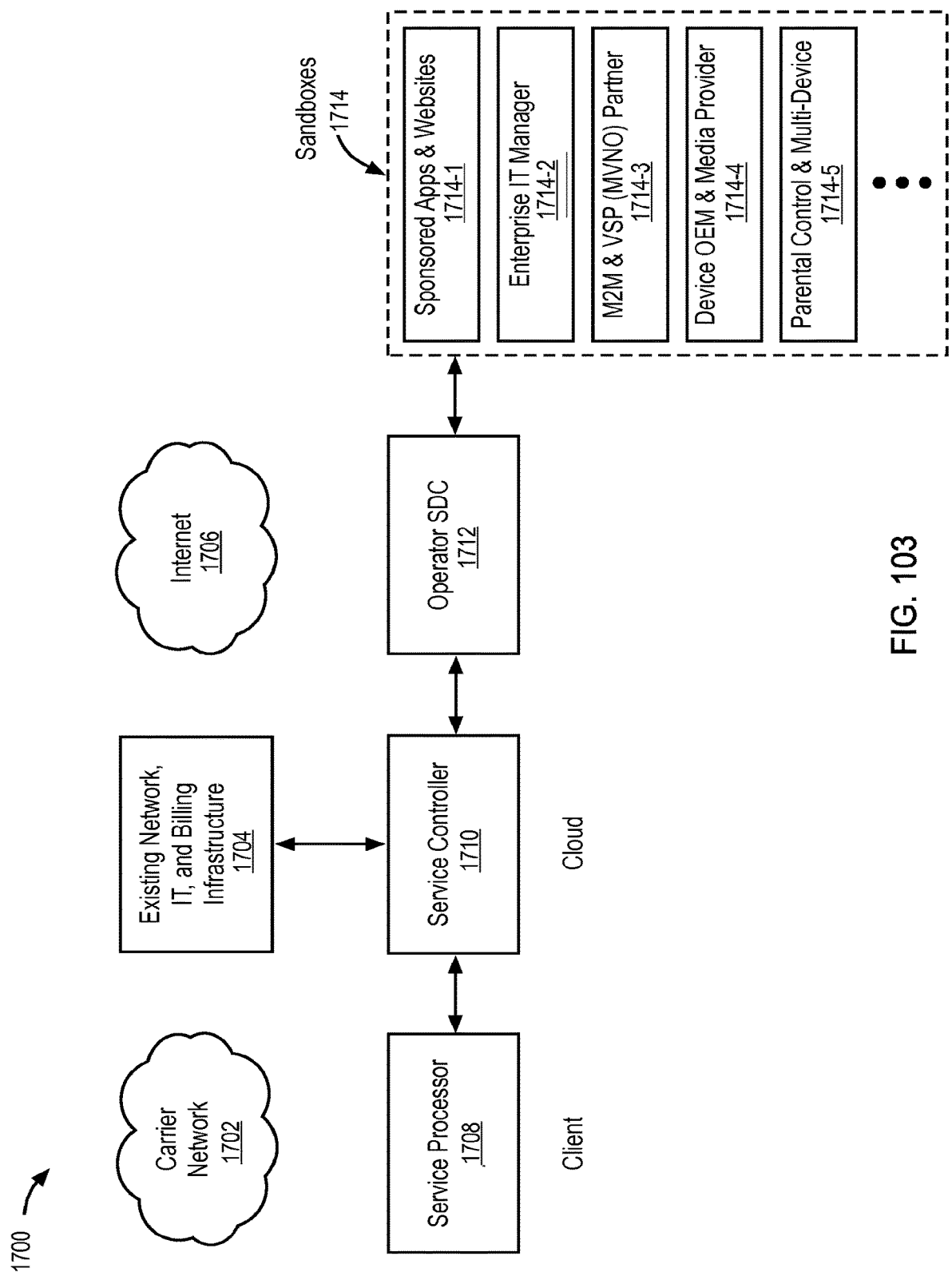
FIG. 103 depicts a conceptual diagram of an example of a service design system sandbox implementation.

FIG. 103 depicts a conceptual diagram 1700 of an example of a service design system sandbox implementation. The components of FIG. 103 are similar to those depicted in FIG. 102. FIG. 103 is intended to illustrate that various sandboxes can be created for a variety of purposes. In the example of FIG. 103, the sandboxes 1714 include sponsored apps & websites sandboxes 1714-1, enterprise IT manager sandboxes 1714-2, machine-to-machine (M2M) & virtual service provider (VSP) (MVNO) partner sandboxes 1714-3, device OEM & media provider sandboxes 1714-4, parental control & multi-device sandboxes 1714-5, etc. A common service controller cloud service software implemented at the service controller 1710 and server processor device client software implemented at the service processor 1708 allows operators and partners to scale customized user experiences and service plan policies.

In some embodiments, a network service usage control policy is dynamic based on one or more of the following: a network busy state, a time of day, which network the service activity is connected to, which base station or communication channel the service activity is connected to, a user input, a user preference selection, an associated service plan, a service plan change, an application behavior, a messaging layer behavior, random back off, a power state of device, a device usage state, a time based criteria (e.g., time/day/ week/month, hold/delay/defer for future time slot, hold/ delay/defer for scheduled time slot, and/or hold/delay/defer until a busy state/availability state/QoS state is achieved), monitoring of user interaction with the service activity, monitoring of user interaction with the device, the state of UI priority for the service activity, monitoring the power consumption behavior of the service activity, modem power cycling or power control state changes, modem communication session set up or tear down, and/or a policy update/ modification/change from the network. In some embodiments, the network service usage control policy is based on updated service usage behavior analysis of the network service usage activity. In some embodiments, the network service usage control policy is based on updated activity behavior response to a network capacity controlled service classification. In some embodiments, the network service usage control policy is based on updated user input/preferences (e.g., related to policies/controls for network capacity controlled services). In some embodiments, the network service usage control policy is based on updates to service plan status. In some embodiments, the network service usage control policy is based on updates to service plan policies. In some embodiments, the network service usage control policy is based on availability of alternative networks. In some embodiments, the network service usage control policy is based on policy rules for selecting alternative networks. In some embodiments, the network service usage control policy is based on network busy state or availability state for alternative networks. In some embodiments, the network service usage control policy is based on specific network selection or preference policies for a given network service activity or set of network service activities.

In some embodiments, associating the network service usage activity with a network service usage control policy or a network service usage notification policy, includes dynamically associating based on one or more of the following: a network busy state, a time of day, a user input/preference, an associated service plan (e.g., 25 MB data plan, 5G data plan, or an unlimited data plan or other data/service usage plan), an application behavior, a messaging layer behavior, a power state of device, a device usage state, a time based criteria, availability of alternative networks, and a set of policy rules for selecting and/or controlling traffic on one or more of the alternative networks.

In some embodiments, a network service usage control policy (e.g., a network capacity controlled services policy) includes defining the network service usage control policy for one or more service plans, defining network access policy rules for one or more devices or groups of devices in a single or multi-user scenarios such as family and enterprise plans, defining network access policy rules for one or more users or groups of users, allowing or disallowing network access events or attempts, modulating the number of network access events or attempts, aggregating network access events or attempts into a group of access events or attempts, time windowing network access events or attempts, time windowing network access events or attempts based on the application or function being served by the network access events or attempts, time windowing network access events or attempts to pre-determined time windows, time windowing network access events or attempts to time windows where a measure of network busy state is within a range, assigning the allowable types of access events or attempts, assigning the allowable functions or applications that are allowed network access events or attempts, assigning the priority of one or more network access events or attempts, defining the allowable duration of network access events or attempts, defining the allowable speed of network access events or attempts, defining the allowable network destinations for network access events or attempts, defining the allowable applications for network access events or attempts, defining the QoS rules for one or more network access events or attempts, defining or setting access policy rules for one or more applications, defining or setting access policy rules for one or more network destinations, defining or setting access policy rules for one or more devices, defining or setting access policy rules for one or more network services, defining or setting access policy rules for one or more traffic types, defining or setting access policy rules for one or more QoS classes, and defining or setting access policy rules based on any combination of device, application, network destination, network service, traffic type, QoS class, and/or other criteria/measures.

In some embodiments, a network service usage control policy (e.g., a network capacity controlled services policy) includes a traffic control policy. In some embodiments, the traffic control policy includes a traffic control setting. In some embodiments, the traffic control policy includes a traffic control/tier, and the traffic control/tier includes the traffic control setting. In some embodiments, the traffic control policy includes one or more of the following: block/allow settings, throttle settings, adaptive throttle settings, QoS class settings including packet error rate, jitter and delay settings, queue settings, and tag settings (e.g., for packet tagging certain traffic flows). In some embodiments, QoS class settings, include one or more of the following: throttle level, priority queuing relative to other device traffic, time window parameters, and hold or delay while accumulating or aggregating traffic into a larger stream/burst/packet/group of packets. In some embodiments, the traffic control policy includes filters implemented as indexes into different lists of policy settings (e.g., using cascade filtering techniques), in which the policy filters include one or more of the following: a network, a service plan, an application, a time of day, and a network busy state. For example, a two dimensional traffic control implementation scheme can be provided using a network busy state and/or a time of day as an index into a traffic control setting (e.g., a certain application's priority level can be increased or decreased based on a network busy state and/or time of day). In some embodiments, the traffic control policy is used for selecting the network from a list of available networks, blocking or reducing access until a connection is made to an alternative network, and/or modifying or replacing a network stack interface of the device to provide for intercept or discontinuance of network socket interface messages to applications or OS functions.

In some embodiments, a traffic control setting is selected based on the network service usage control policy. In some embodiments, the traffic control setting is implemented on the device based on the network service usage control policy. In some embodiments, the implemented traffic control setting controls traffic/traffic flows of a network capacity controlled service. In some embodiments, the traffic control setting is selected based on one or more of the following: a time of day, a day of week, a special time/date (e.g., a holiday or a network maintenance time/date), a network busy state, a priority level associated with the network service usage activity, a QoS class associated with the network service usage activity (e.g., emergency traffic), which network the network service activity is gaining access from, which networks are available, which network the network service activity is connected to, which base station or communication channel the network service activity is connected to, and a network dependent set of traffic control policies that can vary depending on which network the service activity is gaining access from (e.g., and/or various other criteria/measures as described herein). In some embodiments, the traffic control setting includes one or more of the following: allow/block, delay, throttle, QoS class implementation, queue, tag, generate a user notification, random back off, clear to send received from a network element, hold for scheduled transmission time slot, selecting the network from the available networks, and blocking or reducing access until a connection is made to an alternative network. In some embodiments, the traffic control setting is selected based on a network capacity controlled services priority state of the network service usage activity and a network busy state. In some embodiments, the traffic control setting is selected based on a network capacity controlled services priority state of the network service usage activity and a network busy state and is global (e.g., the same) for all network capacity controlled services activities or varies based on a network service usage activity priority, user preferences or option selection, an application, a time based criteria, a service plan, a network the device or service activity is gaining access from, a redetermination of a network congestion state after adapting to a previously determined network busy state, and/or other criteria/measures as described herein.

In some embodiments, network capacity controlled services traffic (e.g., traffic flows) is differentially controlled for protecting network capacity. For example, various software updates for an OS and one or more applications on the device can be differentially controlled using the various techniques described herein. As another example, security/antimalware software (e.g., antivirus, firewall, content protection, intrusion detection/prevention, and/or other security/antimalware software) can be differentially controlled using the various techniques described herein. As yet another example, network backups/imaging, content downloads (e.g., exceeding a threshold individually and/or in aggregate, such as for image, music, video, eBook content, email attachments, content/media subscriptions, RSS/news feeds, text/image/video chat, software updates, and/or other content downloads) can be differentially controlled using the various techniques described herein.

For example, using the DAS for protecting network capacity techniques described herein an adaptive policy control for protecting network capacity can be provided. A network capacity controlled services list can be generated, updated, reported, and/or received by the device and stored on the device (e.g., the list can be based on adapted to the service plan associated with the device). If a monitored network service usage activity is not on the list, then the device can report the monitored network service usage activity to a network element (e.g., for a monitored network service usage activity that also exceeds a certain threshold, based on a network busy state, based on a time based criteria, and/or other criteria/measure). As an example, monitored network service usage activity can be reported if/when the monitored network service usage activity exceeds a data usage threshold (e.g., 50 MB total data usage per day, a socket opening frequency/rate, velocity of data usage at an instant in time, or more complicated thresholds over time, over peak periods, by content and time, by various other parameters/thresholds). As another example, the monitored network service usage activity can be reported based on testing of the network service usage behavior and/or application developer characterization input. The report can include information that identifies the network service usage activity and various network service usage parameters.

In some embodiments, a notification setting is selected based on a service usage notification policy. In some embodiments, a notification setting includes a user notification setting (e.g., various user notifications settings as described above with respect to FIG. 18).

In some embodiments, classifying the network service usage activity further includes classifying the network service usage activity (e.g., using a usage threshold filter and/or cascading filter techniques) into one or more of a plurality of classification categories for differential network access control for protecting network capacity. In some embodiments, classifying the network service usage activity, further includes classifying the network service usage activity into one or more network capacity controlled services in which the network capacity controlled services include one or more of the following: applications requiring data network access, application software updates, applications requiring network information, applications requiring GPS or physical location, operating system software updates, security software updates, network based backups, email downloads, and a set of activities configured as network capacity controlled service activities based on a service profile and/or user input (e.g., and/or various other types of network service usage activities as described herein and as will now be apparent to one of ordinary skill in the art). For example, network capacity controlled services can include software updates for OS and applications, OS background network accesses, cloud synchronization services, RSS feeds & other background information feeds, browser/application/device behavior reporting, background email downloads, content subscription service updates and downloads (e.g., music/video downloads, news feeds), text/voice/video chat clients, security updates (e.g., antimalware updates), peer to peer networking application updates, inefficient network access sequences during frequent power cycling or power save state cycling, large downloads or other high bandwidth accesses, and greedy application programs that constantly/repeatedly access the network with small transmissions or requests for information. In some embodiments, a network capacity controlled services list is static, adaptive, generated using a service processor, received from a network element (e.g., service controller or service cloud), received from a network element (e.g., service controller or service cloud) and based at least in part on device activity reports received from the service processor, based on criteria set by pre-testing, report of behavior characterization performed by the application developer, and/or based at least in part on user input. In some embodiments, the network capacity controlled services list includes one or more network service activity background (QoS) classes.

In some embodiments, classifying the network service usage activity further includes classifying the network service usage activity based on one or more of the following: application or widget (e.g., Outlook, Skype, iTunes, Android email, weather channel weather widget, iCal, Firefox Browser, etc.), application type (e.g., user application, system application/utility/function/process, OS application/utility/function/process, email, browser, widget, malware (such as a virus or suspicious process), RSS feed, device synchronization service, download application, network backup/imaging application, voice/video chat, peer to peer content application or other peer to peer application, streaming media feed or broadcast reception/transmission application, network meeting application, chat application or session, and/or any other application or process identification and categorization), OS/system function (e.g., any system application/utility/function/process and/or OS application/utility/function/process, such as a OS update and/or OS error reporting), modem function, network communication function (e.g., network discovery or signaling, EtherType messages, connection flow/stream/session set up or tear down, network authentication or authorization sequences, IP address acquisition, and DNS services), URL and/or domain, destination/source IP address, protocol, traffic type, socket (e.g., IP address, protocol, and/or port), socket address/label/identifier (e.g., port address/port number), content type (e.g., email downloads, email text, video, music, eBooks, widget update streams, and download streams), port (e.g., port number), QoS classification level, time of day, on peak or off peak, network time, network busy state, access network selected, service plan selected, user preferences, device credentials, user credentials, and/or status, modem power cycling or power state changes, modem authentication processes, modem link set up or tear down, modem management communications, modem software or firmware updates, modem power management information, device power state, and modem power state. In some embodiments, classifying the network service usage activity further includes associating the classified network service usage activity with an ID (e.g., an application ID, which can be, for example, a unique number, name, and/or signature). In some embodiments, classifying the network service usage activity further includes classifying the network service usage activity using a plurality of classification parameters, including one or more of the following: application ID, remote IP (e.g., URL, domain, and/or IP address), remote port, protocol, content type, a filter action class (e.g., network busy state class, QoS class, time of day, network busy state, and/or other criteria/measures), and access network selected. In some embodiments, classifying the network service usage activity further includes using a combination of parameters as discussed above to determine the classification of the network service usage activity.

In some embodiments, classifying the network service usage activity further includes classifying the network service usage activity as a network capacity controlled service, a non-network capacity controlled service, a blocked or disallowed service, and/or a not yet classified/identified service (e.g., unknown/yet to be determined classification or pending classification). In some embodiments, an application connection, OS connection, and/or other service activity is classified as a network capacity controlled service activity when the device has been inactive (e.g., or in a power save state) for a period of time (e.g., when the user has not interacted with it for a period of time, when it has not displayed user notification policy, and/or a user input has not been received for a period of time, and/or when a power save state is entered). In some embodiments, an application connection, OS connection, and/or other service activity is classified as a network capacity controlled service activity when the monitored network service usage activity exceeds a data usage threshold for more than one application connection, OS connection, and/or other service activity (e.g., aggregated data usage exceeds the data usage threshold); or for a specific application connection. In some embodiments, an application connection, OS connection, and/or other service activity is classified as a network capacity controlled service activity when the monitored network service usage activity exceeds a data usage threshold based on a predetermined list of one or more data usage limits, based on a list received from a network element, usage time limit (e.g., based on a period of time exceeding a usage limit), and/or based on some other usage related criteria/measures. In some embodiments, classifying the network service usage activity further includes classifying the network service usage activity as a network capacity controlled service based on a network peak time, a network busy state, or a network connection to the device falls below a certain performance level (e.g., higher/lower priorities assigned based on various such criteria/other input/factors).

In some embodiments, one or more of the network capacity controlled services are associated with a different network access policy set for one or more networks and/or one or more alternative networks. In some embodiments, one or more of the network capacity controlled services are associated with a different notification policy set for one or more networks and/or one or more alternative networks. In some embodiments, the network capacity controlled services list is stored on the device. In some embodiments, the network capacity controlled services list is received/periodically updated from a network element and stored on the device. In some embodiments, the network capacity controlled services list includes network capacity controlled services, non-network capacity controlled services (e.g., foreground services or services based on various possibly dynamic criteria are not classified as network capacity controlled services), and an unclassified set of services (e.g., grey list including one or more network service activities pending classification based on further analysis and/or input, such as from a network element, service provider, and/or user). In some embodiments, the network capacity controlled services list is based on one or more of the following: predefined/predesignated (e.g., network, service plan, pretest and/or characterized by an application developer) criteria; device assisted/based monitoring (e.g., using a service processor); network based monitoring (e.g., using a DPI gateway); network assisted analysis (e.g., based on device reports of DAS activity analysis). For example, the device can report device monitored network service usage activities (e.g., all monitored network service usage activities or a subset based on configuration, threshold, service plan, network, and/or user input) to the network element. As another example, the network element can update the network capacity controlled services list and send the updated list to the device. As yet another example, the network element can perform a statistical analysis of network service activities across a plurality of devices based on the device based and/or network based network service usage activity monitoring/reporting. In some embodiments, a network service usage activity is determined to be an active application or process (e.g., based on a user interaction with the device and/or network service usage activity, such as a pop-up and/or other criteria/measures).

In some embodiments, implementing traffic control for network capacity controlled services is provided using various techniques. In some embodiments, the device includes a service processor agent or function to intercept, block, modify, remove or replace UI messages, notifications or other UI communications generated by a network service activity that whose network service usage is being controlled or managed (e.g., using various measurement points). For example, this technique can be used to provide for an improved user experience (e.g., to prevent an application that is being controlled for protecting network capacity from generating repeated and/or confusing messages/alerts to the user). In some embodiments, a network stack interface of the device is replaced or modified to provide for intercept or discontinuance of network socket interface messages to applications or OS functions or other functions/software.

In some embodiments, implementing traffic control for network capacity controlled services using DAS techniques is provided using various techniques in which the network service usage activity is unaware of network capacity control (e.g., does not support an API or other interface for implementing network capacity control). For example, network service application messaging interface based techniques can be used to implement traffic control. Example network service application messaging interfaces include the following: network stack API, network communication stream/flow interface, network stack API messages, EtherType messages, ARP messages, and/or other messaging or other or similar techniques as will now be apparent to one of ordinary skill in the art in view of the various embodiments described herein. In some embodiments, network service usage activity control policies or network service activity messages are selected based on the set of traffic control policies or service activity messages that result in reduced or modified user notification by the service activity due to network capacity controlled service policies applied to the network service activity. In some embodiments, network service usage activity control policies or network service activity messages are selected based on the set of traffic control policies or service activity messages that result in reduced disruption of device operation due to network capacity controlled service activity policies applied to the network service activity. In some embodiments, network service usage activity control policies or network service activity messages are selected based on the set of traffic control policies or service activity messages that result in reduced disruption of network service activity operation due to network capacity controlled service activity policies applied to the network service activity. In some embodiments, implementing traffic control for network capacity controlled services is provided by intercepting opens/connects/writes. In some embodiments, implementing traffic control for network capacity controlled services is provided by intercepting stack API level or application messaging layer requests (e.g., socket open/send requests). For example, an intercepted request can be copied (e.g., to memory) and queued (e.g., delayed or throttled) or dropped (e.g., blocked). As another example, an intercepted request can be copied into memory and then a portion of the transmission can be retrieved from memory and reinjected (e.g., throttled). As yet another example, intercepting messaging transmissions can be parsed inline and allowed to transmit (e.g., allowed), and the transmission or a portion of the transmission can be copied to memory for classifying the traffic flow. In some embodiments, implementing traffic control for network capacity controlled services is provided by intercepting or controlling or modulating UI notifications. In some embodiments, implementing traffic control for network capacity controlled services is provided by killing or suspending the network service activity. In some embodiments, implementing traffic control for network capacity controlled services is provided by deprioritizing the process(es) associated with the service activity (e.g., CPU scheduling deprioritization).

In some embodiments, implementing traffic control for network capacity controlled services using DAS techniques for network service usage activities that are unaware of network capacity control is provided by emulating network API messaging (e.g., effectively providing a spoofed or emulated network API). For example, an emulated network API can intercept, modify, block, remove, and/or replace network socket application interface messages and/or EtherType messages (e.g., EWOULDBLOCK, ENETDOWN, ENETUNREACH, EHOSTDOWN, EHOSTUNREACH, EALRADY, EINPROGRESS, ECONNREFUSED, EINPROGRESS, ETIMEDOUT, and/other such messages). As another example, an emulated network API can modify, swap, and/or inject network socket application interface messages (socket( ), connect( ), read( ), write( ), close( ), and other such messages) that provide for control or management of network service activity service usage behavior. As yet another example, before a connection is allowed to be opened (e.g., before a socket is opened), transmission, or a flow/stream is initiated, it is blocked and a message is sent back to the application (e.g., a reset message in response to a sync request or another message that the application will understand and can interpret to indicate that the network access attempt was not allowed/blocked, that the network is not available, and/or to try again later for the requested network access). As yet another example, the socket can be allowed to open but after some point in time (e.g., based on network service usage, network busy state, time based criteria, and/or some other criteria/measure), the stream is blocked or the socket is terminated. As yet another example, time window based traffic control techniques can be implemented (e.g., during non-peak, not network busy state times), such as by allowing network access for a period of time, blocking for a period of time, and then repeating to thereby effectively spread the network access out either randomly or deterministically. Using these techniques, an application that is unaware of network capacity control based traffic control can send and receive standard messaging, and the device can implement traffic controls based on the network capacity control policy using messaging that the network service usage activity (e.g., application or OS or software function) can understand and will respond to in a typically predictable manner as would now be apparent to one of ordinary skill in the art.

In some embodiments, implementing traffic control for network capacity controlled services using DAS techniques is provided using various techniques in which the network service usage activity is aware of network capacity control (e.g., the network service usage activity supports an API or other interface for implementing network capacity control). For example, a network access API as described herein can be used to implement traffic control for network capacity controlled services. In some embodiments, the API facilitates communication of one or more of the following: network access conditions, network busy state or network availability state of one or more networks or alternative networks, one or more network capacity controlled service policies (e.g., the network service can be of a current network access setting, such as allow/block, throttle, queue, scheduled time/time slot, and/or defer, which can be based on, for example, a current network, a current network busy state, a time based criteria, a service plan, a network service classification, and/or other criteria/measures), a network access request from a network service activity, a query/polled request to a network service activity, a network access grant to a network service activity (e.g., including a priority setting and/or network capacity controlled service classification, a scheduled time/time slot, an alternative network, and/or other criteria/measures), a network busy state or a network availability state or a network QoS state.

In some embodiments, implementing traffic control for network capacity controlled services using network assisted/based techniques is provided using various techniques in which the network service usage activity is unaware of network capacity control (e.g., does not support an API or other interface for implementing network capacity control). In some embodiments, DPI based techniques are used to control network capacity controlled services (e.g., to block or throttle network capacity controlled services at a DPI gateway).

In some embodiments, implementing traffic control for network capacity controlled services using network assisted/based techniques is provided using various techniques in which the network service usage activity is aware of network capacity control (e.g., does support an API or other interface for implementing network capacity control). In some embodiments, the application/messaging layer (e.g., a network API as described herein) is used to communicate with a network service activity to provide associated network capacity controlled service classifications and/or priorities, network busy state information or network availability of one or more networks or alternative networks, a network access request and response, and/other criteria/measures as similarly described herein.

In some embodiments, DAS for protecting network capacity includes implementing a service plan for differential charging based on network service usage activities (e.g., including network capacity controlled services). In some embodiments, the service plan includes differential charging for network capacity controlled services. In some embodiments, the service plan includes a cap network service usage for network capacity controlled services. In some embodiments, the service plan includes a notification when the cap is exceeded. In some embodiments, the service plan includes overage charges when the cap is exceeded. In some embodiments, the service plan includes modifying charging based on user input (e.g., user override selection as described herein, in which for example, overage charges are different for network capacity controlled services and/or based on priority levels and/or based on the current access network). In some embodiments, the service plan includes time based criteria restrictions for network capacity controlled services (e.g., time of day restrictions with or without override options). In some embodiments, the service plan includes network busy state based criteria restrictions for network capacity controlled services (e.g., with or without override options). In some embodiments, the service plan provides for network service activity controls to be overridden (e.g., one time, time window, usage amount, or permanent) (e.g., differentially charge for override, differentially cap for override, override with action based UI notification option, and/or override with UI setting). In some embodiments, the service plan includes family plan or multi-user plan (e.g., different network capacity controlled service settings for different users). In some embodiments, the service plan includes multi-device plan (e.g., different network capacity controlled service settings for different devices, such as smart phone v. laptop v. net book v. eBook). In some embodiments, the service plan includes free network capacity controlled service usage for certain times of day, network busy state(s), and/or other criteria/measures. In some embodiments, the service plan includes network dependent charging for network capacity controlled services. In some embodiments, the service plan includes network preference/prioritization for network capacity controlled services. In some embodiments, the service plan includes arbitration billing to bill a carrier partner or sponsored service partner for the access provided to a destination, application, or other network capacity controlled service. In some embodiments, the service plan includes arbitration billing to bill an application developer for the access provided to a destination, application or other network capacity controlled service.

In some application scenarios, excess network capacity demand can be caused by modem power state changes on the device. For example, when an application or OS function attempts to connect to the network for any reason when the modem is in a power save state wherein the modem is not connected to the network, it can cause the modem to change power save state, reconnect to the network, and then initiate the application network connection. In some cases, this can also cause the network to re-initiate a modem connection session (e.g., PPP session) which in addition to the network capacity consumed by the basic modem connection also consumes network resources for establishing the PPP session. Accordingly, in some embodiments, network service usage activity control policies are implemented that limit or control the ability of applications, OS functions, and/or other network service usage activities (e.g., network capacity controlled services) from changing the modem power control state or network connection state. In some embodiments, a service usage activity is prevented or limited from awakening the modem, changing the power state of the modem, or causing the modem to connect to the network until a given time window is reached. In some embodiments, the frequency a service usage activity is allowed to awakening the modem, changing the power state of the modem, or causing the modem is limited. In some embodiments, a network service usage activity is prevented from awakening the modem, changing the power state of the modem, or causing the modem until a time delay has passed. In some embodiments, a network service usage activity is prevented from awakening the modem, changing the power state of the modem, or causing the modem until multiple network service usage activities require such changes in modem state, or until network service usage activity is aggregated to increase network capacity and/or network resource utilization efficiency. In some embodiments, limiting the ability of a network service usage activity to change the power state of a modem includes not allowing the activity to power the modem off, place the modem in sleep mode, or disconnect the modem from the network. In some embodiments, these limitations on network service usage activity to awaken the modem, change the power state of the modem, or cause the modem to connect to a network are set by a central network function (e.g., a service controller or other network element/function) policy communication to the modem. In some embodiments, these power control state policies are updated by the central network function.

Figure 104:
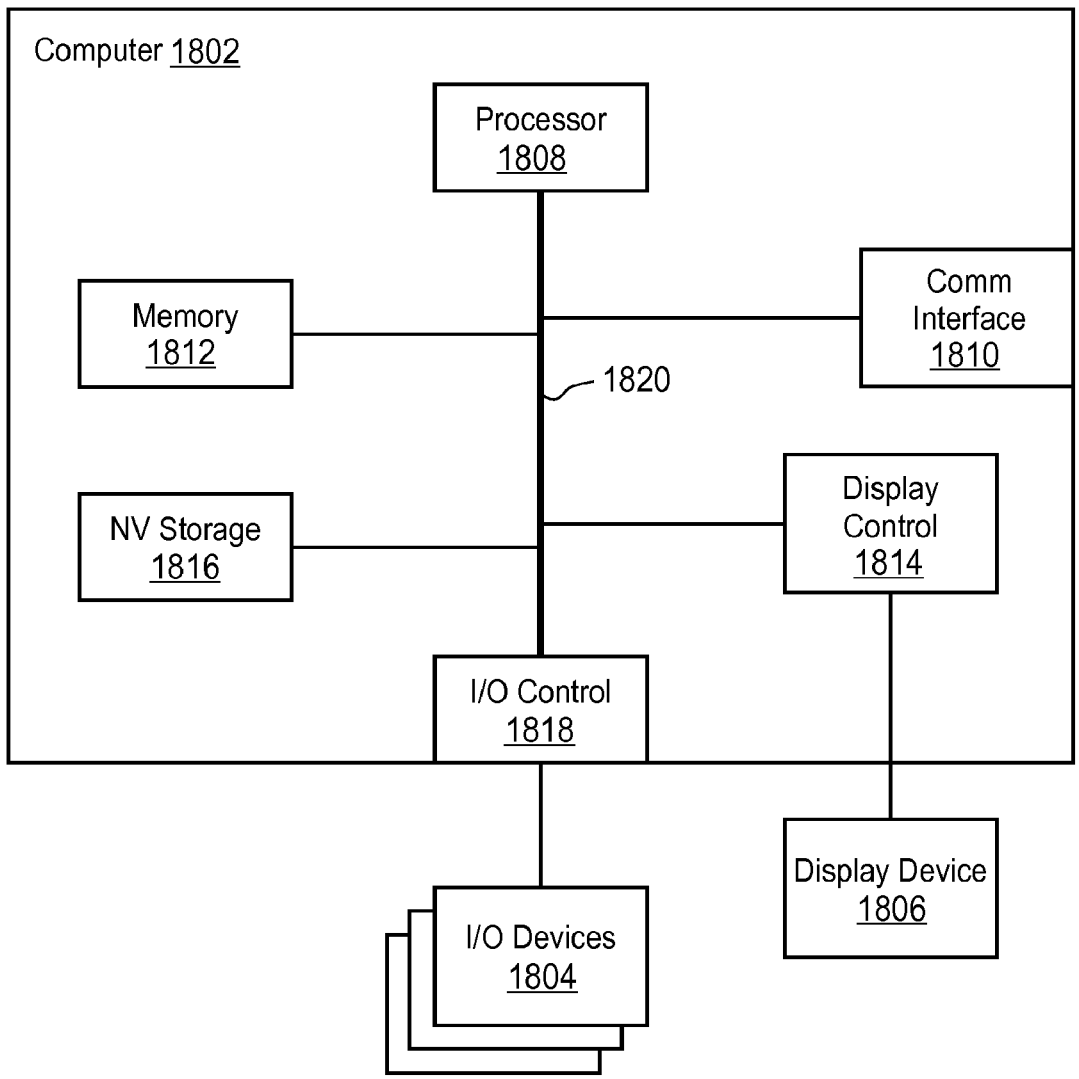
FIG. 104 depicts an example of a computer system on which techniques described in this paper can be implemented.

FIG. 104 depicts an example of a computer system 1800 which may constitute, in whole or part, a computer system or computing system as discussed above, and on which techniques described in this paper can be implemented. The computer system 1800 may be a conventional computer system that can be used as a client computer system, such as a wireless client or a workstation, or a server computer system. The computer system 1800 includes a computer 1802, I/O devices 1804, and a display device 1806. The computer 1802 includes a processor 1808, a communications interface 1180, memory 1812, display controller 1814, non-volatile storage 1816, and I/O controller 1818. The computer 1802 may be coupled to or include the I/O devices 1804 and display device 1806.

The computer 1802 interfaces to external systems through the communications interface 1810, which may include a modem or network interface. It will be appreciated that the communications interface 1810 can be considered to be part of the computer system 1800 or a part of the computer 1802. The communications interface 1810 can be an analog modem, ISDN modem, cable modem, token ring interface, satellite transmission interface (e.g. "direct PC"), or other interfaces for coupling a computer system to other computer systems.

The processor 1808 may be, for example, a conventional microprocessor such as an Intel Pentium microprocessor or Motorola power PC microprocessor. The memory 1812 is coupled to the processor 1808 by a bus 1170. The memory 1812 can be Dynamic Random Access Memory (DRAM) and can also include Static RAM (SRAM). The bus 1170 couples the processor 1808 to the memory 1812, also to the non-volatile storage 1816, to the display controller 1814, and to the I/O controller 1818.

The I/O devices 1804 can include a keyboard, disk drives, printers, a scanner, and other input and output devices, including a mouse or other pointing device. The display controller 1814 may control in the conventional manner a display on the display device 1806, which can be, for example, a cathode ray tube (CRT) or liquid crystal display (LCD). The display controller 1814 and the I/O controller 1818 can be implemented with conventional well known technology.

The non-volatile storage 1816 is often a magnetic hard disk, an optical disk, or another form of storage for large amounts of data. Some of this data is often written, by a direct memory access process, into memory 1812 during execution of software in the computer 1802. One of skill in the art will immediately recognize that the terms "machine-readable medium" or "computer-readable medium" includes any type of storage device that is accessible by the processor 1808 and also encompasses a carrier wave that encodes a data signal.

The computer system 1800 is one example of many possible computer systems which have different architectures. For example, personal computers based on an Intel microprocessor often have multiple buses, one of which can be an I/O bus for the peripherals and one that directly connects the processor 1808 and the memory 1812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1812 for execution by the processor 1808. A Web TV system, which is known in the art, is also considered to be a computer system, but it may lack some of the features shown in FIG. 104, such as certain input or output devices. A typical computer system will usually include at least a processor, memory, and a bus coupling the memory to the processor.

In addition, the computer system 1800 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1816 and causes the processor 1808 to execute the various acts required by the operating system to input and output data and to store data in memory, including storing files on the non-volatile storage 1816.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language, and various embodiments may thus be implemented using a variety of programming languages.

Although the foregoing embodiments have been described in some detail for purposes of clarity of understanding, the disclosure is not limited to the details provided. There are many alternative ways of implementing the disclosure. The disclosed embodiments are illustrative and not restrictive.

Various aspects and features of embodiments disclosed herein are set forth, for example and without limitation, in the following numbered clauses:

33A. A system for generating provisioning instructions for one or more network-delivered services, the system comprising:
  a user interface; and
  computing circuitry, including one or more processors and memory to store program code which, when executed by the one or more processors, causes the one or more processors to:
    prompt a service designer via the user interface to:
    specify a first service policy that defines a first access control action to be performed in response to detecting a first service request from an end-user device, include the first service policy within a first service plan, and include the service plan within a collection of service plans; and generate a plurality of provisioning instructions for the collection of service plans, the plurality of provisioning instructions indicating operations to be executed by one or more processing elements coupled to the network to provision the collection of service plans, the plurality of provisioning instructions including one or more provisioning instructions defined by the first service policy within the first service plan.

34A. The system of clause 33A wherein the program code, when executed by the one or more processors, further causes the one or more processors to prompt the service designer, via the user interface, to specify accounting information that indicates a monetary amount to be charged for usage of the first service plan.

35A. The system of clause 34A wherein the program code which, when executed by the one or more processors, causes the one or more processors to generate the plurality of provisioning instructions for the collection of service plans comprises instructions which, when executed by the one or more processors, cause the one or more processors to generate a plurality of instructions for accounting for usage of the service plans, including one or more accounting instructions for accounting for usage of the first service plan in accordance with the monetary amount to be charged for usage of the first service plan.

36A. The system of clause 33A wherein the program code, when executed by the one or more processors, further causes the one or more processors to prompt the service designer, via the user interface of the computing device, to specify a second service policy that defines a second access control action to be performed in response to detecting a second service request from the end-user device and to include the second service policy within the first service plan.

37A. The system of clause 33A wherein the program code, when executed by the one or more processors, further causes the one or more processors to prompt the service designer, via the user interface of the computing device, to include the first service policy within a second service plan and to include the second service plan within the collection of service plans.

38A. The system of clause 33A wherein the program code which, when executed by the one or more processors, causes the one or more processors to prompt the service designer to specify the first service policy that defines a first control action to be performed in response to detecting the first service access request comprises instructions which, when executed by the one or more processors, cause the one or more processors to prompt the service designer to specify one or more classification criteria, a network state with respect to the end-user device and the first control action to be performed if the one or more classification criteria are met while the end-user device is in the network state.

39A. The system of clause 33A wherein the program code which, when executed by the one or more processors, causes the one or more processors to prompt the service designer to specify the first service policy that defines a first control action to be performed in response to detecting the first service access request comprises instructions which, when executed by the one or more processors, cause the one or more processors to prompt the service designer to specify one or more classification criteria, a service usage state with respect to the end-user device and the first control action to be performed if the one or more classification criteria are met after service usage within the end-user device has reached the service usage state.

40A. The system of clause 33A wherein the program code which, when executed by the one or more processors, causes the one or more processors to prompt the service designer to prompt the service designer to specify the first service policy comprises instructions which, when executed by the one or more processors, cause the one or more processors to prompt the service designer to specify the first control action and one or more first classification criteria to be met before the first control action is to be performed.

41A. The system of clause 40A wherein the program code, when executed by the one or more processors, further causes the one or more processors to prompt the service designer to specify the first service policy further comprising prompting the service designer to specify, as part of the first service policy, a second control action and one or more second classification criteria to be met before the second control action is to be performed.

42A. The system of clause 33A wherein at least one of the one or more processing elements coupled to the network to provision the collection of service plans comprises the end-user device.

43A. A method of generating provisioning instructions for one or more network-delivered services, the method comprising:

prompting a service designer, via a user interface of a computing device, to:

specify a plurality of classification objects and a plurality of service plans that incorporate the plurality of classification objects, and specify information that controls an order in which the plurality of classification objects are to be evaluated in connection with a service request from an end-user device; and generating a plurality of provisioning instructions for the plurality of service plans, the plurality of provisioning instructions indicating order in which the plurality of classification objects are to be evaluated in connection with a service request from an end-user device.

44A. The method of clause 43A wherein prompting the service designer to specify information that controls an order in which the plurality of classification objects are to be evaluated in connection with a service request comprises prompting the service designer to assign each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of classification objects incorporated into the first service plan is to be evaluated in connection with the service request before any of the plurality of classification objects incorporated into the second service plan is to be evaluated in connection with the service request.

45A. The method of clause 44A wherein the first plan class is a sponsored plan class and the second policy class is a user-paid plan class, wherein assignment of the second service plan to the user-paid plan class indicates that a user of the end-user device is to be charged for a service rendered under the second service plan, and assignment of the first service plan to the sponsored plan class indicates that a party other than the user of the end-user device is to be charged for a service rendered under the first service plan.

46A. The method of clause 43A wherein prompting the service designer to specify the plurality service plans that incorporate the plurality of classification objects comprises:
prompting the service designer to specify a plurality of service policies that each incorporate one or more of the classification objects; and
prompting the service designer to specify one or more of the service policies to be incorporated into each of the service plans.

47A. The method of clause 46A wherein prompting the service designer to specify information that controls an order in which the plurality of classification objects are to be evaluated in connection with the service request comprises prompting the service designer to assign each of the one or more service policies to a respective one of a plurality of policy classes that are prioritized relative to one another such that assignment of first and second service policies of the plurality of service policies to respective first and second policy classes of the plurality of policy classes indicates that the first service policy is prioritized over the second service policy such that any of the classification objects incorporated into the first service policy is to be evaluated in connection with the service request before any of the classification objects incorporated into the second service policy is to be evaluated in connection with the service request.

48A. The method of clause 47A wherein the first policy class is a sponsored policy class and the second policy class is a user-paid policy class, wherein assignment of the second service policy to the user-paid policy class indicates that a user of the end-user device is to be charged for a service rendered under the second service policy, and assignment of the first service policy to the sponsored policy class indicates that a party other than the user of the end-user device is to be charged for a service rendered under the first service policy.

49A. The method of clause 47A wherein prompting the service designer to specify information that controls an order in which the plurality of classification objects are to be evaluated in connection with a service request further comprises prompting the service designer to assign each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of classification objects incorporated into the first service plan is to be evaluated in connection with the service request before any of the plurality of classification objects incorporated into the second service plan is to be evaluated in connection with the service request.

50A. The method of clause 49A wherein generating the plurality of provisioning instructions for the plurality of service plans comprises generating the plurality of provisioning instructions to order the evaluation of the plurality of classification objects first according to policy class priority and then according to plan class priority.

51A. A system for generating provisioning instructions for one or more network-delivered services, the system comprising:
a user interface; and
computing circuitry, including one or more processors and memory to store program code which, when executed by the one or more processors, causes the one or more processors to:
prompt a service designer via the user interface to:
specify a plurality of classification objects and a plurality of service plans that incorporate the plurality of classification objects, and
specify information that controls an order in which the plurality of classification objects are to be evaluated in connection with a service request from an end-user device; and
generate a plurality of provisioning instructions for the plurality of service plans, the plurality of provisioning instructions indicating order in which the plurality of classification objects are to be evaluated in connection with a service request from an end-user device.

52A. The system of clause 51A wherein the program code which, when executed by the one or more processors, causes the one or more processors to prompt the service designer to specify information that controls an order in which the plurality of classification objects are to be evaluated in connection with a service request comprises instructions which, when executed by the one or more processors, cause the one or more processors to prompt the service designer to assign each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of classification objects incorporated into the first service plan is to be evaluated in connection with the service request before any of the plurality of classification objects incorporated into the second service plan is to be evaluated in connection with the service request.

53A. The system of clause 52A wherein the first plan class is a sponsored plan class and the second policy class is a user-paid plan class, wherein assignment of the second service plan to the user-paid plan class indicates that a user of the end-user device is to be charged for a service rendered under the second service plan, and assignment of the first service plan to the sponsored plan class indicates that a party other than the user of the end-user device is to be charged for a service rendered under the first service plan.

54A. The system of clause 51A wherein the program code which, when executed by the one or more processors, causes the one or more processors to prompt the service designer to specify the plurality service plans that incorporate the plurality of classification objects comprises instructions which, when executed by the one or more processors, cause the one or more processors to:
prompt the service designer to specify a plurality of service policies that each incorporate one or more of the classification objects; and
prompt the service designer to specify one or more of the service policies to be incorporated into each of the service plans.

55A. The system of clause 54A wherein the program code which, when executed by the one or more processors, causes the one or more processors to prompt the service designer to specify information that controls an order in which the plurality of classification objects are to be evaluated in connection with the service request comprises instructions which, when executed by the one or more processors, cause the one or more processors to prompt the service designer to assign each of the one or more service policies to a respective one of a plurality of policy classes that are prioritized relative to one another such that assignment of first and second service policies of the plurality of service policies to respective first and second policy classes of the plurality of policy classes indicates that the first service policy is prioritized over the second service policy such that any of the classification objects incorporated into the first service policy is to be evaluated in connection with the service request before any of the classification objects incorporated into the second service policy is to be evaluated in connection with the service request.

56A. The system of clause 55A wherein the first policy class is a sponsored policy class and the second policy class is a user-paid policy class, wherein assignment of the second service policy to the user-paid policy class indicates that a user of the end-user device is to be charged for a service rendered under the second service policy, and assignment of the first service policy to the sponsored policy class indicates that a party other than the user of the end-user device is to be charged for a service rendered under the first service policy.

57A. The system of clause 55A wherein the program code which, when executed by the one or more processors, causes the one or more processors to prompt the service designer to specify information that controls an order in which the plurality of classification objects are to be evaluated in connection with a service request further causes the one or more processors to prompt the service designer to assign each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of classification objects incorporated into the first service plan is to be evaluated in connection with the service request before any of the plurality of classification objects incorporated into the second service plan is to be evaluated in connection with the service request.

58A. The system of clause 57A wherein the program code which, when executed by the one or more processors, causes the one or more processors to generate the plurality of provisioning instructions for the plurality of service plans comprises instructions which, when executed by the one or more processors, cause the one or more processors to generate the plurality of provisioning instructions to order the evaluation of the plurality of classification objects first according to policy class priority and then according to plan class priority.

59A. A method of enabling an end-user of a mobile device to select one or more mobile network service plans, the method comprising:
prompting a service designer, via a user interface of a computing device, to:
specify captions of respective views to be presented on a display screen of an end-user mobile device, and
specify respective sets of one or more service plan identifiers to be presented on the end-user mobile device display screen within each of the views; and
generating a plurality of provisioning instructions to enable the views, having respective captions and sets of one or more service plan identifiers as specified by the service designer, to be rendered on the display screen of the end-user mobile device.

60A. The method of clause 59A wherein prompting the service designer to specify respective sets of one or more service plan identifiers to be presented on the end-user mobile device display screen within each of the views comprises displaying a list of service plan identifiers and prompting the service designer to indicate, for each service plan identifier in the list and for each one of the views, whether the service plan identifier is to be presented within the one of the views.

61A. The method of clause 59A wherein each of the service plan identifiers within the sets of one or more service plan identifiers comprises a service plan name.

62A. The method of clause 59A wherein each of the service plan identifiers corresponds to a respective service plan having a name and purchase price, and wherein generating the plurality of provisioning instructions to enable the views to be rendered on the display screen of the end-user mobile device comprises generating provisioning instructions to enable the name and purchase price of each service plan to be rendered on the display screen of the end-user mobile device within the specified one or more of the views together with a screen icon that may be interacted with by a user of the end-user mobile device to purchase the service plan.

63A. The method of clause 59A further comprising prompting the service designer to specify an order in which service plan identifiers included within a selected one of the sets of one or more service plan identifiers are to be listed within a corresponding one of the views.

64A. The method of clause 59A wherein prompting the service designer to specify captions of respective views to be presented on a display screen of the end-user mobile device comprises prompting the service designer to specify captions of respective display tabs to be presented on the display screen of the end-user mobile device.

65A. The method of clause 64A further comprising prompting the service designer to specify a left-to-right order in which the captions of the display tabs are to be presented on the display screen of the end-user mobile device.

66A. A system for generating provisioning instructions relating to one or more network-delivered services, the system comprising:
a user interface; and
computing circuitry, including one or more processors and memory to store program code which, when executed by the one or more processors, causes the one or more processors to:
prompt a service designer via the user interface to:
specify captions of respective views to be presented on a display screen of an end-user mobile device, and
specify respective sets of one or more service plan identifiers to be presented on the end-user mobile device display screen within each of the views; and
generate a plurality of provisioning instructions to enable the views, having respective captions and sets of one or more service plan identifiers as specified by the service designer, to be rendered on the display screen of the end-user mobile device.

67A. The system of clause 66A wherein the program code which, when executed by the one or more processors, causes the one or more processors to prompt the service designer to specify respective sets of one or more service plan identifiers to be presented on the end-user mobile device display screen within each of the views comprises instructions which, when executed by the one or more processors, cause the one or more processors to display a list of service plan identifiers and prompt the service designer to indicate, for each service plan identifier in the list and for each one of the views, whether the service plan identifier is to be presented within the one of the views.

68A. The system of clause 66A wherein each of the service plan identifiers within the sets of one or more service plan identifiers comprises a service plan name.

69A. The system of clause 66A wherein each of the service plan identifiers corresponds to a respective service plan having a name and purchase price, and wherein the program code which, when executed by the one or more processors, causes the one or more processors to generate the plurality of provisioning instructions to enable the views to be rendered on the display screen of the end-user mobile device comprises instructions which, when executed by the one or more processors, cause the one or more processors to generate provisioning instructions to enable the name and purchase price of each service plan to be rendered on the display screen of the end-user mobile device within the specified one or more of the views together with a screen icon that may be interacted with by a user of the end-user mobile device to purchase the service plan.

70A. The system of clause 66A wherein the program code, when executed by the one or more processors, further causes the one or more processors to prompt the service designer to specify an order in which service plan identifiers included within a selected one of the sets of one or more service plan identifiers are to be listed within a corresponding one of the views.

71A. The system of clause 66A wherein the program code which, when executed by the one or more processors, causes the one or more processors to prompt the service designer to specify captions of respective views to be presented on a display screen of the end-user mobile device comprises instructions which, when executed by the one or more processors, cause the one or more processors to prompt the service designer to specify captions of respective display tabs to be presented on the display screen of the end-user mobile device.

72A. The system of clause 71A wherein the program code, when executed by the one or more processors, further causes the one or more processors to prompt the service designer to specify a left-to-right order in which the captions of the display tabs are to be presented on the display screen of the end-user mobile device.

73A. A method of generating provisioning instructions for one or more network-delivered services, the method comprising:
prompting a service designer, via a user interface of a computing device, to:
specify one or more criteria that, if met, signify detection of a service request from an end-user device for which no compatible service plan has been activated, and
specify one or more service plan offers to be presented on a display screen of the end-user device in response to determining that the one or more criteria have been met; and
generating a plurality of provisioning instructions to enable (i) detection of the service request from the end-user device according to the one or more criteria, and (ii) presentation of the one or more service plan offers on the display screen of the end-user device in response to detection of the service request.

74A. The method of clause 73A further comprising prompting the service designer to specify a message to be presented on the display screen of the end-user device in response to determining that the one or more criteria have been met, the message indicating lack of a compatible plan for the service request.

75A. The method of clause 73A wherein at least one of the one or more service plan offers comprises a service plan under which the service request may be fulfilled.

76A. The method of clause 73A wherein prompting the service designer to specify one or more service plan offers to be presented on the display screen of the end-user device comprises prompting the service designer to specify a service plan name and price to be presented on the display screen together with a screen icon that may be interacted with by a user of the end-user mobile device to purchase the named service plan.

77A. The method of clause 73A wherein generating the plurality of provisioning instructions comprises generating provisioning instructions that indicate a first access control policy to be applied to the service request following input from a user of the end-user device indicating whether the user has elected to purchase a service plan offered within the one or more service plan offers.

78A. The method of clause 77A wherein the first access control policy comprises an access control action to allow the service request to be fulfilled if the user has elected to purchase a service plan offered within the one or more service plan offers.

79A. The method of clause 77A wherein the first access control policy comprises an access control action to deny the service request if the user has elected not to purchase a service plan offered within the one or more service plan offers.

80A. A system for generating provisioning instructions relating to one or more network-delivered services, the system comprising:
a user interface; and
computing circuitry, including one or more processors and memory to store program code which, when executed by the one or more processors, causes the one or more processors to:
prompt a service designer via the user interface to:
specify one or more criteria that, if met, signify detection of a service request from an end-user device for which no compatible service plan has been activated, and
specify one or more service plan offers to be presented on a display screen of the end-user device in response to determining that the one or more criteria have been met; and
generate a plurality of provisioning instructions to enable (i) detection of the service request from the end-user device according to the one or more criteria, and (ii) presentation of the one or more service plan offers on the display screen of the end-user device in response to detection of the service request.

81A. The system of clause 80A wherein the program code, when executed by the one or more processors, further causes the one or more processors to prompt the service designer to specify a message to be presented on the display screen of the end-user device in response to determining that the one or more criteria have been met, the message indicating lack of a compatible plan for the service request.

82A. The system of clause 80A wherein at least one of the one or more service plan offers comprises a service plan under which the service request may be fulfilled.

83A. The system of clause 80A wherein the program code which, when executed by the one or more processors, causes the one or more processors to prompt the service designer to specify one or more service plan offers to be presented on the display screen of the end-user device comprises instructions which, when executed by the one or more processors, cause the one or more processors to prompt the service designer to specify a service plan name and price to be presented on the display screen together with a screen icon that may be interacted with by a user of the end-user mobile device to purchase the named service plan.

84A. The system of clause 80A wherein the program code which, when executed by the one or more processors, causes the one or more processors to generate the plurality of provisioning instructions comprises instructions which, when executed by the one or more processors, cause the one or more processors to generate provisioning instructions that indicate a first access control policy to be applied to the service request following input from a user of the end-user device indicating whether the user has elected to purchase a service plan offered within the one or more service plan offers.

85A. The system of clause 84A wherein the first access control policy comprises an access control action to allow the service request to be fulfilled if the user has elected to purchase a service plan offered within the one or more service plan offers.

86A. The system of clause 84A wherein the first access control policy comprises an access control action to deny the service request if the user has elected not to purchase a service plan offered within the one or more service plan offers.

87A. A method of generating provisioning instructions for one or more network-delivered services, the method comprising:
prompting a service designer, via a user interface of a computing device, to:
specify within a first classification object one or more classification criteria that, if met by a service request from an end-user device, signify that a first service policy is to be applied with respect to the service request, and
specify, as a variable characteristic of the first classification object, whether additional classification objects are to be evaluated with respect to the first service request following a determination that the one or more classification criteria are met by the service request; and
generating a plurality of provisioning instructions to enable determination of whether the one or more classification criteria are met by the service request and, if the one or more classification criteria are determined to be met, to selectively enable additional classification objects to be evaluated with respect to the first service request according to the variable characteristic of the first classification object.

88A. The method of clause 87A further comprising prompting the service designer to specify an action to be performed if the first service policy is to be applied with respect to the service request, the action including at least one of an access control action, an access accounting action or an access notification action.

89A. The method of clause 87A wherein prompting the service designer to specify one or more classification criteria within the first classification object comprises prompting the service designer to specify at least one of a domain name associated with the one or more network-delivered services, an internet-protocol (IP) address associated with the one or more network-delivered services, a protocol associated with the one or more network-delivered services, or a communication port number associated with the one or more network-delivered services.

90A. The method of clause 87A wherein the first classification object comprises one or more classification filters.

91A. The method of clause 87A further comprising outputting the plurality of provisioning instructions from the computing device to be delivered to one or more processing elements accessible via the network.

92A. A system for generating provisioning instructions relating to one or more network-delivered services, the system comprising:
a user interface; and
computing circuitry, including one or more processors and memory to store program code which, when executed by the one or more processors, causes the one or more processors to:
prompt a service designer, via the user interface, to:
specify within a first classification object one or more classification criteria that, if met by a service request from an end-user device, signify that a first service policy is to be applied with respect to the service request, and
specify, as a variable characteristic of the first classification object, whether additional classification objects are to be evaluated with respect to the first service request following a determination that the one or more classification criteria are met by the service request; and
generate a plurality of provisioning instructions to enable determination of whether the one or more classification criteria are met by the service request and, if the one or more classification criteria are determined to be met, to selectively enable additional classification objects to be evaluated with respect to the first service request according to the variable characteristic of the first classification object.

93A. The system of clause 92A wherein the program code, when executed by the one or more processors, further causes the one or more processors to prompt the service designer to specify an action to be performed if the first service policy is to be applied with respect to the service request, the action including at least one of an access control action, an access accounting action or an access notification action.

94A. The system of clause 92A wherein the program code which, when executed by the one or more processors, causes the one or more processors to prompt the service designer to specify one or more classification criteria within the first classification object comprises instructions which, when executed by the one or more processors, cause the one or more processors to prompt the service designer to specify at least one of a domain name associated with the one or more network-delivered services, an internet-protocol (IP) address associated with the one or more network-delivered services, a protocol associated with the one or more network-delivered services, or a communication port number associated with the one or more network-delivered services.

95A. The system of clause 92A wherein the first classification object comprises one or more classification filters.

96A. The system of clause 92A wherein the program code, when executed by the one or more processors, further causes the one or more processors to output the plurality of provisioning instructions from the computing device to be delivered to one or more processing elements accessible via the network.

97A. A method of provisioning network-delivered services, the method comprising:
   prompting a first service designer, via a user interface of a computing device, to specify a first user credential;
   selecting a limited set of network service subscribers based on the first user credential, the limited set of network service subscribers lacking at least one network service subscriber included in a second set of network service subscribers selected based on a second user credential;
   selecting, based on the first user credential, a limited set of service design options that may be specified by the first service designer, the limited set of service design options lacking at least one service design option included in a second set of service design options available under the second user credential;
   prompting the first service designer via the user interface to specify, for the limited set of network service subscribers, service options within the limited set of service design options;
   generating a plurality of provisioning instructions corresponding to the service options specified by the first service designer; and
   outputting the plurality of provisioning instructions from the computing device together with information that indicates the limited set of network service subscribers.

98A. The method of clause 97A wherein prompting the first service designer to specify the first user credential comprises prompting the first service designer to specify login information particular to the first service designer.

99A. The method of clause 97A further comprising prompting a service design administrator to associate the limited set of network service subscribers with the first user credential and to associate the limited set of service design options with the first user credential.

100A. The method of clause 99A wherein prompting the service design administrator to associate the limited set of service design options to the first user credential comprises prompting the service design administrator to associate one of a plurality of predefined service design roles with the first user credential, the one of the plurality of predefined service roles corresponding to the limited set of service design options.

101A. The method of clause 100A further comprising prompting the service design administrator to select, from among an unlimited set of service design options, the limited set of service design options and to associate the selected, limited set of service design options with the one of the plurality of predefined service roles.

102A. A system for provisioning network-delivered services, the system comprising:
   a user interface; and
   computing circuitry, including one or more processors and memory to store program code which, when executed by the one or more processors, causes the one or more processors to:
   prompt the first service designer, via the user interface, to specify a first user credential;
   select a limited set of network service subscribers based on the first user credential, the limited set of network service subscribers lacking at least one network service subscriber included in a second set of network service subscribers selected based on a second user credential;
   select, based on the first user credential, a limited set of service design options that may be specified by the first service designer, the limited set of service design options lacking at least one service design option included in a second set of service design options available under the second user credential;
   prompt the first service designer via the user interface to specify, for the limited set of network service subscribers, service options within the limited set of service design options;
   generate a plurality of provisioning instructions corresponding to the service options specified by the first service designer; and
   output the plurality of provisioning instructions from the computing device together with information that indicates the limited set of network service subscribers.

103A. The system of clause 102A wherein the program code which, when executed by the one or more processors, causes the one or more processors to prompt the first service designer to specify the first user credential comprises instructions which, when executed by the one or more processors, cause the one or more processors to prompt the first service designer to specify login information particular to the first service designer.

104A. The system of clause 102A wherein the program code, when executed by the one or more processors, further causes the one or more processors to prompt a service design administrator to associate the limited set of network service subscribers with the first user credential and to associate the limited set of service design options with the first user credential.

105A. The system of clause 104A wherein the program code which, when executed by the one or more processors, causes the one or more processors to prompt the service design administrator to associate the limited set of service design options to the first user credential comprises instructions which, when executed by the one or more processors, cause the one or more processors to prompt the service design administrator to associate one of a plurality of predefined service design roles with the first user credential, the one of the plurality of predefined service roles corresponding to the limited set of service design options.

106A. The system of clause 105A wherein the program code, when executed by the one or more processors, further causes the one or more processors to prompt the service design administrator to select, from among an unlimited set of service design options, the limited set of service design options and to associate the selected, limited set of service design options with the one of the plurality of predefined service roles.

I. Hierarchical Design from Existing Objects (e.g. Service Activities)

1. A method comprising:
   identifying, at a service design system, one or more filters, each filter for identifying network data traffic as associated with one or more network services;

generating one or more service objects using the one or more filters, each service object for identifying network data traffic belonging to a category of one or more network services;

generating a service plan using the one or more service objects, the service plan for managing use of the one or more network services or of the one or more categories of one or more network services by an end user device;

associating at least one sub-plan-level policy with at least one of the one or more filters or with at least one of the one or more service objects, the at least one sub-plan-level policy for defining rules of use of a specified network service or of a specified category of one or more network services; and using the one or more filters of the service plan and the at least one sub-plan-level policy to generate computer code for assisting a policy implementation element to manage use of the particular network service or the particular category of one or more network services on the end user device in accordance with the at least one sub-plan-level policy.

2. The method of clause 1, wherein at least one of the one or more network services includes a web page.
3. The method of clause 1, wherein at least one of the one or more network services includes a domain.
4. The method of clause 1, wherein at least one of the one or more network services includes an application.
5. The method of clause 1, wherein at least one of the one or more network services includes a tethering function.
6. The method of clause 1, wherein at least one of the one or more network services includes a roaming data network function.
7. The method of clause 1, wherein one of the one or more categories includes email services.
8. The method of clause 1, wherein one of the one or more categories includes social networking services.
9. The method of clause 1, wherein one of the one or more categories includes a domain, and the network services of the category include a plurality of web pages.
10. The method of clause 1, wherein one of the one or more categories includes a music download service.
11. The method of clause 1, wherein one of the one or more categories includes video game services.
12. The method of clause 1, wherein one of the one or more categories includes multimedia services.
13. The method of clause 1, wherein the rules include notification rules defining user notifications triggers.
14. The method of clause 1, wherein the rules include access rules defining access rights.
15. The method of clause 1, wherein the rules include accounting rules defining use-based accounting metrics.
16. The method of clause 1, wherein the policy implementation element is on the end user device.
17. The method of clause 1, wherein the policy implementation element is on a network element remote from the end user device.
18. The method of clause 1, wherein each of the steps is performed via a single interface.
19. The method of clause 1, wherein the one or more service objects include two service objects, and the two service objects each include an instance of the same filter.
20. The method of clause 1, wherein
at least one of the one or more service objects comprises a service activity including a group of one or more filters, and comprises a service component including a group of one or more service activities, and the service plan comprises one or more service components.
21 The method of clause 20, wherein one of the at least one sub-plan-level policy includes at least one of an activity-level policy or a component-level policy.
22. The method of clause 1, further comprising
creating a device group of one or more end user devices; and
providing the computer code to an element group of one or more policy implementation elements to manage the specified network service or the specified category of network services on the one or more end user devices of the device group in accordance with the at least one sub-plan-level policy.
23. The method of clause 22, wherein the device group includes a beta test group of one or more end user devices.
24. The method of clause 22,
wherein the beta test group is different than the device group, and
further comprising providing the computer code to a beta test element group of one or more policy implementation elements to manage the specified network service or the specified category of network services on the one or more end user devices of the beta test group in accordance with the at least one sub-plan-level policy, before providing the computer code to the one or more end user devices of the device group.
25. The method of clause 1, wherein a filter identifies all network data traffic as associated therewith.
25++. The method of clause 1, wherein the computer code is generated for a programmable circuit.
26. A service design system, comprising:
a first interface mechanism for identifying one or more filters, each filter for identifying network data traffic as associated with one or more network services;
a second interface mechanism for generating one or more service objects using the one or more filters, each service object for identifying network data traffic belonging to a category of one or more network services;
a third interface mechanism for generating a service plan using the one or more service objects, the service plan for managing use of the one or more network services or of the one or more categories of one or more network services by an end user device;
a fourth interface mechanism for associating at least one sub-plan-level policy with at least one of the one or more filters or with at least one of the one or more service objects, the at least one sub-plan-level policy for defining rules of use of a specified network service or of a specified category of one or more network services; and
a processor for using the one or more filters of the service plan and the at least one sub-plan-level policy to generate computer code for assisting a policy implementation element to manage use of the particular network service or the particular category of one or more network services on the end user device in accordance with the at least one sub-plan-level policy.
27. The system of clause 26, wherein at least one of the one or more network services includes a web page.
28. The system of clause 26, wherein at least one of the one or more network services includes a domain.
29. The system of clause 26, wherein at least one of the one or more network services includes an application.
30. The system of clause 26, wherein at least one of the one or more network services includes a tethering function.

31. The system of clause 26, wherein at least one of the one or more network services includes a roaming data network.
32. The system of clause 26, wherein one of the one or more categories includes email services.
33. The system of clause 26, wherein one of the one or more categories includes social networking services.
34. The system of clause 26, wherein one of the one or more categories includes a domain, and the network services of the category include a plurality of web pages.
35. The system of clause 26, wherein one of the one or more categories includes a music download service.
36. The system of clause 26, wherein one of the one or more categories includes video game services.
37. The system of clause 26, wherein one of the one or more categories includes multimedia services.
38. The system of clause 26, wherein the rules include notification rules defining user notifications triggers.
39. The system of clause 26, wherein the rules include access rules defining access rights.
40. The system of clause 26, wherein the rules include accounting rules defining use-based accounting metrics.
41. The system of clause 26, wherein the policy implementation element is on the end user device.
42. The system of clause 26, wherein the policy implementation element is on a network element remote from the end user device.
43. The system of clause 26, wherein the first, second, third and fourth interface mechanism are all portions of a single interface.
44. The system of clause 26, wherein the one or more service objects include two service objects, and the two service objects each include an instance of the same filter.
45. The system of clause 26, wherein
    at least one of the one or more service objects comprises a service activity including a group of one or more filters, and comprises a service component including a group of one or more service activities, and
    the service plan comprises one or more service components.
46. The system of clause 45, wherein one of the at least one sub-plan-level policy includes at least one of an activity-level policy or a component-level policy.
47. The system of clause 26, further comprising
    a fifth interface mechanism for creating a device group of one or more end user devices; and
    a transmitter mechanism for providing the computer code to an element group of one or more policy implementation elements to manage the specified network service or the specified category of network services on the one or more end user devices of the device group in accordance with the at least one sub-plan-level policy.
48. The system of clause 47, wherein the device group includes a beta test group of one or more end user devices.
49. The system of clause 47, wherein
    the beta test group is different than the device group, and
    wherein the transmitter mechanism is operative to provide the computer code to a beta test element group of one or more policy implementation elements to manage the specified network service or the specified category of network services on the one or more end user devices of the beta test group in accordance with the at least one sub-plan-level policy, before providing the computer code to the one or more end user devices of the device group.
50. The system of clause 26, wherein a filter identifies all network data traffic as associated therewith.
51. The system of clause 26, wherein the processor generates the computer code for a programmable circuit.

II. Design and Implementation: Order of Classifying Data

1. A method comprising:
    identifying filters at a service design system, each filter for classifying network data traffic as associated with one or more network services;
    generating service objects using the filters, each service object for classifying network data traffic as associated with a group of the one or more network services;
    generating a service plan using the service objects, the service plan for managing use of the network services associated with the service objects;
    prioritizing the service objects to avoid conflicting classifications of network data traffic by alternative service objects, the alternative service objects capable of classifying the network data traffic as associated therewith;
    associating policies with the service objects, each policy for defining rules of use of the group of the one or more network services corresponding to an associated service object; and
    using the service objects and the policies to generate computer code for assisting a policy implementation element to manage use of the network services on the end user device.
2. The method of clause 1, wherein the one or more network services includes a web page.
3. The method of clause 1, wherein the one or more network services includes a domain.
4. The method of clause 1, wherein the one or more network services includes an application.
5. The method of clause 1, wherein the one or more network services includes a tethering function.
6. The method of clause 1, wherein the one or more network services includes a roaming data network function.
7. The method of clause 1, wherein the one or more network services includes a category of network services.
8. The method of clause 1, wherein the group includes a category of network services.
9. The method of clause 1, wherein the group includes sponsored services.
10. The method of clause 1, wherein the group of one or more services includes the services provided by a single entity.
11. The method of clause 1, wherein the group includes a domain, and the network services of the group include a plurality of web pages.
12. The method of clause 1, wherein the rules include notification rules defining user notifications triggers.
13. The method of clause 1, wherein the rules include access rules defining access rights.
14. The method of clause 1, wherein the rules include accounting rules defining use-based accounting metrics.
15. The method of clause 1, wherein the policy implementation element is on the end user device.
16. The method of clause 1, wherein the policy implementation element is on a network element remote from the end user device.
17. The method of clause 1, wherein each of the steps is performed via a single interface.
18. The method of clause 1, wherein the service objects include two service objects each including an instance of the same filter.
19. The method of clause 1, wherein
    at least one of the service objects comprises a service activity including a group of one or more filters, and comprises a service component including a group of one or more service activities, and
the service plan comprises one or more service components.
20. The method of clause 19, wherein at least one of the policies includes at least one of an activity-level policy or a component-level policy.
21. The method of clause 1, wherein the computer code is generated for a programmable circuit.
22. The method of clause 1, wherein a filter identifies all network data traffic as associated therewith.
23. The method of clause 1, wherein at least one service object is generated using only one filter.
24. The method of clause 1, wherein the prioritizing includes prioritizing sponsored services ahead of unsponsored services.
25. The method of clause 1,
wherein the service objects includes a first service object and a second service object, each of the first and second service objects configured to classify particular network data traffic with its associated one or more network services, and
wherein the prioritizing includes configuring the first service object to apply until a restriction, and the second service object to apply after the restriction.
26. The method of clause 25, wherein the restriction includes a state condition.
27. The method of clause 25, wherein the restriction includes a usage threshold.
28. The method of clause 1, further comprising providing the computer code to the policy implementation element.
29. A method, comprising:
receiving computer instructions from a service design system;
using the computer instructions to install on an end user device prioritized service objects and policies associated with the service objects, the prioritized service objects and associated policies for managing use of one or more network data services;
receiving network data traffic or a request for network data services at an end user device;
applying, by a policy implementation element, one or more of the prioritized service objects to classify the network data traffic or the request for network data services as belonging to at least one of the one or more network data services and as associated with a particular service object;
applying, by a policy implementation element, a particular policy associated with the particular service object to effect the rules of use of the at least one of the one or more network data services.
30. The method of clause 29, further comprising:
determining that the usage of the applicable classification has reached a first limit when a first packet belonging to the first classification is received;
applying one or more additional filters to the first packet; and
classifying the packet as belonging to a second classification of the at least two different classifications.
31. The method of clause 29, wherein the one or more policies corresponding to the applicable classification include a skip policy, the method further comprising:
stopping of applying any more policies for the applicable classification; and
applying one or more additional filters to the data traffic to determine another applicable classification for the data traffic.

III. Design and Implementation: Policy Modifiers
A. Classification and at Least One Network Policy Modifier
35. A method for designing a service plan group including a plurality of network data services to be provided by an access network to one or more communications devices, the method comprising:
creating each of a plurality of service objects by:
receiving, at an interface of a service design system, one or more filters for a respective service component, each filter including a set of one or more parameters, each set of parameters adapted to classify data traffic as being associated with the respective service object, the data traffic to be communicated on the at least one access network;
providing, to a user, an interface mechanism to select one or more network state categories from a plurality of network state categories and at least one network state value for a selected network state category, each network state category having a plurality of network state values;
receiving a selection of the one or more network state categories and one or more network state values for the selected network state category;
designating one or more policies to combinations of each service object and at least one network state value of a selected network state category;
creating the service plan group based on the plurality of service objects, the policies, and the policy designations, wherein the policy designations of the service plan group facilitates implementing policies for data traffic of a communications device subscribing to the service plan based on current network state values of the selected network state categories; and
translating the service plan group into instructions capable of being used to program one or more policy implementation elements to implement the policies for the data traffic of the communications device.
36. The method of clause 35, wherein a service object is a service component or a service plan that includes service components.
37. The method of clause 35, further comprising:
designating one or more policies to each combination of service object and each network state value of each selected network state category.
38. The method of clause 35, further comprising:
providing, to the user, an input mechanism for receiving one or more policies for each combination of service object and each network state value of each selected network state category.
39. The method of clause 35, further comprising:
receiving a plurality of usage state values, a usage state value indicating an amount of network usage classified to a service object, the classification being determined by the one or more filters of the service object; and
designating one or more policies to each combination of classification, usage state value, and each network state value of each selected network category.
40. The method of clause 35, wherein the interface mechanism allows selecting the one or more network state categories separately for each service object.
41. The method of clause 35, wherein the interface mechanism allows a user to specify one or more network state configurations, a first network state configuration including:

a network state value for each of the network state categories selected for the first network state configuration; and a wildcard symbol for the network state categories not selected for the first network state configuration, wherein the wildcard symbol matches any network state value for the non-selected category, wherein one or more policies are designated for each network state configuration.

42. The method of clause 41, further comprising:
receiving, from the user, one or more policies for each network state configuration.

43. The method of clause 41, further comprising:
receiving an order of the network state configurations, the order being used by the one or more policy implementation elements to determine a network state configuration that first matches with the current network state values and the corresponding one or more policies to implement for data traffic of the communications device.

44. The method of clause 42, wherein the interface mechanism allows a user to separately specify one or more network state configurations for each service object.

45. The method of clause 35, wherein the policy designations are arranged in a multidimensional array, wherein each selected network category is a separate dimension of the multidimensional array, and wherein the plurality of service objects comprise a dimension of the multidimensional array.

46. The method of clause 35, wherein the plurality of network state categories includes congestion state, location of the network, type of network, and network routing identifiers.

47. The method of clause 46, wherein the network state values for the location of the network include home and at least one roaming network.

48. The method of clause 46, wherein the network state values for the congestion state are based on at least one of time of day, a device measure of network congestion, and a network measure of network congestion.

49. The method of clause 48, wherein the network state values are based on a measure of network congestion, the measure of network congestion including at least one of traffic delay, delay jitter, and network packet error rate.

50. The method of clause 48, further comprising:
receiving, from a user, a specification of how a network state value for the congestion state is to be determined.

51. The method of clause 46, wherein the network state values for the type of network include at least two or more selected from a group consisting of: 2G, 3G, 4G, and Wi Fi.

52. The method of clause 35, wherein each parameter in a set is for a respective category of data traffic attributes.

B. Two Policy Modifiers

53. A method for designing a service plan group including one or more network services to be provided by an access network to one or more communications devices, the method comprising:
providing, by a service design system to a user, an interface mechanism to select a plurality of network state categories and at least one network state value for a selected network state category, each network state category having a plurality of network state values;
receiving a selection of the plurality of network state categories and one or more network state values for each of the selected network state categories;
designating one or more policies to a plurality of combinations of network state values for the selected network state categories;
creating the service plan group based on the policies and the policy designations, wherein the policy designations of the service plan group facilitates implementing policies for a communications device subscribing to the service plan group based on current network state values of the selected network state categories; and
translating the service plan group into instructions capable of being used to program one or more policy implementation elements to implement the policies for the data traffic of the communications device.

54. The method of clause 53, further comprising:
designating one or more policies to each combination of network state values for the selected network state categories.

55. The method of clause 53, further comprising:
creating each of a plurality of service objects by:
receiving, at an interface of a service design system, one or more filters for a respective service object, each filter including a set of one or more parameters, each set of parameters adapted to classify data traffic as being associated with the respective service object, the data traffic to be communicated on the at least one access network; and
designating one or more policies to each combination of service object and each network state value of each selected network state category.

56. The method of clause 55, wherein a service object is a service component or a service plan that includes service components.

57. The method of clause 53, further comprising:
receiving a plurality of usage state values, a usage state value indicating an amount of network usage; and
designating one or more policies to each combination of usage state value and each network state value of each selected network category.

C. Implementation with Two Network State Categories

58. A method of implementing a policy for a communications device's use of a network service of an access network, the method comprising:
obtaining network state information;
determining a set of current state values of the access network based on the network state information, each current state value associated with a respective network state category, each network state category having a plurality of network state values;
using the set of current state values to access an array of policies;
retrieving, from the array, a first policy that corresponds to the set of current state values;
receiving one or more packets of data traffic associated with the communications device during the current state of the access network; and
applying, by a policy implementation element, the first policy to the one or more packets of the data traffic.

59. The method of clause 58, wherein using the current state values to access an array of policies includes:
comparing the set of current state values to one or more network state configurations to determine a network state configuration that matches to the set of current state values, each network state configuration associated with one or more policies.

60. The method of clause 59, wherein the comparing is performed in a specified order, the method further comprising:

retrieving the one or more policies associated with the first network state configuration that matches to the set of current state values.
61. The method of clause 58, further comprising:
converting one or more of the current state values to a corresponding predetermined network state value of a respective network state category.
62. The method of clause 61, wherein the respective network state category corresponds to network congestion, and wherein the predetermined network state values correspond to different levels of congestion.
63. The method of clause 58, further comprising:
converting the set of current state values to a network state index of an indexed array of policies; and
using the network state index to retrieve the first policy.
64. The method of clause 63, wherein the first policy is retrieved from a multidimensional array, wherein each of the selected network state categories corresponds to a dimension of the multidimensional array.
65. The method of clause 63, wherein the indexed array contains pointers to the policies.
66. The method of clause 63, further comprising:
detecting when the network state information changes, wherein the converting the network state information to a network state index of an indexed array of policies occurs when the network state information changes.
67. The method of clause 58, wherein the respective network state categories include congestion state, location of the network, type of network, and network routing identifier.
68. The method of clause 67, wherein the network state values for the location of the network include home and at least one roaming network.
69. The method of clause 67, wherein the network state values for the congestion state are based on at least one of time of day, a device measure of network congestion, and a network measure of network congestion.
70. The method of clause 69, wherein the network state values are based on a measure of network congestion, the measure of network congestion including at least one of traffic delay, delay jitter, and network packet error rate.
71. The method of clause 67, wherein the network state values for the type of network include at least two or more selected from a group consisting of: 2G, 3G, 4G, and Wi Fi.

IV. Design of a Policy: Events
  A. Event Associated with 2 of 3 Policies
72. A method for designing a service plan including one or more network services to be provided by an access network to one or more communications devices, the method comprising:
providing, by a service design system to a user, an interface mechanism to provide input defining an event associated with a use of the access network according to the service plan;
receiving, from the user, the input defining the event;
receiving, from the user, a plurality of service policies associated with the event, the service policies including at least two of an access policy that defines rights to access a network service, a charging policy that defines charges for using the network service, and a notification policy that defines when to provide notifications corresponding to the network service; and
creating the service plan based on the event and the plurality of service policies; and
translating the service plan into instructions capable of being used to program one or more policy implementation elements to implement the service policies when the event is detected for a communications device's use of the access network, the communications device subscribing to the service plan.
73. The method of clause 72, further comprising:
identifying a first group of remote communications devices to be bound to the service plan; and
providing the instructions to a second group of policy implementation elements capable of implementing the policy for the first group of remote communications devices.
74. The method of clause 72, wherein the interface mechanism includes one or more picklists for defining the event, each picklist including a plurality of options.
75. The method of clause 74, wherein the one or more picklists include:
a first picklist that includes at least one option that corresponds to a measure for an amount of usage of a network service; and
one or more second picklists that include options for specifying the amount of usage.

B. Event and Device State Provides Notification
76. A method for designing a service plan including one or more network services to be provided by an access network to one or more communications devices, the method comprising:
providing, by a service design system to a user, a first interface mechanism to provide input defining one or more events associated with a use of the access network according to the service plan;
receiving, from the user, the input defining the one or more events;
providing a second interface mechanism for specifying one or more device states of a communications device, a device state being a property of only the communications device;
receiving the one or more device states;
receiving a notification policy associated with the one or more events and the one or more device states, the notification policy defining a conditional relationship between the one or more events and the one or more device states such that a notification message is displayed to a user of a communications device subscribing to the service plan;
creating the service plan based on the one or more events, the one or more device states, and the notification policy; and
translating the service plan into instructions capable of being used to program one or more policy implementation elements to implement the notification policy when the one or more events are detected for the communications device's use of the access network and the conditional relationship exists, the communications device subscribing to the service plan.
77. The method of clause 76, wherein the one or more events include a classification of data traffic of the communications device into a first type of data traffic, the classification being determined by one or more filters of the service plan.
78. The method of clause 76, wherein a device state includes an application presently running on the device, a location of the device,
79. The method of clause 76, wherein the one or more events is only one event, and the conditional relationship includes the one or more device states being present when the only one event is detected.
80. The method of clause 76, wherein the conditional relationship specifies one or more window criteria between when one or more of the events was detected and when one of the device states was last present on the communications device.

81. The method of clause 80, wherein the window criteria includes a time and/or a usage amount.

82. The method of clause 76, wherein the conditional relationship specifies an order of the events.

83. The method of clause 76, wherein the conditional relationship specifies an order for when the device states were present on the communications device.

C. Implementation of Event and Device State Induced Notification

84. A method of implementing a notification policy for a communications device's use of a network service of an access network, the method comprising:
   detecting one or more events associated with a communications device's use of the access network according to the service plan;
   identifying one or more current or recent device states of the communications device, a device state being a property of only the communications device;
   determining whether a conditional relationship exists between the one or more events and the one or more current or recent device states according to a notification policy of a service plan subscribed to by the communications device; and
   sending a notification request to a notification agent on the communications device when the conditional relationship is satisfied.

85. The method of clause 84, wherein the notification request is sent from a network element to the notification agent on the communications device.

86. The method of clause 84, wherein the notification request is sent from a policy implementation agent on the communications device to the notification agent on the communications device.

V. Additional Network Service Plan Provisioning

1. A network service plan provisioning system configured to:
   receive and store multiple service plan components comprising:
      a first service plan component, the first service plan component comprising:
         a first traffic classification filter set comprising a first traffic classification filter for filtering a traffic event in a network traffic inspection system;
         a first policy enforcement action set comprising a first network policy enforcement action that is triggered in a network policy enforcement system when the traffic event possesses characteristics that match the first classification identifier;
      a second service plan component, the second service plan component comprising:
         a second traffic classification filter set comprising a second traffic classification filter for filtering the traffic event in the network traffic inspection system;
         a second policy enforcement action set comprising a second network policy enforcement action that is triggered in the network policy enforcement system when the traffic event possesses characteristics that match the second classification identifier;
   determine a superposition of the first traffic classification filter over the second traffic classification filter;
   process the first service plan component and the second service plan component to create a network provisioning instruction set in accordance with the determination of the superposition of the first traffic classification filter over the second traffic classification filter, the network provisioning instruction set comprising a set of traffic inspection provisioning instructions for a network traffic inspection system and a set of policy enforcement provisioning instructions for a network policy enforcement system;
   provide the set of traffic inspection provisioning instructions to the network traffic inspection system;
   provide the set of policy enforcement provisioning instructions to the network policy enforcement system.

2. The network service plan provisioning system of clause 1 wherein the network service plan provisioning system is configured to order traffic inspection comparison operations in the set of traffic inspection provisioning instructions such that the first service plan component has a higher policy enforcement priority than the second service plan component, wherein the first traffic classification filter is evaluated before the second traffic classification filter in the network traffic inspection system.

3. The network service plan provisioning system of clause 2 wherein the network service plan provisioning system is configured to include in the network provisioning instruction set a specification that once the traffic event triggers the first network policy enforcement action, no further traffic comparison inspections are to be performed for the traffic event.

4. The network service plan provisioning system of clause 2 wherein the network service plan provisioning system is configured to include in the network provisioning instruction set a specification that once the traffic event triggers the first network policy enforcement action, further traffic comparison inspections are to be performed to determine that the traffic event also matches the second traffic classification filter and triggers the second network policy enforcement action.

5. The network service plan provisioning system of clause 1, wherein the network provisioning instruction set includes a service usage activity that satisfies the first service plan component and the second service plan component, further comprising:
   a policy enforcement priority rule datastore including a policy enforcement priority rule for enforcing the service usage activity with the first traffic classification filter and the first network policy enforcement action rather than the second traffic classification filter and the second network policy enforcement action;
   wherein the network service plan provisioning system is configured to include the policy enforcement priority rule in the network provisioning instruction set.

6. The network service plan provisioning system of clause 5 wherein the policy enforcement priority rule comprises a priority order for traffic classification filters, including the first traffic classification filter and the second traffic classification filter, for filtering the traffic event in the network traffic inspection system.

7. The network service plan provisioning system of clause 5 wherein the policy enforcement priority rule comprises a priority specification for at least one of the first service plan component and the second service plan component.

8. The network service plan provisioning system of clause 5 wherein the network service plan provisioning system is configured to include in the set of network provisioning instruction set a specification that the traffic event is to be compared with multiple traffic classification filter sets associated with multiple service plan components, and in the event that more than one traffic classification filter match is triggered then the policy enforcement action associated with the matched traffic classification filter for the service plan component with highest policy enforcement priority is to be enforced.

9. The network service plan provisioning system of clause 8 wherein the network service plan provisioning system is configured to include in the network provisioning instruction set a specification that once the traffic event triggers the first network policy enforcement action, no policy enforcement action from a policy enforcement action set other than the first policy enforcement action set is to be applied to the traffic event.

10. The network service plan provisioning system of clause 8 wherein the network service plan provisioning system is configured to include in the network provisioning instruction set a specification that once the traffic event triggers the first network policy enforcement action, the second policy enforcement action is to be applied to the traffic event.

11. The network service plan provisioning system of clause 5 wherein the network service plan provisioning system is configured to provide a user interface for a service plan design environment that provides for entering the policy enforcement priority rule in the design environment by one or more of: entering a priority assignment to a service plan component, positioning service plan components in a graphical ordering of priority, or defining a service plan component as belonging to a service type that has an implied or literal ordering.

12. The network service plan provisioning system of clause 1 wherein the network service plan provisioning system is configured to include in the first traffic classification filter an inspection criteria selected from a group of inspection criteria consisting of a specific device application, a specific network destination, a specific network source, a specific traffic or content type, a specific traffic protocol, and a combination of two or more of the inspection criteria.

13. The network service plan provisioning system of clause 1 wherein the network service plan provisioning system is configured to include in the policy enforcement action set an action selected from a group of actions consisting of a traffic control policy; a service usage accounting, charging or billing policy, a service notification policy, and a combination of two or more of the actions.

14. The network service plan provisioning system of clause 1, wherein the network service plan provisioning system is configured to include in the network provisioning instruction set a sponsored charging policy.

15. The network service plan provisioning system of clause 1, wherein the network service plan provisioning system is configured to include in the network provisioning instruction set a classification-based charging policy, wherein the classification is from the group of classification categories consisting of application, destination, network, time of day, congestion state, quality of service, content type, and a combination.

16. The network service plan provisioning system of clause 1, wherein the network service plan provisioning system is configured to include in the network provisioning instruction set service buy page notifications with actionable responses.

17. The network service plan provisioning system of clause 1, wherein the network service plan provisioning system is configured to include in the network provisioning instruction set usage notifications in response to device or network state.

18. The network service plan provisioning system of clause 1, wherein the network service plan provisioning system is configured to include in the network provisioning instruction set marketing intercept offer notifications specific to device or network state.

19. The network service plan provisioning system of clause 1, wherein the network service plan provisioning system is configured to include in the network provisioning instruction set roaming notifications specific to device or network state.

20. The network service plan provisioning system of clause 1, wherein the network service plan provisioning system is configured to provide a user interface for a service plan design environment that provides for a hierarchical definition and display of the multiple service plan components, the first traffic classification filter set, the second traffic classification filter set, the first policy enforcement action set, and the second policy enforcement action set.

21. The network service plan provisioning system of clause 1, wherein the network service plan provisioning system is configured to facilitate reuse of the multiple service plan components, the first traffic classification filter set, the second traffic classification filter set, the first policy enforcement action set, and the second policy enforcement action set in multiple service plans by storing the multiple service plan components, the first traffic classification filter set, the second traffic classification filter set, the first policy enforcement action set, and the second policy enforcement action set as objects in a catalog.

22. The network service plan provisioning system of clause 1 wherein the first policy enforcement action set includes an additional policy enforcement action set applied at the service plan level that augments the first policy enforcement action set and the second policy enforcement action set.

23. The network service plan provisioning system of clause 1 wherein the first policy enforcement action set includes an additional policy enforcement action set applied at the service plan level that over-rides the first policy enforcement action set and the second policy enforcement action set.

24. The network service plan provisioning system of clause 1, wherein the network service plan provisioning system is configured to facilitate grouping of the multiple service plan components and provide for grouping of the multiple service plan components into a larger service plan object definition.

25. The network service plan provisioning system of clause 1, wherein the network service plan provisioning system is configured to facilitate grouping of the multiple service plan components and provide for an additional policy enforcement action set applied at a service plan group level that augments the first policy enforcement action set and the second policy enforcement action set.

26. The network service plan provisioning system of clause 1, wherein the network service plan provisioning system is configured to facilitate grouping of the multiple service plan components and provide for an additional policy enforcement action set applied at a service plan group level that over-rides the first policy enforcement action set and the second policy enforcement action set.

27. The network service plan provisioning system of clause 1, wherein the network service plan provisioning system is configured to facilitate grouping of the multiple service plan components and provide one or more service plan component group policy enforcement priority rules comprising a specification for how to resolve one or more policy enforcement ambiguities that occur at the service plan component group level.

28. The network service plan provisioning system of clause 1 wherein the network service plan provisioning system is configured to receive service plan parameters for multiple service plans, combine service policies for the multiple service plans into one composite-plan policy set, and provision the network policy enforcement system to properly enforce the composite policies for the multiple service plans.

29. The network service plan provisioning system of clause 28 wherein the network service plan provisioning system is configured to provide a composite-plan policy enforcement priority rule comprising a specification for how to resolve a potential policy enforcement ambiguity between traffic classification or policy enforcement instructions for two or more composite-plans.

VI. Network Service Plan Provisioning—Online Charging System (OCS)

1. An network based system for providing on-device user access network service plan purchase comprising:
   multiple access network systems, each network comprising:
      an access communication network in communication with an end user device, the end user device configured with an access modem and a device client capable of displaying a service plan offer, transmitting a user service plan selection message and receiving a service usage indication, the service plan offer comprising:
         a list of one or more service plans, each of the one or more service plans providing an amount of access service allowed under an access service policy set associated with the service plan, each of the one or more service plans further configured with a price for the amount of access service allowed under the access service policy set, the user service plan selection message comprising:
            a communication message indicating a service plan purchase option selected by the device user from the service plan offer,
      a service usage credit system configured to:
         translate user service plan selections into a service usage credit for the device, and
      a service usage accounting system configured to:
         account for service usage by the device and debit the service usage credit for the device as service is used, and
         create and transmit service usage accounting records indicating current service usage or remaining service usage credit,
      an access service control system configured to determine if current user service credit is sufficient to provide access service, and if current usage credit is sufficient then provide access service, or if current usage credit is insufficient then deny access service,
   a service controller configured to:
      communicate with the multiple access network,
      receive and store service plan offer information comprising the content of one or more service plan offers,
      communicate the service plan offer information to multiple device clients in communication with the multiple access communication networks,
      accept user service plan selection messages from multiple device clients in communication with the multiple access communication networks,
      communicate the service plan selection messages to multiple service usage credit systems,
      receive service usage accounting records,
      analyze the service usage accounting records to determine when a pre-determined service usage trigger has been reached, and when the trigger condition has been reached, transmit a service usage indication to the device client, the service usage indication being associated with the service usage trigger and comprising device client UI notification message information indicating current service usage or remaining service usage credit.

2. System of clause 1 further configured to manage different service plan offers that are different for at least two of the multiple networks.

3. System of clause 1 further comprising a service design center configured to accept service plan design elements from a network administrator, translate the service plan design elements into the service plan offer information and communicate the service plan offer information to the service controller.

4. System of clause 3 further configured to manage at least two service plan offers that are different for at least two of the multiple networks, and where each of the service plan offers are associated with a different device group or user group.

5. System of clause 3 wherein a service plan choice contained in the service plan offer comprises a pre-pay service plan wherein the device user pre-pays for service credit before the credit is used.

6. System of clause 3 wherein a service plan choice contained in the service plan offer comprises a post-pay service plan wherein the device user pays for service credit after the credit is used.

7. System of clause 3 wherein a service plan choice contained in the service plan offer comprises a post-pay service plan wherein the device user pays for service credit after the credit is used and there is a service usage limit imposed on the service credit.

8. System of clause 3 wherein a service plan choice contained in the service plan offer comprises a recurring service plan wherein the device user pays for service credit after the credit is used and a recurring service plan credit payment is billed to the user on a recurring basis.

9. System of clause 3 wherein a first service plan choice contained in the service plan offer comprises a pre-pay service plan wherein the device user pre-pays for service credit before the credit is used, and a second service plan choice contained in the service plan offer comprises a post-pay service plan wherein the device user pays for service credit after the credit is used.

10. Service controller configured to communicate with the multiple access network systems via an API that provides the necessary protocol translations required to implement a uniform interface in cases where the multiple access network systems have different communication protocols or data exchange protocols.

11. System of clause 1 further comprising a service design center configured to:
   accept service plan design information from a network administrator, the service plan information containing service usage credit rules specifying the price for the amount of access service allowed under the access service policy set and the rules for how to increment the service usage credit when a service plan is selected by the end user, communicate the service usage credit rules to one or more of the service usage credit system or the service usage accounting system.

12. System of clause 11 further configured to manage at least two service usage credit rules that are different for at least two of the multiple networks, and where each of the service usage credit rules are associated with a different device group or user group.

13. System of clause 1 further comprising a service design center configured to:
accept service plan design information from a network administrator, the service plan information comprising device client UI notification message information,
define a service usage trigger condition,
associate the device client UI notification message information with the service usage trigger condition,
communicate the service usage trigger condition and the device client UI notification message information to the service controller.

14. System of clause 11 further configured to manage at least two combinations of service usage trigger condition and device client UI notification message information that are different for at least two of the multiple networks, and where each of the two combinations are associated with a different device group or user group.

15. System of clause 1 wherein the service controller is further configured to query a post-pay service plan catalog to determine a set of post-pay service plans that are available for a service plan offer, configure the service plan offer and communicate the service plan offer to a group of devices on one or more of the multiple access networks.

16. System of clause 1 wherein the service controller is further configured to query a pre-pay service plan catalog to determine a set of pre-pay service plans that are available for a service plan offer, configure the service plan offer and communicate the service plan offer to a group of devices on one or more of the multiple access networks.

17. The system of clause 1 wherein the multiple access network systems are located in multiple countries, and the service plan notification content for each of two or more of the multiple access networks is optimized for the differences in language spoken in the two or more of the multiple access networks.

18. Providing a user with a set of traffic classification based plans to choose from on a device user interface (UI):
a network control element (e.g. GGSN or Allot) monitors data path for a device and determines a trigger condition (e.g. any of: user attempts access or device turns on, user tries an app, user tries a website, etc.) for when to send a service offer consisting of a list of classification plan choices, and when this happens the control element sends a signal to a notification element (e.g. sure pay text notification system or something like our service controller),
the notification element sends a notification to a native client residing on the device telling it to either (i) display a notification message with the service offer consisting of a list of classification plan choices or (ii) automatically launch a website or app server page that provides a list of classification plan choices,
the user chooses a plan and the client sends the plan choice to a plan activation element (e.g. pre-pay top up OCS that is now configured to work with classification plans).

19. A system that has traffic classification based service plan capability and sending the user a message when an attempted access is not covered by an active classification based service plan:
a network policy configuration element (e.g. PCRF) keeps a first specific set of network destinations (e.g. domains, urls, addresses, server names, etc.) for network destination based service plans and when one of these service plans is active it programs a network control element (e.g. GGSN or Allot box) to allow these domains and account for the charges to a specific charging record identifier,
the network control element (e.g. GGSN or Allot box) detects that the device is attempting to reach one or more of a second specific set of network destinations (e.g. domains, urls, server name, address, etc.) that are not on an allowed list, the gateway then blocks the traffic,
the control element signals that the traffic is blocked to a policy configuration element in the network (e.g. PCRF) that in turn communicates with a notification element (e.g. (i) sure pay top-up text message generator or (ii) something like our service controller but configured for notification),
the notification element then sends a message to the device telling the device user that they need to buy a service plan.

VII. Multiple Policy Application for Service Activities Intended to be Tested for Multiple Classification Matches 1. Access network service policy system comprising one or more system elements configured to:
provide network access for a device over one or more access networks including at least a first access network,
store:
a first access classification comprising one or more first access activity identifiers,
a first access policy for governing an aspect of first access network activity associated with the device that falls within the first access classification, the first access policy comprising one or more first access policy instructions for the one or more system elements to assist in governing the aspect of first access network activity,
a second classification comprising one or more second access activity identifiers, the first access activity identifiers and the second access activity identifiers having the capability to be configured so that at least one common possible access activity falls within both the second classification and the first classification,
a second access policy for governing an aspect of access activity that falls within the second classification, the second access policy comprising one or more second access policy instructions for the one or more system elements to assist in governing the aspect of access network activity,
a literal or implied policy priority rule that enables determining that the first access policy has higher priority,
identify a first access classification match comprising identification of a device attempted or actual communication over the first access network that falls within the first access classification,
apply the first access policy to the device attempted or actual communication over the first access network, determine if identifying access network activity that meets the second classification should be attempted, and if so then:
initiate a process to attempt to identify a second classification match comprising identification of a device attempted or actual communication over the first access network that falls within the second classification, and
if the second classification match is identified then apply the second access policy to the device attempted or actual communication over the first access network.
2. Store two or more classification definitions wherein at least two of the classification definitions have at least one common access activity definition component that satisfied both classifications, access policies corresponding to each classification, provide classification instructions that contain either implied or literal rule for determining which policy to apply when a common activity component occurs, identify an access activity that meets the at least one common access activity definition component, implement the implied or literal rule and apply the correct policy.
3. Store two or more classification definitions wherein at least two of the classification definitions have at least one common access activity definition component that satisfied both classifications, access policies corresponding to each classification and a first policy state, provide classification instructions that contain either implied or literal rule for determining which policy to apply when a common activity component occurs and the first policy state if in effect, access policies corresponding to each classification and a second policy state, provide classification instructions that contain either implied or literal rule for determining which policy to apply when a common activity component occurs and the second policy state if in effect, identify an access activity that meets the at least one common access activity definition component when the first policy state is in effect, implement the implied or literal rule and apply the correct policy for the first policy state condition, identify a change in policy state to a second policy state, identify an access activity that meets the at least one common access activity definition component when the second policy state is in effect, implement the implied or literal rule and apply the correct policy for the second policy state condition. [First classification is a intro plan, second is a paid plan or no plan. First policy state is intro plan not exceeded, second policy state is intro plan exceeded.] [First classification is app plan, second is bulk plan. First state is application plan selected, second state is application plan not selected. First state is application plan in effect, second state application plan not in effect. In effect while under limit, not in effect while over limit. In effect on one network, not in effect on another network. In effect during one time window, not in effect during another time window. App plan is sponsored. Second bulk classification is paid.] [First classification is sponsored plan, second is paid. State changes when sponsored plan expires.]
Cap, disallow for plan, expiration vs. unstack, etc.:
4. Access network service policy system comprising one or more system elements configured to:
provide network access for a device over one or more access networks including at least a first access network,
store:
a first classification comprising one or more first access activity identifiers,
a first access policy for governing an aspect of first access network activity associated with the device that falls within the first classification, the first access policy comprising one or more first access policy instructions for the one or more system elements to assist in governing the aspect of first access network activity,
a second classification comprising one or more second access activity identifiers, the first access activity identifiers and the second access activity identifiers having the capability to be configured so that at least one common possible access activity falls within both the second classification and the first classification,
a second access policy for governing an aspect of access activity that falls within the second classification, the second access policy comprising one or more second access policy instructions for the one or more system elements to assist in governing the aspect of access network activity,
a literal or implied ordering policy that enables determining that the first access policy has higher priority,
identify a first classification match comprising identification of a device attempted or actual communication over the first access network that falls within the first classification,
apply the first application policy to the device attempted or actual communication over the first access network,
determine if:
Multiple policy sets that overlap with at least some of the same activities, an implied or literal policy for priority ordering, apply higher policy set until a condition occurs, apply the lower priority set after the condition occurs, or
Multiple policy sets that overlap with at least some of the same activities, three classification groups—first set, second set, common set, three policies.
5. Policy activity that causes multiple matches (matches more than one first order filter—e.g., doubleclick) (Service activity that satisfies multiple classification matches)
Policy application priority where service activities satisfy multiple service classifications, and/or
Service Activities classified multiple times (Cap-Match, Cap-No Match, Disallow for Plan-Match, Disallow for Plan-No Match)
6. Policy decision element, two or more policy enforcement rule sets comprising classification definitions, policy state definitions and mapping of combination of state and classification to low level policy instructions, capable of resolving a conflict in which policy set to apply that arises when at least two of the two or more policy rule sets include classifications that apply to common service activities, identify a service activity that falls within the priority classification, identify a policy state associated with the priority classification, use the mapping of classification and policy state to determine one or more low level policy enforcement instructions, provide the one or more low level policy enforcement instructions to a low level policy enforcement function.
7. The policy decision element of clause 6 further capable of accepting a priority change rule, wherein the priority classification is replaced with another classification that becomes the priority classification.

8. The policy decision element of clause 6 wherein priority change rule is based on a usage level associated with the first priority classification to reach a pre-determined level.
9. The policy decision element of clause 6 wherein priority change rule is based on a user input. User input received in response to a notification provided when classification was detected.
10. The policy decision element of clause 6 wherein priority change rule is based on a network state change.
11. The policy decision element of clause 6 wherein priority change rule is based on a detected pattern of service activity.
12. The policy decision element of clause 6 further comprising the capability to resolve the conflict comprising implied or literal ordering instructions for which policy to apply in the case of an overlap.

VIII. Classification Policy Flow

1. Access network system comprising one or more elements configured to:
   Communicate with a first end-user device to provide access services
   Store a access service policy comprising:
      Classification set comprising one or more classifications of attempted or actual access service usage [include more in this definition as in other claims]
      Access policy instruction set comprising:
         one or more first policy implementation instructions associated with at least one of the one or more classifications of attempted or actual access service usage, the one or more first policy implementation instructions configured to implement one or more of:
            a first user notification regarding a first aspect of the at least one of the one or more classifications of access network service attempted or actual usage,
            a first service control for a first aspect of the at least one of the one or more classifications of access network service attempted or actual usage, and
            a first service accounting for a first aspect of the at least one of the one or more classifications of access network service attempted or actual usage,
         one or more second policy implementation instructions associated with the at least one of the one or more classifications of attempted or actual access service usage, the one or more first policy implementation instructions configured to implement on or more of:
            a second user notification regarding a second aspect of the at least one of the one or more classifications of access network service attempted or actual usage,
            a second service control for a second aspect of the at least one of the one or more classifications of access network service attempted or actual usage, and
            a second service accounting for a second aspect of the at least one of the one or more classifications of access network service attempted or actual usage,
         an implied or literal ordering instruction indicating which of the first or second policy implementation instructions is the higher priority policy implementation instruction that is to be applied first to attempted or actual access network service usage that matches the at least one of the one or more classifications and which is the lower priority policy implementation instruction that is to be applied second to attempted or actual access network service usage that matches the at least one of the one or more classifications,
         an implied or literal re-match instruction indicating that after the higher priority policy instruction is applied to attempted or actual access network service usage that matches the at least one of the one or more classifications the second policy instruction should be applied to attempted or actual access network service usage that matches the at least one of the one or more classifications,
      Identify attempted or actual service usage that falls within the at least one of the one or more classifications,
      Implement the higher priority policy implementation instruction,
      Implement the lower priority policy implementation instruction.
2. The Access network system of clause 1 wherein the policy store further comprises a no-match policy set and if no classification match is identified then a no-match policy is implemented.
3. The Access network system of clause 1 wherein the access policy instruction set applies to a subset of devices capable of communicating with the access network, the subset of devices being identified by a subset of user or device credentials, and the access network system is further configured to identify a specific user credential or device credential associated with the attempted or actual service usage that falls within the at least one of the one or more classifications and determine if the device credential is associated with the classification and policy set.
4. The Access network system of clause 1 wherein the policy store is configured to be updated by a higher level policy control function in the one or more network elements when the policy state changes.
5. The Access network system of clause 1 wherein the policy store is configured to be updated when a policy state change is detected, and the update comprises a new set of classifications or policy implementation instructions associated with the new policy state.
6. The Access network system of clause 5 wherein policy state change is at least one of:
   change in access connection or access connection type,
   change in user service plan selection status, or
   a service usage amount associated with the at least one of the one or more classifications of attempted or actual access service usage reaching a limit.

IX. Joint Policy Including Notification

1. Access network service policy system comprising one or more system elements configured to:
   provide network access for a device over one or more access networks including at least a first access network,
   store:
      a first classification comprising one or more first access activity identifiers (e.g., where need to await user response to determine policy and/or marketing interceptor),
   determine if the communication flow meets a notification trigger condition, if so trigger the notification, determine if the communication flow meets a traffic control classification, if so then apply the traffic control policy, determine a usage accounting classification for the traffic flow and accumulate the usage account corresponding to the classification.

Design of Triggers and Offers for Marketing Interceptor:

2. Determine if the communication flow meets a classification, if so trigger the corresponding service offer notification and apply the control policy corresponding to no user response on the offer, receive a user response to the offer, determine the control policy associated with the particular user response, apply the control policy associated with the particular user response.
3. Insert marketing interceptor, continue with policy match process.

Insert Marketing Interceptor, Block.

4. Once a plan reaches limit, send notification to user informing that activity will be charged to another plan.
5. Once a plan reaches limit, send notification to user informing that the activity will be blocked unless another plan is purchased.
6. Set plan classification policy and limit, set trigger at limit and associated with notification trigger index, design notification to include plan options that will allow activity to continue and associate notification with notification trigger index, implement policy, block at limit, trigger notification index message, send notification to UI, accept user response to plan options.
7. Set plan classification policy and limit, set trigger at limit and associated with notification trigger index, design notification to include option to go to plan choices and associate notification with notification trigger index, implement policy, block at limit, trigger notification index message, send notification to UI, accept user response to go to plan options, purchase plans.

Various aspects and features of embodiments disclosed herein are set forth, for example and without limitation, are also set forth in the following outline:

1. Service design system configured to provide one or more user interface environments configured to enable an admin to create one or more notification trigger event definitions, associate each of the notification trigger definitions with a corresponding notification that is designed, specified, created or obtained in the service design system, translate the one or more notifications into a provisioning instruction set for a network notification system, and translate the one or more notification trigger definitions into a provisioning instruction set capable or provisioning the a communication monitoring system to detect the notification trigger events and to initiate the one or more notifications to be delivered by the notification system.
    1.1. Wherein trigger event definitions comprise one or more filters (or one or more components)
        1.1.1. Voice
        1.1.2. SMS, MMS
        1.1.3. Data
            1.1.3.1. A Classification of data
                1.1.3.1.1. Traffic classified by traffic type
                    1.1.3.1.1.1. Basic data, streaming, VOIP, music, video, downloads, synch services
                1.1.3.1.2. Traffic classified by application
                    1.1.3.1.2.1. Parameters to classify application parameters are entered into SDC and translated to provision policy elements
                        1.1.3.1.2.1.1. App communications are identified by communication flows associated with an app as determined by device agent detecting flows associated with an app credential that was identified or entered in SDC
                            1.1.3.1.2.1.1.1. App credential comprises a certificate or hash result that may be checked on the device to confirm app identity
                            1.1.3.1.2.1.1.2. App credential is selected in SDC from a list of apps available to device
                            1.1.3.1.2.1.1.3. App credential is selected in SDC from a list of apps available in app store
                        1.1.3.1.2.1.2. App communications are identified by communication flows associated with an app as determined by network element detecting communication flows associated with a network server, portal or website identifier associated with the app that was identified or entered in SDC
                1.1.3.1.3. Traffic classified by network destination, address, server, url, website, gateway identifier, proxy identifier
                1.1.3.1.4. Traffic classified by logical channel or logical path, APN, a path to a particular network endpoint, a PDP context, a VPN, a PPP session, a login credential used to gain access to a network (such as a username or password), a communication path to a proxy server, a path to a partner server, a path to a partner network
            1.1.3.2. Traffic associated with a particular QoS level, best effort, streaming, real time interactive, guaranteed.
    1.2. Wherein trigger event includes a policy state qualifier
        1.2.1. An amount of communication, a measure of communication, an amount of network use or a measure of network use
        1.2.2. Amount of use index, limit not reached, limit reached, multi-limit definitions
        1.2.3. Type of network (carrier identifier, 2G, 3G, 4G, home, roaming, cellular, WiFi, femto/indoor/macro, partner roaming/non-partner roaming)
        1.2.4. Time of day
        1.2.5. Geography/location
        1.2.6. Foreground/background communication activity
            1.2.6.1. Foreground/background identified by a foreground or background status of an application
            1.2.6.2. Foreground/background identified by the type of network access (e.g. identify a network access as an access to a software update server, synch services server, app store download server, media download server, email download server, etc.)
        1.2.7. Network busy state or network performance level
    1.3. Wherein at least a portion of the notification UI presentation is designed in or loaded into the SDC environment
        1.3.1. notification text, a notification action element that the user can use to indicate acknowledgement of the notification or acceptance or rejection of an offer to continue, branding name, branding imagery, an icon or descriptive image, a color scheme
    1.4. Wherein the one or more notifications are defined to be associated with a first device group or subscriber group that is serviced by a network and not a second device group or subscriber group that is serviced by a network
    1.5. Wherein the notification comprises a service offer
        1.5.1. text describing offer, a notification action element that the user can use to indicate acknowledgement of the notification or acceptance or rejection of an offer to continue, branding name, branding imagery, an icon or descriptive image, a color scheme 1.5.2. Offer associated with a service plan identifier associated with a service policy provisioning instruction set for one or more network elements, one or more device agents, or one or more network elements and one or more device agents so that the proper service plan policy may be provisioned when the service offer is accepted by a device user that receives the notification.
2. Service design environment configured to provide one or more user interface environments configured to enable an admin to create one or more filter sets, associate the one or more filter sets with one or more service policies to create one or more policy objects, translate the one or more policy objects into a provisioning instruction set capable or provisioning the communication network policies defined in the one or more policy objects, the one or more filter sets each comprising one or more filters.
3. Service design environment configured to provide one or more user interface environments configured to enable an admin to group one or more filters into one or more components and associate the one or more components with one or more policies to create one or more policy objects, translate the one or more policy objects into provisioning instruction set capable or provisioning the communication network policies defined in the one or more policy objects.
4. Service design environment configured to provide one or more user interface environments configured to enable an admin to group one or more filters into one or more components and associate the one or more components with one or more policies to create a service plan or service bundle, translate the service plan or service bundle into provisioning instruction set capable or provisioning the communication network policies defined in the service plan or service bundle.
5. Service design environment configured to provide one or more user interface environments configured to enable an admin to group one or more plans and bundles into catalog objects to provide user service plan/bundle selection options to users associated with one or more device groups, subscriber groups, demographic groups, partners, according to geographies, according to available network type (e.g. home, roaming, WiFi, carrier identifier, etc.).
   5.1. SDC further configured to translate catalog objects into user interface notifications comprising service offers associated with the catalog objects.
   5.2. SDC further configured to associated an identifier of the service catalog objects with an identifier for a service plan provisioning instruction configuration so that when a user selects a service plan or bundle from the service catalog the correct service plan provisioning instruction set will be programmed into the necessary network apparatus (e.g. network based equipment, device based agents or a combination of network based equipment and device based agents) to enable the service plan or bundle.
0. All of the following dependent embodiments can be combined with any of the above independent embodiments 2-5
   .1. SDC further configured to define a first set of one or more policy objects (or plans/bundles or catalog) for a first device group or subscriber group and a second set of one or more policy objects (or plans/bundles or catalog) for a second device group or subscriber group
      .1.1. First device group or user for one demographic of users, second device group or subscriber group for a second demographic of users
         .1.1.1. Users self-select demographic based on description of demographic
         .1.1.2. Demographic selected by characterization of a user
      .1.2. First set of one or more policy objects (or plans/bundles or catalog) can be made available for definition or management for a first admin authentication log-in and second set of one or more policy objects (or plans/bundles or catalog) can be made available for definition or management for a second admin authentication log-in
      .1.3. First set for a first geography and second set for a second geography
         .1.3.1. Geography determined by where device activates
         .1.3.2. Geography determined by where device is at a given time, and device swaps device groups when geography changes
      .1.4. First set for a first network operator and second set for a second network operator
         .1.4.1. Network operator determined by which network operator device activates with
         .1.4.2. Network operator determined by which network device connects to at a given time, and device swaps device groups when network changes
      .1.5. First set for a first OEM and second set for a second OEM
      .1.6. First set for a first MVNO and second set for a second MVNO
      .1.7. First set for a first service partner offering and second set for a second service partner offering
      .1.8. Devices can be associated with first or second set by enrolling device credentials in the first or second device group
         .1.8.1. Carrier enrolls user
         .1.8.2. Carrier partner enrolls user
         .1.8.3. User enrolls via website
         .1.8.4. User enrolls via device UI with multi-device group offers by selecting the device group the user prefers
            .1.8.4.1. Multi-device group offers comprise different service plan offers
            .1.8.4.2. Multi-device group offers comprise different carrier brands
      .1.9. Users can be associated with first or second set by enrolling user credentials in the first or second set
      .1.10. Upon enrollment in the first group or the second group, network authentication system recognizes user device credential as being associated with the policies of the correct group, and the user's device receives the services designed and provisioned by the SDC for the group the device is enrolled in
      .1.11. Upon enrollment in the first group or the second group, one or more device based agents are provisioned with the policies of the correct group, and the user's device receives the services designed and provisioned by the SDC for the group the device is enrolled in
   .2. One or more policies=a communication control policy, an access control policy, a traffic control policy or a combination of these
   .3. Wherein filters define a classification of communication activity comprising one or more of
      .3.1. Voice
      .3.2. Text
      .3.3. Data .3.3.1. Traffic classified by traffic type, basic data, streaming, VOIP, music, video, downloads, synch services
.3.3.2. Traffic classified by application
.3.3.2.1. Parameters to classify application parameters are entered into SDC and translated to provision policy elements
.3.3.2.1.1. App communications are identified by communication flows associated with an app as determined by device agent detecting flows associated with an app credential that was identified or entered in SDC
.3.3.2.1.1.1. App credential comprises a certificate or hash result that may be checked on the device to confirm app identity
.3.3.2.1.1.2. App credential is selected in SDC from a list of apps available to device
.3.3.2.1.1.3. App credential is selected in SDC from a list of apps available in app store
.3.3.2.1.2. App communications are identified by communication flows associated with an app as determined by network element detecting communication flows associated with a network server, portal or website identifier associated with the app that was identified or entered in SDC
.3.3.3. Traffic classified by network destination, address, server, url, website, gateway identifier, proxy identifier
.3.3.4. Traffic classified by logical channel or logical path, APN, a path to a particular network endpoint, a PDP context, a VPN, a PPP session, a login credential used to gain access to a network (such as a username or password), a communication path to a proxy server, a path to a partner server, a path to a partner network
.3.3.5. Traffic associated with a particular QoS level, best effort, streaming, real time interactive, guaranteed.
.4. One or more policies=a service accounting policy
.4.1. Communication measure or amount
.4.2. Network usage
.4.3. Communication occurrences
.4.4. An amount of time elapsed while communicating or enabled to communicate
.4.5. Transactions
.4.6. Measure of a classification of communication
.4.6.1. Voice
.4.6.2. Text
.4.6.3. Data
.4.6.3.1. Traffic classified by traffic type, basic data, streaming, VOIP, music, video, downloads, synch services
.4.6.3.2. Traffic classified by application
.4.6.3.2.1. Application identified by app credential that is identified or entered into SDC UI
.4.6.3.3. Traffic classified by network destination, address, server, url, website, gateway identifier, proxy identifier
.4.6.3.4. Traffic classified by logical channel or logical path, APN, a path to a particular network endpoint, a PDP context, a VPN, a PPP session, a login credential used to gain access to a network (such as a username or password), a communication path to a proxy server, a path to a partner server, a path to a partner network
.4.6.3.5. Traffic associated with a particular QoS level, best effort, streaming, real time interactive, guaranteed.
.4.6.4. Network type
.4.6.4.1. Roaming/home
.4.6.4.2. Cellular/WiFi
.4.6.4.3. 2G/3G/4G
.4.6.4.4. Carrier associated with network
.4.6.5. Sponsored, user paid, zero rated
.4.7. Accounting charged to one or more entities
.4.7.1. User responsible for account
.4.7.2. Entity responsible for account other than user (e.g. business)
.4.7.3. Sponsor of service (e.g. app sponsor, shopping sponsor, maps/nav sponsor, transaction sponsor)
.4.7.4. Carrier
.4.7.5. MVNO
.4.7.6. Combination
.4.7.6.1. some classifications to one entity, other classifications to another entity
.4.7.6.2. a portion of a classification to one entity, a portion of the same classification to another entity (e.g. sponsor pays for X usage of classification, user pays for remainder)
.5. One or more policies=a notification policy
.5.1. SDC is further configured to define an aspect of the user interface notification
.5.1.1. Aspect of the user interface notification displayed by the service offer comprising one or more of: text describing offer, a notification action element that the user can use to indicate acknowledgement of the notification or acceptance or rejection of an offer to continue, branding name, branding imagery, an icon or descriptive image, a color scheme
.5.1.2. Aspect of the user interface notification can be designed to change with device group or subscriber group
.5.1.3. Aspect of the user interface notification can be conditioned on policy state so that notification varies as a function of policy state
.5.1.3.1. Changes with available network type or carrier
.5.1.3.2. Changes with geography
.5.1.4. Service offer comprises an offer to enroll a new device in a family plan or an enterprise plan
.5.1.4.1. New device enrolled in plan inherits policies of other devices in plan
.5.2. a usage indication policy,
.5.3. a limit reached notification policy,
.5.4. an out of service or service not available policy
.5.5. a service plan offer policy
.5.6. a marketing interceptor policy
.5.7. notification can be triggered by a filter match
.5.7.1. when filter is matched, trigger notification comprising a service offer
.5.7.1.1. SDC is further configured to define an aspect of the user interface notification displayed by the service offer
.5.7.1.1.1. Aspect of the user interface notification displayed by the service offer comprising one or more of: notification message text describing the offer, notification text describing why the offer is needed, a notification action element that the user can use to indicate acceptance or rejection of the offer, branding name, branding imagery, an icon or image, a color scheme
.5.8. notification can be triggered by a filter match condition on a policy state
.6. Service design environment further configured to define one or more policies to be a joint policy set of one or more control policies and one or more accounting policies
.6.1. Wherein at least one of the one or more control policies and at least one of the one or more accounting policies share at least one common filter
.7. Service design environment further configured to define one or more policies to be a joint policy set of one or more control policies and one or more notification policies
.7.1. Wherein at least one of the one or more control policies and at least one of the one or more notification policies can be configured to share at least one common filter
.7.2. Control policy comprises restricting or not allowing a communication activity for which there is no service plan in effect, and notification policy comprises notifying the user that a service plan is required to use the communication activity over a network
.7.2.1. Communication activity defined by one or more filters comprises:
.7.2.1.1. Voice call
.7.2.1.2. Text, SMS, MMS
.7.2.1.3. Data communication
.7.2.1.3.1. Classification of data communication
.7.2.1.3.1.1. Basic data
.7.2.1.3.1.2. Streaming data (music, video)
.7.2.1.3.1.3. App
.7.2.1.3.1.3.1. App identified by app credential on device that was identified or entered in SDC UI
.7.2.1.3.1.3.2. App identified by network resource associated with app wherein network resource was identified in SDC
.7.2.1.3.1.4. Website
.7.2.1.3.1.5. VOIP
.7.2.1.3.1.6. Video call
.7.2.1.4. Cellular
.7.2.1.5. WiFi
.7.2.1.6. Roaming
.7.2.1.7. Hot spot or other LAN tethering
.7.3. Control policy comprises restricting or not allowing a communication activity for which there is no service plan in effect, and notification policy comprises providing a service offer to user and accepting a user selected option to enable service plan
.7.3.1. Communication activity defined by filter comprises:
.7.3.1.1. Voice call
.7.3.1.2. Text, SMS, MMS
.7.3.1.3. Data communication
.7.3.1.3.1. Classification of data communication
.7.3.1.3.1.1. Basic data
.7.3.1.3.1.2. Streaming data (music, video)
.7.3.1.3.1.3. App
.7.3.1.3.1.3.1. Classified by communication flows associated with an app as determined by device agent detecting flows associated with an app credential that was identified or entered in SDC
.7.3.1.3.1.3.2. Classified by communication flows associated with an app as determined by network element detecting communication flows associated with a network server, portal or website identifier associated with the app that was identified or entered in SDC
.7.3.1.3.1.4. Website
.7.3.1.3.1.5. VOIP
.7.3.1.3.1.6. Video call
.7.3.1.4. Cellular
.7.3.1.5. WiFi
.7.3.1.6. Roaming
.7.3.1.7. Hot spot or other LAN tethering
.7.4. Control policy is condition on a usage amount reaching a limit on an available allowance and control policy comprises restricting or not allowing a communication activity for which the available service allowance has been exhausted, and notification policy comprises notifying the user that a service plan is required to use the communication activity over a network
.7.5. Control policy comprises restricting or not allowing a communication activity for which the available service allowance has been exhausted, and notification policy comprises notifying the user that a service overage charge is required to use the communication activity over a network and accepting a user acknowledgement response to the notification
.7.6. Control policy comprises restricting or not allowing a communication activity for which the available service allowance has been exhausted, and notification policy comprises providing a service offer to user and accepting a user selected option to enable service plan
.8. Service design environment further configured to define one or more policies to be a joint policy set of one or more accounting policies and one or more notification policies
.8.1. Wherein at least one of the one or more accounting policies and at least one of the one or more notification policies can be configured to share at least one common filter
.8.2. Wherein the accounting policy includes a limit on service and the notification policy triggers a notification indicating the limit on service has been reached when the limit is reached
.8.3. Wherein the accounting policy includes a limit on service and the notification policy triggers a notification indicating an additional service needs to be purchased or indicating an overage charge when the limit is reached
.8.4. Wherein the accounting policy includes a limit on service and the notification policy triggers a notification comprising:
.8.4.1. an offer for additional service purchase and an acceptance of a user response to the offer
.8.4.2. an indication of an overage charge when the limit is reached and an acceptance of a user response to an overage acknowledgement
.9. Service design environment further configured to define one or more policies to be a joint policy set of one or more control policies, one or more accounting policies and one or more notification policies
.9.1. Wherein at least one of the one or more control policies and at least one of the one or more accounting policies and at least the one of the one or more notification policies can be configured to share at least one common filter
.10. Service design environment further configured to enable admin to define one or more policy states and admin defines how at least a subset of one or more policies vary as a function of policy state.
　.10.1. Policy state=one or more of
　　.10.1.1. Amount of use index, limit not reached, limit reached, multi-limit definitions
　　.10.1.2. Type of network (carrier identifier, 2G, 3G, 4G, home, roaming, cellular, WiFi, femto/indoor/macro, partner roaming/non-partner roaming)
　　.10.1.3. Time of day
　　.10.1.4. Geography/location
　　.10.1.5. Foreground/background communication activity
　　　.10.1.5.1. Foreground/background identified by a foreground or background status of an application
　　　.10.1.5.2. Foreground/background identified by the type of network access (e.g. identify a network access as an access to a software update server, synch services server, app store download server, media download server, email download server, etc.)
　　.10.1.6. Network busy state or network performance level
.11. Wherein the format of the information in the one or more policy objects (or plans/bundles or catalog) is structured to be compatible with the provisioning instructions required to provision a particular network policy architecture
　.11.1. Wherein the particular policy architecture comprises a 3GPP policy architecture
　.11.2. Wherein the particular policy architecture comprises one or more device based agents that are provisioned with one or more policy instructions or settings
　.11.3. Wherein the particular policy architecture comprises one or more network based elements that are provisioned with one or more policy instructions or settings
　.11.4. Wherein the policy architecture comprises one device based agents that are provisioned with one or more policy instructions or settings and one or more network based elements that are provisioned with one or more policy instructions or settings
　.11.5. Wherein the particular policy architecture comprises one or more policy decision elements and one or more policy enforcement elements
　　.11.5.1. Wherein the one or more policy decision elements comprise one or more network based PCEF elements and the one or more policy enforcement elements comprise one or more network based PCRF elements
　　.11.5.2. Wherein the one or more policy decision elements comprise one or more device based policy decision agents and the one or more policy enforcement elements comprise one or more policy enforcement agents
　　.11.5.3. Wherein the one or more policy decision elements comprise one or more device based notification agents
　　.11.5.4. Wherein the one or more policy decision elements comprise one or more device based notification elements and one or more device based service monitors configured to detect notification trigger conditions
　　.11.5.5. Wherein the one or more policy decision elements comprise one or more network based notification elements
　　.11.5.6. Wherein the one or more policy decision elements comprise one or more network based notification elements and one or more network based service monitors configured to detect notification trigger conditions
　.11.6. Wherein the particular policy architecture comprises one or more notification trigger identification elements and or more user notification elements.
　　.11.6.1. Wherein the provisioning instruction set comprises a definition of one or more trigger events, the trigger events comprising network communication activities or events that are associated with one or more user notifications, and wherein the one or more notification trigger identification elements identify when a particular notification trigger event from the one or more trigger events has occurred, and the one or more trigger elements provide information to the one or more notification elements indicating that the particular trigger event has occurred and the notification element causes a particular corresponding user notification of the one or more user notifications to be displayed to a user of a mobile communications device.
　.11.7. Wherein the particular policy architecture comprises one or more policy decision elements, one or more policy enforcement elements and one or more notification elements
　.11.8. Wherein the particular policy architecture comprises one or more policy decision elements, one or more policy enforcement elements and one or more policy state classification elements
　.11.9. Wherein a policy decision element considers policy state obtained from a policy state classification element as a variable in choosing a policy enforcement instruction to provide to a policy enforcement element
　.11.10. Wherein the format of the information in the one or more policy objects (or plans/bundles or catalog) is further configured to cause a policy decision element to implement a filter match priority to effect a hierarchy of policy enforcement among the one or more filter sets and the policies associated with each filter set.
　.11.11. Wherein the format of the information in the one or more policy objects (or plans/bundles or catalog) is further configured to cause a policy enforcement element to implement a filter match priority to effect a hierarchy of policy enforcement among the one or more filter sets and the policies associated with each filter set.
.12. Definition of filter to create a filter object, store filter object, name filter object, re-use filter object in another service design use case, copy or clone filter object, copy or clone filter object to modify and re-name, revision control and dating of filter object, testing and/or approval cycle for filter object.
.13. Association of filters with policies to create service policy objects, store policy object, name policy object, re-use policy object in another service design use case, copy or clone policy object, copy or clone policy object to modify and re-name, revision control and dating of policy object, testing and/or approval cycle for policy object.

.14. Association of filters with event qualifiers and policies to create event qualified policy object, store policy object, name policy object, re-use policy object in another service design use case, copy or clone policy object, copy or clone policy object to modify and re-name, revision control and dating of policy object, testing and/or approval cycle for policy object.

.15. Policy objects can be graphical, drag and drop into policy design environment .16. Once designed, policy objects can be selected with a mouse and included in a new plan from the SDC UI.

.17. Policy objects can indicate tested/verified/approved objects vs. non-tested/verified/approved objects.

.17.1. Depending on type of service plan (e.g. engineering prototype, QA test, user beta test, production), an object can be rejected from being included in a plan if it is not of equal or higher test/verification/approval level .17.2. Device groups can vary according to the level of testing/verification/approval for policy objects .17.2.1. Small group for engineering, medium group for beta, larger group for production .17.2.2. Multiple smaller groups for beta with different versions of policy objects tested for each group, fine tune best beta group and use for production .18. SDC is further configured to specify definition of filter ordering and/or policy application ordering—Z order is well covered in current spec .19. SDC is further configured to specify design of sponsored service definitions, control policies, accounting policies, notification policies, offer policies .20. SDC is further configured to specify design of family share plans or corporate share plans .21. SDC is further configured to specify design of sandbox for family admin or corporate admin—admin can add device credentials to device group, change allowance policies for one or more devices, set limits for one or more devices, etc.

The section headings provided in this detailed description are for convenience of reference only, and in no way define, limit, construe or describe the scope or extent of such sections. Also, while various specific embodiments have been disclosed, it will be evident that various modifications and changes may be made thereto without departing from the broader spirit and scope of the disclosure. For example, features or aspects of any of the embodiments may be applied in combination with any other of the embodiments or in place of counterpart features or aspects thereof. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required. Further, in the foregoing description and in the accompanying drawings, specific terminology and drawing symbols have been set forth to provide a thorough understanding of the disclosed embodiments. In some instances, the terminology and symbols may imply implementation or operational details that are not required to practice those embodiments. Accordingly, the specification and drawings are to be regarded in an illustrative rather than a restrictive sense.

INCORPORATION BY REFERENCE

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/229,580, filed Sep. 9, 2011, entitled WIRELESS NETWORK SERVICE INTERFACES, now U.S. Pat. No. 8,626,115 (issued Jan. 7, 2014); application Ser. No. 13/237,827, filed Sep. 20, 2011, entitled ADAPTING NETWORK POLICIES BASED ON DEVICE SERVICE PROCESSOR CONFIGURATION, now U.S. Pat. No. 8,832,777 (issued Sep. 9, 2014); application Ser. No. 13/239,321, filed Sep. 21, 2011, entitled SERVICE OFFER SET PUBLISHING TO DEVICE AGENT WITH ON-DEVICE SERVICE SELECTION, now U.S. Pat. No. 8,898,293; application Ser. No. 13/248,028, filed Sep. 28, 2011, entitled ENTERPRISE ACCESS CONTROL AND ACCOUNTING ALLOCATION FOR ACCESS NETWORKS, now U.S. Pat. No. 8,924,469; application Ser. No. 13/247,998, filed Sep. 28, 2011, entitled COMMUNICATIONS DEVICE WITH SECURE DATA PATH PROCESSING AGENTS, now U.S. Pat. No. 8,725,123 (issued May 13, 2014); application Ser. No. 13/248,025, filed Sep. 28, 2011, entitled SERVICE DESIGN CENTER FOR DEVICE ASSISTED SERVICES, now U.S. Pat. No. 8,924,543; application Ser. No. 13/253,013, filed Oct. 4, 2011, entitled SYSTEM AND METHOD FOR PROVIDING USER NOTIFICATIONS, now U.S. Pat. No. 8,745,191 (issued Jun. 3, 2014); application Ser. No. 13/309,556, filed Dec. 1, 2011, entitled END USER DEVICE THAT SECURES AN ASSOCIATION OF APPLI- CATION TO SERVICE POLICY WITH AN APPLICATION CERTIFICATE CHECK, now U.S. Pat. No. 8,893,009; application Ser. No. 13/309,463, filed Dec. 1, 2011, entitled SECURITY, FRAUD DETECTION, AND FRAUD MITIGATION IN DEVICE-ASSISTED SERVICES SYSTEMS, now U.S. Pat. No. 8,793,758 (issued Jul. 29, 2014); application Ser. No. 13/374,959, filed Jan. 24, 2012, entitled FLOW TAGGING FOR SERVICE POLICY IMPLEMENTATION, now U.S. Pat. No. 8,606,911 (issued Dec. 10, 2013); application Ser. No. 13/441,821, filed Apr. 6, 2012, entitled MANAGING SERVICE USER DISCOVERY AND SERVICE LAUNCH OBJECT PLACEMENT ON A DEVICE; application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT; and application Ser. No. 13/802,483, filed Mar. 13, 2013, entitled MOBILE DEVICE ACTIVATION VIA DYNAMICALLY SELECTED ACCESS NETWORK;

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208, filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL; Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed September 28, entitled SECURED DEVICE DATA RECORDS, 2010; Provisional Application No. 61/407,358, filed Oct. 27, 2010, entitled SERVICE CONTROLLER AND SERVICE PROCESSOR ARCHITECTURE; Provisional Application No. 61/418,507, filed Dec. 1, 2010, entitled APPLICATION SERVICE PROVIDER INTERFACE SYSTEM; Provisional Application No. 61/418,509, filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; Provisional Application No. 61/472,606, filed Apr. 6, 2011, entitled MANAGING SERVICE USER DISCOVERY AND SERVICE LAUNCH OBJECT PLACEMENT ON A DEVICE; Provisional Application No. 61/550,906, filed Oct. 24, 2011, entitled SECURITY FOR DEVICE-ASSISTED SERVICES; Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; Provisional Application No. 61/610,876, filed Mar. 14, 2012, entitled METHODS AND APPARATUS FOR APPLICATION PROMOTION AND SPONSORSHIP; Provisional Application No. 61/610,910, filed Mar. 14, 2012, entitled WIFI ACTIVATION BACKUP PROCESS; Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; Provisional Application No. 61/674,331, filed Jul. 21, 2012, entitled SERVICE CONTROLLER FOR MANAGING CLOUD-BASED POLICY; Provisional Application No. 61/724,267, filed Nov. 8, 2012, entitled FLEXIBLE SERVICE PLAN DESIGN, USER INTERFACE AND DEVICE MANAGEMENT; Provisional Application No. 61/724,837, filed Nov. 9, 2012, entitled SERVICE PLAN DISCOVERY, CUSTOMIZATION, AND MANAGEMENT; Provisional Application No. 61/724,974, filed Nov. 10, 2012, entitled SERVICE PLAN DISCOVERY, CUSTOMIZATION, AND MANAGEMENT; Provisional Application No. 61/732,249, filed Nov. 30, 2012, entitled APPLICATION PROGRAMMING INTERFACES FOR SMART SERVICES; Provisional Application No. 61/734,288, filed Dec. 6, 2012, entitled INTERMEDIATE NETWORKING DEVICE SERVICES; and Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; Provisional Application No. 61/756,332, filed Jan. 24, 2013, entitled MOBILE HOTSPOT; Provisional Application No. 61/758,964, filed Jan. 30, 2013, entitled MOBILE HOTSPOT; Provisional Application No. 61/765,978, filed Feb. 18, 2013, entitled ENHANCED CURFEW AND PROTEC- TION ASSOCIATED WITH A DEVICE GROUP; Provisional Application No. 61/785,988, filed Mar. 14, 2013, entitled AUTOMATED CREDENTIAL PORTING FOR MOBILE DEVICES; Provisional Application No. 61/794,116, filed Mar. 15, 2013, entitled ENHANCED INTERMEDIATE NETWORKING DEVICE; Provisional Application No. 61/792,765, filed Mar. 15, 2013, entitled DEVICE GROUP AND SERVICE PLAN MANAGEMENT; and Provisional Application No. 61/793,894, filed Mar. 15, 2013, entitled SIMPLIFIED POLICY DESIGN, MANAGEMENT, AND IMPLEMENTATION.

What is claimed is:

1. A computer-implemented method of automatically generating provisioning instructions for one or more network-delivered services to be delivered to a wireless end-user device, wherein one or more processors are configured to execute instructions to perform a method comprising:
   prompting a service designer, via a user interface of a computing device, to
      specify, via the user interface, a plurality of network service classification objects and a plurality of service plans that incorporate the plurality of network service classification objects,
      specify, via the user interface, information that controls an order in which the plurality of network service classification objects are to be evaluated in connection with a network service request from a wireless end-user device,
      specify, via the user interface, the plurality of service plans as respective hierarchies of a plurality of service policies, a plurality of service policy components and plurality of service plan filters, wherein each service plan filter is associated with a respective policy state,
      specify, via the user interface, a plurality of service plan priorities for two or more overlapping service plans of the plurality of service plans, each overlapping service plan having at least one respective multi-match service policy component wherein the multi-match service policy component is configured to match a combination of the policy state of the end-user device and a service access event attempted or performed by the end-user device to a service policy component of at least one further overlapping service plan, and
      specify, for at least one of the multi-match service policy components, a multi-match entry that indicates whether or not that service policy component allows a re-match condition; and
   automatically generating a plurality of network equipment provisioning instructions for the plurality of service plans, the plurality of network equipment provisioning instructions
      indicating the order in which the plurality of classification objects are to be evaluated by a network element in connection with a network service request from a wireless end-user device, and
      indicating whether, when a classification object from the plurality of classification objects is evaluated and matched by the network element in connection with the network service request, the network element is allowed to evaluate other classification objects from the plurality of classification objects for a match in connection with the network service request.

2. The method of claim 1, wherein prompting the service designer, via the user interface, to specify information that controls an order in which the plurality of network service classification objects are to be evaluated in connection with a network service request comprises prompting the service designer to, via the user interface, assign each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of network service classification objects incorporated into the first service plan is to be evaluated in connection with the network service request before any of the plurality of network service classification objects incorporated into the second service plan is to be evaluated in connection with the network service request.

3. The method of claim 2, wherein the first plan class is a sponsored plan class and the second policy class is a user plan class.

4. The method of claim 1, wherein prompting the service designer to specify the plurality of service plans that incorporate the plurality of network service classification objects comprises:
   prompting the service designer to specify, via the user interface, a plurality of service policies that each incorporate one or more of the network service classification objects; and
   prompting the service designer to specify, via the user interface, one or more of the service policies to be incorporated into each of the service plans.

5. The method of claim 4, wherein prompting the service designer to specify information that controls an order in which the plurality of network service classification objects are to be evaluated in connection with the network service request comprises prompting the service designer to assign, via the user interface, each of the one or more service policies to a respective one of a plurality of policy classes that are prioritized relative to one another such that assignment of first and second service policies of the plurality of service policies to respective first and second policy classes of the plurality of policy classes indicates that the first service policy is prioritized over the second service policy such that any of the network service classification objects incorporated into the first service policy is to be evaluated in connection with the network service request before any of the network service classification objects incorporated into the second service policy is to be evaluated in connection with the network service request.

6. The method of claim 5, wherein the first policy class is a sponsored policy class and the second policy class is a user policy class.

7. The method of claim 5, wherein prompting the service designer to specify information that controls an order in which the plurality of network service classification objects are to be evaluated in connection with a network service request further comprises prompting the service designer to assign, via the user interface, each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of network service classification objects incorporated into the first service plan is to be evaluated in connection with the network service request before any of the plurality of network service classification objects incorporated into the second service plan is to be evaluated in connection with the network service request.

8. The method of claim 7, wherein automatically generating the plurality of network equipment provisioning instructions for the plurality of service plans comprises generating the plurality of network equipment provisioning instructions to order the evaluation of the plurality of network service classification objects first according to policy class priority and then according to plan class priority.

9. A computer system for generating network equipment provisioning instructions for one or more network-delivered services to be delivered to a wireless end-user device, the system comprising computing circuitry, including one or more processors and non-transitory memory to store program code, the program code to configure the one or more processors to:
prompt a service designer, via a user interface, to
specify, via the user interface, a plurality of network service classification objects and a plurality of service plans that incorporate the plurality of network service classification objects,
specify, via the user interface, information that controls an order in which the plurality of network service classification objects are to be evaluated in connection with a network service request from a wireless Elser device,
specify, via the user interface, the plurality of service plans as respective hierarchies of a plurality of service policies, a plurality of service policy components and plurality of service plan filters, wherein each service plan filter is associated with a respective policy state,
specify, via the user interface, a plurality of service plan priorities for two or more overlapping service plans of the plurality of service plans, each overlapping service plan having at least one respective multi-match service policy component wherein the multi-match service policy component is configured to match a combination of the policy state of the end-user device and a service access event attempted or performed by the end-user device to a service policy component of at least one further overlapping service plan, and
specify, for at least one of the multi-match service policy components, a multi-match entry that indicates whether or not that service policy component allows a re-match condition; and
generate a plurality of network equipment provisioning instructions for the plurality of service plans, the plurality of network equipment provisioning instructions
indicating the order in which the plurality of network service classification objects are to be evaluated in connection with a network service request from a wireless end-user device, and
indicating whether, when a classification object from the plurality of classification objects is evaluated and matched by the network element in connection with the network service request, the network element is allowed to evaluate other classification objects from the plurality of classification objects for a match in connection with the network service request.

10. The system of claim 9, wherein the program code to configure the one or more processors to prompt the service designer to specify information that controls an order in which the plurality of network service classification objects are to be evaluated in connection with a network service request comprises instructions to configure the one or more processors to prompt the service designer to assign, via the user interface, each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of network service classification objects incorporated into the first service plan is to be evaluated in connection with the network service request before any of the plurality of network service classification objects incorporated into the second service plan is to be evaluated in connection with the network service request.

11. The system of claim 10, wherein the first plan class is a sponsored plan class and the second policy class is a user plan class.

12. The system of claim 9, wherein the program code to configure the one or more processors to prompt the service designer to specify the plurality of service plans that incorporate the plurality of network service classification objects comprises instructions to configure the one or more processors to:
prompt the service designer to specify, via the user interface, a plurality of service policies that each incorporate one or more of the network service classification objects; and
prompt the service designer to specify, via the user interface, one or more of the service policies to be incorporated into each of the service plans.

13. The system of claim 12, wherein the program code to configure the one or more processors to prompt the service designer to specify information that controls an order in which the plurality of network service classification objects are to be evaluated in connection with the network service request comprises instructions to configure the one or more processors to prompt the service designer to assign, via the user interface, each of the one or more service policies to a respective one of a plurality of policy classes that are prioritized relative to one another such that assignment of first and second service policies of the plurality of service policies to respective first and second policy classes of the plurality of policy classes indicates that the first service policy is prioritized over the second service policy such that any of the network service classification objects incorporated into the first service policy is to be evaluated in connection with the network service request before any of the network service classification objects incorporated into the second service policy is to be evaluated in connection with the network service request.

14. The system of claim 13, wherein the first policy class is a sponsored policy class and the second policy class is a user policy class.

15. The system of claim 13, wherein the program code to configure the one or more processors to prompt the service designer to specify information that controls an order in which the plurality of network service classification objects are to be evaluated in connection with a network service request further configures the one or more processors to prompt the service designer to assign, via the user interface, each of the plurality of service plans to respective plan classes, the plan classes being prioritized relative to one another such that assignment of first and second service plans of the plurality of service plans to first and second plan classes, respectively, indicates that the first service plan is prioritized over the second service plan such that any of the plurality of network service classification objects incorporated into the first service plan is to be evaluated in connection with the network service request before any of the plurality of network service classification objects incorporated into the second service plan is to be evaluated in connection with the network service request.

16. The system of claim 15, wherein the program code to configure the one or more processors to generate the plurality of network equipment provisioning instructions for the plurality of service plans comprises instructions to configure the one or more processors to generate the plurality of network equipment provisioning instructions to order the evaluation of the plurality of network service classification objects first according to policy class priority and then according to plan class priority.

* * * * *